(12) United States Patent
Abraham et al.

(10) Patent No.: US 10,051,470 B2
(45) Date of Patent: Aug. 14, 2018

(54) SCHEDULE SELECTION AND CONNECTION SETUP BETWEEN DEVICES PARTICIPATING IN A NAN DATA LINK

(71) Applicant: QUALCOMM Incorporated, San Diego, CA (US)

(72) Inventors: Santosh Paul Abraham, San Diego, CA (US); Abhishek Pramod Patil, San Diego, CA (US); Alireza Raissinia, Monte Sereno, CA (US); George Cherian, San Diego, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 15/076,129

(22) Filed: Mar. 21, 2016

(65) Prior Publication Data

US 2016/0286574 A1 Sep. 29, 2016

Related U.S. Application Data

(60) Provisional application No. 62/298,398, filed on Feb. 22, 2016, provisional application No. 62/261,266, (Continued)

(51) Int. Cl.
*H04W 84/12* (2009.01)
*H04W 12/06* (2009.01)
(Continued)

(52) U.S. Cl.
CPC ............ *H04W 12/06* (2013.01); *H04L 63/04* (2013.01); *H04L 63/062* (2013.01); *H04L 63/065* (2013.01); *H04L 63/123* (2013.01);

*H04L 65/4076* (2013.01); *H04W 8/00* (2013.01); *H04W 12/04* (2013.01); *H04W 48/16* (2013.01);
(Continued)

(58) Field of Classification Search
CPC . H04W 72/1247; H04W 8/005; H04W 84/12; H04W 8/00; H04W 72/12
See application file for complete search history.

(56) References Cited

U.S. PATENT DOCUMENTS 5,638,412 A 6/1997 Blakeney, II et al.
2004/0062262 A1 4/2004 Venteicher et al.
(Continued)

FOREIGN PATENT DOCUMENTS

WO 1995035002 12/1995
WO 2005096548 A1 10/2005
(Continued)

OTHER PUBLICATIONS

International Search Report and Written Opinion—PCT/US2016/023591—ISA/EPO—dated May 24, 2016.
(Continued)

*Primary Examiner* — Andrew Lee
(74) *Attorney, Agent, or Firm* — Arent Fox, LLP

(57) ABSTRACT

A method, an apparatus, and a computer-readable medium for wireless communication are provided. In one aspect, an apparatus is configured to determine a multicast schedule for communicating data associated with a service over an NDL and to transmit the multicast schedule to at least one other wireless device.

74 Claims, 55 Drawing Sheets

Related U.S. Application Data filed on Nov. 30, 2015, provisional application No. 62/249,870, filed on Nov. 2, 2015, provisional application No. 62/207,874, filed on Aug. 20, 2015, provisional application No. 62/181,722, filed on Jun. 18, 2015, provisional application No. 62/165,652, filed on May 22, 2015, provisional application No. 62/137,125, filed on Mar. 23, 2015.

(51) Int. Cl.

| | | |
|---|---|---|
| *H04L 29/06* | (2006.01) | |
| *H04W 12/04* | (2009.01) | |
| *H04W 72/00* | (2009.01) | |
| *H04W 72/12* | (2009.01) | |
| *H04W 48/16* | (2009.01) | |
| *H04W 8/00* | (2009.01) | |
| *H04W 76/10* | (2018.01) | |

(52) U.S. Cl.
CPC ......... *H04W 72/005* (2013.01); *H04W 72/12* (2013.01); *H04W 72/1205* (2013.01); *H04W 72/1263* (2013.01); *H04W 76/10* (2018.02)

(56) References Cited

U.S. PATENT DOCUMENTS

| | | |
|---|---|---|
| 2005/0216942 A1 | 9/2005 | Barton |
| 2006/0026671 A1 | 2/2006 | Potter et al. |
| 2006/0203795 A1 | 9/2006 | Welborn et al. |
| 2009/0279449 A1 | 11/2009 | Kneckt et al. |
| 2010/0010899 A1 | 1/2010 | Lambert et al. |
| 2010/0165861 A1* | 7/2010 | Rrdland ............... H04W 36/30 370/252 |
| 2011/0158142 A1 | 6/2011 | Gong et al. |
| 2012/0236716 A1* | 9/2012 | Anbazhagan ....... H04L 41/5022 370/235 |
| 2013/0010767 A1 | 1/2013 | Wang et al. |
| 2013/0196708 A1 | 8/2013 | Narasimhan et al. |
| 2013/0278414 A1 | 10/2013 | Sprigg et al. |
| 2014/0045422 A1 | 2/2014 | Qi et al. |
| 2014/0080481 A1 | 3/2014 | Abraham et al. |
| 2014/0177504 A1* | 6/2014 | Sayeed ............... H04W 72/005 370/312 |
| 2014/0254426 A1 | 9/2014 | Abraham et al. |
| 2014/0254569 A1 | 9/2014 | Abraham et al. |
| 2014/0269555 A1 | 9/2014 | Sadasivam et al. |
| 2014/0302786 A1 | 10/2014 | Kasslin et al. |
| 2014/0321317 A1 | 10/2014 | Kasslin et al. |
| 2015/0063327 A1 | 3/2015 | Barriac et al. |
| 2015/0071121 A1 | 3/2015 | Patil et al. |
| 2016/0088480 A1* | 3/2016 | Chen ................. H04L 63/0823 713/171 |
| 2016/0150466 A1* | 5/2016 | Jung ................... H04W 8/005 455/434 |
| 2016/0205616 A1* | 7/2016 | Oren .................... H04W 4/08 370/254 |
| 2016/0206616 A1* | 7/2016 | Zhang ................ C07D 403/14 |
| 2016/0212606 A1* | 7/2016 | Qi ...................... H04L 65/4076 |
| 2016/0255080 A1* | 9/2016 | Griffin ............... H04L 63/0884 713/155 |
| 2016/0259800 A1 | 9/2016 | Luo |
| 2016/0278112 A1* | 9/2016 | Liu .................... H04W 8/005 |
| 2016/0286398 A1 | 9/2016 | Abraham et al. |
| 2016/0286572 A1 | 9/2016 | Abraham et al. |
| 2016/0286573 A1 | 9/2016 | Abraham et al. |
| 2017/0094554 A1 | 3/2017 | Liu et al. |
| 2018/0109952 A1 | 4/2018 | Abraham et al. |

FOREIGN PATENT DOCUMENTS

| | | |
|---|---|---|
| WO | 2008155623 A2 | 12/2008 |
| WO | 2015038272 A1 | 3/2015 |

OTHER PUBLICATIONS

"IEEE Standard for Information TechnologyTelecommunications and Information Exchange Between Systems Local and Metropolitan Area Networks Specific Requirements Part 11: Wireless LAN Medium Access Control (MAC) and Physical Layer (PHY) Specifications Amendment 6: Medium Access Control (MAC) Security Enh", IEEE Standard, [IEEE Standard], IEEE, Piscataway, NJ, USA, Jan. 1, 2004 (Jan. 1, 2004), pp. 1-175, XP017603687, ISBN: 978-0-7381-4074-2 paragraph 8.5.4 figure 43ad.

* cited by examiner

500

Available Time Blocks in Physical Channel 1

| 1 | 0 | 0 | 1 | 1 | 0 | 0 | 1 |
|---|---|---|---|---|---|---|---|
| TB1 | TB2 | TB3 | TB4 | TB5 | TB6 | TB7 | TB8 |

} FAM 502

Available Time Blocks in Physical Channel 1

| 0 | 1 | 0 | 1 | 1 | 0 | 1 | 1 |
|---|---|---|---|---|---|---|---|
| TB1 | TB2 | TB3 | TB4 | TB5 | TB6 | TB7 | TB8 |

} FAM 504

FIG. 5A

Availability Entry Definition 550

| Field | Value (Hex) | Description |
|---|---|---|
| Entry Control | Variable | Available entry control information |
| Operating Class | Variable | Indicating the frequency band the NAN Device will be available |
| Channel Number | Variable | Indicating the channel the NAN device will be available |
| Availability Intervals Bitmap | Variable | The Availability Intervals Bitmap divides the time between the beginnings of consecutive Discovery Windows of a given NAN cluster into consecutive time intervals of equal durations. The time interval duration is specified by the Availability Interval Duration subfield of the Entry Control field. A NAN device that sets the i-th bit of the Availability Intervals Bitmap to 1 shall be present during the corresponding i-th time interval in the operation channel indicated by the Operating Class and Channel Number fields in the same Availability Entry. A NAN device that sets the i-th bit of the Availability Intervals Bitmap to 0 may be present during the corresponding i-th time interval in the operation channel indicated by the Operating Class and Channel Number fields in the same Availability Entry. |

Entry Control Field Definition

| Bit(s) | Information | Description |
|---|---|---|
| 0-1 | Availability Interval Duration | Indicates the availability interval duration associated with the Availability Intervals Bitmap field. The value is set as follows: 0: 16 TU; 1: 32 TU; 2: 64 TU; 3: reserved |
| 2 | Availability on all channels | When set to 1, this bit indicates that the device is available on all channels in the Operating Class (as defined by the geographical location of the device). Channel number field is set to one of the possible channels for backward compatibility. NAN 2 devices (e.g., newer NAN devices ignore the channel number). |
| 3-7 | Reserved | -- |

FIG. 5B

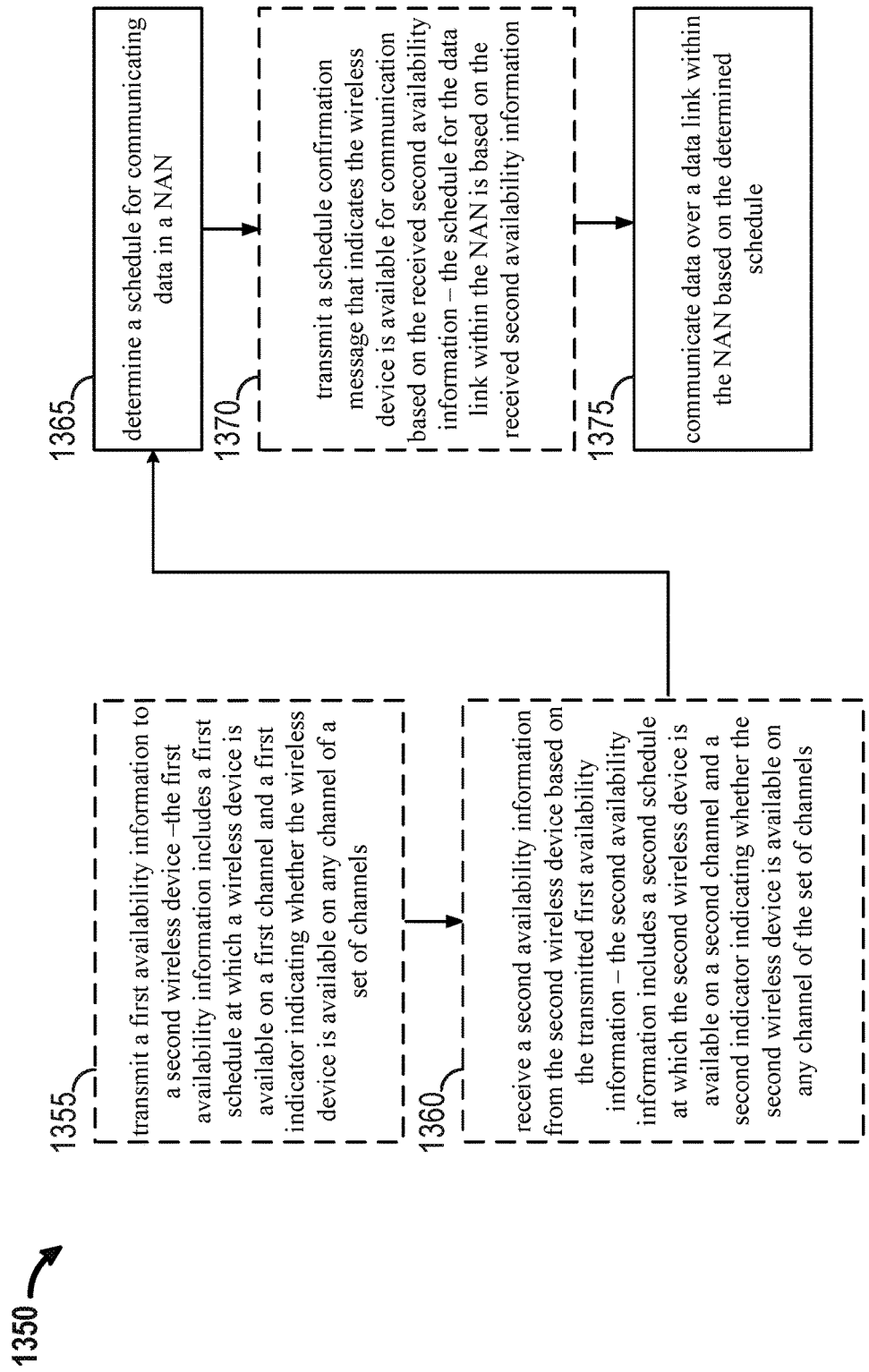

NDL Attribute for Negotiation — 2500

| Field | Description |
|---|---|
| Attribute ID | Identifies the type of NAN attribute |
| Length | Length of the following fields in the attribute |
| MAC Address | Device MAC address for data link |
| Group ID | Identifies the type of NAN attribute |
| Validity Time | Number of DW intervals for which this NDL attribute is valid (may be equivalent to NDL lifetime) |
| NDL Control | Device MAC address for data link |
| NDL Logical Channel Indicator | Length of the following fields in the attribute |
| Map Control | The availability channel and time map control information |
| Availability Intervals Bitmap | Present if indicated by NDL control.<br><br>The Availability Intervals Bitmap divides the time between the beginnings of consecutive Discovery Windows of a given NAN cluster into consecutive time intervals of equal durations. The time interval duration is specified by the Availability Interval Duration subfield of the Map Control field. A NAN device that sets the i-th bit of the Availability Intervals Bitmap to 1 shall be present during the corresponding i-th time interval in the operation channel indicated by the associated Further Availability Map attribute. A NAN device that sets the i-th bit of the Availability Intervals Bitmap to 0 may be present during the corresponding i-th time interval in the operation channel indicated by the associated Further Availability Map attribute. |
| Link Conditions | A set of one or more requirements to be satisfied before a device may join an NDL or communicate with a peer |

NDL Control Field

| Availability Map Present Indicator | NDL Logical Channel Indicator Present | Confirm | Flexible | Power Save | Reserved |

FIG. 25

|  | | PUBLISHER | | |
|---|---|---|---|---|
|  | | One to One | One to Many | Logical Channel |
| SUBSCRIBER | One to One | Mutually exchange availability and arrive at schedule | Subscriber provides availability to publisher and complies with the availability time chosen by the publisher | Comply with standard schedule provided by publisher |
| | One to Many | Publisher complies with standard schedule chosen by subscriber. Publisher provides services at times when publisher availability coincides with subscriber chosen schedule | | |
| | Logical Channel | Publisher complies with standard schedule chosen by subscriber. Publisher provides services at times when publisher availability coincides with subscriber chosen schedule | Publisher complies with standard schedule chosen by subscriber. Publisher provides services at times when publisher availability coincides with subscriber chosen schedule | Comply with standard schedule provided by publisher |

SCHEDULE SELECTION AND CONNECTION SETUP BETWEEN DEVICES PARTICIPATING IN A NAN DATA LINK

CROSS-REFERENCE TO RELATED APPLICATION(S)

This application claims the benefit of U.S. Provisional Application Ser. No. 62/137,125, entitled "CONNECTION SETUP FOR NAN DATA LINKS WITH NAN DATA LINK TIME BLOCKS" and filed on Mar. 23, 2015, U.S. Provisional Application Ser. No. 62/165,652, entitled "SCHEDULE SELECTION AND CONNECTION SETUP BETWEEN DEVICES PARTICIPATING IN A NAN DATA LINK" and filed on May 22, 2015, U.S. Provisional Application Ser. No. 62/181,722, entitled "SCHEDULE SELECTION AND CONNECTION SETUP BETWEEN DEVICES PARTICIPATING IN A NAN DATA LINK" and filed on Jun. 18, 2015, U.S. Provisional Application Ser. No. 62/207,874, entitled "SCHEDULE SELECTION AND CONNECTION SETUP BETWEEN DEVICES PARTICIPATING IN A NAN DATA LINK" and filed on Aug. 20, 2015, U.S. Provisional Application Ser. No. 62/249,870, entitled "SCHEDULE SELECTION AND CONNECTION SETUP BETWEEN DEVICES PARTICIPATING IN A NAN DATA LINK" and filed on Nov. 2, 2015, U.S. Provisional Application Ser. No. 62/261,266, entitled "SCHEDULE SELECTION AND CONNECTION SETUP BETWEEN DEVICES PARTICIPATING IN A NAN DATA LINK" and filed on Nov. 30, 2015, and U.S. Provisional Application Ser. No. 62/298,398, entitled "SCHEDULE SELECTION AND CONNECTION SETUP BETWEEN DEVICES PARTICIPATING IN A NAN DATA LINK" and filed on Feb. 22, 2016, which are expressly incorporated by reference herein in their entirety.

BACKGROUND

Field

The present disclosure relates generally to communication systems, and more particularly, to schedule selection and connection setup between devices participating in a neighbor awareness networking (NAN) data link (NDL), which may be associated with one or more a NAN data paths (NDPs).

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc., frequency bands. Wireless networks advantageously facilitate user mobility and rapid field deployment when compared to fixed wired networks.

SUMMARY

The systems, methods, computer-readable media, and devices of the invention each have several aspects, no single one of which is solely responsible for the invention's desirable attributes. Without limiting the scope of this invention as expressed by the claims, which follow, some features will now be discussed briefly. After considering this discussion, and particularly after reading the section entitled "Detailed Description," one will understand how the features of this invention provide advantages for devices in a wireless network.

One aspect of this disclosure provides an apparatus (e.g., a station or an access point) for wireless communication. The apparatus is configured to receive a message from a second wireless device. The message includes wake up information associated with the second wireless device for connection setup, and the message includes time block information indicating whether any data link time blocks (DL-TBs) are used by the second wireless device for data communication. The apparatus is configured to determine one or more wake up times associated with the second wireless device for connection setup based on the wake up information and the time block information included in the message. The apparatus is configured to establish a connection with the second wireless device based on the determined one or more wake up times associated with the second wireless device.

Another aspect of this disclosure provides an apparatus (e.g., a station or an access point) for wireless communication. The apparatus is configured to transmit a message to a second wireless device. The message includes wake up information associated with the first wireless device for connection setup, and the message includes time block information indicating whether any DL-TBs are used by the first wireless device for data communication. The apparatus is configured to receive a connection setup message from the second wireless device based on the wake up information and the time block information included in the message. The apparatus is configured to establish a connection with the second wireless device based on the received connection setup message.

Another aspect of this disclosure provides an apparatus (e.g., a station or an access point) for wireless communication. The apparatus is configured to determine a schedule for communicating data in a NAN. The apparatus is configured to communicate data over a data link within the NAN based on the determined schedule.

Another aspect of this disclosure provides an apparatus (e.g., a station or an access point) for wireless communication. The apparatus is configured to determine a schedule for communicating data over a data link within in a NAN. The apparatus is configured to communicate data with the second wireless device based on the determined schedule.

Another aspect of this disclosure provides an apparatus (e.g., a station or an access point) for wireless communication. The apparatus is configured to determine a data link attribute for scheduling a data link with a second wireless device and to transmit the determined data link attribute in a frame to the second wireless device.

Another aspect of this disclosure provides an apparatus (e.g., a station or an access point) for wireless communication. The apparatus is configured to determine a multicast schedule for communicating data associated with a service over an NDL and to transmit the multicast schedule to at least one other wireless device.

Another aspect of this disclosure provides an apparatus (e.g., a station or an access point) for wireless communication. The apparatus is configured to transmit a message to a second wireless device to request a multicast schedule for communicating data associated with an NDL and to receive a second message from the second wireless device based on the transmitted message. The second message may include the multicast schedule for communicating data associated with the service over the NDL.

Another aspect of this disclosure provides an apparatus (e.g., a station or an access point) for wireless communication. The apparatus is configured to determine to initiate a security negotiation with a publishing device to establish a secure NDP in which the publishing device is an authenticator in the security negotiation and the apparatus (e.g., the subscribing device) is a supplicant. The apparatus is configured to transmit an initiation message to the publishing device, which is providing a NAN service, to initiate the security negotiation for establishing the secure NDP. The initiation message may indicate that the publishing device will be the authenticator in the security negotiation.

Another aspect of this disclosure provides an apparatus (e.g., a station or an access point) for wireless communication. The apparatus may be a publishing device. The apparatus is configured to receive an initiation message from a subscribing device, which is requesting a NAN service, to initiate a security negotiation associated with an NDP. The initiation message may indicate that the publishing device is an authenticator in the security negotiation. The apparatus is configured to determine based on the received initiation message that the publishing device is the authenticator and the subscribing device is a supplicant in the security negotiation.

BRIEF DESCRIPTION OF THE DRAWINGS

FIG. 5A is a diagram with examples of availability information.

FIG. 5B illustrates an availability attribute for determining an availability of a wireless device for scheduling a data link.

FIG. 13B is a flowchart of an exemplary method of a wireless device performing a first variation of a second negotiated approach for a pair-wise connection setup using availability information.

FIG. 25 illustrates a data link attribute for determining an availability of a wireless device for scheduling a data link.

FIG. 27 illustrates a table that presents potential behavior of wireless devices based upon a mode of operation.

DETAILED DESCRIPTION

Figure 1:
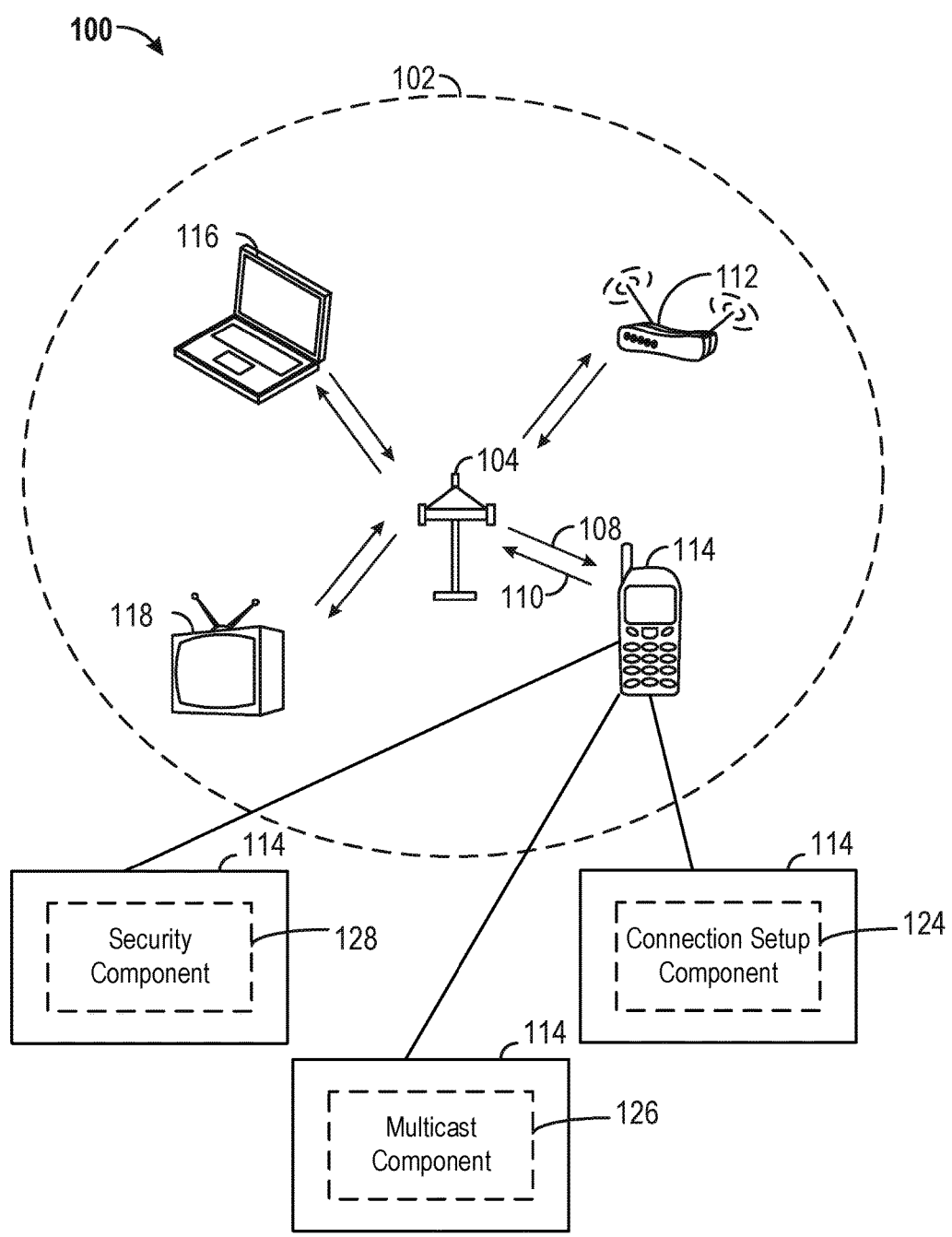
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method, which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices, which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, either from the beacon or probe response frames, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the STA 114 may include one or more components for performing various functions. For example, the STA 114 may include a connection setup component 124, a multicast component 126, and/or a security component 128. The connection setup component 124 may be configured to perform procedures related to setting up a data link (e.g., a P2P connection) in a NAN (or a NAN cluster) as described herein. The multicast component 126 may be configured to perform procedures related to providing for and subscribing to a multicast service in the NAN. The security component 128 may be configured to perform procedures related to setting up a security context for data link within the NAN. In an aspect, the connection setup component 124, the multicast component 126, and/or the security component 128 may be one component or multiple components. In another aspect, the connection setup component 124, the multicast component 126, and/or the security component 128 may be within a processing system.

In a NAN that has multiple wireless devices, each wireless device may have data to transmit to another wireless device over a P2P connection. NAN discovery windows may be used to enable wireless devices within the NAN to discovery other wireless devices. If a wireless device misses a NAN discovery window, then the wireless device will have to wait for the next NAN discovery window in order to perform connection setup. A NAN discovery window cannot be too long, however, or wireless devices may waste resources. As such, a need exists for an efficient method of enabling wireless devices to establish a connection with each other without having to remain awake for an extended period of time. Additionally, a need exists to perform connection setup (e.g., for P2P connections) within a NAN network that efficiently utilizes the available wireless resources given the various quality of service and bandwidth requirements of each wireless device.

To begin communication in a NAN data link (e.g., a P2P data link), wireless devices need to perform connection setup, which involves capability determination (e.g., exchanging information on the types of services available on each wireless device), secure association and key derivation (e.g., associating with another wireless device and exchanging private keys), Internet Protocol (IP) address determination and exchange, and block acknowledgment set up. Signaling for connection setup should be as low as possible to conserve device resources (e.g., battery power) and to reduce traffic on the wireless medium.

Figure 2:
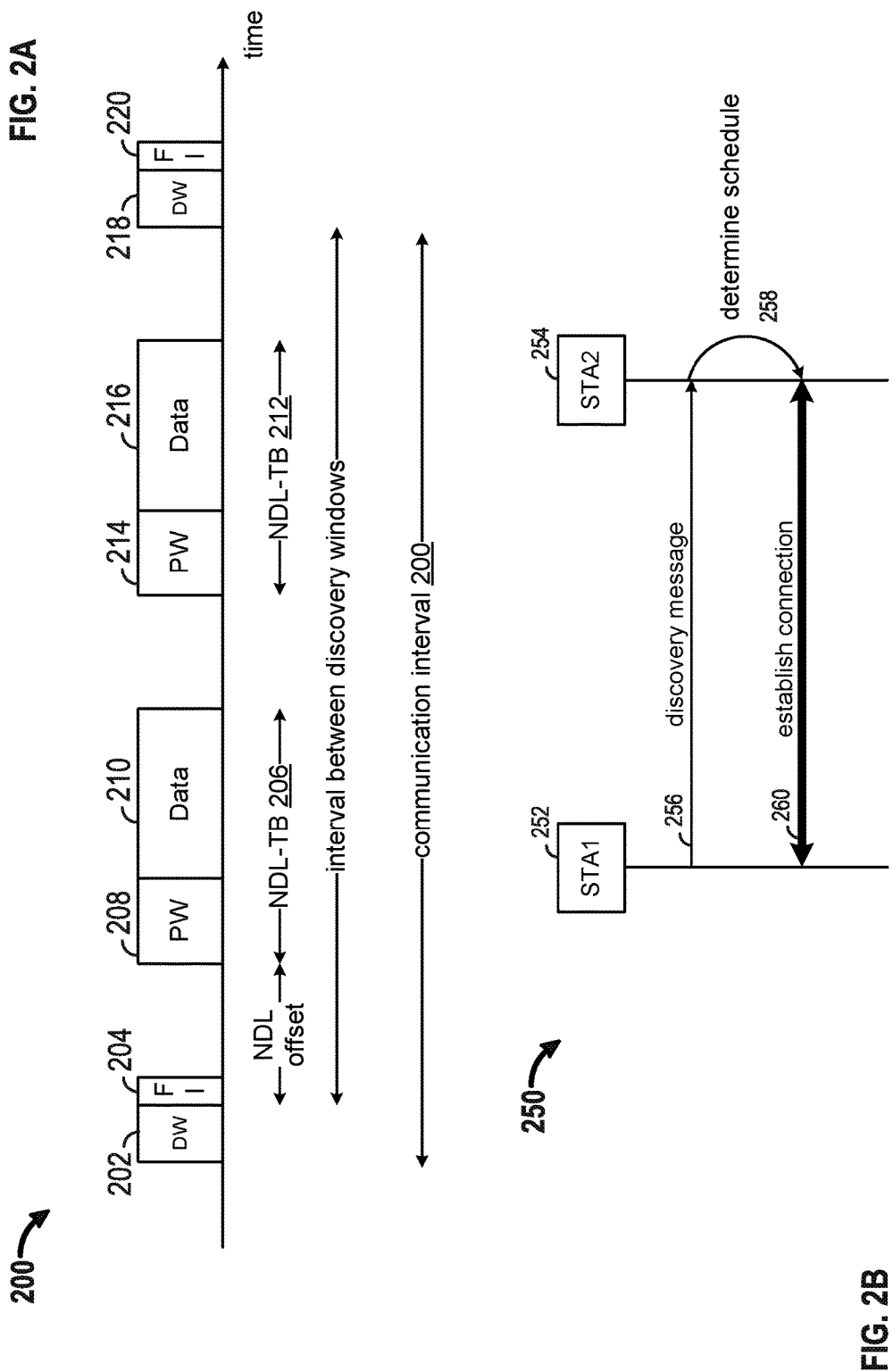
FIG. 2A is an exemplary diagram of a communication interval.
FIG. 2B illustrates an exemplary call flow diagram for a data link connection setup in a NAN.

Before connection setup can begin, wireless devices may need an efficient way to know when other wireless devices will be awake for connection setup. FIGS. 2A and 2B discuss methods for wireless devices to signal when the wireless devices are available for connection setup.

FIG. 2A is an exemplary diagram of a communication interval 200. The communication interval 200 may include discovery windows 202, 218 (e.g., NAN service discovery windows), which may be time windows designated for and dedicated for enabling wireless devices (e.g., a STA) within a NAN to discover other wireless devices. That is, during the discovery window 202, for example, wireless devices in the NAN may transmit peer discovery signals for peer discovery. The time interval between two discovery windows may be 512 time units (e.g., 512 ms). The communication interval 200 may include fixed intervals 204, 220 (which may also be known as connection setup windows or further service discovery windows), which may be allocated for connection setup. For example, after wireless devices discover each other during the discovery window 202, the wireless devices may utilize the fixed interval 204 after the discovery window 202 to transmit signaling for a connection setup (e.g., a P2P connection setup). In one aspect, the fixed interval 204 may immediately follow the discovery window 202 and may be dedicated for connection setup. In another aspect, the fixed interval 204 may follow the discovery window 202, but need not immediately follow the discovery window 202.

In an aspect, wireless devices may perform connection setup only during the fixed intervals 204, 220. Wireless devices that publish/subscribe to a service may remain awake after the discovery windows 202, 218 to exchange connection setup messages in the fixed intervals 204, 220. In some instances, however, the fixed intervals 204, 220 may occur infrequently (e.g., every 512 ms). Wireless devices may want to connect to a previously discovered service sooner than in the next fixed interval. Additionally, if connection setup were only allowed to occur at the fixed intervals 204, 220, wireless devices may need to remain awake for a time beyond the discovery windows 202, 218 on every communication interval 200 to receive connection setup messages. In the event no connection setup occurs and no data transmissions are expected, wireless devices may not be able to leverage early sleep after the discovery windows 202, 218.

To provide greater flexibility, aside from performing connection setup at the fixed intervals 204, 220, wireless devices may be given the option to commence connection setup during a NAN data link time block (or another type of DL-TB). As shown in FIG. 2A, the communication interval 200 includes a first NDL time block (NDL-TB) 206 and a second NDL-TB 212. The first NDL-TB 206 may be offset from the end or beginning of the discovery window 202 by an NDL offset value. The first NDL-TB 206 may include a first paging window 208 and a first data window 210. In aspect, a paging window may be considered a first portion of a NDL-TB. The first paging window 208 may be used by a first wireless device for paging a second wireless device to indicate that the first wireless device has data to transmit to the second wireless device (e.g., data related to a photo sharing service). Subsequently, the first wireless device may transmit the data in the first data window 210 used for transmitting data associated with destinations/wireless devices identified during the first paging window 208. Similarly, the second NDL-TB 212 may include a second paging window 214 and a second data window 216.

In an aspect, a third wireless device may have discovered the first wireless device during a previous discovery window and may be aware that the first wireless device is providing a service (e.g., photo sharing service). Subsequently, the third wireless device may want to establish a connection with the first wireless device, but the fixed interval 204 may already have passed. In this aspect, the third wireless device may utilize the first paging window 208 for connection setup. A more detailed explanation of the connection setup is provided in FIG. 2B. Although FIG. 2A illustrates one full communication interval, and the communication interval 200 has one discovery window, one fixed interval, and two NDL-TBs, any number of discovery windows, fixed intervals, and NDL-TBs may be found within a communication interval.

NAN network provides a mechanism for wireless devices to synchronize time and channel on which the devices may converge to facilitate the discovery of NAN services that have been made discoverable on existing or new devices that enter the NAN. In an aspect, the service discovery may occur without the assistance of an AP. A NAN network may operate in only one channel in the 2.4 gigahertz (GHz) frequency band, and optionally, in one channel in the 5 GHz frequency band. The NAN channel in the 2.4 GHz frequency band may be channel 6 (2.327 GHz). A NAN cluster may include multiple wireless devices or NAN devices, such as STAs 112, 114, 116, 118. The NAN cluster may be a collection of NAN devices that share a common set of NAN parameters. NAN parameters may include a time period between consecutive discovery windows, the time duration of the discovery windows, and a beacon interval. In an aspect, all of the STAs 112, 114, 116, 118 participating in the NAN cluster may be synchronized to the same NAN clock, which may be determined by the STA 112, for example, if the STA 112 is acting in the anchor master role of the NAN cluster. The STA 112, as the anchor master, may determine the timing synchronization function (TSF) and broadcast the TSF in the NAN synchronization beacon. Other STAs in the NAN cluster may be required to adopt the TSF and to broadcast the TSF to other devices within the NAN. The NAN synchronization beacon may be broadcasted by NAN devices during the discovery window. NAN devices that receive the NAN synchronization beacon may use the beacon for clock synchronization.

FIG. 2B illustrates an exemplary call flow diagram 250 for a data link connection setup in a NAN. As shown FIG. 2B, a first STA 252 may transmit a message 256 (e.g., a discovery message) to a second STA 254 in the discovery window 202 (e.g., a NAN discovery window). The message 256 may indicate the services/capabilities (e.g. photo/video sharing) offered by the first STA 252. The message 256 may include wake up information associated with the first STA 252 and time block information. The wake up information may indicate one or more times at which the first STA 252 is available for connection setup. The wake up information may include an indicator (e.g., a bit indicator) that indicates the times at which the first STA 252 is available for connection setup. For example, the wake up information may be a 2-bit indicator with one of the following values:

| Indicator Bit Value | Description |
| --- | --- |
| 00 | The STA (e.g., first STA 252) will wake up during a first portion (or initial portion) such as the paging window (e.g., the first paging window 208) of the one or more predetermined NDL-TBs (e.g., the first NDL-TB 206) for connection setup |
| 01 | The STA will remain awake only after a discovery window (e.g., the discovery windows 202, 218) for a fixed interval (e.g., the fixed interval 204) for connection setup. The STA will not allow connection setup during NDL-TBs |
| 10 | The STA will wake up during a first portion of the one or more predetermined NDL-TBs for connection setup and will remain awake after a discovery window for a fixed interval for connection setup. This is a combination of 00 and 01 |
| 11 | The STA will remain awake after a discovery window for a fixed interval for connection setup and will allow a wireless device requesting a connection to propose one or more NDL-TBs for data communication |

When the indicator is set to 00, the first STA 252 will wake up during the first and second paging windows 208, 214 of one or more NDL-TBs associated with a pre-existing connection for the first STA 252. In this configuration, the first STA 252 may not perform connection setup during the fixed intervals 204, 220, which may reduce the amount of time the first STA 252 is awake. When the indicator is set to 01, the first STA 252 will remain awake only after the discovery windows 202, 218 for the fixed intervals 204, 220 for connection setup. In this configuration, the first STA 252 may be awake for any NDL-TBs associated with an existing connection, but the first STA 252 may not allow connection setup during such NDL-TBs. When the indicator is set to 10, the first STA 252 will wake up during the first portion of the first and second NDL-TBs 206, 212 for connection setup and the first STA 252 will also remain awake after the discovery windows 202, 218 for the fixed intervals 204, 220 for connection setup. In other words, connection setup may occur in the fixed intervals 204, 220 and in the first and second paging windows 208, 214. This configuration allows for the greatest flexibility with respect to connection setup, but also requires the longest awake time for the first STA 252. When the indicator is set to 11, the first STA 252 will remain awake after the discovery windows 202, 218 for the fixed intervals 204, 220 for connection setup. The first STA 252 will also allow a wireless device requesting a connection (e.g., the second STA 254) to propose one or more NDL-TBs to be used for data communication once the connection (e.g., a P2P connection) has been established.

For the first three configurations (e.g., 00, 01, 10), the time block information included in the message 256 may indicate one or more NDL-TBs used for data communication by the first NDL-TB. The NDL-TBs indicated in the message 256 may be used by the second STA 254 for connection signaling. The NDL-TBs indicated in the message 256 may also be used by the second STA 254 for transmitting data in the connection to be established with the first STA 252. In the fourth configuration (e.g., indicator is set to 11), the time block information may indicate that no NDL-TBs have been selected for the proposed P2P connection. As such, the second STA 254 is free to propose NDL-TBs for the data connection.

After the first STA 252 transmits the message 256, the second STA 254 may receive the message 256. As previously discussed, the message 256 may include an indicator that includes wake up information about the first STA 252 and time block information indicating whether any NDL-TBs are used by the first STA 252 for data communication. Based on the indicator and the time block information in the message 256, the second STA 254 may determine 258 wake up times for the first STA 252. For example, if the indicator is set to 00, then second STA 254 will determine that the first STA 252 will be awake for connection setup during the NDL-TBs indicated in the time block information—specifically, the paging windows with respect to the NDL-TBs. If the indicator is set to 01, the second STA 254 will determine that the first STA 252 will be awake for connection setup during the fixed intervals 204, 220. In this configuration, NDL-TB wake up for connection setup does not occur. However, the NDL-TB that will be used for a prospective data link would be communicated to allow for the requesting device (e.g., the second STA 254) to determine whether the requesting device can be available for the service. If the indicator is set to 10, the second STA 254 will determine that the first STA 252 will be awake for connection setup during the fixed intervals 204, 220 and during the paging windows of any NDL-TBs indicated in the time block information (e.g., the first and second paging windows 208, 214) for connection setup. If the indicator is set to 11, the second STA 254 will determine that the first STA 252 will be awake during the fixed intervals 204, 220 and that the second STA 254 may propose one or more NDL-TBs to be used for communicating data with the first STA 252.

After determining one or more wake up times associated with the first STA 252, the second STA 254 may establish 260 a connection with the first STA 252 based on the one or more determined wake up times. In an aspect, the second STA 254 may establish 260 the connection by transmitting an association request to the first STA 252. The association request (e.g., an association frame) may include device capabilities and information needed for key derivation for added security. The association request may be transmitted either in the fixed intervals 204, 220, or in the first and second paging windows 208, 214, depending on when the first STA 252 is awake for connection setup. After transmitting the association request, the second STA 254 may exchange security keys and capability information with the first STA 252 through additional signaling and acknowledgment messages. If the connection setup is performed during the fixed intervals 204, 220, the connection setup may be completed within the fixed intervals 204, 220. However, if the connection setup is performed during the first paging window 208, for example, the connection setup need not be completed within the first paging window 208. In an aspect, the second STA 254 may send a first connection setup message (e.g., an association request message) to the first STA 252 during the first paging window 208 because the first STA 252 will be awake for at least the paging time. Subsequent messages (e.g., encryption key exchanges, acknowledgements) may be sent during the first data window 210 because, after receiving the connection setup message, the first STA 252 knows to remain awake to complete the connection setup.

In an aspect, the indicator with the wake up information and the time block information may make up an NDL attribute. The NDL attribute may be a field within a message (e.g., a discovery frame, a management frame, or an action frame).

By allowing connection setup to occur during NDL-TBs, the first STA 252 may be available for connections as often as the NDL-TBs occur, which may be more frequent than discovery windows. This allows wireless devices to join a service at more flexible times after discovering the service. Further, by using an indicator bit that indicates when a device will be awake, the device may conserve energy when the device does not want to enable further connections while still providing flexibility for having the option to provide multiple connection setup options.

Figure 3:
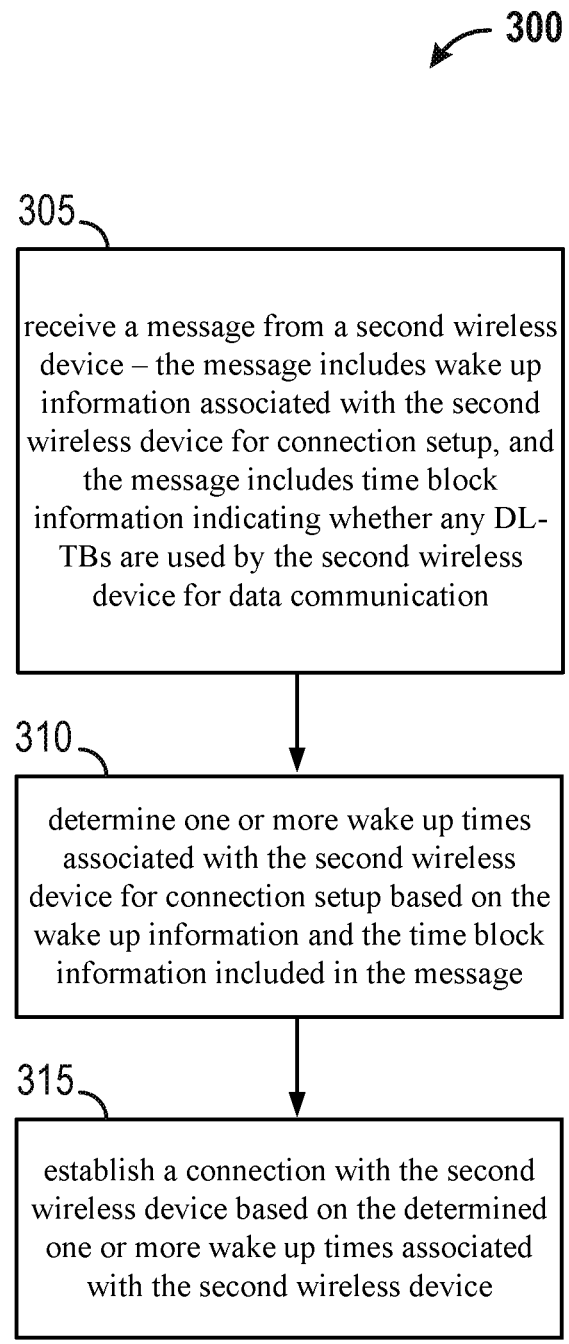
FIG. 3 is a flowchart of an exemplary method for determining times for setting up a data link in a NAN.

FIG. 3 is a flowchart of an exemplary method 300 for determining times for setting up a data link in a NAN. The method 300 may be performed using an apparatus (e.g., the STA 114, the first STA 252, or the second STA 254, for example). Although the method 300 is described below with respect to the elements of wireless device 2302 of FIG. 23, below, other components may be used to implement one or more of the steps described herein.

At block 305, the apparatus may receive a message from a second wireless device. The message may include wake up information associated with the second wireless device for connection setup, and the message may include time block information indicating whether any DL-TBs are used by the second wireless device for data communication. For example, referring to FIG. 2, the second STA 254 may receive the message 256. The message 256 may include wake up information associated with the first STA 252. The message 256 may include time block information indicating that the NDL-TBs used by the first STA 252 for data communication. The wake up information may have 2-bit indicator set to 10. The time block information may indicate that the first STA 252 is using the first NDL-TB 206 and the second NDL-TB 212 for data communication.

At block 310, the apparatus may determine one or more wake up times associated with the second wireless device for connection setup based on the wake up information and the time block information included in the message. For example, referring to FIG. 2, the second STA 254 may determine 258 the wake up times associated with the first STA 252 based on the indicator and the time block information included in the discovery message. In an example, the second STA 254 may determine that the first STA 252 will wake up during the first and second paging windows 208, 214 for the first NDL-TB 206 and the second NDL-TB 212, respectively, and based on the indicator being set to 10, the second STA 254 may determine that the first STA 252 will remain awake after the discovery windows 202, 218 for the fixed intervals 204, 220 for connection setup.

At block 315, the apparatus may establish a connection with the second wireless device based on the determined one or more wake up times associated with the second wireless device. For example, referring to FIG. 2, the second STA 254 may establish a connection with the first STA 252 based on the determine wake times (e.g., the fixed intervals 204, 220 and the first and second paging windows 208, 214) associated with the first STA 252.

Figure 4:
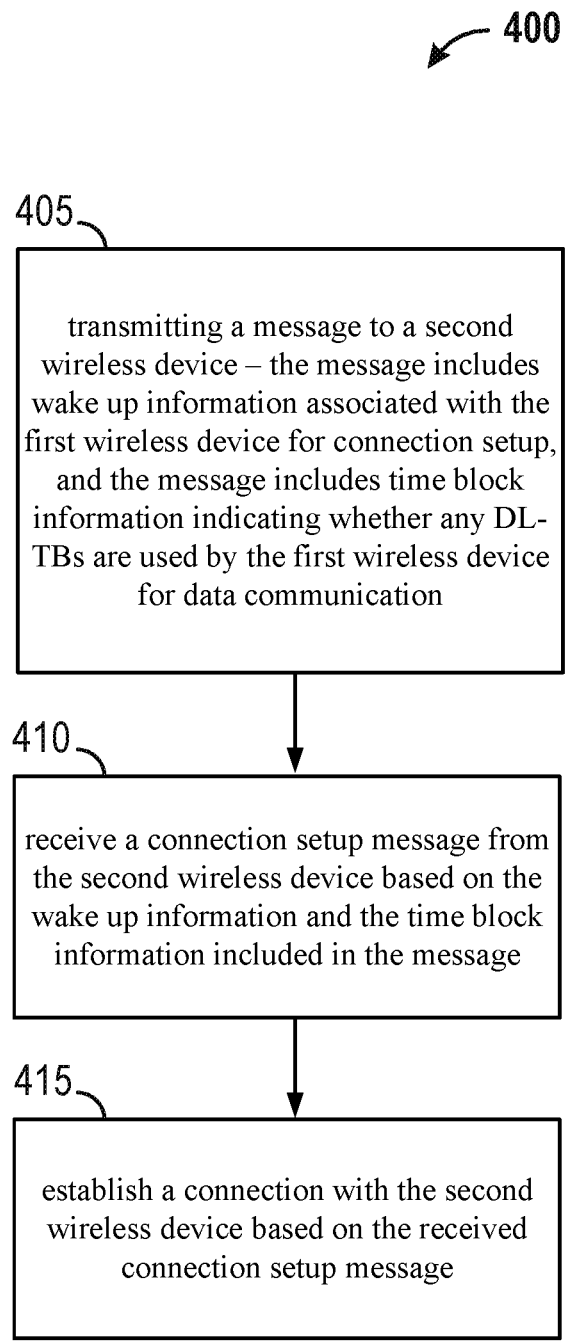
FIG. 4 is a flowchart of an exemplary method for enabling the determination of times for setting up a data link in a NAN.

FIG. 4 is a flowchart of an exemplary method 400 for enabling the determination of times for setting up a data link in a NAN. The method 400 may be performed using an apparatus (e.g., the STA 114, the first STA 252, or the second STA 254, for example). Although the method 400 is described below with respect to the elements of wireless device 2302 of FIG. 23, below, other components may be used to implement one or more of the steps described herein.

At block 405, the apparatus may transmit a message to a second wireless device. The message may include wake up information associated with the first wireless device for connection setup, and the message may include time block information indicating whether any DL-TBs are used by the first wireless device for data communication. For example, referring to FIG. 2, the first STA 252 may transit a message 256 to the second STA 254. The message 256 may include wake up information associated with the first STA 252 for connection setup. For example, the wake up information may include a 2-bit indicator set to 10. The message 256 may include time block information indicating that the predetermined time blocks (e.g., the first NDL-TB 206 and the second NDL-TB 212) are used by the first STA 252 for data communication.

At block 410, the apparatus may receive a connection setup message from the second wireless device based on the wake up information and the time block information included in the message. For example, referring to FIG. 2, the first STA 252 may receive a connection setup message (e.g., an association request message) from the second STA 254 based on the indicator being set to 10 and the time block information included in the message 256. In an aspect, the association request message may be sent during the first paging window 208.

At block 410, the apparatus may establish a connection with the second wireless device based on the received connection setup message. For example, referring to FIG. 2, the first STA 252 may establish 260 a connection with the second STA 254 based on the received association request message.

The foregoing discussion focuses on methods that wireless devices may use to signal awake times for purposes of device discovery and connection setup. The following discussion focuses on methods in which wireless devices may converge on wake times for data transmission. In a NAN, wireless devices that want to setup a data link need to converge on common times to be awake. Wake up times should be minimized to ensure power utilization. In an aspect, to establish a data link between the first STA 252 and the second STA 254, the first and second STAs 252, 254 may send availability information (e.g., further availability map) to each other. In an aspect, connection setup and scheduling negotiation (or renegotiation) for wake times may occur during an existing NDL-TB or a fixed interval (e.g., further service discovery window).

FIG. 5A is a diagram 500 with examples of availability information. Wireless devices may transmit availability information to each other to indicate times at which each respective wireless device is available for a data link (and by inference, the times at which each respective wireless device is unavailable for the data link). In an aspect, the availability information may include a schedule/bitmap. For example, a first further availability map (FAM) 502 represents time blocks at which the first STA 252 is available to communicate data. A second FAM 504 represents time blocks at which the second STA 254 is available to communicate data. Referring to the first FAM 502, this example illustrates 8 time blocks in physical channel 1. In an aspect, the 8 time blocks (or any other number of timing blocks) may be within a predetermined interval. The first FAM 502 indicates that the first STA 252 is available in time blocks 1, 4, 5, and 8 in physical channel 1. A second FAM 504 indicates that the second STA 254 is available in time blocks 2, 4, 5, 7, and 8 in physical channel 1. Although diagram 500 illustrates a single FAM per STA, additional FAMs corresponding to other physical channels may be used.

To utilize the first and second FAMs 502, 504 to converge on a time/channel sequence for data, the first STA 252 may send the first FAM 502 to the second STA 254. The second STA 254 may send the second FAM 504 to the first STA 252. The first STA 252 may determine the group of time blocks where both the first and second STAs 252, 254 are available. Similarly, the second STA 254 may determine the group of time blocks where both the first and second STAs 252, 254 are available. As shown in the diagram 500, the overlapping time blocks are time blocks 4, 5. As such, in the course of establishing a P2P connection, the first and second STAs 252, 254 may determine to use time blocks 4, 5 for communication (e.g., P2P communication). In an aspect, the first and second FAMs 502, 504 may represent a field in an association request. By ensuring a standardized algorithm is used to select the group of time blocks, no further messaging is necessary. Although this example only used one physical channel, the first and second STAs 252, 254 may transmit FAMs associated with additional physical channels and commonly available time blocks may be found across different physical channels. In an aspect, FAMs may also be used to communication availability and unavailability times for other channels, including logical channels.

The first and second FAMs 502, 504, however, only indicate the time(s) a device is available on one channel. Under the current configuration, a wireless device cannot indicate that the wireless device can be available on any channel of a multiple number of channels for data exchange. As such, an availability attribute that includes the FAM may be modified to include a field (or an indicator) that indicates whether a device is available on any channel of multiple channels.

FIG. 5B illustrates an availability attribute 550 for determining an availability of a wireless device for scheduling a data link. The availability attribute 550 may be another example of availability information. The availability attribute 550 may include information about the times a device is available on a particular channel and the times a device is available on any channel of multiple channels. As shown in FIG. 5B, the availability attribute 550 includes an availability intervals bitmap, which may correspond to the first FAM 502 or the second FAM 504. The operating class field (which may be 1 octet in size) of the availability attribute 550 indicates the frequency band that the first STA 252, for example, will be available. The channel number field (which may be 1 octet in size) indicates the physical channel that the first STA 252, for example, will be available. The entry control field (which may be 1 octet in size) includes 8 bits of information. The first two bits of the entry control field may indicate the availability interval duration (e.g., time block duration) associated with the availability intervals. One of the remaining bits (e.g., the third bit) may be used in indicate whether the first STA 252 (or any other STA) is available on all channels in the operating class. The channels in an operating class may be determined based on the geographical location of the device (e.g., per country basis). For example, when the third bit is set to 1, then the first STA 252 may be available on all channels in the operating class (e.g., available on channels 0-7 for a specified or specific period of time). When the third bit is set to 0, then the first STA 252 is available on the channel indicated in the channel number field at time blocks indicated in the bitmap. To enable backwards compatibility with respect to STAs that do not know to process the extra bit in the entry control field, the channel number field may be set to one of the possible channels on which the first STA 252 is available. In an aspect, one or more availability attributes may be transmitted within a message. In another aspect, the availability attribute 550 may include connectivity information associated with the first STA 252. The connectivity information may indicate the current number of active connections associated with the first STA 252. In another aspect, the availability attribute 550 may include a data link identifier (e.g., an NDL ID) that identifies the data link to be negotiated and established between the wireless devices. The data link identifier may enable wireless devices to refer to the data link if changes to the data link are required (e.g., scheduling changes that require re-negotiation of the data link or the data link is to be deleted).

Figure 6:
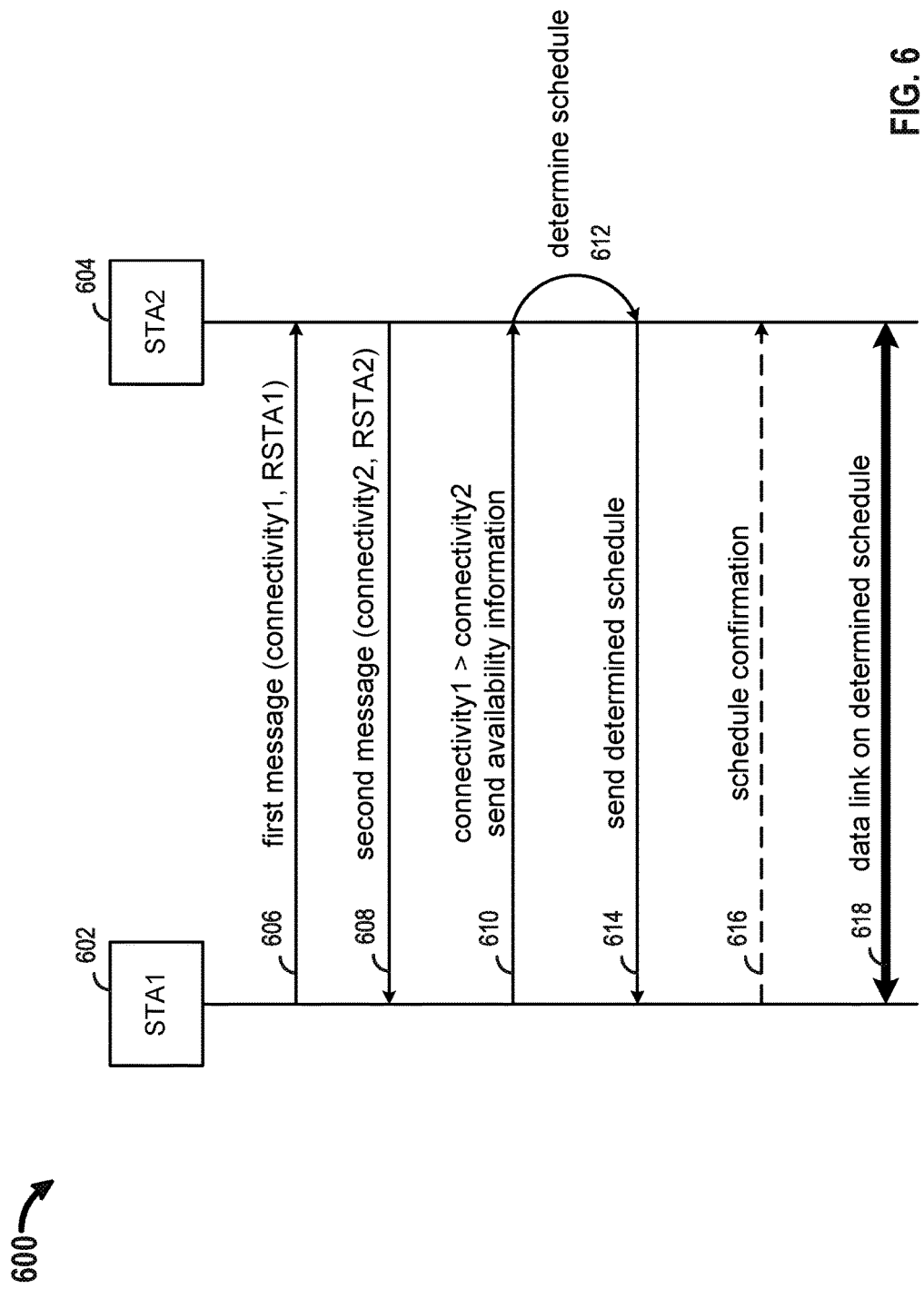
FIG. 6 is a call flow diagram illustrating a first negotiated approach for a pair-wise connection setup using availability information.

FIG. 6 is a call flow diagram 600 illustrating a first negotiated approach for a pair-wise connection setup using availability information. Referring to FIG. 6, a first STA 602 and a second STA 604 may be in a NAN. The first STA 602 may transmit a first message 606 to the second STA 604 for purposes of establishing a data link with the second STA 604. The first message 606 may include a first connectivity value and a first random number RSTA1. The first connectivity value may be the number of active connections associated with the first STA 602. In an aspect, the first message 606 may include a data link identifier (e.g., an NDL ID) that identifies the data link to be negotiated and established between the first STA 602 and the second STA 604. The data link identifier enables the first STA 602 and the second STA 604 to refer to the data link if changes to the data link (e.g., scheduling changes that require re-negotiation or data link is to be deleted) are required.

The second STA 604 may transmit a second message 608 to the first STA 602. The second message 608 may include a second connectivity value and a second random number. The second connectivity value may be the number of active connections associated with the second STA 604. Having received each other's connectivity values and random numbers, the first STA 602 or the second STA 604 may determine whether to send availability information (e.g., the availability attribute 550) based on a comparison of the first connectivity value and the second connectivity value. In an aspect, the wireless device with the greater connectivity value (e.g., more connections) transmits the availability information to use for determining a schedule for a data link because the wireless device with more connection may have more restrictions as to time availability. In another aspect, the wireless device with the lesser connectivity value may transmit the availability information to use for determining a schedule. In an aspect, if the first and second connectivity values are the same, the first random number RSTA1 and the second random number RSTA2 may be used as a tiebreaker to determine which device transmits the availability information. For example, the wireless device with the greater random number may transmit the availability information in the event of a tie in the number of connections between devices. Referring to FIG. 6, if the first connectivity value is greater than the second connectivity value, then the first STA 602 may send availability information 610 (e.g., the availability attribute 550) associated with the first STA 602 to the second STA 604. Otherwise, if the first connectivity value is less than the second connectivity value, then the second STA 604 may send availability information 610 (example not pictured). In the event of a tie in connectivity values, the first and second random numbers RSTA1, RSTA2 may be used as a tiebreaker. Assuming the first STA 602 has a greater connectivity value than the second STA 604, upon receiving the availability information 610, the second STA 604 may determine 612 a schedule to use for data communication based on the availability information 610. The second STA 604 may choose from the schedule of available time blocks that the first STA 602 provided in the availability information. As discussed in FIG. 5B, the availability information 610 may indicate one or more time blocks (e.g., a schedule) at which the first STA 602 is available on a channel and an indicator indicating whether the first STA 602 is available on any channel of a set of channels. Based on the received availability information 610, the second STA 604 may choose one or more available time blocks associated with the first STA 602 based on whether any of the time blocks correspond with the available time blocks associated with the second STA 604. If there are no time blocks/channels in the availability information 610 associated with the first STA 602 that are suitable for the second STA 604, then the second STA 604 may send a message to the first STA 602 indicating that NDL setup has failed. Otherwise, if the second STA 604 identifies one or more time blocks during which both the first STA 602 and the second STA 604 are available, the second STA 604 may determine 612 an NDL schedule 614 and transmits the NDL schedule 614 to the first STA 602. In one configuration, the first STA 602 may optionally transmit a schedule confirmation message 616 to the second STA 604. The schedule confirmation message 616 may indicate (e.g., using a confirmation bit) that the first STA 602 accepts the NDL schedule 614 proposed by the second STA 604, is ready to receive data from the second STA 604, and/or is ready to transmit data to the second STA 604. In an aspect, the first STA 602 may send the schedule confirmation message 616 after the first STA 602 has set up resources (e.g., buffers and state machines) for the communicating on the data link. In another aspect, the second STA 604 may not transmit data on the NDL schedule 614 until the second STA 604 receives the schedule confirmation message 616. Subsequently, after the first STA 602 transmits the schedule confirmation message 616, the first STA 602 and the second STA 604 may establish a data link 618 (e.g., a P2P connection) based on the NDL schedule 614. In another configuration, the first STA 602 may not transmit the schedule confirmation message 616, and the second STA 604 may begin communicating on the data link 618 after transmitting the NDL schedule 614. However, the first STA 602 may not be ready to receive data, and therefore, in some instances, utilizing the schedule confirmation message 616 may prevent the situation in which the first STA 602 receives data on the data link 618 before being ready.

In another aspect, a NDL (e.g., the data link 618) may be associated with a lifetime (or a validity time). The lifetime may be a value that indicates when a NDL will expire. The NDL lifetime may be advertised in the NAN as part of the NDL attribute. The lifetime may provide a clear boundary as to when wireless devices may switch to a different NDL or NDL schedule (if needed). Because wireless devices within a NAN are synchronized and the lifetime is advertised in the NAN, all wireless devices may have the same understanding of when the lifetime epoch occurs. The lifetime may also provide a time for major transitions to occur. For example, the lifetime may end when a common group key (e.g., used for encrypting any group-addressed traffic) is updated or when one or more devices of the NDL move to a different cluster. Initially, the NDL lifetime may be set by a creator of the NDL and may be extended by any wireless device using the NDL. The wireless device that extends the lifetime could be the same wireless device that initiated the NDL or a different device. For example, in a one-to-many wireless device topology, the service provider device may extend the lifetime. But in a one-to-one or many-to-many topology, the service provider or the subscriber may extend the lifetime of the NDL. If an NDL is no longer needed (e.g., no more data left to send), a lifetime may not be extended and all of the wireless devices may leave the NDL at the expiration of the lifetime. However, if one or more wireless devices have additional data to send or receive in the NDL, the one or more wireless devices may extend the lifetime of the NDL. Thus, in an aspect, referring to FIG. 6, if the second STA 604 determines that the NDL setup has failed, the first and second STAs 602, 604 may decide to use a predetermined scheduling scheme (e.g., a non-negotiated scheduling scheme such as a NDL profile based schedule, a default NDL schedule, or service provider NDL schedule) for data communication. The predetermined scheduling scheme may be used to establish a NDL that is associated with a lifetime. Upon the expiration of the lifetime, the second STA 604 (or the first STA 602) may attempt to renegotiate an NDL schedule after the expiration of the lifetime in case any conditions have changed (e.g., the first STA 602 and/or the second STA 604 have more availability because one or more connections are no longer active). The extension of an NDL may be similar to a new NDL schedule negotiation. New schedule negotiations occur outside DWs and may occur during an existing NDL-TB, FSD, or some other commonly agreed time.

Figure 7A:
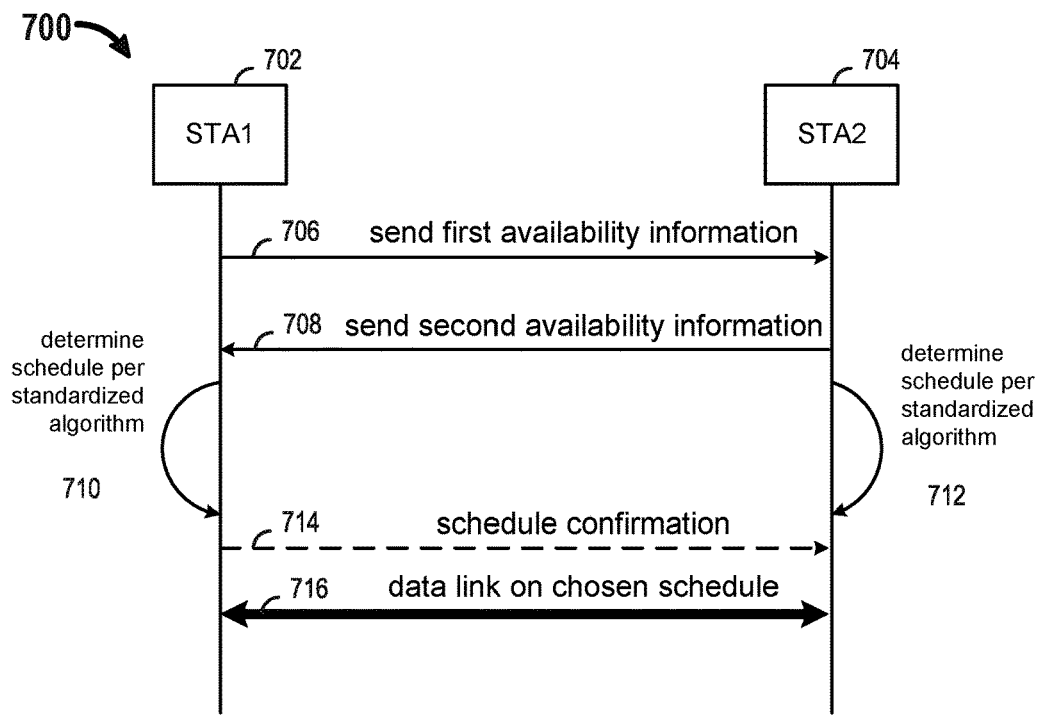
FIGS. 7A and 7B are call flow diagrams illustrating a second negotiated approach for a pair-wise connection setup using availability information.

FIG. 7A is a call flow diagram 700 illustrating a first variation of a second negotiated approach for a pair-wise connection setup using availability information. Referring to FIG. 7A, a first STA 702 and a second STA 704 are in a NAN. The first STA 702 transmits a first availability information 706 (e.g., a first availability attribute) to the second STA 704. The second STA 704 transmits a second availability information 708 (e.g., a second availability attribute) to the first STA 702. The first STA 702 combines the received second availability information 708 with the first availability information 706 to determine 710 a mutual schedule based on a standardized or accepted algorithm. Similarly, the second STA 704 combines the received first availability information 706 with the second availability information 708 to determine 712 the same mutual schedule as determine by the first STA 702 using the same standardized/accepted algorithm. In an aspect, the algorithm may be based on common criteria on how a subset of overlapping time blocks are to be selected given one or more quality of service requirements. Furthermore, the algorithm may be based on a common set of criteria for choosing channels when a group of channels is available at a particular time. In an example, when a group of channels is available, the devices may determine which channel has the lowest energy use level, which would imply that the channel is less congested with traffic from other devices. In one configuration, after determining a mutual schedule, the first STA 702 may optionally transmit a schedule confirmation message 714 to the second STA 704. The schedule confirmation message 714 may indicate (e.g., using a confirmation bit) that the first STA 702 is ready to receive data according to the determined mutual schedule and/or is ready to transmit data according to the determined mutual schedule. In an aspect, the first STA 702 may send the schedule confirmation message 714 after the first STA 702 has set up resources (e.g., buffers and state machines) for the communicating on the data link. In another aspect, the second STA 704 may not transmit data on the mutual schedule until the second STA 704 receives the schedule confirmation message 714 from the first STA 702. Subsequently, after the first STA 702 transmits the schedule confirmation message 714, the first STA 702 and the second STA 704 may establish the data link 716 (e.g., a P2P connection) based on the determined mutual schedule. In another configuration, the first STA 702 may not transmit the schedule confirmation message 714, and the second STA 704 may begin communicating on the data link 716 after determining the mutual schedule. However, the first STA 702 may not be ready to receive data, and therefore, in some instances, utilizing the schedule confirmation message 714 may prevent the situation in which the first STA 702 receives data on the data link 716 before being ready. In another aspect, the first STA 702 and/or the second STA 704 may re-evaluate the determined mutual schedule after the lifetime associated with the data link 716 has expired. The re-evaluation may be based on whether any conditions have changed (e.g., whether there is any data left to send, whether the quality of service requirement has changed, etc.).

Figure 7B:
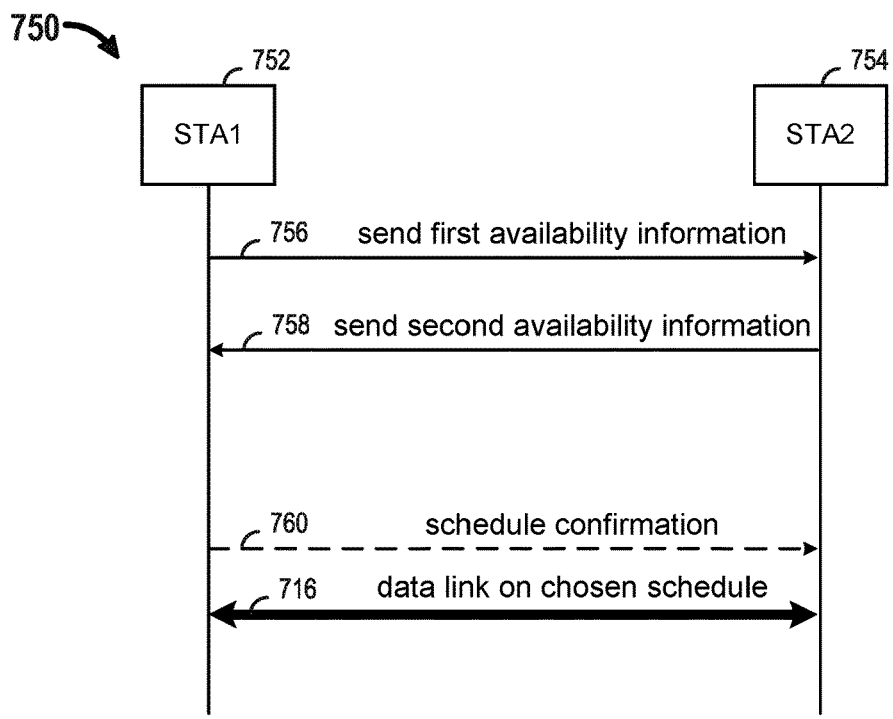

FIG. 7B is a call flow diagram 750 illustrating a second variation of the second negotiated approach for a pair-wise connection setup using availability information. Referring to FIG. 7B, a first STA 752 and a second STA 754 are in a NAN. The first STA 752 transmits a first availability information 756 (e.g., a first availability attribute) to the second STA 754. The first availability information may include a first schedule at which the first STA 752 is available on a first channel (e.g., an availability intervals bitmap as shown in FIG. 5B) and a first channel indicator indicating whether the first STA 752 is available on any channel of a set of channels (e.g., a bit indicator indicating the first STA 752 is available on all channels in an operating class as shown in FIG. 5B).

Upon receiving the first availability information 756, the second STA 754 may determine whether the second STA 754 is available during most or all of the times indicated in the first availability information. The second STA 754 may determine a second availability information 758 (e.g., a second availability attribute) to transmit to the first STA 752 based on the first availability information 756. In one aspect, if the second STA 754 is available during all of the times indicated in the first availability information, then the second STA 754 may determine to use the same schedule indicated in the first availability information for communicating with the first STA 752. As such, the second availability information 758 may have a second schedule that is the same as the first schedule and a second indicator that is the same as the first indicator. In another aspect, if the second STA 754 is available during most of the time indicated in the first availability information, then the second STA 754 may determine a second schedule that includes times during which the first and second STAs 752, 754 are both availability. The second schedule may include additional times during which the second STA 754 is available. In another aspect, if the second STA 754 is not available during any or most of the times indicated in the first availability information 756, the second STA 754 may determine a second schedule, which may be mostly different from the first schedule. The second STA 754 may transmit the second availability information 758 to the first STA 752. In an aspect, the second availability information may include a second indicator that indicates whether the second STA 754 is available on any channel of a set of channels. The first STA 752 may determine whether the first STA 752 is available during most or all of the times indicated in the second availability information 758. If not, the first STA 752 and the second STA 754 may continue to negotiate for a mutually agreeable schedule by transmitting additional availability information. In an aspect, after a predetermined number of availability information exchanges (e.g., 10 rounds of exchanges), the first and second STAs 752, 754 the negotiation may fail and the first and second STAs 752 may determine to cease negotiations.

After determining a mutually agreeable schedule, the first STA 752 may optionally transmit a schedule confirmation message 760 to the second STA 754. The schedule confirmation message 760 may indicate (e.g., using a confirmation bit) that the first STA 752 is ready to receive data according to the determined mutual schedule and/or is ready to transmit data according to the determined mutual schedule. In an aspect, the first STA 752 may send the schedule confirmation message 760 after the first STA 752 has set up resources (e.g., buffers and state machines) for the communicating on the data link. In another aspect, the second STA 754 may not transmit data on the mutual schedule until the second STA 754 receives the schedule confirmation message 760 from the first STA 752. Subsequently, after the first STA 752 transmits the schedule confirmation message 760, the first STA 752 and the second STA 754 may establish the data link 762 (e.g., a P2P connection) based on the determined mutual schedule. In another configuration, the first STA 752 may not transmit the schedule confirmation message 760, and the second STA 754 may begin communicating on the data link 762 after determining the mutual schedule. However, the first STA 752 may not be ready to receive data, and therefore, in some instances, utilizing the schedule confirmation message 760 may prevent the situation in which the first STA 752 receives data on the data link 762 before being ready. In another aspect, the first STA 752 and/or the second STA 754 may re-evaluate the determined mutual schedule after the lifetime associated with the data link 762 has expired. The re-evaluation may be based on whether any conditions have changed (e.g., whether there is any data left to send, whether the quality of service requirement has changed, etc.).

In an aspect, instead of, or in addition to, indicating times during which a device is available for a NDL (e.g., preferred times and/or preferred channels), the device may indicate unavailability times as part of the schedule negotiation. The unavailability times may be NDL-TBs and/or unavailable channels. An indication of unavailability times may be useful when the device wants to avoid certain time blocks because the device is busy (e.g., with other concurrent networks or with some other activities) and does not want any NDL operation during such times. Examples of concurrent networks could be other NDLs, infra-AP connection, Bluetooth, etc. Similarly, in some instances, the device may indicate preferred channel(s) due to on-going operations on that channel. The device may prefer to use a channel to avoid channel switching. In another aspect, the device may avoid certain channels because, for example, the channels are known to have LTE and/or other deployments.

The negotiated schedules discussed in FIGS. 6, 7A, and 7B have been with respect to a one-to-one connection. In some instances, however, a one-to-many connection may be desired. For example, a first wireless device may have photographs to share with many wireless devices. In the simplest case, the first wireless device may set up data links on a pair-wise basis with each of the other wireless devices. But this may cause the first wireless device to be awake for longer to accommodate multiple wake up schedules. Furthermore, the order in which connections are set up may cause some destinations to be impossible to include. For example, the first wireless device may setup connections with a second and third wireless device. Subsequently, a fourth wireless device may want to setup a connection, but there may be no more time blocks left from the first wireless device because the second and third wireless devices used all of the available time blocks associated with the first wireless device. An alternative scheme for a one-to-many connection setup is shown in FIG. 8.

Figure 8:
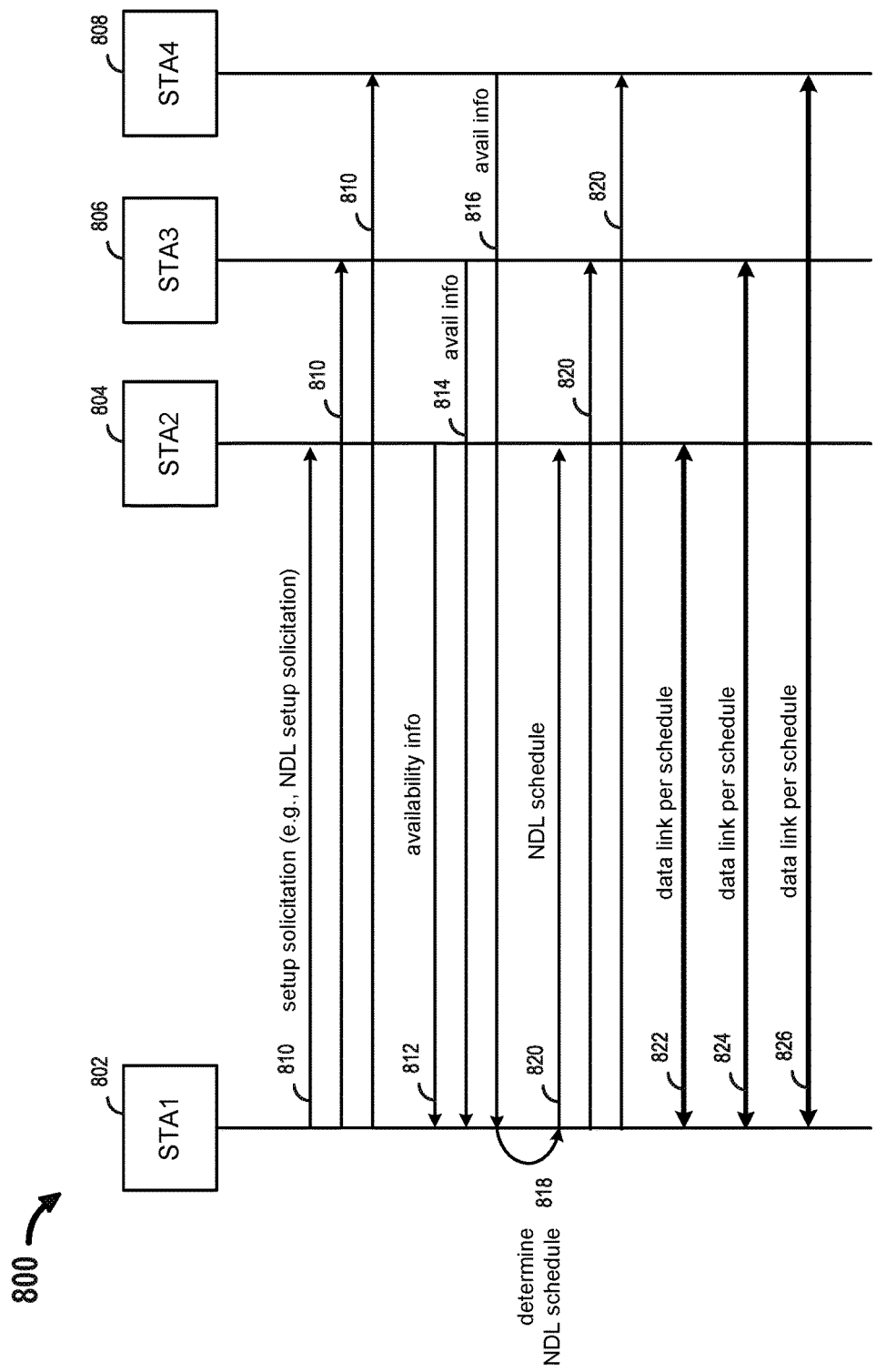
FIG. 8 is a call flow diagram illustrating a third negotiated approach for performing a one-to-many connection setup that is based on availability information.

FIG. 8 is a call flow diagram 800 illustrating a third negotiated approach for performing a one-to-many connection setup that is based on availability information. Referring to FIG. 8, a first STA 802 may send a setup solicitation message 810 (e.g., a NAN data link setup solicitation message) to a second STA 804, a third STA 806, and a fourth STA 808. The setup solicitation message 810 may indicate a request to receive availability information (e.g., the availability attribute 550). Upon receiving the setup solicitation message 810, the second STA 804 may transmit a first availability information 812 (e.g., the availability attribute 550) to the first STA 802. The third STA 806 may transmit a second availability information 814 to the first STA 802. The fourth STA 808 may transmit a third availability information 816 to the first STA 802. The first, second, and third availability information 812, 814, 816 may be an availability attribute (e.g., a FAM that includes a STA's availability at a particular channel and/or a STA's availability at any channel of a set of channels). In an aspect, the first, second, and third availability information 812, 814, 816 may include current connectivity information associated with each of the STAs, respectively. Upon receiving the first, second, and third availability information 812, 814, 816, the first STA 802 may determine 818 a schedule 820 or a set of times for communicating data with each of the second, third, and fourth STAs 804, 806, 808. The schedule 820 may be determined based on times at which both the first STA 802 and the other STAs (e.g., the second STA 804, the third STA 806, and the fourth STA 808) are available. The schedule 820 may be further based on throughput requirements, quality of service requirements, and/or the physical channel conditions. In another aspect, the first STA 802 may determine 818 the schedule 820 based on connectivity information that may be included in the first, second, and/or third availability information 812, 814, 816. In this aspect, the first STA 802 may consider the schedule of a constrained device, for example, that has a lot of active connections when determining the schedule 820. The schedule 820 may comprise one or more NDL-TBs allocated to or associated with each of the second STA 804, the third STA 806, and the fourth STA 808 for P2P communication within a NAN. In an aspect, the first STA 802 may send the same schedule 820 to each of the second, third, and fourth STAs 804, 806, 808. In another aspect, the first STA 802 may send different schedules 820 to each of the second, third, and fourth STAs 804, 806, 808. Upon receiving the schedule 820, first STA 802 may establish a first data link 822 with the second STA 804. The first STA 802 may establish a second data link 824 with the third STA 806. The first STA 802 may establish a third data link 826 with the fourth STA 808. Each of the first, the second, and the third data links 822, 824, 826 may be a P2P connection.

In an aspect, similar to the discussion with respect to FIGS. 6 and 7, the second STA 804, the third STA 806, and/or the fourth STA 808 may transmit a schedule confirmation message upon receiving the schedule 820 from the first STA 802. The first STA 802 may not transmit data based on the schedule 820 until the first STA 802 receives the schedule confirmation from at least one of the first, second, or third STAs 802, 804, 806.

In another aspect, the first, second, and third data links 822, 824, 826 may each be associated with a respective lifetime. At or before the expiration of the lifetime, the first STA 802, the second STA 804, the third STA 806, and/or the fourth STA 808 may re-evaluate the schedule 820 or respective data links based on any change in conditions (e.g., no more data left to transmit/receive, a change in quality of service or latency requirements, a change in the number of devices in the NAN, a change in the power of the devices, etc.) and determine whether to extend the respective lifetimes of the data links or leave the data link.

FIGS. 6, 7A, 7B, and 8 relate to methods for negotiating connection setup and connection setup parameters (e.g., the NDL-TBs). Under some circumstances, accommodating different schedules for several STAs into a single schedule may not be possible, especially if the STAs are available on different channels and would require a STA providing the service to switch between different channels. Furthermore, as discussed before, the order in which STAs are considered affects the resulting schedules. In order to create a schedule that accommodates two STAs, a schedule that has been set up with one of the STAs may have to be changed. Rapidly changing already set up schedules when additional STAs request connection setup may be difficult. In other words, mutually negotiated data transmission times may not be scalable for a large number of wireless devices. As such, non-negotiated (or predetermined) schedules may also be used, especially in one-to-many or many-to-many topologies.

Figure 9:
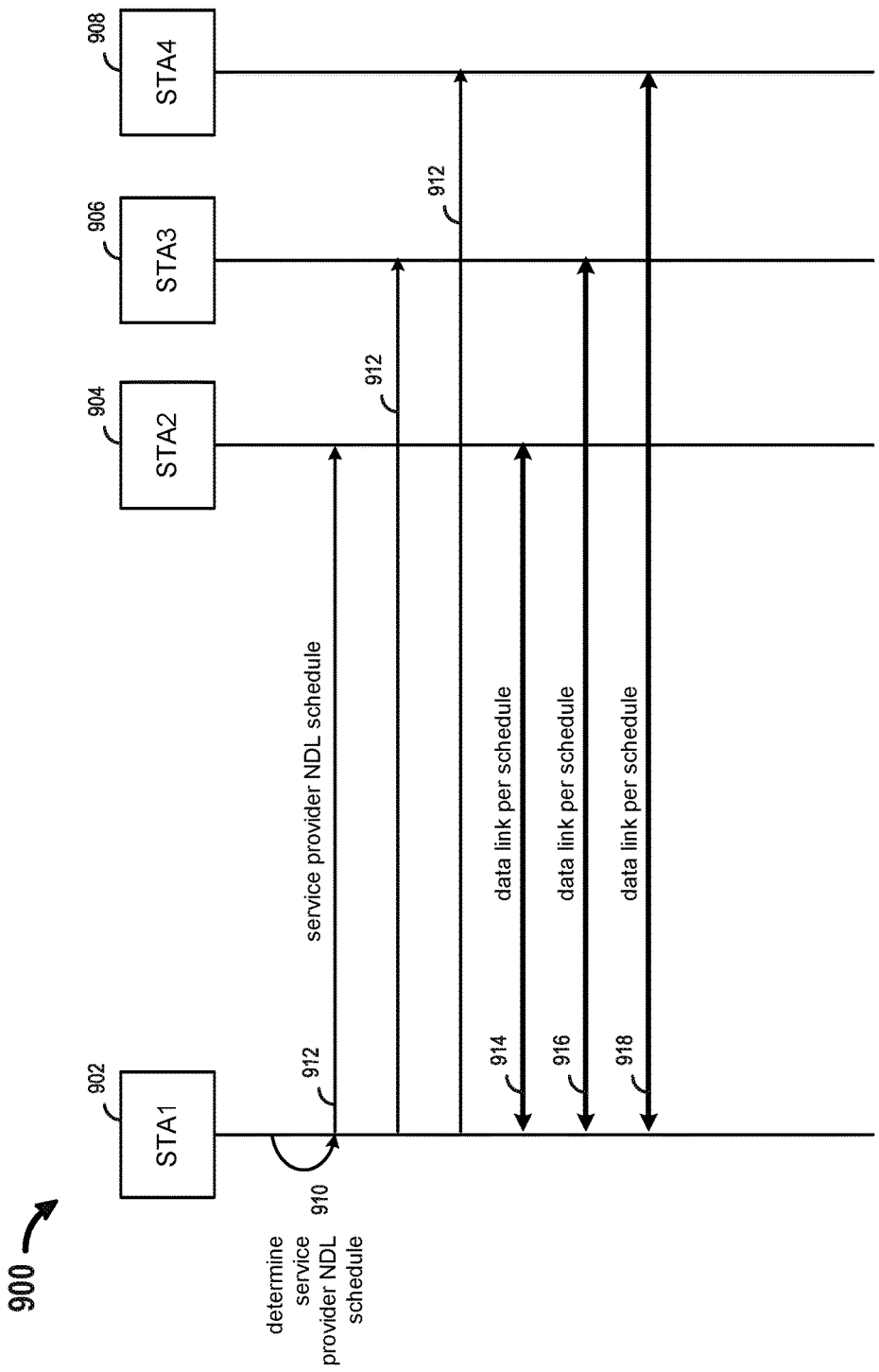
FIG. 9 is a call flow diagram illustrating a non-negotiated approach for using a service provider schedule with standardized periodic time blocks for a data link.

FIG. 9 is a call flow diagram 900 illustrating a non-negotiated approach for using a service provider schedule with standardized periodic time blocks for a data link. Instead of allowing each STA requesting a data connection to negotiate for time blocks based on an availability attribute, for example, a first STA 902 providing a service may utilize a service provider NDL schedule. A second STA 904, a third STA 906, and a fourth STA 908 may be interested in receiving/joining a service provided by the first STA 902. Referring to FIG. 9, the first STA 902 may determine 910 a service provider NDL schedule 912 for providing the service. In an aspect, the service provider NDL schedule 912 may be published by the first STA 902 when the first STA 902 advertises one or more services (e.g., in a discovery window as part of NAN service discovery). In this aspect, the service provider NDL schedule 912 may be inserted into an NDL attribute within a service discovery frame, for example.

In another aspect, the NDL attribute may be inserted into a NAN management frame (NMF). A NMF may have the same or similar structure as a service discovery frame. The NMF may carry attributes related to NAN operation. In an aspect, the NMF may be used for post-service discovery operations such as NDL or NDP schedule negotiation. In some instances, NMFs may be transmitted via a NAN interface instead of an NDL interface for some types of messages. For example, the NAN interface may be used for NAN control signaling such as NAN discovery and/or connection setup. As such, all NMFs related to pre-NDL may be transmitted on the NAN interface because the NDL interface is not yet set up. Subsequently, when the NDL is set up, the NDL interface (or NDP interface) may be used for data transmission over the NDP. As such, after the NDL is set up, the NDL interface may be used to transmit NMFs related to the NDL. In such cases, the receiver device may have a mapping between the NAN interface and the NDL interface of its NDL peers. In another aspect, the NMF may be a vendor specific action frame or a vendor specific public action frame. By having a NAN and NDL interface, the design may be more delineated—that is, once the NDL is established, all NDL activity (data and management) may occur on the NDL interface.

In an aspect, there may be only one NDL between two wireless devices. However, there may be multiple NDPs between two devices, and each NDP may be associated with a particular service. The NDP may also be associated with an NDP ID to map a particular session between two devices. The NDP may have its own quality of service and/or security requirements. Each NDP may also have its own interface. As between two wireless devices, all of the NDPs between the two wireless devices may conform to the same schedule, which may be the NDL schedule between the two devices. An NDL ID may be an identifier assigned to an NDL between devices. The NDL ID may be represented in a bitmap for traffic advertisement, for example, during a paging window. That is, one or more positions within a bitmap may correspond to an NDL ID. When the bit corresponding to an NDL is set to 1, then traffic associated with the NDL ID is forthcoming. By contrast, when the bit corresponding to the NDL is set to 0, then no traffic associated with the NDL ID is expected. Such traffic signaling may be helpful, when multiple wireless devices associated with different NDLs have the same or similar wake up times. Although the wireless devices are awake during some of the same times, the wireless devices may go to sleep if the NDL ID to which the wireless devices' are subscribed is not signaled in a bitmap during a traffic announcement period (e.g., a paging window).

In another aspect, the service provider NDL schedule 912 may indicate one or more logical channels for a network data link connection (e.g., a P2P connection). Each logical channel in the service provider NDL schedule 912 may include a set of time blocks (e.g., NDL-TBs) having a particular time block duration (e.g., 15 ms) and a particular time block periodicity (e.g., every 75 ms). In an aspect, different logical channels in the service provider NDL schedule 912 may refer to different time blocks, with different time block durations and/or with different periodicities. The time block duration and periodicities may be determined based on a quality of service, throughput requirement, etc. As such, devices (e.g., the second STA 904, the third STA 906, or the fourth STA 908) requiring higher throughput may select the appropriate logical channel. In an aspect, devices interested in the service may join the NDL using the service provider NDL schedule 912 if the devices may be available for most of the service provider NDL schedule 912. For example, the devices may be available for most of the service provider NDL schedule 912 if the devices are available for more than x % of the service provider NDL schedule 912, in which x % may be 60%, 80%, or 90%. In an aspect, x % may be a function of the type of service being provided (e.g. latency and/or throughput requirements associated with the type of service).

Referring to FIG. 9, the service provider NDL schedule 912 may have 5 different logical channels (or any other number of logical channels). Each of the logical channels may be associated with a different set of time blocks having a different time block duration and/or periodicity. Upon receiving the service provider NDL schedule 912, the second STA 904, the third STA 906, and the fourth STA 908 may select one of the logical channels to use for setting up a data link with the first STA 902. In an aspect, each of the second STA 904, the third STA 906, or the fourth STA 908 may choose a physical channel to be used for the selected logical channel. The physical channels may be chosen based on the amount of energy detected on the channel. Based on the selected logical/physical channels, the second STA 904 may establish a first data link 914 with the first STA 902, the third STA 906 may establish a second data link 916 with the first STA 902, and the fourth STA 908 may establish a third data link 918 with the first STA 902. In an aspect, the first, second, and third data links 914, 916, 918 may be associated with a respective lifetime that indicates when each of the data links expires and/or begins.

Figure 10:
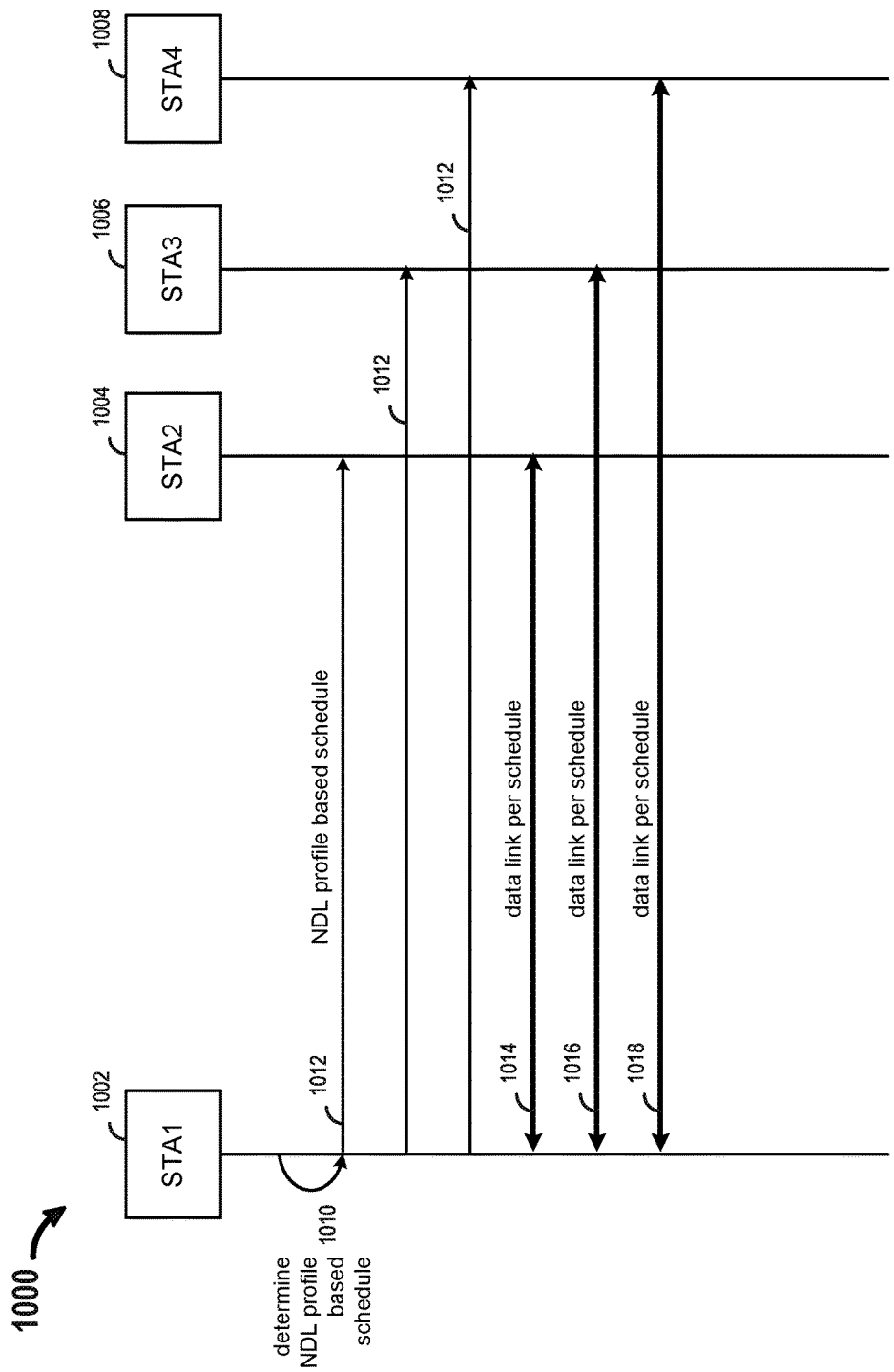
FIG. 10 is a call flow diagram illustrating a non-negotiated approach for using a profile associated with a service for determining a schedule for a data link.

FIG. 10 is a call flow diagram 1000 illustrating a non-negotiated approach for using a profile associated with a service for determining a schedule for a data link. The profile based scheduling may be suitable for any topology. Similar to the method discussed in FIG. 9, FIG. 10 relates to a method for establishing a data link schedule without negotiations between wireless devices. In this method, the data link schedule may be customized based upon the type of application/service being advertised. Referring to FIG. 10, a first STA 1002 may have a variety of services, each of which may have different latency and/or throughput requirements. In an aspect, the first STA 1002 may determine 1010 an NDL profile based on the service. In an aspect, various NDL profiles may be customized to meet certain service requirements (e.g., latency, throughput, power, topology, etc.) Each NDL profile may map to a set of NDL schedules that may be tailored to meet a service or an application's requirements. An application or service may be categorized into groups, and each group may be associated with a particular NDL profile. For example, voice chats may be categorized into one group (e.g., smaller time blocks that repeat frequently), video chats into a different group (e.g., longer time blocks that repeat frequently), and file transfers into yet another different group based on service requirements (e.g., longer time blocks that do not frequently repeat). When the first STA 1002 has a service to advertise, the first STA 1002 may determine 1010 the NDL profile associated with the service. Based on the NDL profile, the first STA 1002 may determine a set of schedules associated with the NDL profile. In one aspect, the first STA 1002 may select the NDL profile based schedule 1012 based on the set of schedules, and transmit the NDL profile based schedule 1012 to a second STA 1004, a third STA 1006, and/or a fourth STA 1008. In another aspect, the NDL profile based schedule 1012 may include a subset of schedules selected from the set of schedules associated with the NDL profile, and the first STA 1002 may send the subset of schedules to the second STA 1004, the third STA 1006, and/or the fourth STA 1008. In another aspect, the each type of schedule may be associated with an index. In this aspect, the first STA 1002 may transmit the NDL profile based schedule 1012, which may contain the NDL profile and/or one or more indices associated with different NDL schedules. Upon receiving the NDL profile based schedule 1012, the second, third, and fourth STAs 1004, 1006, 1008 may converge on a mutually acceptable schedule and establish a first data link 1014, a second data link 1016, and a third data link 1018 with the first STA 1002, respectively. In an aspect, the first, second, and third data links 1014, 1016, 1018 may each be associated with a respective lifetime.

Figure 11:
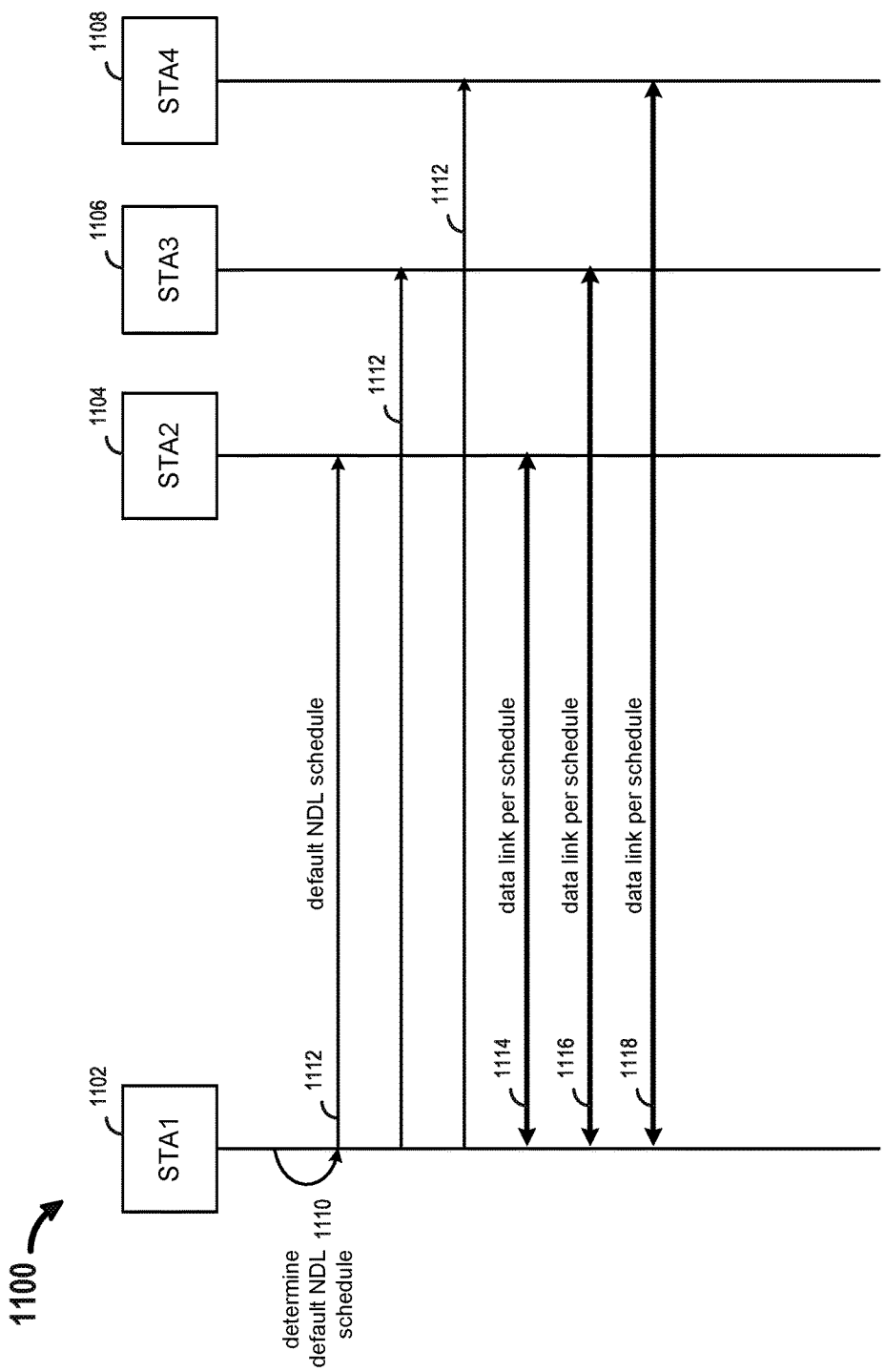
FIG. 11 is a call flow diagram illustrating a non-negotiated approach for using a default NDL schedule for a data link.

FIG. 11 is a call flow diagram 1100 illustrating a non-negotiated approach for using a default NDL schedule for a data link. The default NDL schedule may be suited for a many-to-many topology where it may be difficult to accommodate the availability of multiple wireless devices. Each NAN cluster may have a default NDL schedule that any service advertised on the NAN could utilize. The default NDL schedule may be defined by an anchor master associated with the NAN cluster, an initiator of the NAN cluster, or defined by other members of the NAN on a rotating basis. The initiator of the NAN is the first wireless devices that decides to create the NAN by sending out a beacon advertising the NAN, for example. The anchor master associated with the NAN cluster may be the initiator of the NAN or another wireless device within the NAN. The anchor master may be responsible for sending out beacon messages advertising the NAN. In an aspect, the anchor master may be chosen based on an amount of available resources associated with a wireless device (e.g., battery power, connectivity, geographical vicinity with respect to other wireless devices within the NAN) in comparison to other wireless devices in the NAN. Referring to FIG. 11, a first STA 1102 may have a service to advertise. In an aspect, the first STA 1102 may determine 1110 the default NDL schedule 1112 for the service based on the default NDL schedule advertised by a wireless device within the NAN. In another aspect, the first STA 1102 may be the wireless device responsible for determining the default NDL schedule. Wireless devices (e.g., a second STA 1104, a third STA 1106, and/or a fourth STA 1108) interested in the service may join the default NDL to begin data exchange. In an aspect, the second STA 1104 may further negotiate a new or supplementary NDL schedule if the default NDL schedule does not satisfy the application requirements. For example, in a first scenario, the second STA 1104 may determine immediately that the default NDL schedule is insufficient. In this scenario, the second STA 1104 may negotiate a supplemental NDL schedule (e.g. by using the NDL-TBs of the default NDL schedule if the first STA 1102 is awake during the paging window of the NDL-TBs). In a second scenario, the second STA 1104 may utilize the default NDL schedule for a period of time and then, based on additional users joining the schedule or other factors, determine that the default NDL schedule is no longer sufficient. In this scenario, the second STA 1104 may negotiate a supplemental NDL schedule. In a third scenario, the second STA 1104 may negotiate a new NDL schedule and not use the default NDL schedule based on the service requirements. In an aspect, the second STA 1104 may utilize the NDL-TBs in the default NDL schedule for connection setup. In this aspect, the second STA 1104 need not use the NDL-TBs in the default NDL schedule for exchanging user data. Instead, the second STA 1104 may utilize the paging window within the NDL-TB to perform connection setup for the service in which the second STA 1104 is interested. In other words, negotiations for new or supplemental data links may occur over the default NDL schedule.

Figure 12:
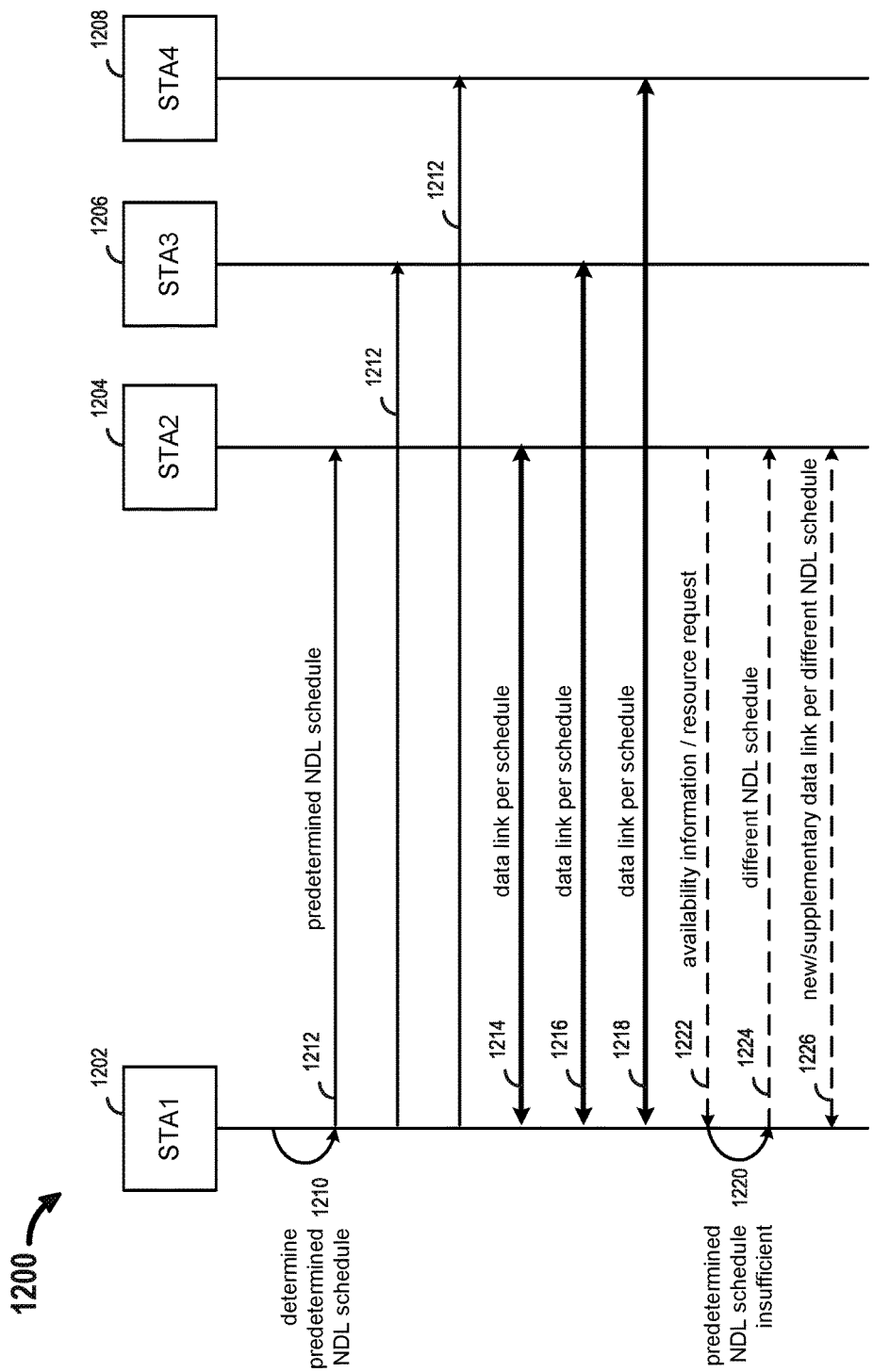
FIG. 12 is a call flow diagram illustrating a hybrid approach for using a predetermined NDL schedule and a negotiated NDL schedule for a data link.

FIG. 12 is a call flow diagram 1200 illustrating a hybrid approach for using a predetermined NDL schedule and a negotiated NDL schedule for a data link. In one configuration, the first STA 1202 may utilize both the predetermined NDL schedules (non-negotiable) discussed in FIGS. 9-11 and the negotiated NDL schedules discussed in FIGS. 6-8. For example, in most peer-to-peer type short connection setup and tear down, the first STA 1202 may use the negotiated methods in FIG. 6, 7, or 8. In one-to-many or many-to-many connections, the first STA 1202 may use a predetermined NDL schedule. As an example, referring to FIG. 12 illustrating a one-to-many connection, the first STA 1202 may determine 1210 initially to a predetermined NDL schedule 1212 (e.g., the service provider NDL schedule 912, the NDL profile based schedule 1012, or the default NDL schedule 1112). Based on the predetermined NDL schedule 1212, the first STA 1202 may establish a first data link 1214 with the second STA 1204, establish a second data link 1216 with the third STA 1206, and establish a third data link 1218 with the fourth STA 1208.

Subsequently, in one configuration, the first STA 1202 may determine 1220 that the predetermined NDL schedule 1212 no longer meets one or more requirements for communicating data associated with the service or may determine 1220 that there has been a change in the number of wireless devices in the NAN or a change in the service topology. In an aspect, the one or more requirements may include a latency requirement for the service or wireless device, a throughput requirement for the service or wireless device, or a power requirement for the service or wireless device. In another configuration, the first STA 1202 may determine 1220 that the predetermined NDL schedule 1212 no longer meets one or more requirements for communicating data associated with the service based on a message 1222 from the first STA 1202. The message 1222 may indicate that the predetermined NDL schedule 1212 no longer meets one or more requirements for communicating data associated with the service. The message 1222 may request additional resources for data communication. The message 1222 may include the availability information (e.g., an availability attribute) associated with the second STA 1204. In an aspect, the first STA 1202 and the second STA 1204 may negotiate a different NDL schedule 1224 over the predetermined NDL schedule 1212. Based on the received message 1222, the first STA 1202 may determine the different NDL schedule 1224 to be used for communication in a new/supplemental data link 1226 with the second STA 1204. In an aspect, if the different NDL schedule 1224 is for a new data link, then the first and second STAs 1202, 1204 may continue to communicate over the first data link 1214 until the lifetime associated with the first data link 1214 has expired at which point the first and second STAs 1202, 1204 may establish a new data link for communication. In an aspect, the lifetime of the first data link 1214 may be shortened based on the determination that the predetermined NDL schedule 1212 is no longer meets requirements. In another aspect, if the different NDL schedule 1224 is for a supplemental data link, the first and second STAs 1202, 1204 may continue to communicate on the first data link 1214 until the lifetime associated with the first data link 1214 has expired and also communicate on the supplemental data link.

Figure 13A:
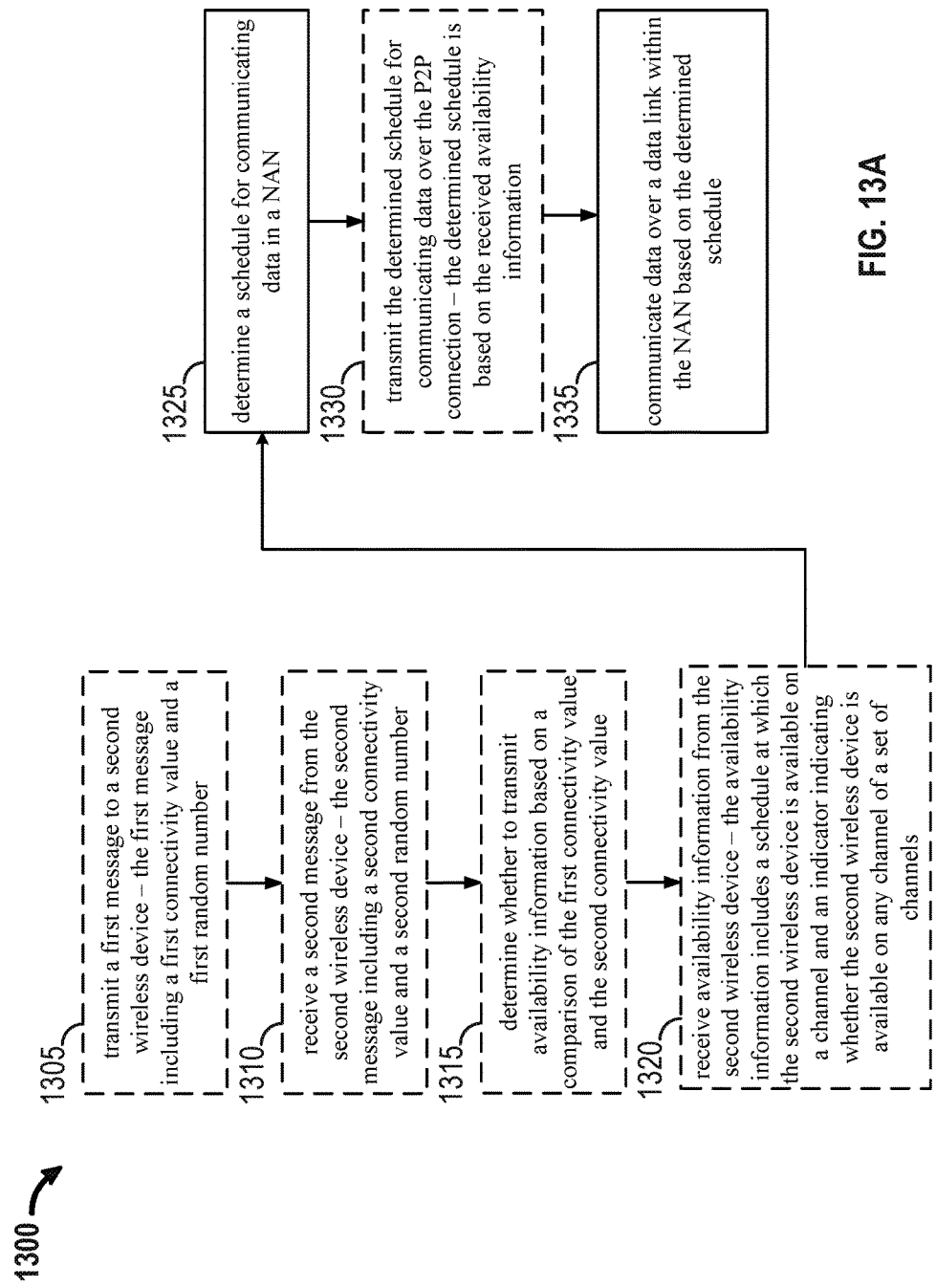
FIG. 13A is a flowchart of an exemplary method of a service receiver performing a first negotiated approach for a pair-wise connection setup using availability information.

FIG. 13A is a flowchart of an exemplary method 1300 of a service receiver performing a first negotiated approach for a pair-wise connection setup using availability information. The method 1300 may be performed using an apparatus (e.g., the STA 114, the second STA 604, or the wireless device 2302, below, for example). Although the method 1300 is described below with respect to the elements of wireless device 2302 of FIG. 23, below, other components may be used to implement one or more of the steps described herein.

At block 1305, the apparatus may transmit a first message to a second wireless device. The first message may include a first connectivity value and a first random number. For example, referring to FIG. 6, the second STA 604 may transmit the second message 608 to the first STA 602. The second message 608 may include the second connectivity value and the second random number.

At block 1310, the apparatus may receive a second message from the second wireless device. The second message may include a second connectivity value and a second random number. In an aspect, the first connectivity value may be associated with a first number of active connections associated with the apparatus, and the second connectivity value is associated with a second number of active connections associated with the second wireless device. For example, referring to FIG. 6, the second STA 604 may receive the first message 606 from the first STA 602. The first message 606 may include a first connectivity value and a first random number. The first connectivity value may be associated with a first number of active connections associated with the first STA 602, and the second connectivity value may be associated with a second number of active connections associated with the second STA 604.

At block 1315, the apparatus may determine whether to transmit availability information based on a comparison of the first connectivity value and the second connectivity value. In an aspect, the apparatus determines to transmit availability information if the first connectivity value is greater than the second connectivity value, and the wireless device determines not to transmit availability information if the first connectivity value is less than the second connectivity value. In another aspect, the determination of whether to transmit availability information may also be based on a comparison of the first random number and the second random number. For example, referring to FIG. 6, the second STA 604 may determine not to transmit availability information to the first STA 602 because the first connectivity value is greater than the second connectivity value.

At block 1320, the apparatus may receive availability information from the second wireless device. The availability information may include a schedule at which the second wireless device is available on a channel and an indicator indicating whether the second wireless device is available on any channel of a set of channels. For example, referring to FIG. 6, the second STA 604 may receive availability information from the first STA 602. The availability information may include a FAM as in FIG. 5B indicating times at which the first STA 602 is available.

At block 1325, the apparatus may determine a schedule for communicating data in a NAN. For example, referring to FIG. 6, the second STA 604 may determine the schedule for communicating data in the NAN with the first STA 602. The second STA 604 may determine the schedule by determining times at which the second STA 604 is available, and based on the determined times, determine when both the first STA 602 and the second STA have overlapping availability. The determined schedule may include the overlapping times. The determined schedule may also include additional times during which the second STA 604 is available.

At block 1330, the apparatus may transmit the determined schedule for communicating data over the P2P connection. The determined schedule may be based on the received availability information. For example, referring to FIG. 6, the second STA 604 may transmit the determined schedule for communicating data over the P2P connection to the first STA 602.

At block 1335, the apparatus may communicate data over a data link within the NAN based on the determined schedule. For example, referring to FIG. 6, the second STA 604 may communicate data over the data link 618 with the first STA 602 based on the determined schedule.

FIG. 13B is a flowchart of an exemplary method 1350 of a wireless device performing a first variation of a second negotiated approach for a pair-wise connection setup using availability information. The method 1350 may be performed using an apparatus (e.g., the STA 114, the first STA 752, or the wireless device 2302, below, for example). Although the method 1350 is described below with respect to the elements of wireless device 2302 of FIG. 23, below, other components may be used to implement one or more of the steps described herein.

At block 1355, the apparatus may transmit a first availability information to a second wireless device. The first availability information may include a first schedule at which the apparatus is available on a first channel and a first indicator indicating whether the apparatus is available on any channel of a set of channels. For example, referring to FIG. 7B, the first STA 752 may transmit the first availability information 756 to the second STA 754. The first availability information 756 may include a first schedule at which the first STA 752 is available on a first channel and a first indicator indicating whether the first STA 752 is available on any channel of a set of channels.

At block 1360, the apparatus may receive a second availability information from the second wireless device based on the transmitted first availability information. The second availability information may include a second schedule at which the second wireless device is available on a second channel and a second indicator indicating whether the second wireless device is available on any channel of the set of channels. In one aspect, the second schedule may be the same as the first schedule. In another aspect, the second schedule may be different from the first schedule. For example, referring to FIG. 7B, the first STA 752 may be configured to receive the second availability information 758 from the second STA 754 based on the transmitted first availability information 756. The second availability information 758 may include the same schedule as the first availability information 756 because both the first STA 752 and the second STA 754 are available during the same times.

At block 1365, the apparatus may determine a schedule for communicating data in a NAN. In one aspect, the schedule may be determined based on the transmitted first availability information and the received second availability information. In one configuration, the apparatus may determine the schedule by determining that the apparatus is unavailable during the second schedule and by transmitting a third availability information to the second wireless device to further negotiate a mutually agreeable schedule. The third availability information may include a third schedule and a third indicator. In an aspect, the third schedule and/or the third indicator may be based on the received second availability information. For example, referring to FIG. 7B, the first STA 752 may determine the schedule for communicating data in the NAN. The first STA 752 may determine that the schedule indicated in the second availability information 758 is the same schedule that is indicated in the first availability information 756. Accordingly, the first STA 752 may determine that the communication schedule is the same as the schedule indicated in the first and second availability information 756, 758. However, if the schedules are not the same, then the first STA 752 may determine a new schedule to transmit to the second STA 754, and the new schedule may be based on the availability times indicated in the second availability information 758.

At block 1370, the apparatus may transmit a schedule confirmation message that indicates the apparatus is available for communication based on the received second availability information. The schedule for the data link within the NAN may be based on the received second availability information. Referring to FIG. 7B, the first STA 752 may transmit the schedule confirmation message 760 that indicates that the first STA 752 is available for communication based on the received second availability information 758.

At block 1375, the apparatus may communicate data over a data link within the NAN based on the determined schedule. In an aspect, the communication may occur after the apparatus transmits the schedule confirmation message. For example, referring to FIG. 7B, the second STA 754 may communicate data over the data link 718 based on the determined schedule.

Figure 14:
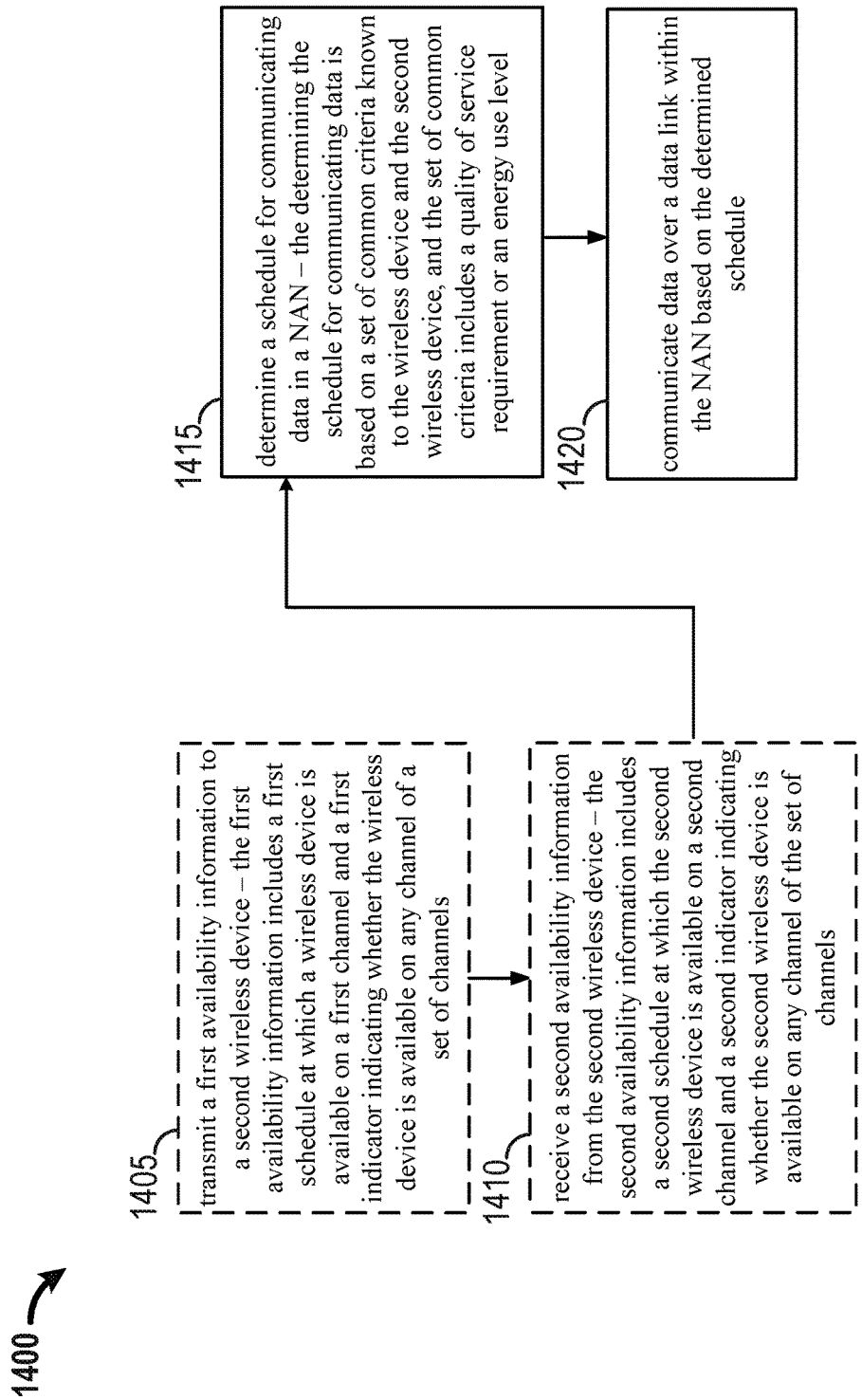
FIG. 14 is a flowchart of an exemplary method of a service receiver/provider performing a second variation of a second negotiated approach for a pair-wise connection setup using availability information.

FIG. 14 is a flowchart of an exemplary method 1400 of a service receiver/provider performing a second negotiated approach for a pair-wise connection setup using availability information. The method 1400 may be performed using an apparatus (e.g., the STA 114, the second STA 704, or the wireless device 2302, below, for example). Although the method 1400 is described below with respect to the elements of wireless device 2302 of FIG. 23, below, other components may be used to implement one or more of the steps described herein.

At block 1405, the apparatus may transmit a first availability information to a second wireless device. The first availability information may include a first schedule at which the apparatus is available on a first channel and a first indicator indicating whether the apparatus is available on any channel of a set of channels.

At block 1410, the apparatus may receive a second availability information from the second wireless device. The second availability information may include a second schedule at which the second wireless device is available on a second channel and a second indicator indicating whether the second wireless device is available on any channel of the set of channels.

At block 1415, the apparatus may determine a schedule for communicating data in a NAN. In an aspect, the determining the schedule for communicating data may be based on a set of common criteria known to the apparatus and the second wireless device, and the set of common criteria may include a quality of service requirement or an energy use level.

At block 1420, the apparatus may communicate data over a data link within the NAN based on the determined schedule.

Figure 15:
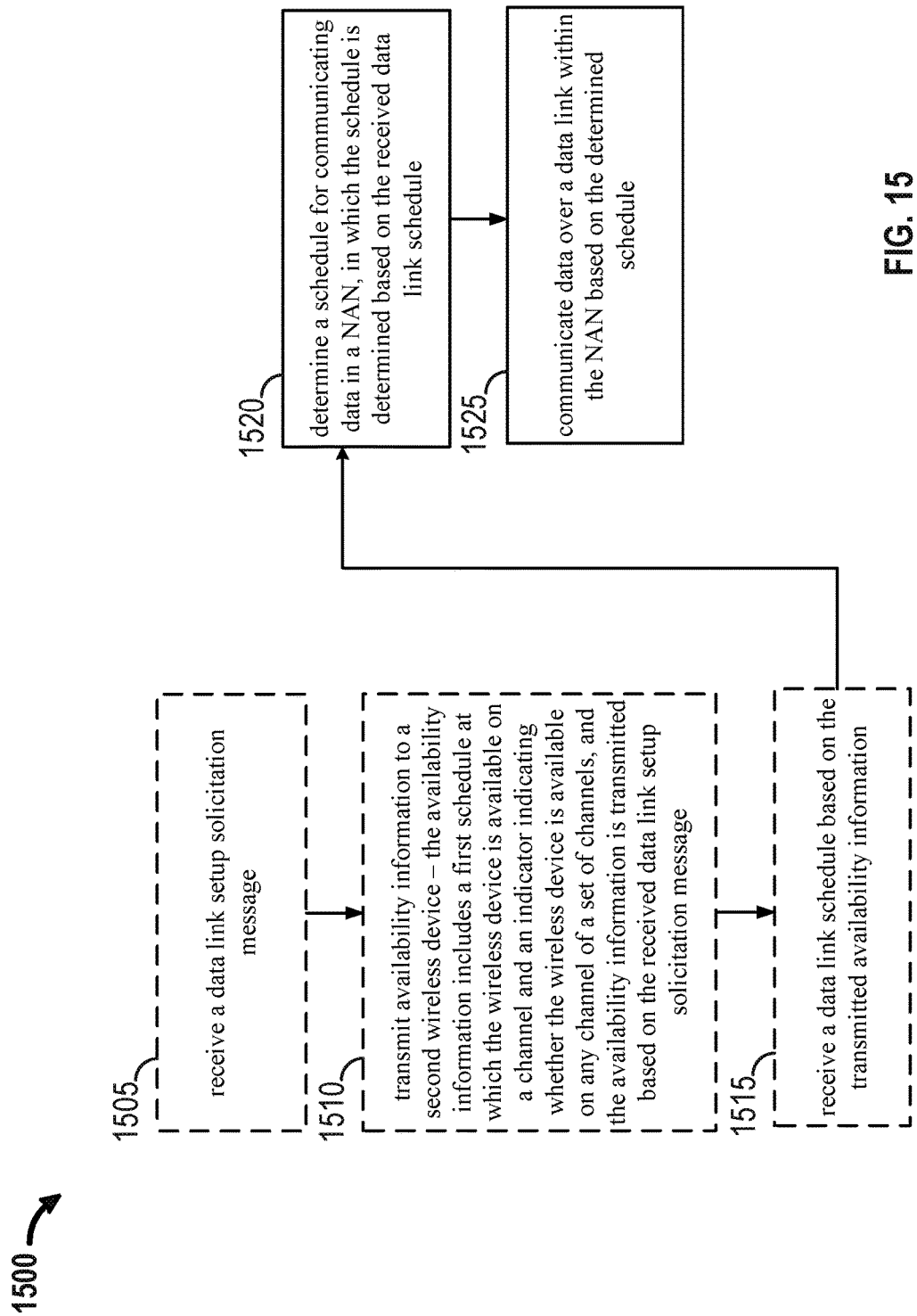
FIG. 15 is a flowchart of an exemplary method of a service receiver performing a third negotiated approach for performing a one-to-many connection setup that is based on availability information.

FIG. 15 is a flowchart of an exemplary method 1500 of a service receiver performing a third negotiated approach for performing a one-to-many connection setup that is based on availability information. The method 1500 may be performed using an apparatus (e.g., the STA 114, the second STA 804, or the wireless device 2302, below, for example). Although the method 1500 is described below with respect to the elements of wireless device 2302 of FIG. 23, below, other components may be used to implement one or more of the steps described herein.

At block 1505, the apparatus may receive a data link setup solicitation message. For example, referring to FIG. 8, the second STA 804 may receive the setup solicitation message 810.

At block 1510, the apparatus may transmit availability information to a second wireless device. The availability information may include a first schedule at which the apparatus is available on a channel and an indicator indicating whether the apparatus is available on any channel of a set of channels, and the availability information may be transmitted based on the received data link setup solicitation message. For example, referring to FIG. 8, the second STA 804 may transmit the first availability information 812 to the first STA 802. The first availability information 812 may include a first schedule at which the second STA 804 is available on a channel (e.g., a FAM) and an indicator indicating whether the second STA 804 is available on any channel of a set of channels.

At block 1515, the apparatus may receive a data link schedule based on the transmitted availability information. For example, referring to FIG. 8, the second STA 804 may receive the schedule 820 based on the transmitted first availability information 812.

At block 1520, the apparatus may determine a schedule for communicating data in a NAN, in which the schedule is determined based on the received data link schedule. For example, referring to FIG. 8, the second STA 804 may determine the schedule for communicating data. The schedule is determined by extracting scheduling information from the schedule 820 and by storing the scheduling information from the schedule 820. The second STA 804 may determine whether the second STA 804 is available on the received schedule 820. If so, then the second STA 804 may determine to utilize the received schedule 820 for communication.

At block 1525, the apparatus may communicate data over a data link within the NAN based on the determined schedule. For example, referring to FIG. 8, the second STA 804 may communicate data over the first data link 822 based on the determined schedule.

Figure 16:
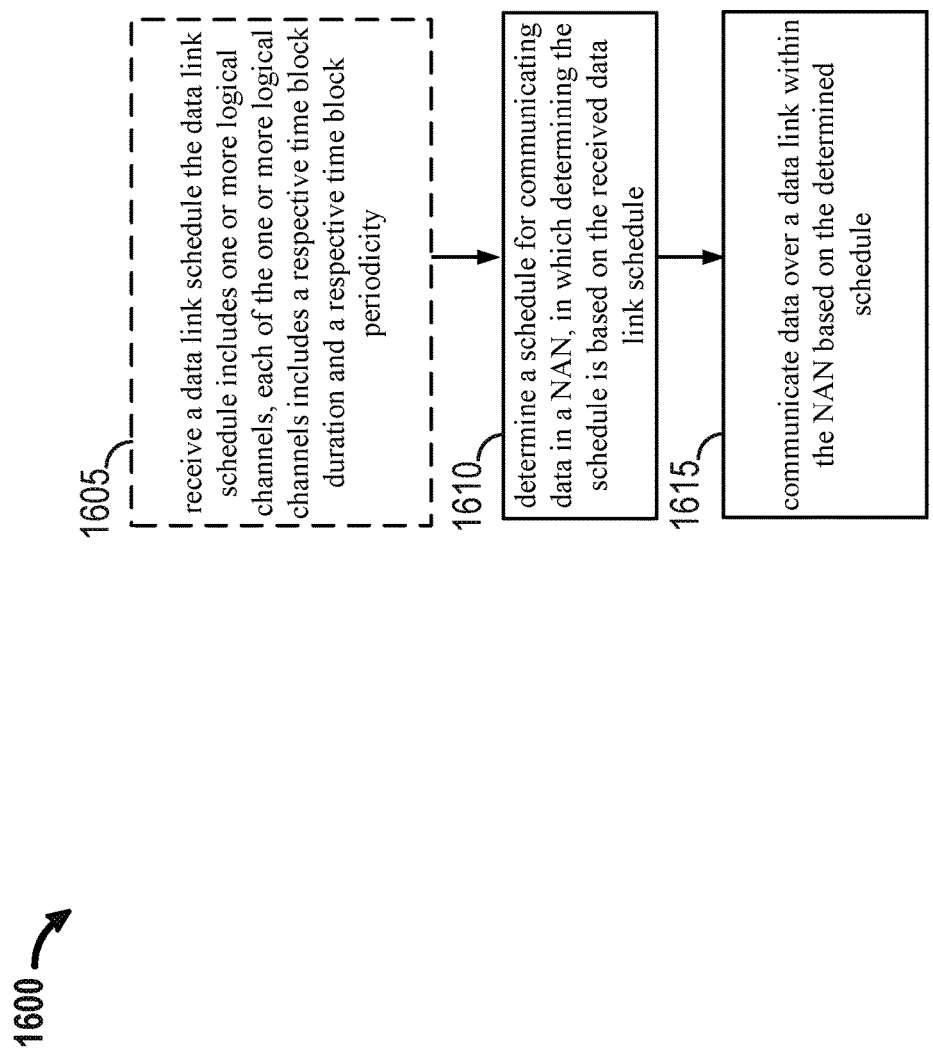
FIG. 16 is a flowchart of an exemplary method of a service receiver performing a non-negotiated approach for using a service provider schedule with standardized periodic time blocks for a data link.

FIG. 16 is a flowchart of an exemplary method 1600 of a service receiver performing a non-negotiated approach for using a service provider schedule with standardized periodic time blocks for a data link. The method 1600 may be performed using an apparatus (e.g., the STA 114, the second STA 904, or the wireless device 2302, below, for example). Although the method 1600 is described below with respect to the elements of wireless device 2302 of FIG. 23, below, other components may be used to implement one or more of the steps described herein.

At block 1605, the apparatus may receive a data link schedule, and the data link schedule may include one or more logical channels. Each of the one or more logical channels may include a respective time block duration and a respective time block periodicity. For example, referring to FIG. 9, the second STA 904 may receive the service provider NDL schedule 912, and the service provider NDL schedule 912 may include one or more logical channels. Each of the one or more logical channels may include a respective time block duration and time block periodicity.

At block 1610, the apparatus may determine a schedule for communicating data in a NAN, in which determining the schedule is based on the received data link schedule. For example, referring to FIG. 9, the second STA 904 may determine whether the second STA 904 is available on the service provider NDL schedule 912. If so, then the second STA 904 may determine to utilize the service provider NDL schedule 912 for communication; otherwise, the second STA 904 may not utilize the schedule.

At block 1615, the apparatus may communicate data over a data link within the NAN based on the determined schedule. For example, referring to FIG. 9, the second STA 904 may communicate data over the data link based on the service provider NDL schedule 912.

Figure 17:
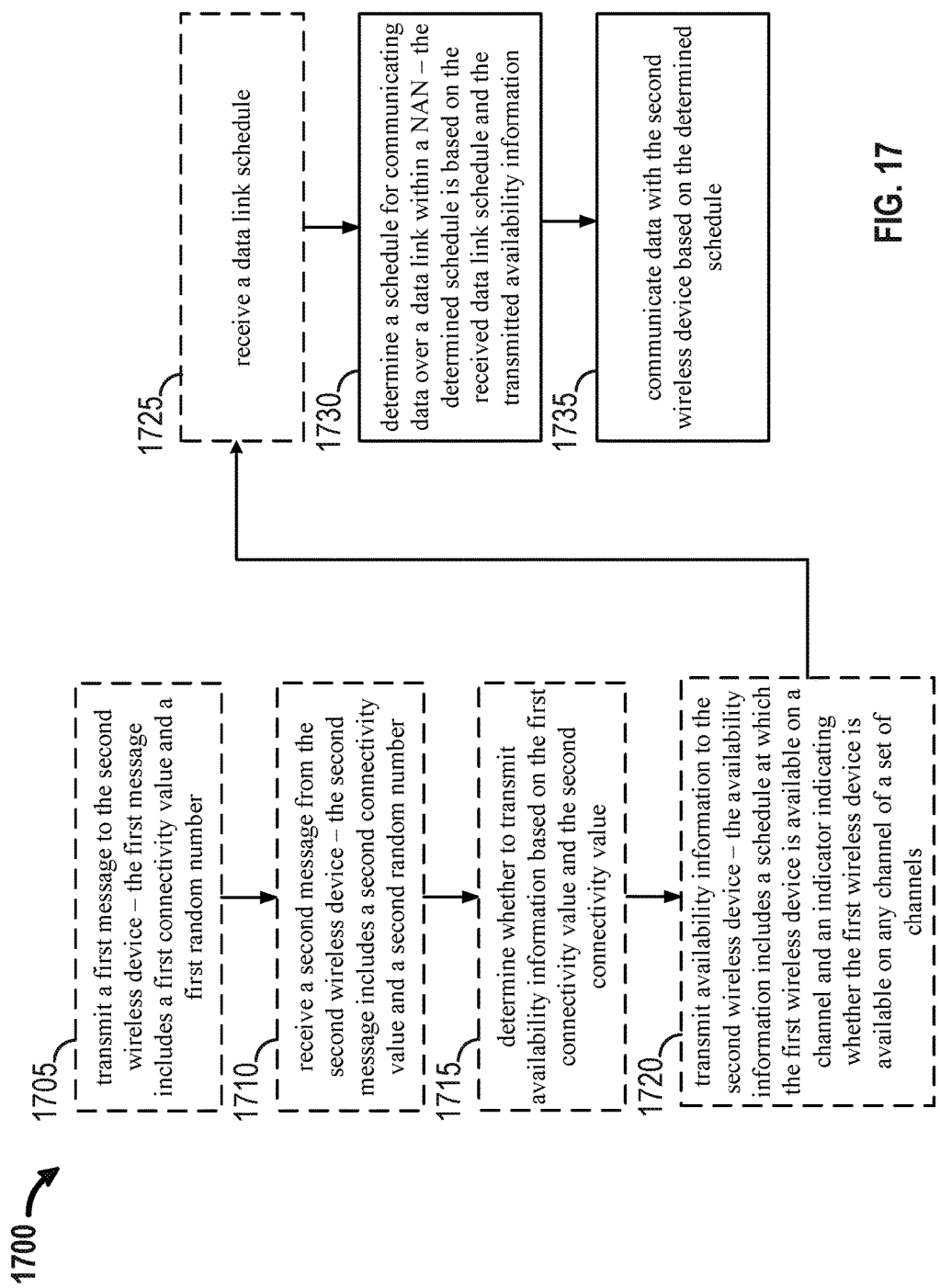
FIG. 17 is a flowchart of an exemplary method of a service provider performing a first negotiated approach for a pair-wise connection setup using availability information.

FIG. 17 is a flowchart of an exemplary method 1700 of a service provider performing a first negotiated approach for a pair-wise connection setup using availability information. The method 1700 may be performed using an apparatus (e.g., the STA 114, the first STA 602, or the wireless device 2302, below, for example). Although the method 1700 is described below with respect to the elements of wireless device 2302 of FIG. 23, below, other components may be used to implement one or more of the steps described herein.

At block 1705, the apparatus may transmit a first message to the second wireless device. The first message may include a first connectivity value and a first random number.

At block 1710, the apparatus may receive a second message from the second wireless device. The second message may include a second connectivity value and a second random number.

At block 1715, the apparatus may determine whether to transmit availability information based on the first connectivity value and the second connectivity value. In an aspect, the determination of whether to transmit the availability information may be further based on a comparison of the first random number and the second random number.

At block 1720, the apparatus may transmit availability information to the second wireless device. The availability information may include a schedule at which the apparatus is available on a channel and an indicator indicating whether the apparatus is available on any channel of a set of channels.

At block 1725, the apparatus may receive a data link schedule.

At block 1730, the apparatus may determine a schedule for communicating data over a data link within a NAN. The determined schedule may be based on the received data link schedule and the transmitted availability information.

At block 1735, the apparatus may communicate data with the second wireless device based on the determined schedule.

Figure 18:
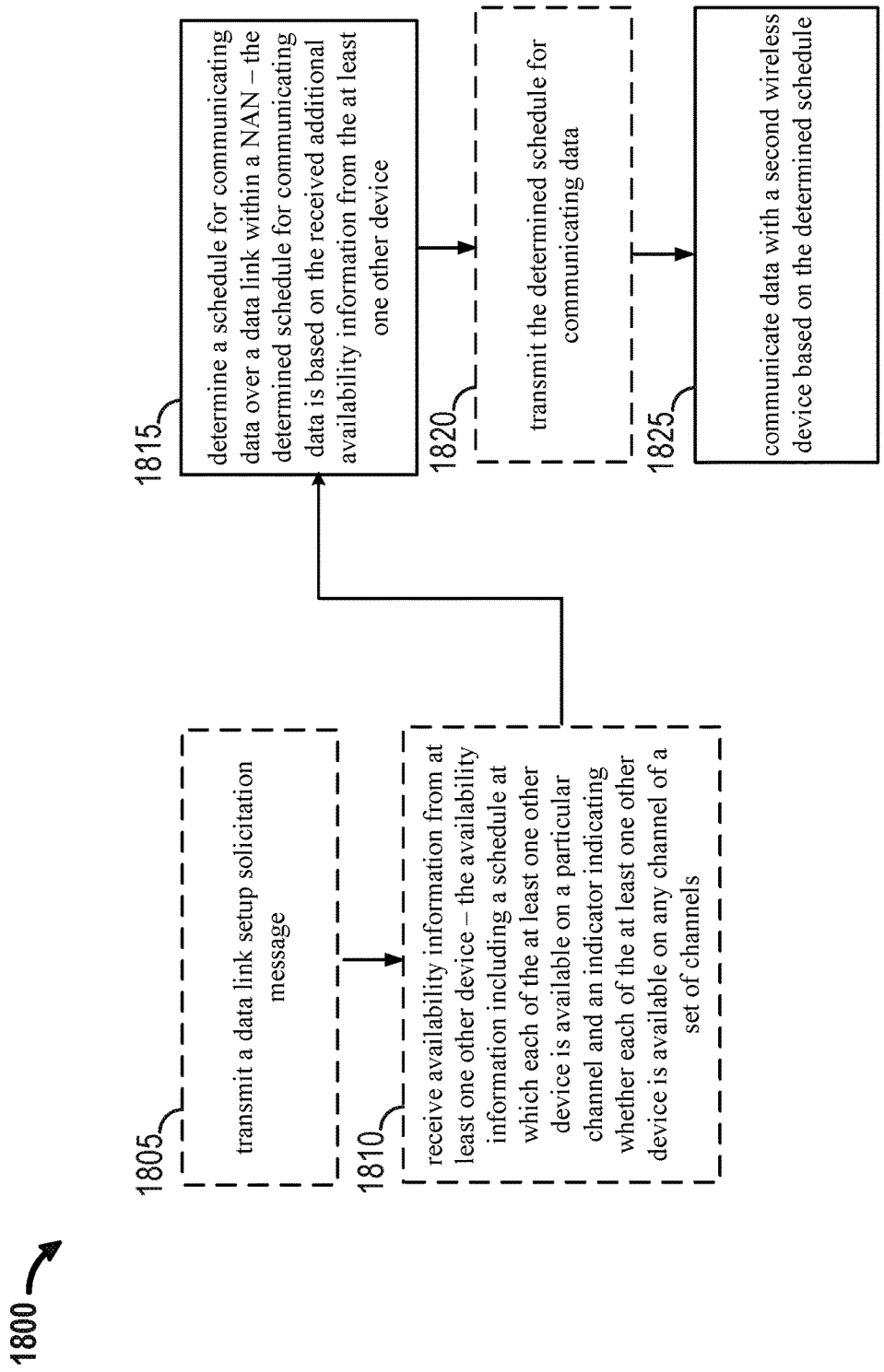
FIG. 18 is a flowchart of an exemplary method of a service provider performing a third negotiated approach for a pair-wise connection setup using availability information.

FIG. 18 is a flowchart of an exemplary method 1800 of a service provider performing a third negotiated approach for a pair-wise connection setup using availability information.

The method 1800 may be performed using an apparatus (e.g., the STA 114, the first STA 802, or the wireless device 2302, below, for example). Although the method 1800 is described below with respect to the elements of wireless device 2302 of FIG. 23, below, other components may be used to implement one or more of the steps described herein.

At block 1805, the apparatus may transmit a data link setup solicitation message. For example, referring to FIG. 9, the first STA 802 may transmit the setup solicitation message 810.

At block 1810, the apparatus may receive availability information from at least one other device. The availability information may include a schedule at which each of the at least one other device is available on a particular channel and an indicator indicating whether each of the at least one other device is available on any channel of a set of channels. For example, referring to FIG. 8, the first STA 802 may receive the first availability information 812 from the second STA 804 and receive the second availability information 814 from the third STA 806. The first availability information 812 may include a schedule at which the second STA 804 is available, and the second availability information 814 may include a schedule at which the third STA 806 is available.

At block 1815, the apparatus may determine a schedule for communicating data over a data link within a NAN. The determined schedule for communicating data may be based on the received additional availability information from the at least one other device. In an aspect, determining the schedule may include determining one or more logical channels. Each of the one or more logical channels may include a respective time block duration and a respective time block periodicity. In another aspect, the determination of the one or more logical channels may be based on at least one of a quality of service requirement or an energy use level of a channel (e.g., a logical or physical channel). For example, referring to FIG. 8, the first STA 802 may determine the schedule 820 for communicating data over the data link. The determined schedule 820 may be based on the first availability information 812 and the second availability information 814. That is, the determined schedule 820 may include times that overlap with available times indicated in both the first availability information 812 and the second availability information 814. The determined schedule 820 may include one or more logical channels with time blocks and periodicities that are compatible with the availability of the second and third STAs 804, 806.

At block 1820, the apparatus may transmit the determined schedule for communicating data. For example, referring to FIG. 8, the first STA 802 may transmit the determined schedule 820.

At block 1825, the apparatus may communicate data with the second wireless device based on the determine schedule. For example, referring to FIG. 8, the first STA 802 may communicate data with the second STA 804 based on the determined schedule 820.

Figure 19:
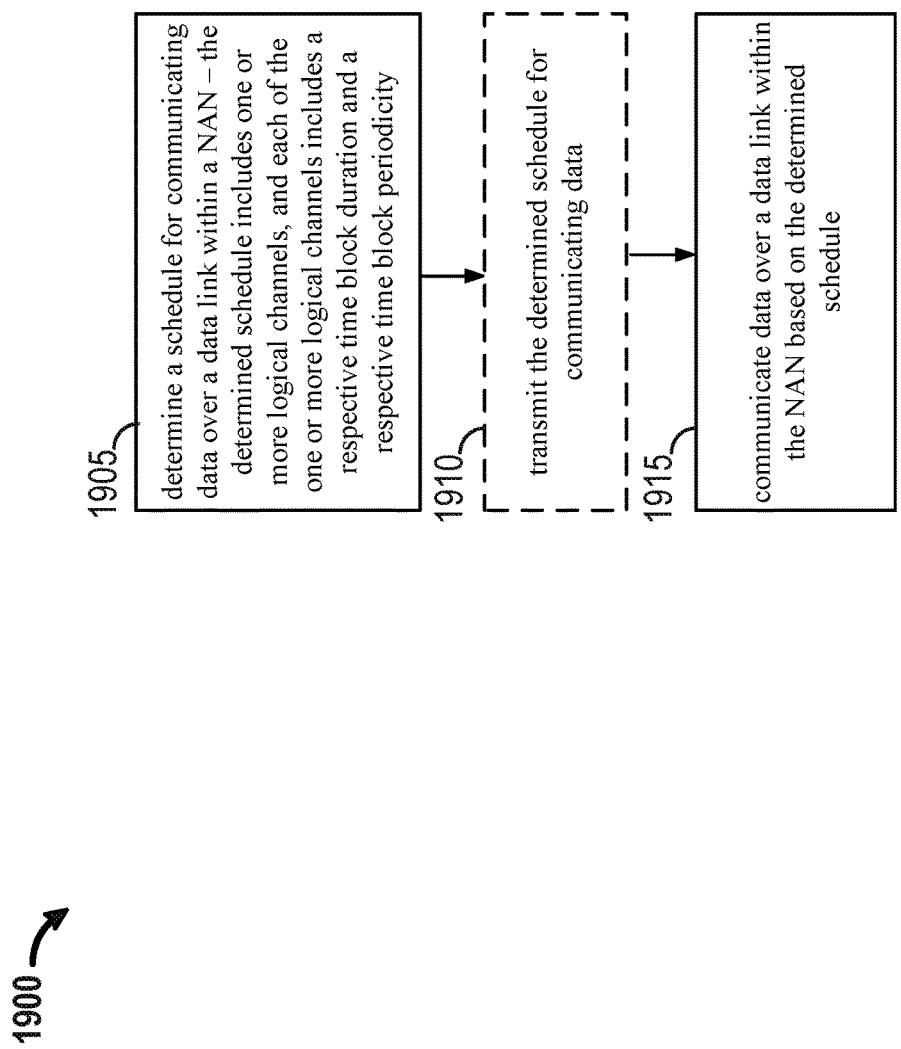
FIG. 19 is a flowchart of an exemplary method of a service provider using a non-negotiated approach for determining a service provider schedule with standardized periodic time blocks for a data link.

FIG. 19 is a flowchart of an exemplary method 1900 of a service provider using a non-negotiated approach for determining a service provider schedule with standardized periodic time blocks for a data link. The method 1900 may be performed using an apparatus (e.g., the STA 114, the first STA 902, or the wireless device 2302, below, for example). Although the method 1900 is described below with respect to the elements of wireless device 2302 of FIG. 23, below, other components may be used to implement one or more of the steps described herein.

At block 1905, the apparatus may determine a schedule for communicating data over a data link within a NAN. The determined schedule may include one or more logical channels, and each of the one or more logical channels may include a respective time block duration and a respective time block periodicity. For example, referring to FIG. 9, the first STA 902 may determine the service provider NDL schedule 912 for communicating data. The first STA 902 may determine a type of service provided by the first STA 902 and determine the service provider NDL schedule 912 based on one or more quality of service requirements of the service. For example, a real-time gaming service may have shorter time blocks at greater periodicity, and a file-sharing service may have longer time blocks at shorter periodicity.

At block 1910, the apparatus may transmit the determined schedule for communicating data. For example, referring to FIG. 9, the first STA 902 may transmit the service provider NDL schedule 912.

At block 1915, the apparatus may communicate data over a data link within the NAN based on the determined schedule. For example, referring to FIG. 9, the first STA 902 may communicate data over the data link based on the service provider NDL schedule 912.

Figure 20:
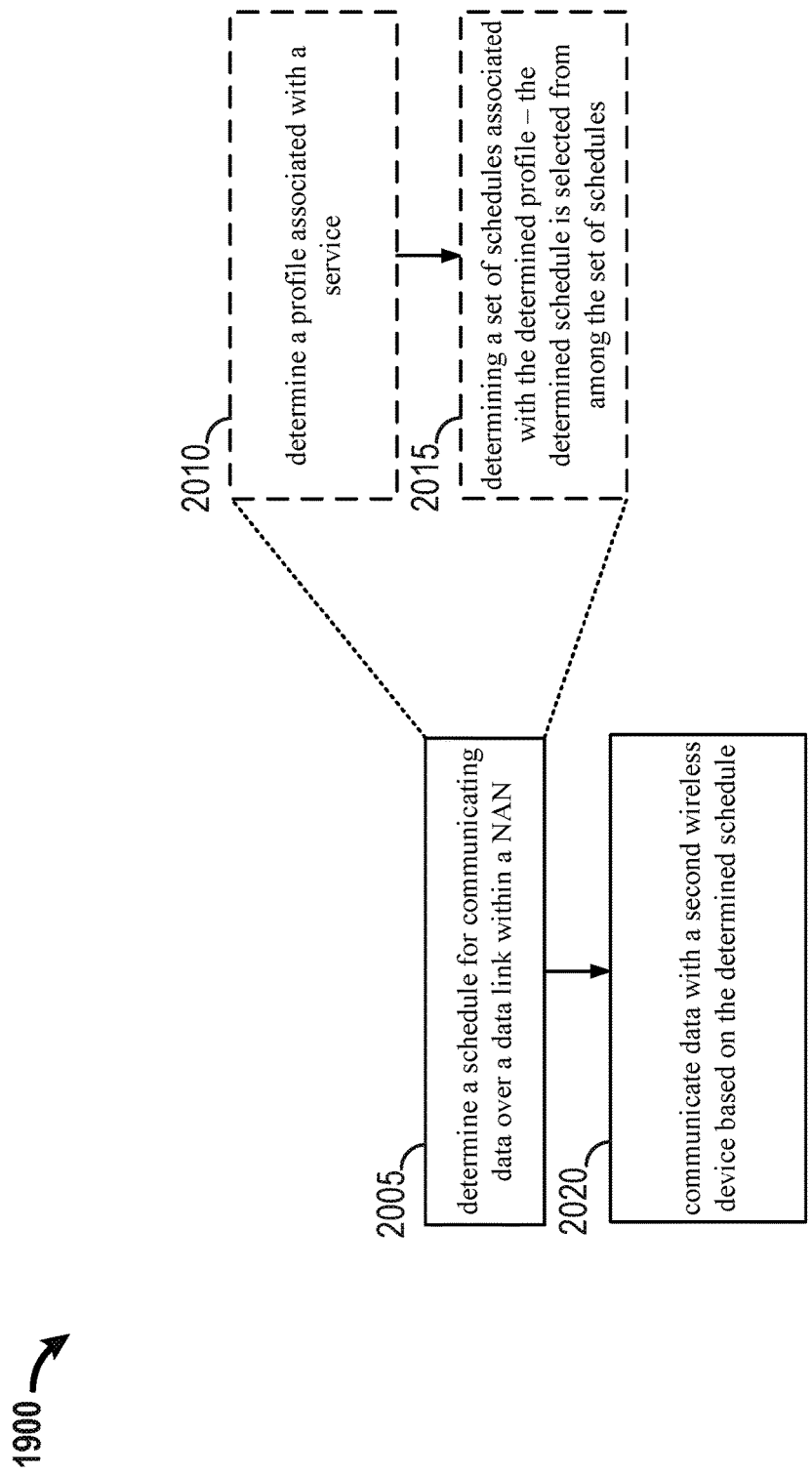
FIG. 20 is a flowchart of an exemplary method of a service provider using a non-negotiated approach for using a profile associated with a service for determining a schedule for a data link.

FIG. 20 is a flowchart of an exemplary method 2000 of a service provider using a non-negotiated approach for using a profile associated with a service for determining a schedule for a data link. The method 2000 may be performed using an apparatus (e.g., the STA 114, the first STA 1002, or the wireless device 2302, below, for example). Although the method 2000 is described below with respect to the elements of wireless device 2302 of FIG. 23, below, other components may be used to implement one or more of the steps described herein.

At block 2005, the apparatus may determine a schedule for communicating data over a data link within a NAN. In an aspect, determining the schedule may include block 2010, in which the apparatus determines a profile associated with a service to be offered, and block 2015, in which the apparatus determines a set of schedules associated with the determined profile. The determined schedule may be selected from among the set of schedules. For example, referring to FIG. 10, the first STA 1002 may determine the schedule for communicating data. The first STA 1002 may determine a profile associated with a service to be offered. The profile may indicate latency and/or throughput requirements to use for the data link. The first STA 1002 may determine a set of schedules associated with the determine profile and select from among the set of schedules. The first STA 1002 may transmit the determined schedule to the second STA 1004.

At block 2020, the apparatus may communicate data with a second wireless device based on the determined schedule. For example, referring to FIG. 10, the first STA 1002 may communicate data with the second STA 1004 based on the determined schedule.

Figure 21:
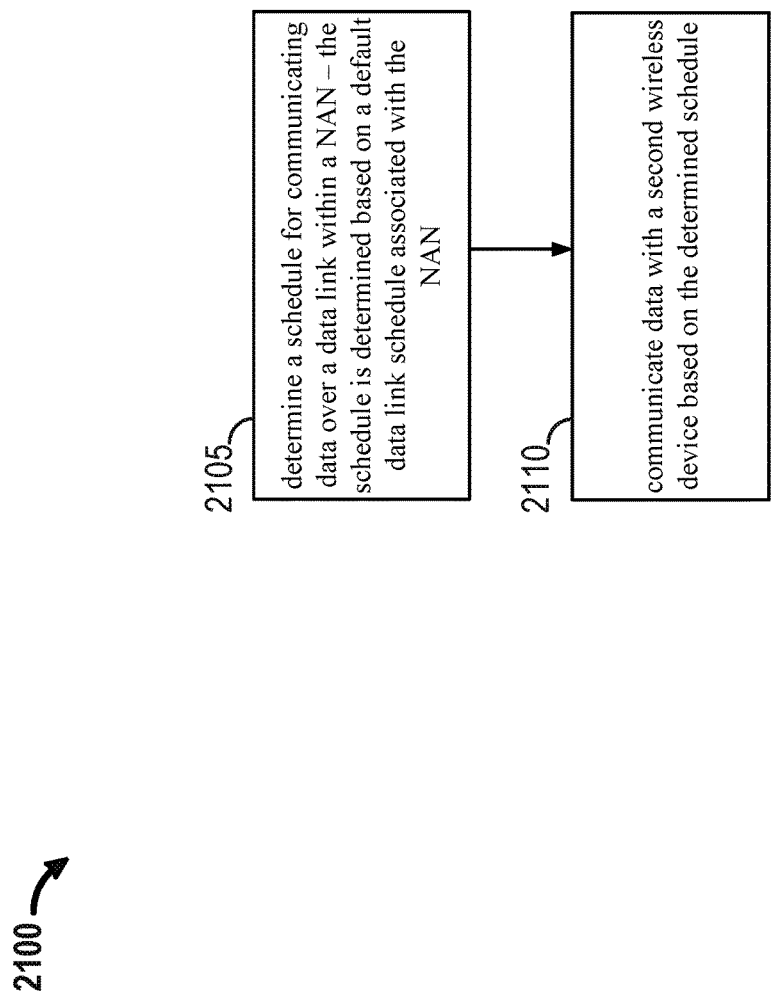
FIG. 21 is a flowchart of an exemplary method of a service provider using a non-negotiated approach for using a default NDL schedule for a data link.

FIG. 21 is a flowchart of an exemplary method 2100 of a service provider using a non-negotiated approach for using a default NDL schedule for a data link. The method 2100 may be performed using an apparatus (e.g., the STA 114, the first STA 1102, or the wireless device 2302, below, for example). Although the method 2100 is described below with respect to the elements of wireless device 2302 of FIG. 23, below, other components may be used to implement one or more of the steps described herein.

At block 2105, the apparatus may determine a schedule for communicating data over a data link within a NAN. The schedule may be determined based on a default data link schedule associated with the NAN. For example, referring to FIG. 11, the first STA 1102 may determine that the first STA 1102 has a service to provide. However, the service may not be associated with any schedules (e.g., based on profile) and/or may not have any specific latency or quality of service requirements. Accordingly, the first STA 1102 may determine to use a default NDL schedule for the service. The default NDL schedule may be preconfigured within the first STA 1102 or the default NDL schedule may be advertised by an anchor master within the NAN to which the first STA 1102 is associated.

At block 2110, the apparatus may communicate data with a second wireless device based on the determined schedule. For example, referring to FIG. 11, the first STA 1102 may communicate with the second STA 1104 based on the default NDL schedule.

Figure 22:
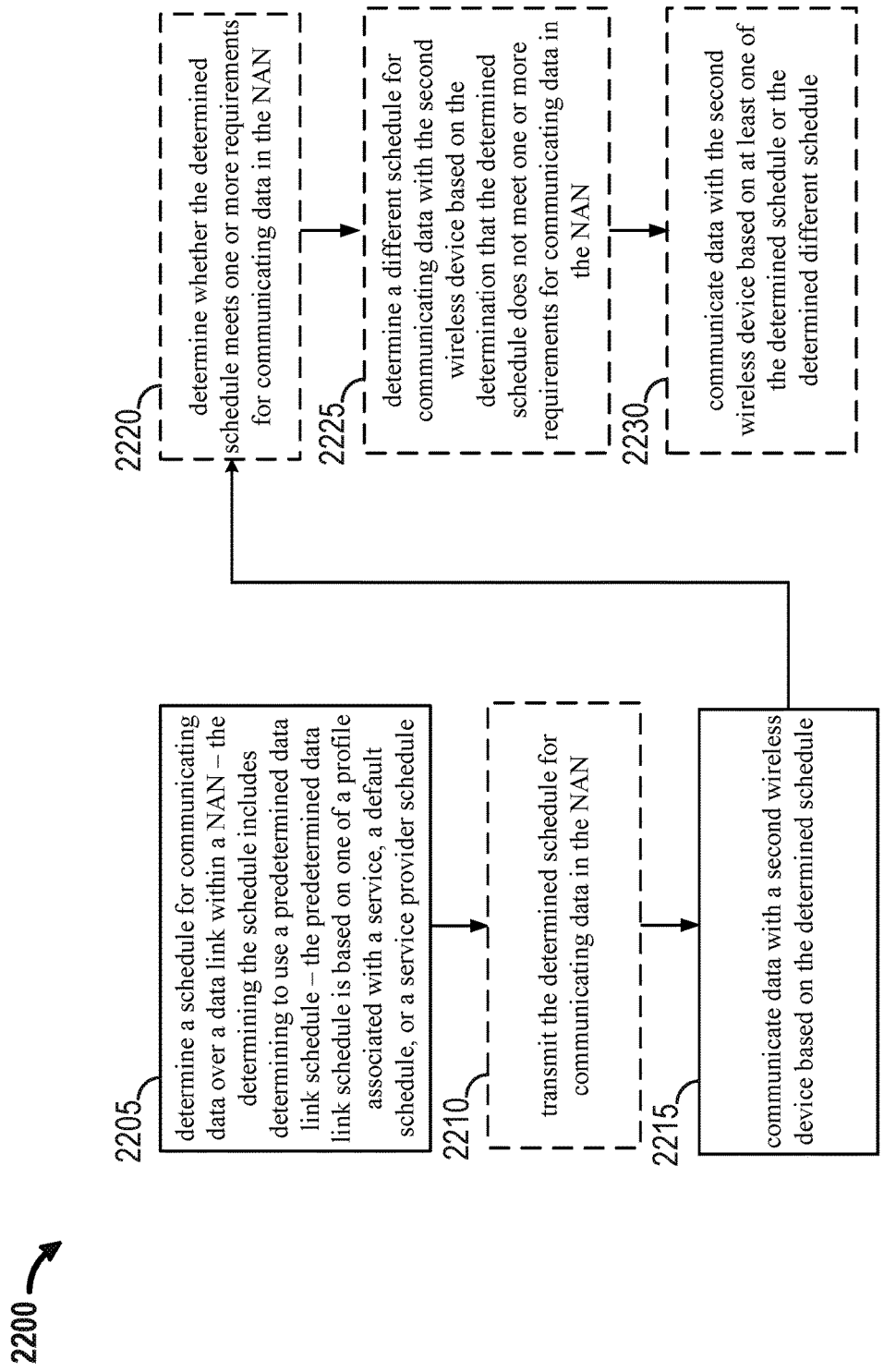
FIG. 22 is a flowchart of an exemplary method of a service provider using a hybrid approach for utilizing a predetermined NDL schedule and a negotiated NDL schedule for a data link.

FIG. 22 is a flowchart of an exemplary method 2200 of a service provider using a hybrid approach for utilizing a predetermined NDL schedule and a negotiated NDL schedule for a data link. The method 2200 may be performed using an apparatus (e.g., the STA 114, the first STA 1202, or the wireless device 2302, below, for example). Although the method 2200 is described below with respect to the elements of wireless device 2302 of FIG. 22, below, other components may be used to implement one or more of the steps described herein.

At block 2205, the apparatus may determine a schedule for communicating data over a data link within a NAN. The apparatus may determine the schedule by determining to use a predetermined data link schedule. The predetermined data link schedule may be based on one of a profile associated with a service, a default schedule, or a service provider schedule. For example, referring to FIG. 12, the first STA 1202 may determine a schedule for communicating data over the data link within the NAN. The first STA 1202 may determine to use a predetermined schedule (e.g., a schedule that is not negotiated). The first STA 1202 may determine to use a schedule associated with a profile, a default NDL schedule, or a service provider NDL schedule.

At block 2210, the apparatus may transmit the determined schedule for communicating data in the NAN. For example, referring to FIG. 12, the first STA 1202 may transmit the predetermined NDL schedule 1212 for communicating data in the NAN.

At block 2215, the apparatus may communicate data with a second wireless device based on the determined schedule. For example, referring to FIG. 12, the first STA 1202 may communicate data with the second STA 1204.

At block 2220, the apparatus may determine whether the determined schedule meets one or more requirements for communicating data in the NAN. For example, referring to FIG. 12, the first STA 1202 may determine whether the predetermined NDL schedule 1212 meets a latency requirement for the service. If so, the first STA 1202 may keep the predetermined NDL schedule 1212 for communication. Otherwise, if the first STA 1202 receives the message 1222 from the second STA 1204 requesting additional resources, then the first STA 1202 may determine that the predetermined NDL schedule 1212 does not meet requirements.

At block 2225, the apparatus may determine a different schedule for communicating data with the second wireless device based on the determination that the determined schedule does not meet one or more requirements for communicating data in the NAN. For example, referring to FIG. 12, the first STA 1202 may determine the different NDL schedule 1224 for communicating with the second STA 1204 based on the determination that the predetermined NDL schedule 1212 does not meet requirements. In an aspect, the message 1222 may include times at which the second STA 1204 is available for communication. The first STA 1202 may determine whether any of those times overlaps with the first STA 1202's availability and determine the different NDL schedule 1224 based on the availability of the second STA 1204.

At block 2230, the apparatus may communicate data with the second wireless device based on at least one of the determined schedule or the determined different schedule. For example, referring to FIG. 12, the first STA 1202 may communicate data with the second STA 1204 based on the predetermined NDL schedule 1212 or the different NDL schedule 1224.

Figure 23:
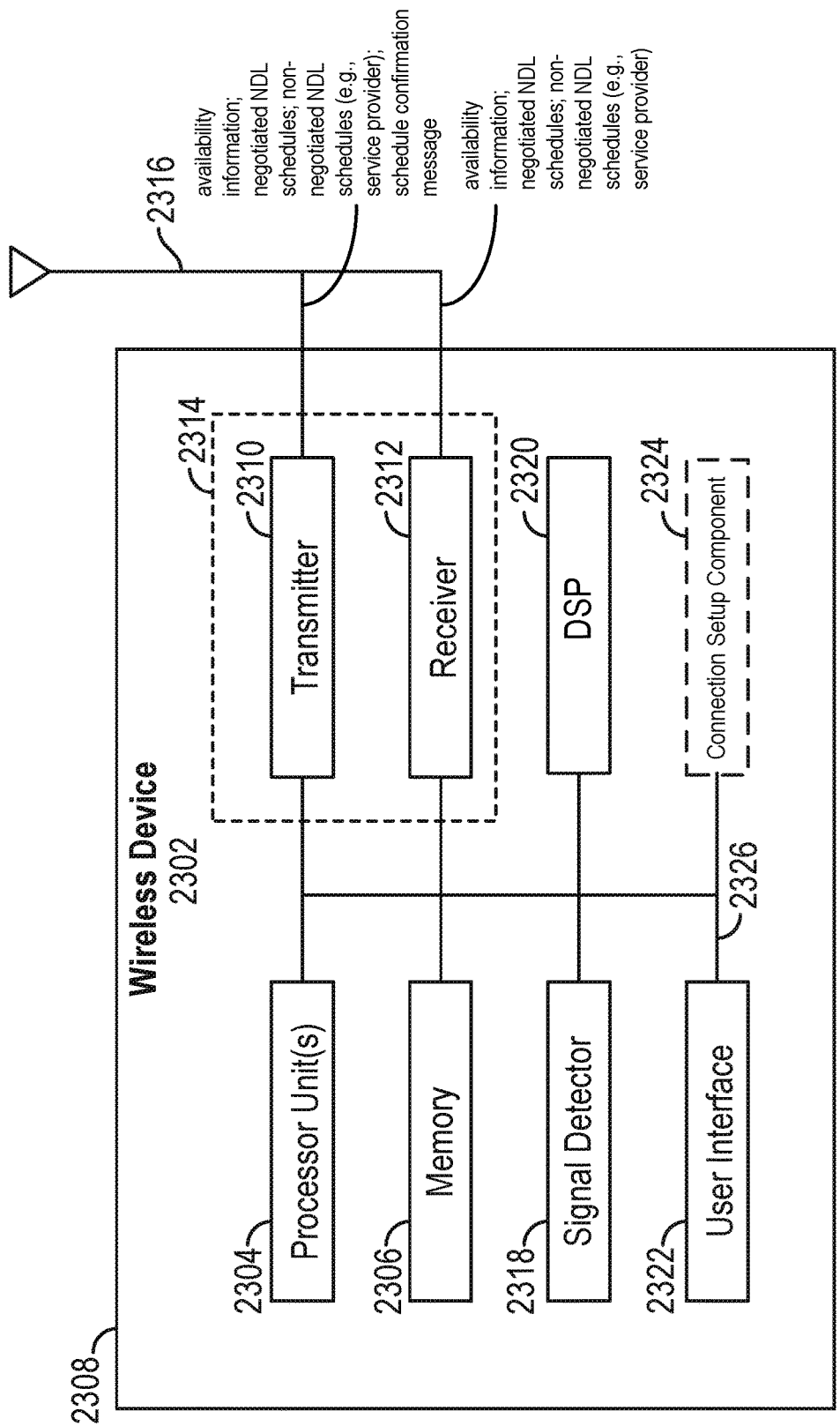
FIG. 23 shows an example functional block diagram of a wireless device that may perform NAN connection setup within the wireless communication system of FIG. 1.

FIG. 23 shows an example functional block diagram of a wireless device 2302 that may perform NAN connection setup within the wireless communication system 100 of FIG. 1. The wireless device 2302 is an example of a device that may be configured to implement the various methods described herein. For example, the wireless device 1302 may comprise one of the STAs 114, 252, 254, 602, 604, 702, 704, 802, 804, 806, 808, 902, 904, 906, 908, 1002, 1004, 1006, 1008, 1102, 1104, 1106, 1108, 1202, 1204, 1206, 1208.

The wireless device 2302 may include a processor 2304, which controls operation of the wireless device 2302. The processor 2304 may also be referred to as a central processing unit (CPU). Memory 2306, which may include both read-only memory (ROM) and random access memory (RAM), may provide instructions and data to the processor 2304. A portion of the memory 2306 may also include non-volatile random access memory (NVRAM). The processor 2304 typically performs logical and arithmetic operations based on program instructions stored within the memory 2306. The instructions in the memory 2306 may be executable (by the processor 2304, for example) to implement the methods described herein.

The processor 2304 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 2302 may also include a housing 2308, and the wireless device 2302 that may include a transmitter 2310 and/or a receiver 2312 to allow transmission and reception of data between the wireless device 2302 and a remote device. The transmitter 2310 and the receiver 2312 may be combined into a transceiver 2314. An antenna 2316 may be attached to the housing 2308 and electrically coupled to the transceiver 2314. The wireless device 2302 may also include multiple transmitters, multiple receivers, multiple transceivers, and/or multiple antennas.

The wireless device 2302 may also include a signal detector 2318 that may be used to detect and quantify the level of signals received by the transceiver 2314 or the receiver 2312. The signal detector 2318 may detect such signals as total energy, energy per subcarrier per symbol, power spectral density, and other signals. The wireless device 2302 may also include a DSP 2320 for use in processing signals. The DSP 2320 may be configured to generate a packet for transmission. In some aspects, the packet may comprise a physical layer convergence procedure (PLCP) protocol data unit (PPDU).

The wireless device 2302 may further comprise a user interface 2322 in some aspects. The user interface 2322 may comprise a keypad, a microphone, a speaker, and/or a display. The user interface 2322 may include any element or component that conveys information to a user of the wireless device 2302 and/or receives input from the user.

When the wireless device 2302 is implemented as a STA (e.g., the STA 114), the wireless device 2302 may also comprise a connection setup component 2324. The connection setup component 2324 may be configured to perform each of the functions and/or steps recited in disclosure with respect to FIGS. 1-22.

In one embodiment, the connection setup component 2324 may be configured to determine a schedule for communicating data in a NAN and to communicate data over a data link within the NAN based on the determined schedule. In one configuration, the connection setup component 2324 may be configured to transmit a first availability information to a second wireless device. The first availability information may include a first schedule at which the wireless device 2302 is available on a first channel and a first indicator indicating whether the wireless device 2302 is available on any channel of a set of channels. In this configuration, the connection setup component 2324 may be configured to receive a second availability information from the second wireless device based on the transmitted first availability information. The second availability information may include a second schedule at which the second wireless device is available on a second channel and a second indicator indicating whether the second wireless device is available on any channel of the set of channels. In an aspect, the second schedule may be the same as the first schedule or the second schedule is different from the first schedule. In another aspect, the schedule may be determined based on the transmitted first availability information and the received second availability information. In another configuration, the connection setup component 2324 may be configured to determine the schedule by determining that the wireless device 2302 is unavailable for communication during the second schedule. In this configuration, the connection setup component 2324 may be further configured to transmit a third availability information to the second wireless device. The third availability information may include a third schedule at which the wireless device 2302 is available on a third channel and a third indicator indicating whether the wireless device 2302 is available on any channel of a set of channels. In another configuration, the connection setup component 2324 may be configured to transmit a schedule confirmation message that indicates the wireless device 2302 is available for communication based on the received second availability information. The schedule for the data link within the NAN may be based on the received second availability information, and the data may be communicated after transmitting the schedule confirmation message. In another aspect, the first availability information may include a data link identifier (e.g., NDL ID) identifying the data link (e.g., the NDL). In another configuration, the connection setup component 2324 may be configured to receive a data link setup solicitation message. The connection setup component 2324 may be configured to transmit availability information to a second wireless device. The availability information may include a first schedule at which the wireless device 2302 is available on a channel and an indicator indicating whether the wireless device 2302 is available on any channel of a set of channels. The availability information may be transmitted based on the received data link setup solicitation message. In this configuration, the connection setup component 2324 may be configured to receive a data link schedule based on the transmitted availability information, and the schedule may be determined based on the received data link schedule. In another configuration, the connection setup component 2324 may be configured to receive a data link schedule, and the data link schedule may include one or more logical channels. Each of the one or more logical channels may include a respective time block duration and a respective time block periodicity. In this configuration, the connection setup component 2324 may be configured to determine the schedule based on the received data link schedule. In another aspect, the received data link schedule may be non-negotiable and the schedule may be determined based on the received data link schedule if the wireless device 2302 is available for communications during more than half of the received data link schedule. In another aspect, the data may be communicated based on a lifetime associated with the data link, and the lifetime may provide a boundary for schedule transition. In another aspect, the lifetime associated with the data link may be extended by a period of time to enable data communication. In another aspect, the data link may be associated with one or more NDPs. Each NDP may be associated with a session of a service between the wireless device 2302 and a second wireless device. Each NDP may be associated with the same determined schedule. In another aspect, the data link may be associated with a data link identifier, and each NDP is associated with an NDP identifier. In another aspect, each NDP of the one or more NDPs may have a quality of service and security requirements that are different from other NDPs of the one or more NDPs.

In another embodiment, the connection setup component 2324 may be configured to determine a schedule for communicating data over a data link within a NAN. The connection setup component 2324 may be configured to communicate data with a second wireless device based on the determined schedule. In one configuration, the connection setup component 2324 may be configured to receive a first availability information from a second wireless device. The first availability information may include a first schedule at which the second wireless device is available on a first channel and a first indicator indicating whether the second wireless device is available on any channel of a set of channels. The connection setup component 2324 may be configured to transmit a second availability information to the second wireless device based on the received first availability information. The second availability information may include a second schedule at which the wireless device 2302 is available on a second channel and a second indicator indicating whether the wireless device 2302 is available on any channel of the set of channels. In another configuration, the connection setup component 2324 may be configured to determine the schedule by determining whether the wireless device 2302 is unavailable for communication based on the first availability information. The second availability information may be determined based on the first availability information. In configuration, the connection setup component 2324 may be configured to receive a schedule confirmation message that indicates the second wireless device is available for communication based on the transmitted second availability information. The schedule for the data link within the NAN may be based on the received second availability information. The data may be communicated after receiving the schedule confirmation message. In another configuration, the connection setup component 2324 may be configured to transmit a data link setup solicitation message. The connection setup component 2324 may be configured to receive availability information from at least one other device, and the availability information may include a schedule at which each of the at least one other device is available on a particular channel and an indicator indicating whether each of the at least one other device is available on any channel of a set of channels. The availability information may be received based on the data link setup solicitation message. In this configuration, the connection setup component 2324 may be configured to transmit the determined schedule for communicating data. The determined schedule for communicating data may be based on the received availability information from the at least one other device. In another configuration, the connection setup component 2324 may be configured to determine the schedule by determining one or more logical channels, and each of the one or more logical channels may include a respective time block duration and a respective time block periodicity. In this configuration, the connection setup component 2324 may be configured to transmit the determined schedule that may indicate the one or more logical channels for communicating data. In another configuration, the connection setup component 2324 may be configured to determine the one or more logical channels based on at least one of a quality of service requirement or an energy use level. In another configuration, the connection setup component 2324 may be configured to determine the schedule by determining a profile associated with a service and by determining a set of schedules associated with the determined profile. The determined schedule may be selected from among the set of schedules. In another aspect, the profile may be based on at least one of a latency requirement, a throughput requirement, or a power requirement associated with service. In another aspect, the schedule may be determined based on a default data link schedule associated with the NAN. In another aspect, the default data link schedule may be available to any service advertised on the NAN. In another aspect, the default data link schedule may be available for exchanging connection scheduling information. In another configuration, the connection setup component 2324 may be configured to determine the schedule by determining to use a predetermined data link schedule. The predetermined data link schedule may be based on one of a profile associated with a service, a default schedule, or a service provider schedule associated with the service. In this configuration, the connection setup component 2324 may be configured to transmit the determined schedule for communicating data in the NAN. In another aspect, the determined schedule is non-negotiable. In another aspect, the determined schedule is for a one-to-many service or a many-to-many service. In another configuration, the connection setup component 2324 may be configured to determine that the determined schedule fails to meet one or more requirements for communicating data in the NAN, to determine a different schedule for communicating data with the second wireless device based on the determination that the determined schedule fails to meet one or more requirements for communicating data in the NAN, and to communicate data with the second wireless device based on the determined different schedule. In another aspect, the one or more requirements may include at least one of a latency requirement, a throughput requirement, or a power requirement. The determination that the determined schedule fails to meet the one or more requirements may be further based on a change in a number of wireless devices in the NAN or a change in topology. In another configuration, the connection setup component 2324 may determine that the determined schedule fails to meet one or more requirements for communicating data in the NAN by receiving a message from the second wireless device. The message may indicate that the determined schedule does not meet one or more requirements for communicating data in the NAN and including availability information associated with the second wireless device. The availability information may indicate a first schedule at which the second wireless device is available on a channel and an indicator indicating whether the second wireless device is available on any channel of a set of channels. In another configuration, the connection setup component 2324 may be configured to receive a schedule confirmation message that indicates a confirmation of the determined schedule for the data link within the NAN. The data may be communicated after receiving the schedule confirmation message.

The various components of the wireless device 2302 may be coupled together by a bus system 2326. The bus system 2326 may include a data bus, for example, as well as a power bus, a control signal bus, and a status signal bus in addition to the data bus. Components of the wireless device 2302 may be coupled together or accept or provide inputs to each other using some other mechanism.

Although a number of separate components are illustrated in FIG. 23, one or more of the components may be combined or commonly implemented. For example, the processor 2304 may be used to implement not only the functionality described above with respect to the processor 2304, but also to implement the functionality described above with respect to the signal detector 2318, the DSP 2320, the user interface 2322, and/or the connection setup component 2324. Further, each of the components illustrated in FIG. 23 may be implemented using a plurality of separate elements.

Figure 24:
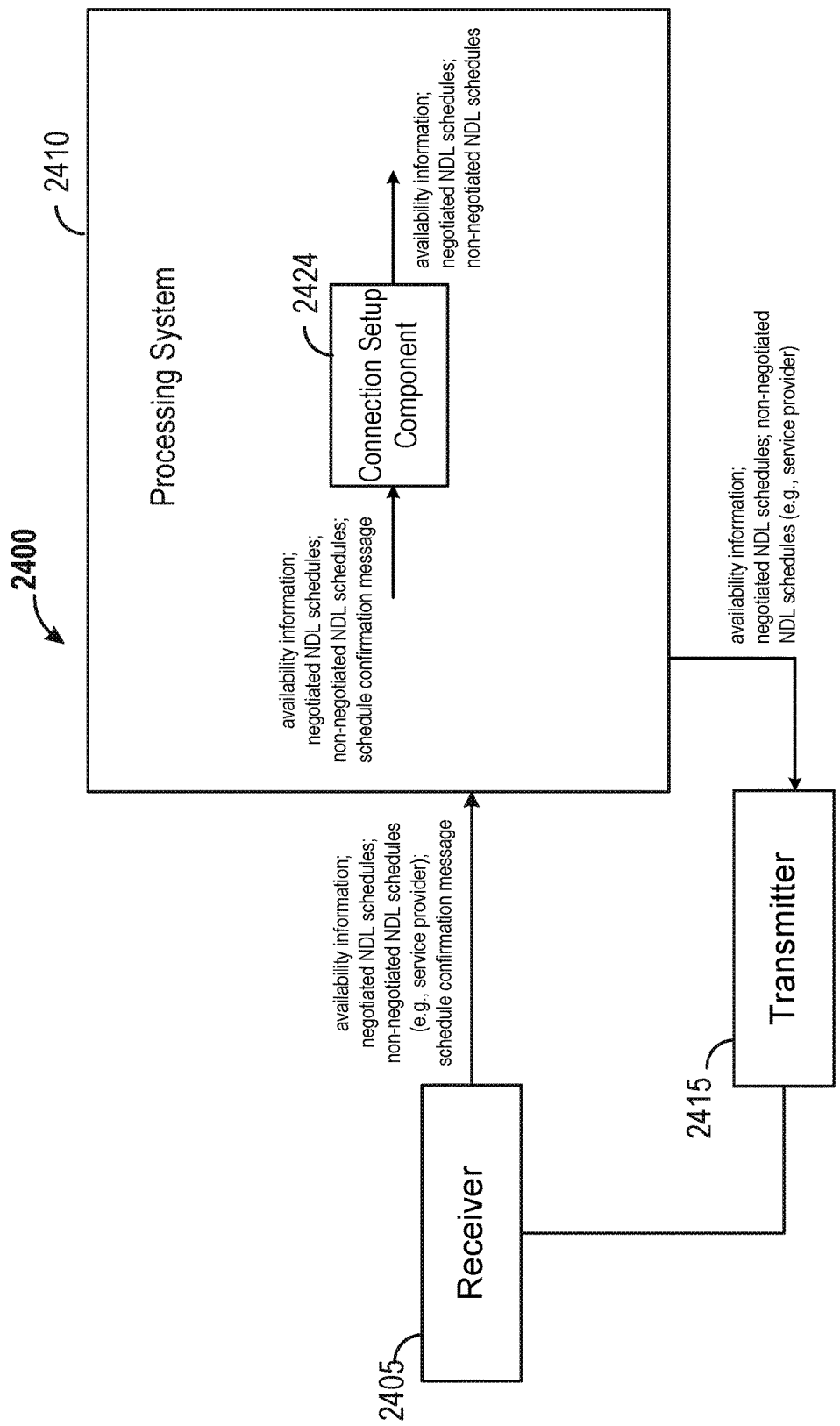
FIG. 24 is a functional block diagram of an example wireless communication device that performs connection setup.

FIG. 24 is a functional block diagram of an example wireless communication device 2400 that performs connection setup. The wireless communication device 2400 may include a receiver 2405, a processing system 2410, and a transmitter 2415. The processing system 2410 may include a connection setup component 2424.

In one configuration, the transmitter 2415, the processing system 2410, and/or the connection setup component 2424 may be configured to perform each of the functions and/or steps recited in disclosure with respect to FIGS. 1-22.

In one embodiment, the connection setup component 2424 and/or the processing system 2410 may be configured to determine a schedule for communicating data in a NAN. The connection setup component 2424, the processing system 2410, the transmitter 2415, and/or the receiver 2405 may be configured to communicate data over a data link within the NAN based on the determined schedule. In one configuration, the connection setup component 2424, the processing system 2410, and/or the transmitter 2415 may be configured to transmit a first availability information to a second wireless device. The first availability information may include a first schedule at which the wireless communication device 2400 is available on a first channel and a first indicator indicating whether the wireless communication device 2400 is available on any channel of a set of channels. In this configuration, the connection setup component 2424, the processing system 2410, and/or the receiver 2405 may be configured to receive a second availability information from the second wireless device based on the transmitted first availability information. The second availability information may include a second schedule at which the second wireless device is available on a second channel and a second indicator indicating whether the second wireless device is available on any channel of the set of channels. In an aspect, the second schedule may be the same as the first schedule or the second schedule is different from the first schedule. In another aspect, the schedule may be determined based on the transmitted first availability information and the received second availability information. In another configuration, the connection setup component 2424 and/or the processing system 2410 may be configured to determine the schedule by determining that the wireless communication device 2400 is unavailable for communication during the second schedule. In this configuration, the connection setup component 2424, the processing system 2410, and/or the transmitter 2415 may be further configured to transmit a third availability information to the second wireless device. The third availability information may include a third schedule at which the wireless communication device 2400 is available on a third channel and a third indicator indicating whether the wireless communication device 2400 is available on any channel of a set of channels. In another configuration, the connection setup component 2424, the processing system 2410, and/or the transmitter 2415 may be configured to transmit a schedule confirmation message that indicates the wireless communication device 2400 is available for communication based on the received second availability information. The schedule for the data link within the NAN may be based on the received second availability information, and the data may be communicated after transmitting the schedule confirmation message. In another aspect, the first availability information may include a data link identifier (e.g., NDL ID) identifying the data link (e.g., the NDL). In another configuration, the connection setup component 2424, the processing system 2410, and/or the receiver 2405 may be configured to receive a data link setup solicitation message. The connection setup component 2424, the processing system 2410, and/or the transmitter 2415 may be configured to transmit availability information to a second wireless device. The availability information may include a first schedule at which the wireless communication device 2400 is available on a channel and an indicator indicating whether the wireless communication device 2400 is available on any channel of a set of channels. The availability information may be transmitted based on the received data link setup solicitation message. In this configuration, the connection setup component 2424, the processing system 2410, and/or the receiver 2405 may be configured to receive a data link schedule based on the transmitted availability information, and the schedule may be determined based on the received data link schedule. In another configuration, the connection setup component 2424, the processing system 2410, and/or the receiver 2405 may be configured to receive a data link schedule, and the data link schedule may include one or more logical channels. Each of the one or more logical channels may include a respective time block duration and a respective time block periodicity. In this configuration, the connection setup component 2424 and/or the processing system 2410 may be configured to determine the schedule based on the received data link schedule. In another aspect, the received data link schedule may be non-negotiable and the schedule may be determined based on the received data link schedule if the wireless communication device 2400 is available for communications during more than half of the received data link schedule. In another aspect, the data may be communicated based on a lifetime associated with the data link, and the lifetime may provide a boundary for schedule transition. In another aspect, the lifetime associated with the data link may be extended by a period of time to enable data communication. In another aspect, the data link may be associated with one or more NDPs. Each NDP may be associated with a session of a service between the wireless communication device 2400 and a second wireless device. Each NDP may be associated with the same determined schedule. In another aspect, the data link may be associated with a data link identifier, and each NDP is associated with an NDP identifier. In another aspect, each NDP of the one or more NDPs may have a quality of service and security requirements that are different from other NDPs of the one or more NDPs.

In another embodiment, the connection setup component 2424 and/or the processing system 2410 may be configured to determine a schedule for communicating data over a data link within a NAN. The connection setup component 2424, the processing system 2410, the receiver 2405, and/or the transmitter 2415 may be configured to communicate data with a second wireless device based on the determined schedule. In one configuration, the connection setup component 2424, the processing system 2410, and or the receiver 2405 may be configured to receive a first availability information from a second wireless device. The first availability information may include a first schedule at which the second wireless device is available on a first channel and a first indicator indicating whether the second wireless device is available on any channel of a set of channels. The connection setup component 2424, the processing system 2410, and/or the transmitter 2415 may be configured to transmit a second availability information to the second wireless device based on the received first availability information. The second availability information may include a second schedule at which the wireless communication device 2400 is available on a second channel and a second indicator indicating whether the wireless communication device 2400 is available on any channel of the set of channels. In another configuration, the connection setup component 2424 and/or the processing system 2410 may be configured to determine the schedule by determining whether the wireless communication device 2400 is unavailable for communication based on the first availability information. The second availability information may be determined based on the first availability information. In configuration, the connection setup component 2424, the processing system 2410, and/or the receiver 2405 may be configured to receive a schedule confirmation message that indicates the second wireless device is available for communication based on the transmitted second availability information. The schedule for the data link within the NAN may be based on the received second availability information. The data may be communicated after receiving the schedule confirmation message. In another configuration, the connection setup component 2424, the processing system 2410, and/or the transmitter 2415 may be configured to transmit a data link setup solicitation message. The connection setup component 2424, the processing system 2410, and/or the receiver 2405 may be configured to receive availability information from at least one other device, and the availability information may include a schedule at which each of the at least one other device is available on a particular channel and an indicator indicating whether each of the at least one other device is available on any channel of a set of channels. The availability information may be received based on the data link setup solicitation message. In this configuration, the connection setup component 2424, the processing system 2410, and/or the transmitter 2415 may be configured to transmit the determined schedule for communicating data. The determined schedule for communicating data may be based on the received availability information from the at least one other device. In another configuration, the connection setup component 2424 and/or the processing system 2410 may be configured to determine the schedule by determining one or more logical channels, and each of the one or more logical channels may include a respective time block duration and a respective time block periodicity. In this configuration, the connection setup component 2424, the processing system 2410, and/or the transmitter 2415 may be configured to transmit the determined schedule that may indicate the one or more logical channels for communicating data. In another configuration, the connection setup component 2424 and/or the processing system 2410 may be configured to determine the one or more logical channels based on at least one of a quality of service requirement or an energy use level. In another configuration, the connection setup component 2424 and/or the processing system 2410 may be configured to determine the schedule by determining a profile associated with a service and by determining a set of schedules associated with the determined profile. The determined schedule may be selected from among the set of schedules. In another aspect, the profile may be based on at least one of a latency requirement, a throughput requirement, or a power requirement associated with service. In another aspect, the schedule may be determined based on a default data link schedule associated with the NAN. In another aspect, the default data link schedule may be available to any service advertised on the NAN. In another aspect, the default data link schedule may be available for exchanging connection scheduling information. In another configuration, the connection setup component 2424 and/or the processing system 2410 may be configured to determine the schedule by determining to use a predetermined data link schedule. The predetermined data link schedule may be based on one of a profile associated with a service, a default schedule, or a service provider schedule associated with the service. In this configuration, the connection setup component 2424, the processing system 2410, and/or the transmitter 2415 may be configured to transmit the determined schedule for communicating data in the NAN. In another aspect, the determined schedule is non-negotiable. In another aspect, the determined schedule is for a one-to-many service or a many-to-many service. In another configuration, the connection setup component 2424 and/or the processing system 2410 may be configured to determine that the determined schedule fails to meet one or more requirements for communicating data in the NAN, to determine a different schedule for communicating data with the second wireless device based on the determination that the determined schedule fails to meet one or more requirements for communicating data in the NAN, and to communicate data with the second wireless device based on the determined different schedule. In another aspect, the one or more requirements may include at least one of a latency requirement, a throughout requirement, or a power requirement. The determination that the determined schedule fails to meet the one or more requirements may be further based on a change in a number of wireless devices in the NAN or a change in topology. In another configuration, the connection setup component 2424 and/or the processing system 2410 may determine that the determined schedule fails to meet one or more requirements for communicating data in the NAN by receiving a message from the second wireless device. The message may indicate that the determined schedule does not meet one or more requirements for communicating data in the NAN and including availability information associated with the second wireless device. The availability information may indicate a first schedule at which the second wireless device is available on a channel and an indicator indicating whether the second wireless device is available on any channel of a set of channels. In another configuration, the connection setup component 2424, processing system 2410, and/or the receiver 2405 may be configured to receive a schedule confirmation message that indicates a confirmation of the determined schedule for the data link within the NAN. The data may be communicated after receiving the schedule confirmation message.

The receiver 2405, the processing system 2410, the connection setup component 2424, and/or the transmitter 2415 may be configured to perform one or more functions discussed above with respect to FIGS. 1-22. The receiver 2405 may correspond to the receiver 2312. The processing system 2410 may correspond to the processor 2304. The transmitter 2415 may correspond to the transmitter 2310. The connection setup component 2424 may correspond to the connection setup component 124, and/or the connection setup component 2324.

In one embodiment, the wireless communication device 2400 may include means for determining a schedule for communicating data in a NAN and for communicating data over a data link within the NAN based on the determined schedule. In one instance, the wireless communication device 2400 may include means for transmitting a first availability information to a second wireless device. The first availability information may include a first schedule at which the wireless communication device 2400 is available on a first channel and a first indicator indicating whether the wireless communication device 2400 is available on any channel of a set of channels. In this configuration, the wireless communication device 2400 may include means for receiving a second availability information from the second wireless device based on the transmitted first availability information. The second availability information may include a second schedule at which the second wireless device is available on a second channel and a second indicator indicating whether the second wireless device is available on any channel of the set of channels. In an aspect, the second schedule may be the same as the first schedule or the second schedule is different from the first schedule. In another aspect, the schedule may be determined based on the transmitted first availability information and the received second availability information. In another configuration, the means for determining the schedule may be configured to determine that the wireless communication device 2400 is unavailable for communication during the second schedule. In this configuration, the wireless communication device 2400 may further include means for transmitting a third availability information to the second wireless device. The third availability information may include a third schedule at which the wireless communication device 2400 is available on a third channel and a third indicator indicating whether the wireless communication device 2400 is available on any channel of a set of channels. In another configuration, the wireless communication device 2400 may include means for transmitting a schedule confirmation message that indicates the wireless communication device 2400 is available for communication based on the received second availability information. The schedule for the data link within the NAN may be based on the received second availability information, and the data may be communicated after transmitting the schedule confirmation message. In another aspect, the first availability information may include a data link identifier (e.g., NDL ID) identifying the data link (e.g., the NDL). In another configuration, the wireless communication device 2400 may include means for receiving a data link setup solicitation message. The wireless communication device 2400 may include means for transmitting availability information to a second wireless device. The availability information may include a first schedule at which the wireless communication device 2400 is available on a channel and an indicator indicating whether the wireless communication device 2400 is available on any channel of a set of channels. The availability information may be transmitted based on the received data link setup solicitation message. In this configuration, the wireless communication device 2400 may include means for receiving a data link schedule based on the transmitted availability information, and the schedule may be determined based on the received data link schedule. In another configuration, the wireless communication device 2400 may include means for receiving a data link schedule, and the data link schedule may include one or more logical channels. Each of the one or more logical channels may include a respective time block duration and a respective time block periodicity. In this configuration, the wireless communication device 2400 may include means for determining the schedule based on the received data link schedule. In another aspect, the received data link schedule may be non-negotiable and the schedule may be determined based on the received data link schedule if the wireless communication device 2400 is available for communications during more than half of the received data link schedule. In another aspect, the data may be communicated based on a lifetime associated with the data link, and the lifetime may provide a boundary for schedule transition. In another aspect, the lifetime associated with the data link may be extended by a period of time to enable data communication. In another aspect, the data link may be associated with one or more NDPs. Each NDP may be associated with a session of a service between the wireless communication device 2400 and a second wireless device. Each NDP may be associated with the same determined schedule. In another aspect, the data link may be associated with a data link identifier, and each NDP is associated with an NDP identifier. In another aspect, each NDP of the one or more NDPs may have a quality of service and security requirements that are different from other NDPs of the one or more NDPs.

For example, means for determining a schedule for communicating data may include the connection setup component 2424 and/or the processing system 2410. Means for communicating data may include the receiver 2405, the transmitter 2415, the processing system 2410, and/or the connection setup component 2424. Means for transmitting the first availability information may include the connection setup component 2424, the processing system 2410, and/or the transmitter 2415. Means for receiving the second availability information may include the connection setup component 2424, the processing system 2410, and/or the receiver 2405. Means for transmitting the third availability information may include the connection setup component 2424, the processing system 2410, and/or the transmitter 2415. Means for transmitting a schedule confirmation may include the connection setup component 2424, the processing system 2410, and/or the transmitter 2415. Means for receiving a data link setup solicitation message may include the connection setup component 2424, the processing system 2410, and the receiver 2405. Means for transmitting availability information may include the connection setup component 2424, the processing system 2410, and/or the transmitter 2415. Means for receiving a data link schedule may include the connection setup component 2424, the processing system 2410, and/or the receiver 2405.

In one embodiment, the wireless communication device 2400 may include means for determining a schedule for communicating data over a data link within a NAN. The wireless communication device 2400 may include means for communicating data with a second wireless device based on the determined schedule. In one configuration, the wireless communication device 2400 may include means for receiving a first availability information from a second wireless device. The first availability information may include a first schedule at which the second wireless device is available on a first channel and a first indicator indicating whether the second wireless device is available on any channel of a set of channels. The wireless communication device 2400 may include means for transmitting a second availability information to the second wireless device based on the received first availability information. The second availability information may include a second schedule at which the wireless communication device 2400 is available on a second channel and a second indicator indicating whether the wireless communication device 2400 is available on any channel of the set of channels. In another configuration, the means for determining the schedule may be configured to determine whether the wireless communication device 2400 is unavailable for communication based on the first availability information. The second availability information may be determined based on the first availability information. In configuration, the wireless communication device 2400 may include means for receiving a schedule confirmation message that indicates the second wireless device is available for communication based on the transmitted second availability information. The schedule for the data link within the NAN may be based on the received second availability information. The data may be communicated after receiving the schedule confirmation message. In another configuration, the wireless communication device 2400 may include means for transmitting a data link setup solicitation message. The wireless communication device 2400 may include means for receiving availability information from at least one other device, and the availability information may include a schedule at which each of the at least one other device is available on a particular channel and an indicator indicating whether each of the at least one other device is available on any channel of a set of channels. The availability information may be received based on the data link setup solicitation message. In this configuration, the wireless communication device 2400 may include means for transmitting the determined schedule for communicating data. The determined schedule for communicating data may be based on the received availability information from the at least one other device. In another configuration, the means for determining the schedule may be configured to determine one or more logical channels, and each of the one or more logical channels may include a respective time block duration and a respective time block periodicity. In this configuration, the wireless communication device 2400 may include means for transmitting the determined schedule that may indicate the one or more logical channels for communicating data. In another configuration, the determination of the one or more logical channels may be based on at least one of a quality of service requirement or an energy use level. In another configuration, the means for determining the schedule may be configured to determine a profile associated with a service and to determine a set of schedules associated with the determined profile. The determined schedule may be selected from among the set of schedules. In another aspect, the profile may be based on at least one of a latency requirement, a throughput requirement, or a power requirement associated with service. In another aspect, the schedule may be determined based on a default data link schedule associated with the NAN. In another aspect, the default data link schedule may be available to any service advertised on the NAN. In another aspect, the default data link schedule may be available for exchanging connection scheduling information. In another configuration, the means for determining the schedule may be configured to determine to use a predetermined data link schedule. The predetermined data link schedule may be based on one of a profile associated with a service, a default schedule, or a service provider schedule associated with the service. In this configuration, the wireless communication device 2400 may include means for transmitting the determined schedule for communicating data in the NAN. In another aspect, the determined schedule may be non-negotiable. In another aspect, the determined schedule may be for a one-to-many service or a many-to-many service. In another configuration, the wireless communication device 2400 may include means for determining that the determined schedule fails to meet one or more requirements for communicating data in the NAN, means for determining a different schedule for communicating data with the second wireless device based on the determination that the determined schedule fails to meet one or more requirements for communicating data in the NAN, and means for communicating data with the second wireless device based on the determined different schedule. In another aspect, the one or more requirements may include at least one of a latency requirement, a throughout requirement, or a power requirement. The determination that the determined schedule fails to meet the one or more requirements may be further based on a change in a number of wireless devices in the NAN or a change in topology. In another configuration, the means for determining that the determined schedule fails to meet one or more requirements for communicating data in the NAN may be configured to receive a message from the second wireless device. The message may indicate that the determined schedule does not meet one or more requirements for communicating data in the NAN and including availability information associated with the second wireless device. The availability information may indicate a first schedule at which the second wireless device is available on a channel and an indicator indicating whether the second wireless device is available on any channel of a set of channels. In another configuration, the wireless communication device 2400 may include means for receiving a schedule confirmation message that indicates a confirmation of the determined schedule for the data link within the NAN. The data may be communicated after receiving the schedule confirmation message.

For example, means for determining a schedule for communicating data may include the connection setup component 2424 and/or the processing system 2410. Means for communicating may include the connection setup component 2424, the processing system 2410, the transmitter 2415, and/or the receiver 2405. Means for receiving a first availability information may include the connection setup component 2424, the processing system 2410, and/or the receiver 2405. Means for transmitting a second availability information may include the connection setup component 2424, the processing system 2410, and/or the transmitter

2415. Means for receiving a schedule conformation message may include the connection setup component 2424, the processing system 2410, and/or the receiver 2405. Means for transmitting a data link setup solicitation message may include the connection setup component 2424, the processing system 2410, and/or the transmitter 2415. Means for receiving availability information may include the connection setup component 2424, the processing system 2410, and/or the receiver 2405. Means for transmitting the determine schedule may include the connection setup component 2424, the processing system 2410, and/or the transmitter 2415. Means for determining that the determined schedule fails to meet one or more requirements may include the connection setup component 2424 and/or the processing system 2410. Means for determining a different schedule may include the connection setup component 2424 and/or the processing system 2410. Means for communicating data may include the connection setup component 2424 and/or the processing system 2410. Means for receiving a message may include the connection setup component 2424, the processing system 2410, and/or the receiver 2405. Means for receiving a schedule confirmation may include the connection setup component 2424, the processing system 2410, and/or the receiver 2405.

FIG. 25 illustrates a data link attribute 2500 for determining an availability of a wireless device for scheduling a data link. In an aspect, the data link attribute 2500 may be an NDL attribute used for schedule negotiation (e.g., for converging on a schedule for transmission). The data link attribute 2500 may be another example of availability information as discussed above. Although the data link attribute 2500 in FIG. 25 indicates a number of fields, not all of the fields are required, and the data link attribute 2500 may have any number of the fields illustrated in FIG. 25. The data link attribute 2500 may include information about the times a device is available on a particular channel and the times a device is available on any channel of multiple channels. As shown in FIG. 25, the data link attribute 2500 includes an availability intervals bitmap, which may correspond to the first FAM 502 or the second FAM 504 in FIG. 5. Referring to FIG. 25, the attribute ID field may identify the type of attribute (or NAN attribute) among other types attributes. In an aspect, the attribute ID field may be 1 octet in size and may have a value of 0x0C. The length field may indicate the length of the fields following the length field. In an aspect, the length field may be 2 octets in size and may have a variable value. The MAC address field may indicate the MAC address of the wireless device transmitting the data link attribute 2500. The MAC address field may be used to identify the wireless device for packet transmission over the data link. In an aspect, the MAC address field may be 6 octets in size and may have a variable value. The group ID field may identify a group of devices associated with a data link service (e.g., a unique NDL group ID). In an aspect, the group ID field may be 6 octets in size and may have a variable value. The validity time field may indicate the number of discovery window intervals for which the data link attribute 2500 is valid. In an aspect, the validity time field may be 2 octets in length and may have a variable value. For example, the validity time field may be equivalent to life time of the data link.

The NDL control field may indicate a presence or absence of certain bits within the data link attribute 2500. The NDL control field may include an availability map indicator, an NDL logical channel indicator, a confirm field (or a status field), a flexible field, a power save field, and a reserved field. The availability map indicator (e.g., a bit indicator) may indicate whether the data link attribute 2500 has a map control field and an availability intervals bitmap field. For example, if the availability map indicator is set to 0, then the data link attribute 2500 may not have a map control field or an availability intervals bitmap, or the map control field and the availability intervals bitmap may be empty. If the availability map indicator is set to 1, then the data link attribute 2500 may have both the map control field and the availability intervals bitmap, and both the map control field and the availability intervals bitmap are not empty. The NDL logical channel indicator (e.g., a bit indicator) may indicate whether the NDL logical channel indicator field is present in the data link attribute 2500. For example, if the NDL logical channel indicator is set to 0, then the data link attribute 2500 may not indicate a channel in the NDL logical channel indicator field. But if the NDL logical channel indicator is set to 1, then the data link attribute 2500 may indicate a channel in the NDL logical channel field. The flexible field (e.g., having a bit indicator) may indicate whether the wireless device transmitting the data link attribute 2500 may negotiate an alternate schedule (or is willing to negotiate an alternate schedule). For example, if the flexible field is set to 1, then the wireless device is willing to negotiate with another wireless device with respect to a data link schedule between the wireless devices. But if the flexible field is set to 0, then the wireless device is not willing to negotiate with respect to a data link schedule between the wireless devices. The confirm field may indicate whether the data link attribute 2500 is associated with a data link schedule request, a data link schedule counter request, an indication of a failed data link schedule negotiation, or a confirmation of a requested data link schedule. In an aspect, the confirm field may include a 2-bit indicator. When the confirm field is set to 00, the confirm field may indicate that the data link attribute 2500 is associated with a data link schedule request (e.g., the data link attribute 2500 is a request for a data link based on a schedule indicated in the data link attribute 2500). When the confirm field is set to 01, the confirm field may indicate that the data link attribute 2500 is a data link schedule counter request (e.g., the wireless device rejects a previously received schedule and counters with a different schedule; flexible field=1). When the confirm field is set to 10, the confirm field may indicate that the data link attribute 2500 is an indication of a failed data link schedule negotiation. A data link negotiation may fail for one or more reasons (e.g., a wireless device will not allow schedule negotiation or the wireless device does not have availability for data link scheduling). When the confirm field is set to 11, the confirm field may indicate a confirmation of a requested data link schedule. That is, a wireless device that transmits the data link attribute 2500 with the confirm field set to 11 indicates that the wireless device confirms that the wireless device will use the data link schedule received from another wireless device. The power save field may indicate whether a wireless device is operating in a power save mode. When the wireless device is operating in a power save mode, the wireless device may initially be awake in the paging window (e.g., the paging window 208) in a scheduled NDL-TB (e.g., the first NDL-TB 206) to detect paging signals. Upon detecting a paging signal, the wireless device may determine that another wireless device requests to communicate data with the wireless device in the scheduled NDL-TB. Thus, the wireless device may accordingly determine to stay awake in the data window (e.g., the first data window 210) of the scheduled NDL-TB (e.g., the first NDL-TB 206). When the wireless device detects no paging signals in the paging window, the wireless device may determine to sleep in the data window of the scheduled NDL-TB. When the wireless device is not operating in a power save mode, the wireless device may stay awake throughout a scheduled NDL-TB.

The NDL logical channel indicator field indicates the logical channel index for the data link (e.g., NAN data link). For example, a wireless device may have a table of predetermined data link schedules. The logical channel index may be used to identify a predetermined data link schedule (or a set of predetermined data link schedules) to be used for the data link. In an aspect, the NDL logical channel indicator field may include multiple logical channel indices. In another aspect, the NDL logical channel indicator may be 2 octets in length and have a variable value.

The map control field may indicate the availability channel and time map control information. For example, the map control field may indicate one or more physical channels that the wireless device is available based on the availability intervals bitmap. In an aspect, the map control field may be 1 octet in length and may be variable in size. The availability intervals bitmap may divide the time between the beginnings of consecutive discovery windows into consecutive time intervals of equal durations. A wireless device may set the i-th bit of the availability intervals bitmap to indicate whether the wireless device will be or may be present during the i-th time interval in the operation channel for data link.

In another aspect, the data link attribute 2500 may include a link conditions field. The link conditions field may be 1 octet in size. The link conditions field may include a set of one or more requirements to be satisfied in order for a device to join an NDL or communicate with a peer. Wireless devices may use the link conditions field, for example, to set minimum requirements for the NDL. Examples of conditions that may be indicated in the link conditions field may include a minimum communication bandwidth, a minimum data rate, a minimum quality of service, standard compatibility information (e.g., which IEEE standards, such as 802.11n, 802.11ac, or future standards a device is compatible with), a number of supported spatial streams, channel capabilities (e.g., whether a device supports 5 GHz or higher frequency channels), security capabilities, and/or additional physical layer capabilities.

In another aspect, the data link attribute 2500 may include a data link identifier (e.g., an NDL ID) that identifies the data link to be negotiated and/or established between the wireless devices. The data link identifier may enable wireless devices to refer to the data link if changes to the data link are required (e.g., scheduling that requires changes to the data link schedule or the data link is to be deleted).

Although the aforementioned examples discuss the data link attribute 2500 with respect to a NAN, the data link attribute 2500 may also be utilized in other types of networks.

Figure 26A:
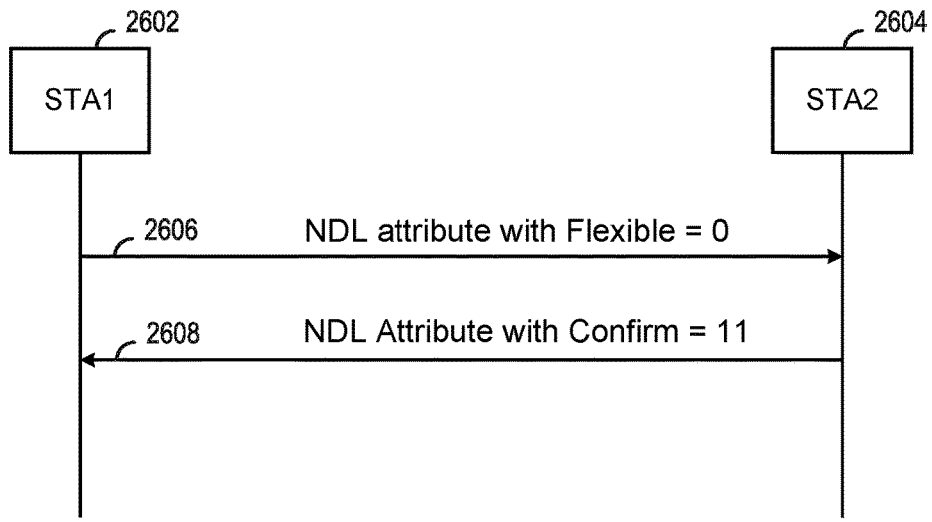
FIG. 26A is a call flow diagram illustrating a first exemplary data link setup using a data link attribute.

FIG. 26A is a call flow diagram 2600 illustrating a first exemplary data link setup using a data link attribute. Referring to FIG. 26A, a first STA 2602 and a second STA 2604 may be in a NAN (or another wireless network). In an aspect, the second STA 2604 may be publishing a service and the first STA 2602 may want to subscribe to the service (e.g., a video streaming service). The first STA 2602 may attempt to establish a data link with the second STA 2604. In an aspect, the first STA 2602 may determine a first data link attribute for scheduling the data link with the second STA 2604. The first data link attribute may include a first NDL control field, a first NDL logical channel indicator field, a first map control field, and/or a first availability intervals bit map. The first STA 2602 may determine the first data link attribute by determining one or more schedules during which the first STA 2602 is available for the data link. In one aspect, the schedule may be indicated in the first availability intervals bitmap (e.g., the availability intervals bitmap in FIG. 25) of the data link attribute. In another aspect, if the first STA 2602 determines to use one or more logical channels (e.g., standard specified schedules) for the data link, then the schedule may be associated with one or more logical channel indices. The first STA 2602 may include the one or more logical channel indices in the first NDL logical channel indicator field, and the one or more logical channel indices may refer to the one or more logical channels.

Referring to FIG. 26A, the first STA 2602 may determine to use one or more logical channels as the schedule. The first STA 2602 may determine that the first STA 2602 is not willing to negotiate the schedule for the data link and indicate that the first STA 2602 is not willing to negotiate the schedule for the data link in the flexible field of the data link attribute (e.g., flexible=0). The first STA 2602 may set the first confirm field to 00 to indicate that the first data link attribute is a data link schedule request. The first STA 2602 may also determine other aspects of the first data link attribute.

After determining the first data link attribute to be used for scheduling a data link with the second STA 2604, the first STA 2602 may transmit the first data link attribute in a first STA 2602 to the second STA 2604. In an aspect, the first data link attribute may include a schedule at which the first STA 2602 is available for the data link. The schedule may be indicated as a logical channel index of the NDL logical channel indicator field. The first STA 2602 may set the first flexible field to 0, indicating that the first STA 2602 will not negotiate the schedule for the data link. In response, if the second STA 2604 is available at the schedule indicated by the logical channel index, then the second STA 2604 may transmit a second frame 2608 to the first STA 2602. The second frame 2608 may include a second data link attribute with a second NDL control field. The second confirm field of the second NDL control field may indicate a confirmation of a requested data link schedule. That is, the second STA 2604 may confirm that the second STA 2604 may establish a data link with the first STA 2602 based on the logical channel index indicated in the first frame 2606. Accordingly, the first STA 2602 and the second STA 2604 may establish a connection based on the logical channel index. In some instances, as discussed earlier, instead of using a non-negotiated schedule, it may be beneficial to enable wireless devices to negotiate for a mutually acceptable schedule.

Figure 26B:
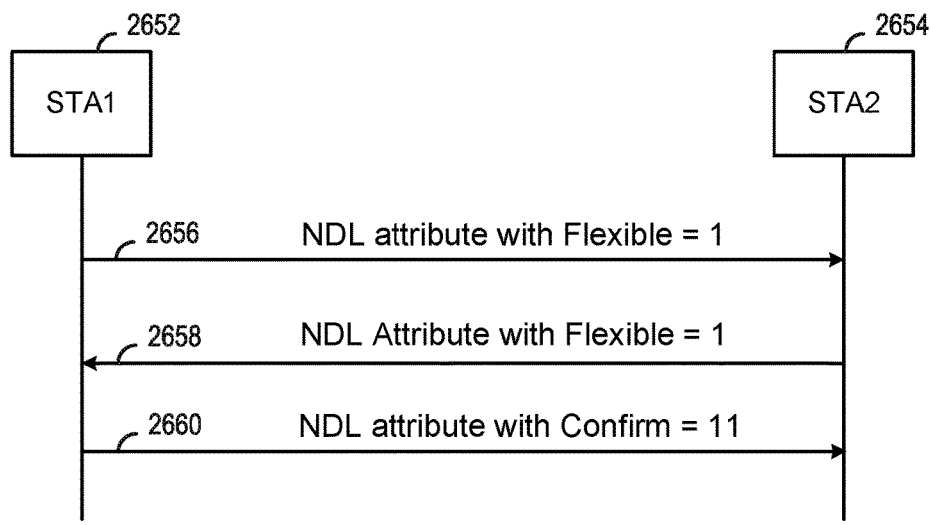
FIG. 26B is a call flow diagram illustrating a second exemplary data link setup using a data link attribute.

FIG. 26B is a call flow diagram 2650 illustrating a second exemplary data link setup using a data link attribute. Referring to FIG. 26B, a first STA 2652 and a second STA 2654 may be in a NAN (or another wireless network). In an aspect, the second STA 2654 may be publishing a service and the first STA 2652 may want to subscribe to the service (e.g., a photo sharing service). The first STA 2652 may attempt to establish a data link with the second STA 2654. In an aspect, the first STA 2652 may determine a first data link attribute for scheduling the data link with the second STA 2654. The first data link attribute may include a first NDL control field, a first NDL logical channel indicator field, a first map control field, and/or a first availability intervals bitmap. The first STA 2652 may determine the first data link attribute by determining one or more schedules during which the first STA 2652 is available for the data link. In one aspect, the schedule may be indicated in the first availability intervals bitmap (e.g., the availability intervals bitmap in FIG. 25) of the first data link attribute. In another aspect, if the first STA 2652 determines to use one or more logical channels (e.g., standard specified schedules) for the data link, then the schedule may be associated with one or more logical channel indices. The first STA 2652 may include the one or more logical channel indices in the first NDL logical channel indicator field, and the one or more logical channel indices may refer to the one or more logical channels.

Referring to FIG. 26B, the first STA 2652 may not use the logical channels. Instead, the first STA 2652 may determine a set of available times and indicate availability in the first availability intervals bitmap. The first STA 2652 may determine that the first STA 2652 is willing to negotiate the schedule for the data link. The first STA 2652 may indicate the first STA 2652 is willing to negotiate the schedule by setting the first flexible field to 1. The first STA 2652 may set the first availability map indicator to 1 to indicate that the first data link attribute includes a first map control field and a first availability intervals bitmap. In an aspect, the first STA 2652 may set the first logical channel indicator to 0 to indicate that a first NDL logical channel indicator field is not present or is empty. The first STA 2652 may set the first confirm field to 00 to indicate that the first data link attribute is a data link schedule request. The first STA 2652 may set the first flexible field to 1 to indicate that the first STA 2652 is willing to (or is configured to) negotiate a data link schedule with the second STA 2654. The first STA 2602 may also determine other aspects of the first data link attribute.

After determining the first data link attribute to be used for scheduling a data link with the second STA 2654, the first STA 2652 may transmit the first data link attribute in a first frame 2656 to the second STA 2604. In an aspect, the first data link attribute may include a schedule at which the first STA 2602 is available for the data link. In this aspect, the schedule may be indicated by a first availability intervals bitmap. The first STA 2652 may set the first flexible field to 1, indicating that the first STA 2652 is willing to negotiate the schedule for the data link. The second STA 2654 may determine if the second STA 2654 is available at the schedule indicated by the first availability intervals bitmap received from the first STA 2652. In an aspect, the second STA 2654 may determine that the second STA 2654 is not available at the schedule provided by the first STA 2652. Based on the determination of whether the second STA 2654 is available at the schedule indicated by the first STA 2652, the second STA 2654 may transmit a second frame 2658 to the first STA 2602. The second frame 2608 may include a second data link attribute. The second data link attribute may include a second NDL control field. The second NDL control field may have a second availability map indicator set to 1 to indicate that the second data link attribute includes a second map control field and a second availability intervals bitmap. The second availability intervals bitmap may indicate a schedule during which the second STA 2654 is available. In an aspect, the second availability intervals bitmap may be based on the first availability intervals bitmap (e.g., include one or more times indicated in the first availability intervals bitmap). A second logical channel indicator included in the second NDL control field may be set to 0 to indicate that the second NDL logical channel indicator field is empty or does not exist. A second confirm field may be set to 01 to indicate the second data link attribute is a data link schedule counter request based on the second availability intervals bitmap. That is, the second STA 2654 may indicate that the schedule proposed by the first STA 2652 is rejected and an alternative schedule is proposed in the second data link attribute. A second flexible field may be set to 1 to indicate that the second STA 2654 is willing to negotiate with the first STA 2652. The first STA 2652 may receive the second frame 2658 and determine whether the first STA 2652 is available at the schedule indicated in the second availability intervals bitmap. The first STA 2652 may determine that the first STA 2652 is available at the schedule indicated by the second STA 2654. The first STA 2652 may transmit a third frame 2660 to the second STA 2654. The third frame 2660 may include a third data link attribute. The third data link attribute may include a third NDL control field. In an aspect, the third NDL control field may include a third availability map indicator and a third logical channel indicator, both of which may be set to 0 to indicate that the third frame 2660 does not include an availability intervals bitmap and does not include a logical channel index. The third NDL control field may include a third confirm field set to 11, indicating a confirmation of the requested data link schedule indicated in the second frame 2658. Based on a mutually agreed upon schedule, the first and second STAs 2652, 2654 may establish a data link with each other.

As shown in FIGS. 26A and 26B, data link attributes allow for multiple possibilities for dictating or negotiating a schedule for a data link (e.g., NDL) using different combinations of the NDL control field. Although only several combinations of the NDL control field have been described, additional combinations are available based on the aforementioned discussion. The data link attribute may also allow for use of a specification created schedule (e.g., logical channels) indicated by a further availability map. By enabling negotiated schedules and non-negotiated schedules (e.g., dictated schedules), different services can be accommodated. In other instances, a wireless device may behave differently based on the wireless device's mode of operation.

FIG. 27 illustrates a table 2700 that presents potential behavior of wireless devices based upon a mode of operation. Referring to FIG. 27, a first STA may be characterized as a subscriber; for example, a subscriber (e.g., the first STA 2602) to a service provided by a publisher. A second STA may be characterized as a publisher; for example, a publisher of a service (e.g., the second STA 2604). STAs may be in one of three modes of operation—one-to-one, one-to-many, logical channel. When a publisher is in a one-to-one mode of operation with respect to a service, then the publisher is providing the service to just one subscriber. A publisher in a one-to-one mode of operation may be more flexible with respect to accommodating a schedule from a subscriber. When a publisher is in a one-to-many mode of operation with respect to a service, then the publisher is providing the service to many subscribers. A publisher in a one-to-many mode of operation may be less flexible with respect to accommodating a schedule from a subscriber. When a publisher is in a logical channel mode of operation, then the publisher may be available during one or more predetermined schedules (e.g., predetermined according to a standard specification). In an aspect, the predetermined schedules may be the default NDL schedule discussed in FIG. 11 or the predetermined NDL schedule discussed in FIG. 12. A publisher in a logical channel mode of operation may be least flexible with respect to accommodating a schedule from the subscriber. Similarly, when a subscriber is in a one-to-one mode of operation, the subscriber may be flexible with or may be able to accommodate different schedules that may or may not be associated with a logical channel. A subscriber may not be in a one-to-many mode of operation with respect to a service because the subscriber does not publish the service. When a subscriber is in a logical channel mode of operation, then the subscriber may only be able to accommodate schedules associated with one or more logical channels (e.g., predetermined schedules).

Referring to FIG. 27, in one aspect, when the first STA (the subscriber) is in a one-to-one mode of operation and the second STA (the publisher) is in a one-to-one mode of operation, the first and second STAs may negotiate and exchange availability information to arrive at a mutually agreed upon schedule (e.g., as shown in FIG. 26B). In another aspect, when the first STA is in a one-to-one mode of operation, and the second STA is in a one-to-many mode of operation, then the first STA may be more flexible in terms of scheduling than the second STA. As such, in this scenario, the first STA may provide availability information to the second STA, the second STA may determine a schedule based on the availability information provided by the first STA, and send the schedule to the first STA. The first STA may comply with the schedule chosen by the second STA. In another aspect, when the first STA is in a one-to-one mode and the second STA is in a logical channel mode, the second STA may provide the first STA with one or more logical channel indices indicating one or more logical channels on which the service is provided. The first STA may establish a connection using the one or more logical channels as indicated if the first STA is available during the times associated with the one or more logical channels. In this aspect, the first STA need not provide any availability information to the second STA. In another aspect, the first STA may be in a logical channel mode and the second STA may be in a one-to-one mode. In this aspect, the second STA is more flexible than the first STA in terms of scheduling for a data link. As such, the first STA may provide the second STA with one or more logical channel indices associated with one or more logical channels on which the first STA is available. The second STA may choose among the one or more logical channels to provide the service to the first STA based on the availability of the second STA. Similarly, in another aspect, the first STA may be in a logical channel mode and the second STA may be in a one-to-many mode. In this aspect, the second STA is more flexible than the first STA in terms of scheduling for a data link. As such, the first STA may provide the second STA with one or more logical channel indices associated with one or more logical channels on which the first STA is available. The second STA may choose among the one or more logical channels to provide the service to the first STA based on the availability of the second STA. In yet another aspect, both the first and second STAs may be in a logical channel mode. In this aspect, the second STA may provide the first STA with one or more logical channel indices associated with one or more logical channels on which the service is published. The first STA may subscribe to the service based on the one or more logical channels.

In an aspect, the first STA and the second STA may exchange signaling similar to the signaling discussed in FIGS. 25 and 26 with respect to the data link attribute. In an aspect, the data link attribute may also indicate a mode of operation of the wireless device. As such, the first STA may determine a mode of operation being used by the first STA. The first STA may determine a mode of operation being used by the second STA based on a data link attribute received from the second STA. Based on both modes of operations, the first STA may determine a schedule for the data link. The second STA may perform similar operations for determining a schedule for the data link.

As such, in FIG. 27, wireless devices may determine a mode of operation for negotiating a schedule. The mode of operation may indicate a willingness or an availability of the wireless device to accommodate different schedules/availabilities of other wireless devices. In an aspect, mapping a service to a service data link characteristic may be left out of scope. Implementation may optimize the choice of mode or service may indicate the mode required.

Figure 28:
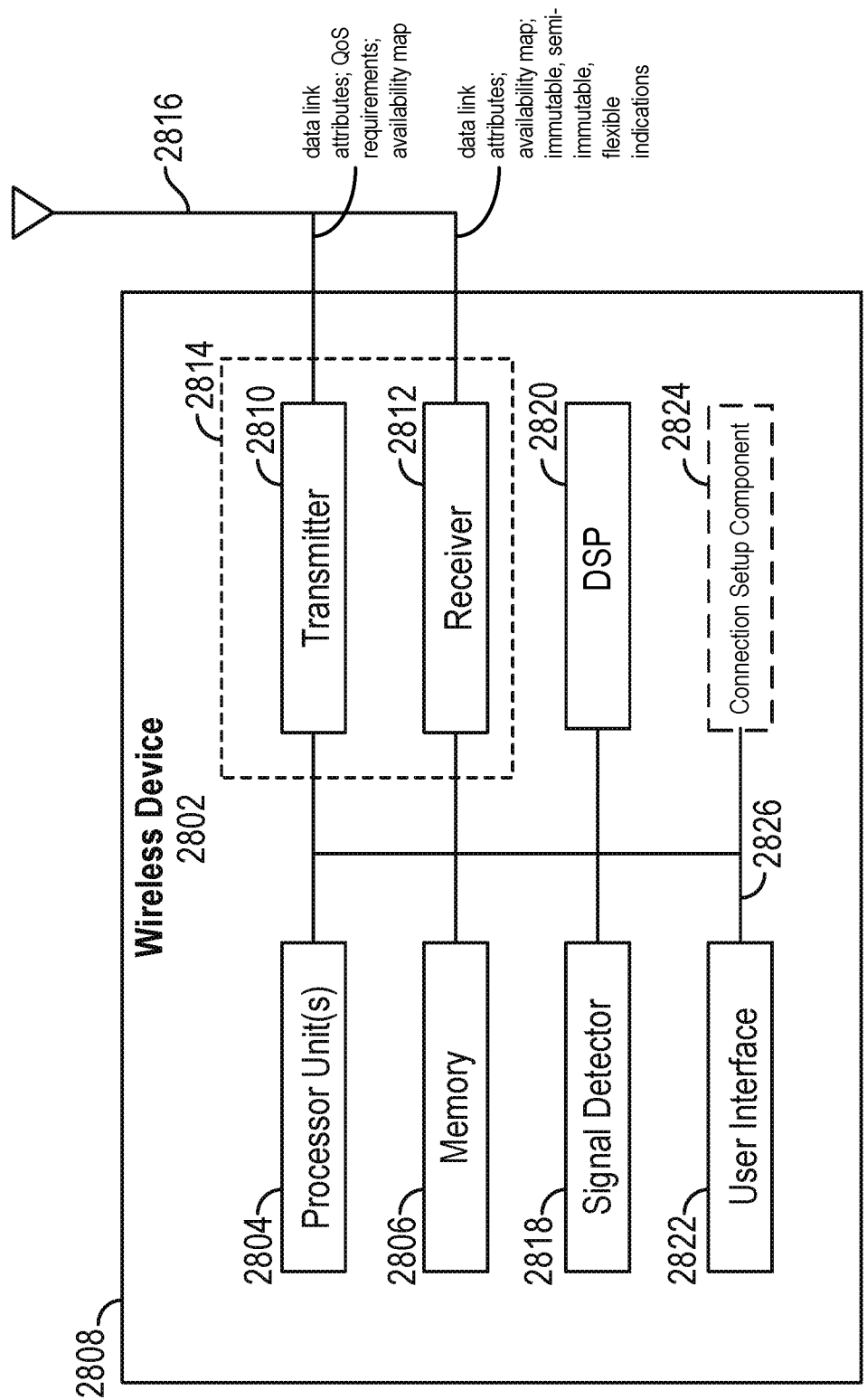
FIG. 28 shows an example functional block diagram of a wireless device that may perform connection setup utilizing a data link attribute within the wireless communication system of FIG. 1.

FIG. 28 shows an example functional block diagram of a wireless device 2802 that may perform connection setup utilizing a data link attribute within the wireless communication system 100 of FIG. 1. The wireless device 2802 is an example of a device that may be configured to implement the various methods described herein. For example, the wireless device 2802 may comprise one of the STAs 114, 2602, 2604, 2652, 2654.

The wireless device 2802 may include a processor 2804, which controls operation of the wireless device 2802. The processor 2804 may also be referred to as a CPU. Memory 2806, which may include both ROM and RAM, may provide instructions and data to the processor 2804. A portion of the memory 2806 may also include NVRAM. The processor 2804 typically performs logical and arithmetic operations based on program instructions stored within the memory 2806. The instructions in the memory 2806 may be executable (by the processor 2804, for example) to implement the methods described herein.

The processor 2804 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 2802 may also include a housing 2808, and the wireless device 2802 may include a transmitter 2810 and/or a receiver 2812 to allow transmission and reception of data between the wireless device 2802 and a remote device. The transmitter 2810 and the receiver 2812 may be combined into a transceiver 2814. An antenna 2816 may be attached to the housing 2808 and electrically coupled to the transceiver 2814. The wireless device 2802 may also include multiple transmitters, multiple receivers, multiple transceivers, and/or multiple antennas.

The wireless device 2802 may also include a signal detector 2818 that may be used to detect and quantify the level of signals received by the transceiver 2814 or the receiver 2812. The signal detector 2818 may detect such signals as total energy, energy per subcarrier per symbol, power spectral density, and other signals. The wireless device 2802 may also include a DSP 2820 for use in processing signals. The DSP 2820 may be configured to generate a packet for transmission. In some aspects, the packet may comprise a PPDU.

The wireless device 2802 may further comprise a user interface 2822 in some aspects. The user interface 2822 may comprise a keypad, a microphone, a speaker, and/or a display. The user interface 2822 may include any element or component that conveys information to a user of the wireless device 2802 and/or receives input from the user.

When the wireless device 2802 is implemented as a STA (e.g., the STA 114), the wireless device 2802 may also comprise a connection setup component 2824 (which may be the same as the connection setup component 2324). The connection setup component 2824 may be configured to determine a data link attribute for scheduling a data link with a second wireless device and to transmit the determined data link attribute in a frame to the second wireless device. In an aspect, the data link attribute may include a control field, and the control field may include at least one of an availability map indicator, a logical channel indicator, a confirm field, or a flexible field. In another aspect, the availability map indicator may indicate whether a map control field and an availability map are present in the data link attribute. The availability map may indicate an availability of the wireless device 2802 for the data link. In an aspect, the logical channel indicator may indicate whether a logical channel indicator field is present in the data link attribute, and the logical channel indicator field may identify a logical channel index for the data link. In another aspect, the confirm field may indicate whether the data link attribute is associated with a data link schedule request, a data link schedule counter request, an indication of a failed data link schedule negotiation, or a confirmation of a requested data link schedule. In another aspect, the flexible field may indicate whether the wireless device 2802 is willing negotiate a data link schedule. In another aspect, the flexible field may indicate that the wireless device 2802 will not negotiate the data link schedule indicated in the frame. In this aspect, the connection setup component 2824 may be configured to receive a second frame from the second wireless device. The second frame may include a second data link attribute, and the second data link attribute may include a second confirm field indicating the confirmation of the requested data link schedule indicated in the frame. In another aspect, the flexible field may indicate that the wireless device 2802 is willing negotiate the data link schedule. In this aspect, the connection setup component 2824 may be configured to receive a second frame from the second wireless device. The second frame may include a second data link attribute, and the second data link attribute may include a second flexible field indicating that the second wireless device is willing negotiate the data link schedule. The second data link attribute may further include an availability map that indicates a requested data link schedule based on an availability of the second wireless device for the data link. In this aspect, the connection setup component 2824 may further be configured to transmit a third frame to the second wireless device. The third frame may include a third data link attribute, and the third data link attribute may include a third confirm field indicating the confirmation of the requested data link schedule indicated in the second data link attribute. In another aspect, the data link attribute may further include a link conditions field that indicates a set of one or more requirements to be satisfied by the second wireless device in order for the data link to be established with the second wireless device. In another aspect, the set of one or more requirements may include a minimum communication bandwidth for the second wireless device, a minimum data rate for the second wireless device, a minimum quality of service for the data link, wireless standard compatibility information, minimum number of supported spatial streams, one or more channel capabilities, or one or more physical layer capabilities. In another aspect, the data link attribute may include a validity time field that indicates a number of discovery window intervals for which the data link attribute is valid. In another aspect, the validity time field may indicate when wireless devices associated with a NDL are allowed to switch to a different NDL. In another aspect, a value in the number of discovery window intervals may be extendable by wireless devices communicating on the NDL associated with the validity time field. In another configuration, the connection setup component 2824 may be configured to determine a schedule for communicating data of a service with a second wireless device on an NDL. The schedule may specify at least one time block in which the wireless device 2802 and the second wireless device are required to be available. The connection setup component 2824 may be configured to transmit the schedule to the second wireless device. In another aspect, the schedule may further specify at least one channel to be used by the wireless device 2802 and the second wireless device to communicate the data in the specified at least one time block. In another aspect, the schedule may include an immutable portion, and the wireless device 2802 and the second wireless device may be required to be available in the at least one time block specified in the immutable portion. In another aspect, the immutable portion may include a base schedule. In another configuration, the connection setup component 2824 may be configured to receive an indication from the second wireless device, and the indication may indicate whether the immutable portion is accepted by the second wireless device. In an aspect, the schedule may include a semi-immutable portion, a subset of the at least one time block specified in the semi-immutable portion is to be selected by the second wireless device in accordance with a predetermined rule. In another aspect, the schedule may include a flexible portion, and one or more time blocks of the at least one time block specified in the flexible portion are to be selected by the second wireless device. In another configuration, the connection setup component 2824 may be configured to transmit, to the second wireless device, QoS requirements for receiving the data of the service. The one or more time blocks are further to be selected by the second wireless device to meet the QoS requirements. In another aspect, the flexible portion may further specify one or more channels that are to be used by the second wireless device in each of the at least one time block specified in the flexible portion. In another aspect, the flexible portion may require the second wireless device to use all of the one or more channels specified for a time block of the flexible portion and that is selected by the second wireless device. In another aspect, the flexible portion may allow the second wireless device to select from the one or more channels specified for a time block of the flexible portion and that is selected by the second wireless device. In another configuration, the connection setup component 2824 may be configured to determine a schedule for communicating on the data link based on a first mode of the wireless device 2802 and a second mode of the second wireless device. In an aspect, the first mode and the second mode are a one-to-one mode, and the schedule is determined based on a negotiation between the wireless device 2802 and the second wireless device. In another aspect, the first mode is in a one-to-one mode and the second mode is in a one-to-many mode, and the schedule is determined based on a publisher schedule received from the second wireless device. In this aspect, the publisher schedule may be based on an availability of the wireless device 2802. In another aspect, the first mode is a one-to-one mode and the second mode is a logical channel mode, and the schedule may be determined based on a predetermined schedule received from the second wireless device. In another aspect, the first mode is a logical channel mode and the second mode is a one-to-one mode, and the schedule is determined based on a publisher schedule received from the second wireless device. The publisher schedule may be based on a predetermined schedule selected by the wireless device 2802. In another aspect, the first mode is a logical channel mode and the second mode is a one-to-many mode, and the schedule is determined based on a publisher schedule received from the second wireless device. The publisher schedule may be based on a predetermined schedule selected by the wireless device 2802. In another aspect, the first mode and the second mode are a logical channel mode, and the schedule is determined based on a predetermined schedule received from the second wireless device.

The various components of the wireless device 2802 may be coupled together by a bus system 2826. The bus system 2826 may include a data bus, for example, as well as a power bus, a control signal bus, and a status signal bus in addition to the data bus. Components of the wireless device 2802 may be coupled together or accept or provide inputs to each other using some other mechanism.

Although a number of separate components are illustrated in FIG. 28, one or more of the components may be combined or commonly implemented. For example, the processor 2804 may be used to implement not only the functionality described above with respect to the processor 2804, but also to implement the functionality described above with respect to the signal detector 2818, the DSP 2820, the user interface 2822, and/or the connection setup component 2824. Further, each of the components illustrated in FIG. 28 may be implemented using a plurality of separate elements.

Figure 29:
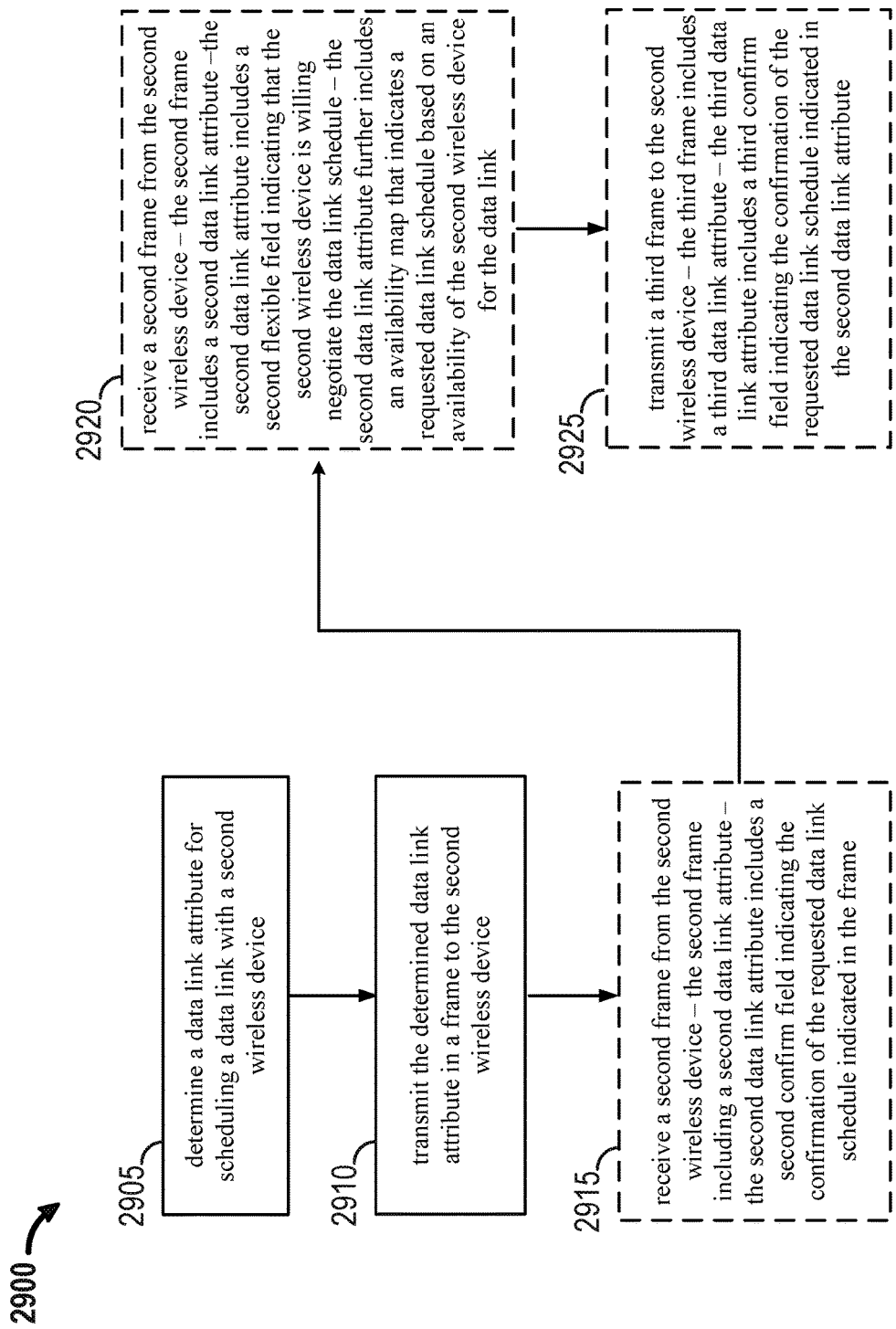
FIG. 29 is a flowchart of an exemplary method of using a data link attribute for connection scheduling.

FIG. 29 is a flowchart of an exemplary method 2900 of using a data link attribute for connection scheduling. The method 2900 may be performed using an apparatus (e.g., the STA 114, the first STA 2602, or the wireless device 2802, supra, for example). Although the method 2900 is described below with respect to the elements of wireless device 2802 of FIG. 28, supra, other components may be used to implement one or more of the steps described herein.

At block 2905, the apparatus may determine a data link attribute for scheduling a data link with a second wireless device. In one aspect, the data link attribute may include a control field, and the control field may include at least one of an availability map indicator, a logical channel indicator, a confirm field, or a flexible field. In this aspect, the availability map indicator may indicate whether a map control field and an availability map is present in the data link attribute, and the availability map may indicate an availability of the first wireless device for the data link. In this aspect, the logical channel indicator may indicate whether a logical channel indicator field is present in the data link attribute, and the logical channel indicator field may identify a logical channel index for the data link. In this aspect, the confirm field may indicate whether the data link attribute is associated with a data link schedule request, a data link schedule counter request, an indication of a failed data link schedule negotiation, or a confirmation of a requested data link schedule. In this aspect, the flexible field may indicate whether the first wireless device is willing negotiate a data link schedule. In one example, referring to FIG. 26A, the apparatus may be the first STA 2602 and the second wireless device may be the second STA 2604. The first STA 2602 may determine the first data link attribute for scheduling a data link with the second STA 2604. The first data link attribute may include a first control field and the first control field may include a first availability map indicator, a first logical channel indicator, a first confirm field, and a first flexible field. The first availability map indicator may be set to 0 to indicate that an availability intervals bitmap is not present in the first data link attribute and to indicate that the first map control field is not present in the first data link attribute. The first logical channel indicator may be set to 1 to indicate that the first logical channel indicator field is present and has a value corresponding to one or more logical channel indices for the data link. The first confirm field may be set to 00 to indicate that the first data link attribute is associated with a data link schedule request. The first flexible field may be set to 0 to indicate that the first STA 2602 is not willing to negotiate a data link schedule. In another example, referring to FIG. 26B, the apparatus may be the first STA 2652 and the second wireless device may be the second STA 2654. The first STA 2652 may determine the first data link attribute for scheduling a data link with the second STA 2654. The first data link attribute may include a first control field and the first control field may include a first availability map indicator, a first logical channel indicator, a first confirm field, and a first flexible field. The first availability map indicator may be set to 1 to indicate that an availability intervals bitmap is present in the first data link attribute and to indicate that the first map control field is present in the first data link attribute. The first logical channel indicator may be set to 0 to indicate that the first logical channel indicator field is not present in the data link attribute. The first confirm field may be set to 00 to indicate that the first data link attribute is associated with a data link schedule request. The first flexible field may be set to 1 to indicate that the first STA 2652 is willing to negotiate a data link schedule.

At block 2910, the apparatus may transmit the determined data link attribute in a frame to the second wireless device. In one example, referring to FIG. 26A, the first STA 2602 may transmit the determined data link attribute in the first frame 2606 to the second STA 2604. In another example, referring to FIG. 26B, the first STA 2652 may transmit the determined data link attribute in the first frame 2656 to the second STA 2654.

In one configuration, when a data link schedule is not negotiated, at block 2915, the apparatus may receive a second frame from the second wireless device. The second frame may include a second data link attribute. The second data link attribute may include a second data confirm field indicating the confirmation of the requested data link schedule indicated in the frame. For example, referring to FIG. 26A, the first STA 2602 may receive the second frame 2608 from the second STA 2604. The second frame 2608 may include a second data link attribute. The second data link attribute may include a second confirm field indicating the confirmation of the requested data link schedule indicated in the first frame 2606.

In another configuration, when a data link schedule is negotiated, at block 2920, the apparatus may receive a second frame from the second wireless device. The second frame may include a second data link attribute. The second data link attribute may include a second flexible field indicating that the second wireless device is willing negotiate the data link schedule. The second data link attribute may further include an availability map that indicates a requested data link schedule based on an availability of the second wireless device for the data link. For example, referring to FIG. 26B, the first STA 2652 may receive the second frame 2658 from the second STA 2654. The second frame 2658 may include a second flexible field indicating that the second STA 2654 is willing to negotiate the data link schedule. The second data link attribute may include an availability map that indicates a requested data link schedule based on an availability of the second STA 2654 for the data link.

In this configuration, at block 2925, the apparatus may transmit a third frame to the second wireless device. The third frame may include a third data link attribute. The third data link attribute may include a third confirm field indicating the confirmation of the requested data link schedule indicated in the second data link attribute. For example, referring to FIG. 26B, the first STA 2652 may transmit the third frame 2660 to the second STA 2654. The third frame 2660 may include a third data link attribute. The third data link attribute may include a third confirm field indicating the confirmation of the requested data link schedule (e.g., an availability intervals bitmap) indicated in the second data link attribute contained in the second frame 2658.

Figure 30:
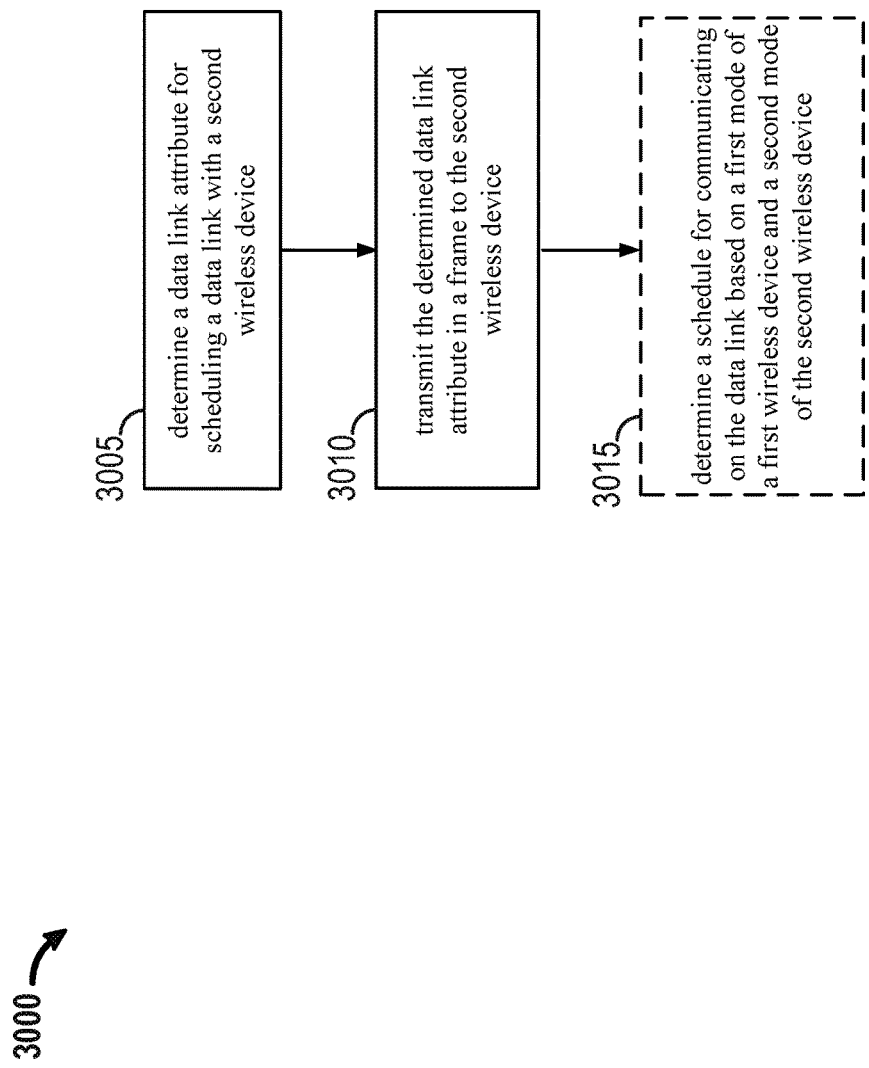
FIG. 30 is a flowchart of an exemplary method of determining a data link schedule based on a mode of operation.

FIG. 30 is a flowchart of an exemplary method 3000 of determining a data link schedule based on a mode of operation. The method 3000 may be performed using an apparatus (e.g., the STA 114, the first STA 2602, the first STA 2652, or the wireless device 2802, supra, for example). Although the method 3000 is described below with respect to the elements of wireless device 2802 of FIG. 28, supra, other components may be used to implement one or more of the steps described herein.

At block 3005, the apparatus may determine a data link attribute for scheduling a data link with a second wireless device. For example, referring to FIG. 27, the first STA (e.g., the subscriber) may determine a data link attribute for scheduling a data link with the second STA (e.g., the publisher). The first STA may determine the data link attribute by determining whether to use one or more fields in the data link attribute. The first STA may determine values for the length field, the MAC address field, the group ID field, the validity time field, and/or the NDL control field, for example.

At block 3010, the apparatus may transmit the determined data link attribute in a frame to the second wireless device. For example, referring to FIG. 27, the first STA may transmit determined data link attribute in a frame to the second STA.

At block 3015, the apparatus may determine a schedule for communicating on the data link based on a first mode of the apparatus and a second mode of the second wireless device. For example, referring to FIG. 27, the first STA may determine a schedule for communicating on the data link based on the first mode of the first STA and the second mode of the second STA.

Figure 31:
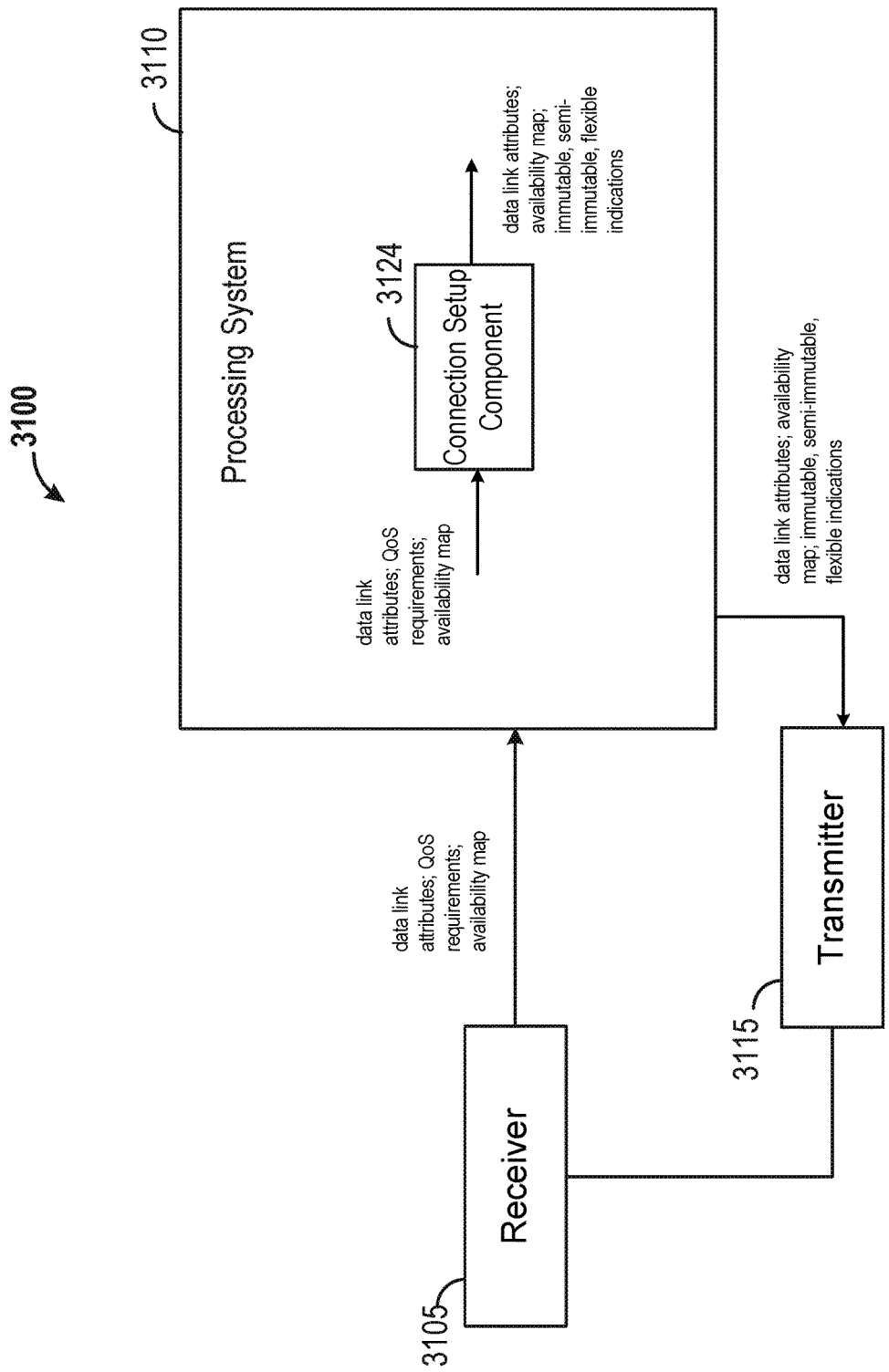
FIG. 31 is a functional block diagram of an example wireless communication device that performs connection setup.

FIG. 31 is a functional block diagram of an example wireless communication device 3100 that performs connection setup. The wireless communication device 3100 may include a receiver 3105, a processing system 3110, and a transmitter 3115. The processing system 3110 may include a connection setup component 3124. The connection setup component 3124 may be the same as the connection setup component 2324 (and/or other connection setup components mentioned herein). The processing system 3110 and/or the connection setup component 3124 may be configured to determine a data link attribute for scheduling a data link with a second wireless device. The connection setup component 3124, the processing system 3110, and/or the transmitter 3115 may be configured to transmit the determined data link attribute in a frame to the second wireless device. In an aspect, the data link attribute may include a control field, and the control field may include at least one of an availability map indicator, a logical channel indicator, a confirm field, or a flexible field. In another aspect, the availability map indicator may indicate whether a map control field and an availability map is present in the data link attribute. The availability map may indicate an availability of the wireless communication device 3100 for the data link. In an aspect, the logical channel indicator may indicate whether a logical channel indicator field is present in the data link attribute, and the logical channel indicator field may identify a logical channel index for the data link. In another aspect, the confirm field may indicate whether the data link attribute is associated with a data link schedule request, a data link schedule counter request, an indication of a failed data link schedule negotiation, or a confirmation of a requested data link schedule. In another aspect, the flexible field may indicate whether the wireless communication device 3100 is willing negotiate a data link schedule. In another aspect, the flexible field may indicate that the wireless communication device 3100 will not negotiate the data link schedule indicated in the frame. In this aspect, the connection setup component 3124, the processing system 3110, and/or the receiver 3105 may be configured to receive a second frame from the second wireless device. The second frame may include a second data link attribute, and the second data link attribute may include a second confirm field indicating the confirmation of the requested data link schedule indicated in the frame. In another aspect, the flexible field may indicate that the wireless communication device 3100 is willing negotiate the data link schedule. In this aspect, the connection setup component 2824 may be configured to receive a second frame from the second wireless device. The second frame may include a second data link attribute, and the second data link attribute may include a second flexible field indicating that the second wireless device is willing negotiate the data link schedule. The second data link attribute may further include an availability map that indicates a requested data link schedule based on an availability of the second wireless device for the data link. In this aspect, the connection setup component 3124, the processing system 3110, and/or the transmitter 3115 may further be configured to transmit a third frame to the second wireless device. The third frame may include a third data link attribute, and the third data link attribute may include a third confirm field indicating the confirmation of the requested data link schedule indicated in the second data link attribute. In another aspect, the data link attribute may further include a link conditions field that indicates a set of one or more requirements to be satisfied by the second wireless device in order for the data link to be established with the second wireless device. In another aspect, the set of one or more requirements may include a minimum communication bandwidth for the second wireless device, a minimum data rate for the second wireless device, a minimum quality of service for the data link, wireless standard compatibility information, minimum number of supported spatial streams, one or more channel capabilities, or one or more physical layer capabilities. In another aspect, the data link attribute may include a validity time field that indicates a number of discovery window intervals for which the data link attribute is valid. In another aspect, the validity time field may indicate when wireless devices associated with a NDL is allowed to switch to a different NDL. In another aspect, a value in the number of discovery window intervals may be extendable by wireless devices communicating on the NDL associated with the validity time field. In another configuration, the connection setup component 3124 and/or the processing system 3110 may be configured to determine a schedule for communicating data of a service with a second wireless device on an NDL. The schedule may specify at least one time block in which the wireless communication device 3100 and the second wireless device are required to be available. The connection setup component 3124, the processing system 3110, and/or the transmitter 3115 may be configured to transmit the schedule to the second wireless device. In another aspect, the schedule may further specify at least one channel to be used by the wireless communication device 3100 and the second wireless device to communicate the data in the specified at least one time block. In another aspect, the schedule may include an immutable portion, and the wireless communication device 3100 and the second wireless device may be required to be available in the at least one time block specified in the immutable portion. In another aspect, the immutable portion may include a base schedule. In another configuration, the connection setup component 3124, the processing system 3110, and/or the receiver 3105 may be configured to receive an indication from the second wireless device, and the indication may indicate whether the immutable portion is accepted by the second wireless device. In an aspect, the schedule may include a semi-immutable portion, a subset of the at least one time block specified in the semi-immutable portion is to be selected by the second wireless device in accordance with a predetermined rule. In another aspect, the schedule may include a flexible portion, and one or more time blocks of the at least one time block specified in the flexible portion are to be selected by the second wireless device. In another configuration, the connection setup component 3124, the processing system 3110, and/or the transmitter 3115 may be configured to transmit, to the second wireless device, QoS requirements for receiving the data of the service. The one or more time blocks are further to be selected by the second wireless device to meet the QoS requirements. In another aspect, the flexible portion may further specify one or more channels that are to be used by the second wireless device in each of the at least one time block specified in the flexible portion. In another aspect, the flexible portion may require the second wireless device to use all of the one or more channels specified for a time block of the flexible portion and that is selected by the second wireless device. In another aspect, the flexible portion may allow the second wireless device to select from the one or more channels specified for a time block of the flexible portion and that is selected by the second wireless device. In another configuration, the connection setup component 3124 and/or the processing system 3110 may be configured to determine a schedule for communicating on the data link based on a first mode of the wireless device 2802 and a second mode of the second wireless device. In an aspect, the first mode and the second mode are a one-to-one mode, and the schedule is determined based on a negotiation between the wireless communication device 3100 and the second wireless device. In another aspect, the first mode is in a one-to-one mode and the second mode is in a one-to-many mode, and the schedule is determined based on a publisher schedule received from the second wireless device. In this aspect, the publisher schedule may be based on an availability of the wireless communication device 3100. In another aspect, the first mode is a one-to-one mode and the second mode is a logical channel mode, and the schedule may be determined based on a predetermined schedule received from the second wireless device. In another aspect, the first mode is a logical channel mode and the second mode is a one-to-one mode, and the schedule is determined based on a publisher schedule received from the second wireless device. The publisher schedule may be based on a predetermined schedule selected by the wireless communication device 3100. In another aspect, the first mode is a logical channel mode and the second mode is a one-to-many mode, and the schedule is determined based on a publisher schedule received from the second wireless device. The publisher schedule may be based on a predetermined schedule selected by the wireless communication device 3100. In another aspect, the first mode and the second mode are a logical channel mode, and the schedule is determined based on a predetermined schedule received from the second wireless device.

The receiver 3105, the processing system 3110, the connection setup component 3124, and/or the transmitter 3115 may be configured to perform one or more functions discussed above with respect to FIGS. 25-27, 29, and 30. The receiver 3105 may correspond to the receiver 2812. The processing system 3110 may correspond to the processor 2804. The transmitter 3115 may correspond to the transmitter 2810. The connection setup component 3124 may correspond to the connection setup component 124, and/or the connection setup component 2824.

In one configuration, the wireless communication device 3100 may include means for determining a data link attribute for scheduling a data link with a second wireless device and means for transmitting the determined data link attribute in a frame to the second wireless device. In an aspect, the data link attribute may include a control field, and the control field may include at least one of an availability map indicator, a logical channel indicator, a confirm field, or a flexible field. In another aspect, the availability map indicator may indicate whether a map control field and an availability map is present in the data link attribute. The availability map may indicate an availability of the wireless communication device 3100 for the data link. In an aspect, the logical channel indicator may indicate whether a logical channel indicator field is present in the data link attribute, and the logical channel indicator field may identify a logical channel index for the data link. In another aspect, the confirm field may indicate whether the data link attribute is associated with a data link schedule request, a data link schedule counter request, an indication of a failed data link schedule negotiation, or a confirmation of a requested data link schedule. In another aspect, the flexible field may indicate whether the wireless communication device 3100 is willing negotiate a data link schedule. In another aspect, the flexible field may indicate that the wireless communication device 3100 will not negotiate the data link schedule indicated in the frame. In this aspect, the wireless communication device 3100 may include means for receiving a second frame from the second wireless device. The second frame may include a second data link attribute, and the second data link attribute may include a second confirm field indicating the confirmation of the requested data link schedule indicated in the frame. In another aspect, the flexible field may indicate that the wireless communication device 3100 is willing negotiate the data link schedule. In this aspect, the wireless communication device 3100 may include means for receiving a second frame from the second wireless device. The second frame may include a second data link attribute, and the second data link attribute may include a second flexible field indicating that the second wireless device is willing negotiate the data link schedule. The second data link attribute may further include an availability map that indicates a requested data link schedule based on an availability of the second wireless device for the data link. In this aspect, the wireless communication device 3100 may include means for transmitting a third frame to the second wireless device. The third frame may include a third data link attribute, and the third data link attribute may include a third confirm field indicating the confirmation of the requested data link schedule indicated in the second data link attribute. In another aspect, the data link attribute may further include a link conditions field that indicates a set of one or more requirements to be satisfied by the second wireless device in order for the data link to be established with the second wireless device. In another aspect, the set of one or more requirements may include a minimum communication bandwidth for the second wireless device, a minimum data rate for the second wireless device, a minimum quality of service for the data link, wireless standard compatibility information, minimum number of supported spatial streams, one or more channel capabilities, or one or more physical layer capabilities. In another aspect, the data link attribute may include a validity time field that indicates a number of discovery window intervals for which the data link attribute is valid. In another aspect, the validity time field may indicate when wireless devices associated with a NDL is allowed to switch to a different NDL. In another aspect, a value in the number of discovery window intervals may be extendable by wireless devices communicating on the NDL associated with the validity time field. In another configuration, the wireless communication device 3100 may include means for determining a schedule for communicating data of a service with a second wireless device on an NDL. The schedule may specify at least one time block in which the wireless communication device 3100 and the second wireless device are required to be available. The wireless communication device 3100 may include means for transmitting the schedule to the second wireless device. In another aspect, the schedule may further specify at least one channel to be used by the wireless communication device 3100 and the second wireless device to communicate the data in the specified at least one time block. In another aspect, the schedule may include an immutable portion, and the wireless communication device 3100 and the second wireless device may be required to be available in the at least one time block specified in the immutable portion. In another aspect, the immutable portion may include a base schedule. In another configuration, the connection setup component 2824 may be configured to receive an indication from the second wireless device, and the indication may indicate whether the immutable portion is accepted by the second wireless device. In an aspect, the schedule may include a semi-immutable portion, a subset of the at least one time block specified in the semi-immutable portion is to be selected by the second wireless device in accordance with a predetermined rule. In another aspect, the schedule may include a flexible portion, and one or more time blocks of the at least one time block specified in the flexible portion are to be selected by the second wireless device. In another configuration, the wireless communication device 3100 may be include means for transmitting, to the second wireless device, QoS requirements for receiving the data of the service. The one or more time blocks are further to be selected by the second wireless device to meet the QoS requirements. In another aspect, the flexible portion may further specify one or more channels that are to be used by the second wireless device in each of the at least one time block specified in the flexible portion. In another aspect, the flexible portion may require the second wireless device to use all of the one or more channels specified for a time block of the flexible portion and that is selected by the second wireless device. In another aspect, the flexible portion may allow the second wireless device to select from the one or more channels specified for a time block of the flexible portion and that is selected by the second wireless device. In another configuration, the schedule for communicating on the data link may be determined based on a first mode of the wireless communication device 3100 and a second mode of the second wireless device. In an aspect, the first mode and the second mode are a one-to-one mode, and the schedule is determined based on a negotiation between the wireless communication device 3100 and the second wireless device. In another aspect, the first mode is in a one-to-one mode and the second mode is in a one-to-many mode, and the schedule is determined based on a publisher schedule received from the second wireless device. In this aspect, the publisher schedule may be based on an availability of the wireless communication device 3100. In another aspect, the first mode is a one-to-one mode and the second mode is a logical channel mode, and the schedule may be determined based on a predetermined schedule received from the second wireless device. In another aspect, the first mode is a logical channel mode and the second mode is a one-to-one mode, and the schedule is determined based on a publisher schedule received from the second wireless device. The publisher schedule may be based on a predetermined schedule selected by the wireless communication device 3100. In another aspect, the first mode is a logical channel mode and the second mode is a one-to-many mode, and the schedule is determined based on a publisher schedule received from the second wireless device. The publisher schedule may be based on a predetermined schedule selected by the wireless communication device 3100. In another aspect, the first mode and the second mode are a logical channel mode, and the schedule is determined based on a predetermined schedule received from the second wireless device.

For example, means for determining a data link attribute may include the connection setup component 3124 and/or the processing system 3110. Means for transmitting the determined data link attribute may include the connection setup component 3124, the processing system 3110, and/or the transmitter 3115. Means for receiving a second frame may include the connection setup component 3124, the processing system 3110, and/or the receiver 3105. Means for transmitting a third frame may include the connection setup component 3124, the processing system 3110, and/or the transmitter 3115. Means for determining a schedule for communication data may include the connection setup component 3124 and/or the processing system 3110. Means for transmitting the schedule may include the connection setup component 3124, the processing system 3110, and/or the transmitter 3115. Means for receiving an indication may include the connection setup component 3124, the processing system 3110, and/or the receiver 3105. Means for transmitting, to the second wireless device, QoS requirements may include the connection setup component 3124, the processing system 3110, and/or the transmitter 3115. Means for determining a schedule may include the connection setup component 3124 and/or the processing system 3110.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Figure 32:
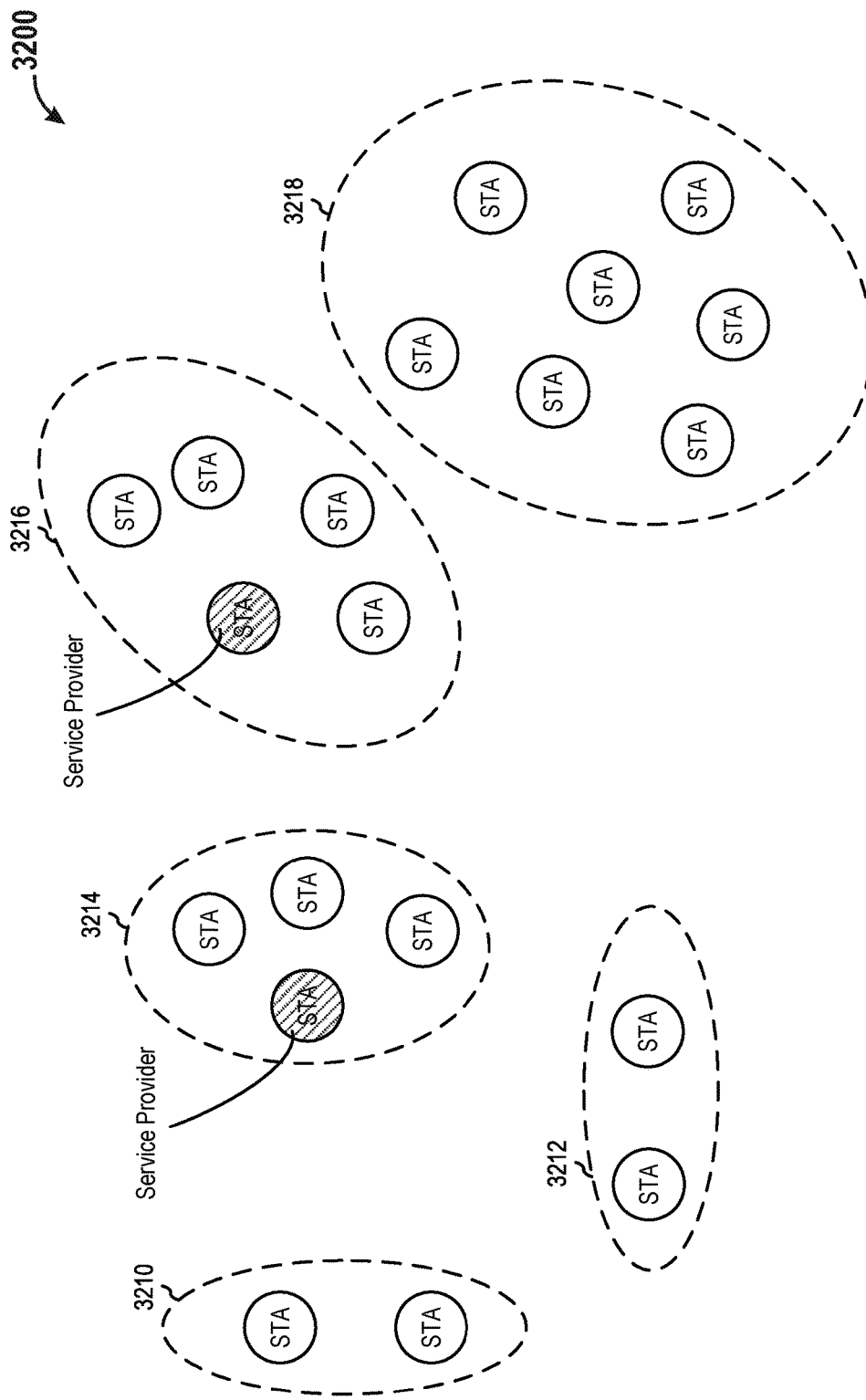
FIG. 32 is a diagram illustrating a NAN cluster.

FIG. 32 is a diagram illustrating a NAN cluster 3200. The NAN cluster 3200 may include 5 groups of STAs, (e.g., a first group of STAs 3210, a second group of STAs 3212, a third group of STAs 3214, a fourth group of STAs 3216, and a fifth group of STAs 3218). Two STAs of the same group may establish an NDL. Each NDL may incorporate a default NDL schedule. The default NDL schedule does not require the STAs associated with the NDL to negotiate the NDL schedule. The default NDL schedule may be published in the NAN cluster 3200 or may be determined by an associated STA based on an industry standard. In this example, the NDLs connecting the fifth group of STAs 3218 use the default NDL schedule.

Further, NDLs associated with a service provider (or a publisher) may use a service NDL schedule determined by the service provider, instead of the default NDL schedule. Subscribers associated with these NDLs may receive the service NDL schedule from the service provider. The service NDL schedule does not require the STAs associated with these NDLs to negotiate the service NDL schedule. The service provider may advertise the service NDL schedule in discovery windows/fixed intervals (e.g., the discovery window 202 and fixed interval 204). In this example, the NDLs connecting the third group of STAs 3214 use a service NDL schedule provided by a service provider STA. Similarly, the NDLs connecting the third group of STAs 3214 use a service NDL schedule provided by another service provider STA.

In addition, two STAs may exchange messages in order to negotiate a mutually agreeable NDL schedule. In this example, the NDL connecting the first group of STAs 3210 use an NDL schedule negotiated by the first group of STAs 3210. Similarly, the NDL connecting the second group of STAs 3212 use an NDL schedule negotiated by the second group of STAs 3212.

Figure 33:
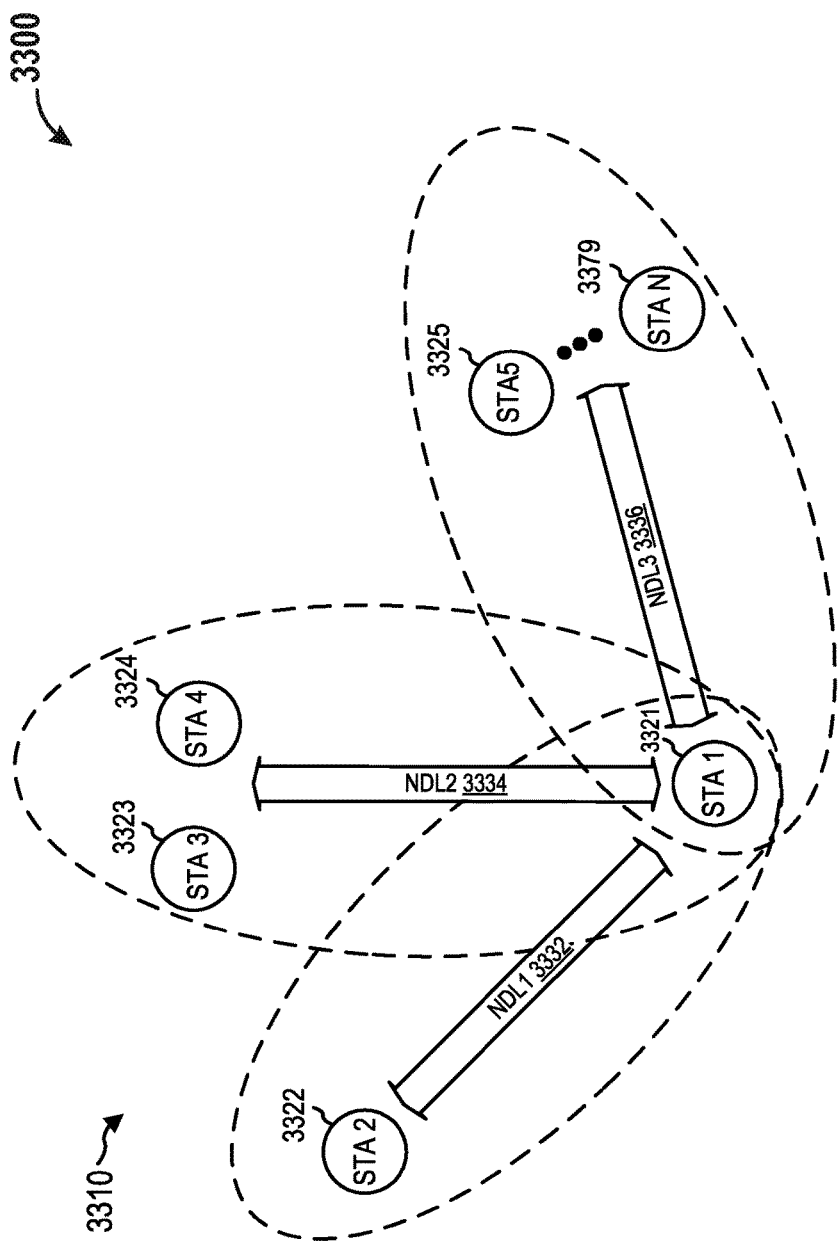
FIG. 33 is a diagram illustrating a NAN data cluster (NDC).

FIG. 33 is a diagram 3300 illustrating a NAN data cluster (NDC). An NDC may be considered as a collection of STAs that are connected by one or more NDLs. An NDC may include two or more STAs. In this example, FIG. 33 shows an NDC 3310 includes N STAs, (e.g., a first STA 3321, a second STA 3322, a third STA 3323, a fourth STA 3324, a fifth STA 3325, . . . , and an $N^{th}$ STA 3379). An NDC may include one or more NDLs. In this example, the NDC 3310 includes three NDLs (e.g., a first NDL 3332, a second NDL 3334, and a third NDL 3336). Further, the first STA 3321 may communicate data with the second STA 3322 on the first NDL 3332. The first STA 3321 may communicate data with the third STA 3323 and the fourth STA 3324 on the second NDL 3334. The first STA 3321 may communicate data with the fifth STA 3325 to the $N^{th}$ STA 3379 on the third NDL 3336.

An NDL may be a mechanism that allows the STAs associated with the NDL to communicate data and includes a schedule of time and channel (e.g., frequency) blocks to be used by the associated STAs to communicate data. Each of the NDLs in the NDC may incorporate a same base NDL schedule. That is, each of the STAs in the NDC is awake on the channel/time blocks specified by the base NDL schedule and is available for communicating data. Accordingly, the base NDL schedule may be used for managing the NDLs and the STAs. Particularly, the base NDL schedule may be used for ensuring synchronization of the STAs in the NDC even when one or more of the STAs may move to different NAN clusters.

A NAN device (e.g., the first STA 3321) that has multiple NDLs (e.g., the NDLs 3332, 3334, 3336) may specify a group NDL schedule. The group NDL schedule indicates the channel/time blocks in which all the devices associated with the NDLs (e.g., the first STA 3321, the second STA 3322, . . . , the $N^{th}$ STA 3379) are awake. The base NDL schedule is part of the group NDL schedule. The group NDL schedule is adapted as NDLs are added. A new NDL may adopt part of the group NDL schedule. The group NDL schedule may be modified when a new NDL is created.

Figure 34:
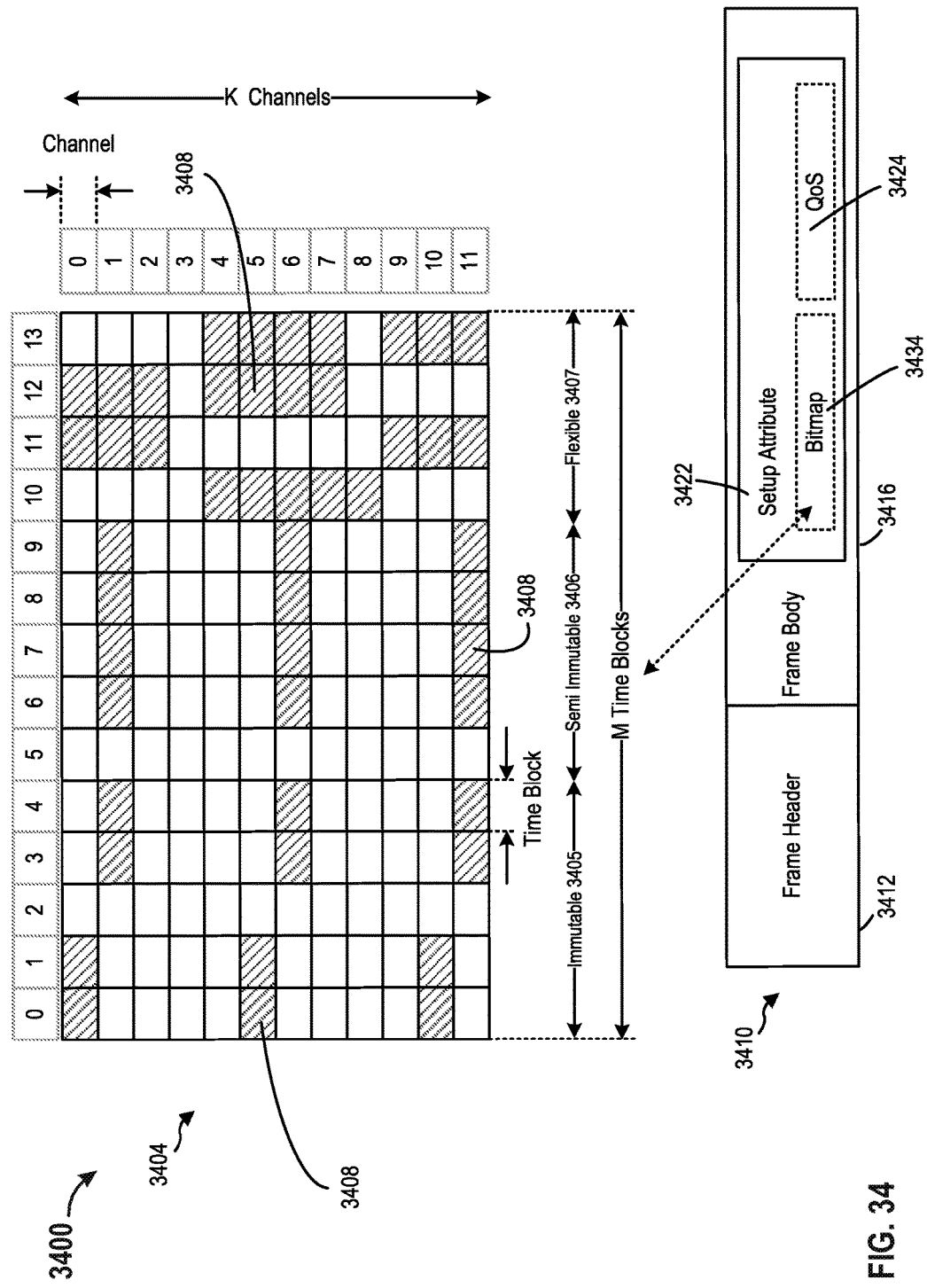
FIG. 34 is a diagram illustrating an NDL schedule of an NDL.

Further, as an example, the first STA 3321 may be a publisher of a service and the second STA 3322 may be a subscriber. FIG. 34 is a diagram 3400 illustrating an NDL schedule of the first NDL 3332. In this example, the first NDL 3332 between the first STA 3321 and the second STA 3322 may include K channels, which may be physical channels or logical channels. The time period between two consecutive discovery windows/fixed intervals may include M NDL-TBs described supra. For example, the time period between the discovery window 202 and the fixed interval 204 and the discovery window 218 and the fixed interval 220 shown in FIG. 2, which may be referred to as a scheduling period, may include M NDL-TBs, which includes the first NDL-TB 206 and the second NDL-TB 212.

As such, the time/channel resources on the first NDL 3332 in a scheduling period can be illustrated as a time/channel resource grid 3404. In this example, K is 12 and M is 14. That is, there are 14 NDL-TBs and 12 channels.

The publisher or the subscriber of a service may determine an NDL schedule (e.g., resource allocation on the time/channel resource grid 3404) for communicating data between the publisher and the subscriber. The NDL schedule specifies the NDL-TBs in which the publisher and the subscriber may be awake and the channels that the publisher and the subscriber may use to communicate data. As an example, the shaded blocks on the time/channel resource grid 3404 indicate the available NDL-TBs and the channels to be used for communication. More specifically, the time/channel resource grid 3404 shows an NDL schedule that specifies, among others, that the publisher and the subscriber may be awake in NDL-TBs 0 and 1 and may communicate data on channels 1, 5, and 10.

An STA (e.g., the first STA 3321 or the second STA 3322) that determines the NDL schedule may be referred to as a scheduler. The scheduler may determine an NDL schedule to be immutable, semi-immutable, flexible, or any combination thereof. Particularly, the scheduler may determine an NDL schedule that is entirely immutable. The scheduler may also determine an NDL schedule that includes an immutable portion and a flexible portion. The scheduler may further determine an NDL schedule that includes an immutable portion, a semi-immutable portion, and a flexible portion. Accordingly, a portion or all of the time/channel resource grid 3404 may be immutable. A portion or all of the time/channel resource grid 3404 may be semi-immutable. A portion of all of the time/channel resource grid 3404 may be flexible.

After the scheduler has determined an NDL schedule, the scheduler may transmit information indicating the determined NDL schedule to the other party in a scheduling frame 3410. The scheduling frame 3410 may include a frame header 3412 and a frame body 3416. The frame body 3416 may include an NDL setup attribute 3422. In one example, the NDL setup attribute 3422 may include a bitmap 3434 that indicates the NDL schedule on the time/channel resource grid 3404.

In this example, the first STA 3321 may be a publisher and may also be the scheduler. The second STA 3322 may be a subscriber that has subscribed the service of the first STA 3321 (e.g., the publisher). Further, the first STA 3321 may determine an NDL schedule for the time/channel resource grid 3404. More specifically, in this example, the NDL schedule for the NDL-TB 0 to the NDL-TB 4 of the time/channel resource grid 3404 may be immutable. The NDL schedule for the NDL-TB 5 to the NDL-TB 9 may be semi-immutable. The NDL schedule for the NDL-TB 10 to the NDL-TB 13 may be flexible. The NDL schedule for the NDL-TB 0 to the NDL-TB 4 of the time/channel resource grid 3404 may be referred to as an immutable portion 3405 of the NDL schedule. The NDL schedule for the NDL-TB 5 to the NDL-TB 9 of the time/channel resource grid 3404 may be referred to as a semi-immutable portion 3406 of the NDL schedule. The NDL schedule for the NDL-TB 10 to the NDL-TB 13 of the time/channel resource grid 3404 may be referred to as a flexible portion 3407 of the NDL schedule. The NDL setup attribute 3422 of the scheduling frame 3410 may include information indicating the immutable portion 3405, the semi-immutable portion 3406, and the flexible portion 3407.

The first STA 3321 transmits the determined NDL schedule for the time/channel resource grid 3404 to the second STA 3322. The immutable portion 3405 must be all accepted or rejected by the second STA 3322. If the second STA 3322 cannot be awake and communicate data with the first STA 3321 in one or more channel/time blocks 3408 prescribed by the immutable portion 3405, the second STA 3322 may reject the NDL schedule. For example, the second STA 3322 may transmit a frame to the first STA 3321 indicating the rejection. If the second STA 3322 accepts the immutable portion 3405, the second STA 3322 may transmit a frame to the first STA 3321 indicating the acceptance.

The semi-immutable portion 3406 of the NDL schedule indicates the channel/time blocks 3408 for which the first STA 3321 is available and from which the second STA 3322 may select a subset of the NDL-TBs based on a predetermined rule or logic. There may not be channel flexibility in selecting the channel/time blocks 3408. That is, the second STA 3322 may select one or more NDL-TBs from the available NDL-TBs of the semi-immutable portion 3406. But the second STA 3322 is required to be available on all the channels specified for a selected NDL-TB. The second STA 3322 may determine that the second STA 3322 only needs to be awake (e.g., operating in a normal mode) for a certain number of NDL-TBs in order to communicate data with the first STA 3321. Accordingly, the second STA 3322 may decide to sleep (e.g., operating in an energy-saving mode) during the rest time in the semi-immutable portion 3406. The second STA 3322 may select the NDL-TBs from the semi-immutable portion 3406 based on the predetermined rule or logic.

In the example shown in FIG. 34, the NDL schedule for the time/channel resource grid 3404 shows that the first STA 3321 is available on channels 1, 6, and 11 in NDL-TBs 6-9. The predetermined rule or logic may allow the second STA 3322 to trim the NDL-TBs available in the semi-immutable portion 3406 from the end. As an example, the second STA 3322 may decide, based on its needs and the predetermined rule, to be awake during NDL-TBs 6-7 and be asleep in NDL-TBs 8-9. In other words, the available NDL-TBs 8-9 are trimmed by the second STA 3322. As required, the second STA 3322 is available on channels 1, 6, and 11 in the selected NDL-TBs 6-7. Further, the second STA 3322 may transmit to the first STA 3321 information regarding the selection of NDL-TBs in the semi-immutable portion 3406. For example, the second STA 3322 may use a scheduling frame 3410 to transmit such information. Further, the semi-immutable portion 3406 may be included in a group NDL schedule.

The flexible portion of the NDL schedule indicates the channel/time blocks 3408 for which the first STA 3321 is available. The second STA 3322 may select none or one or more of the channel/time blocks 3408 for communicating data with the first STA 3321. In one configuration, the first STA 3321 may also send indication indicating that both NDL-TBs and channels in the flexible portion 3407 are flexible for selection. In other words, the second STA 3322 may select channel/time blocks 3408 on any available channels and in any available NDL-TBs specified in the flexible portion 3407. In the example shown in FIG. 34, the shaded blocks in the flexible portion 3407 of the time/channel resource grid 3404 are the channel/time blocks 3408 available for the second STA 3322 (e.g., a subscriber) to select from. In this configuration, as an example, the second STA 3322 may select NDL-TB 10 (or any other NDL-TB) from the available NDL-TBs 10-13, as the NDL-TBs are flexible for selection. Further, channels 4-8 are available for NDL-TB 10. The second STA 3322 may select channel 4 (or any other channel) from the available channels 4-8, as the channels are flexible for selection. That is, the second STA 3322 determines to be awake on NDL-TB 10 and be available on channel 4 in NDL-TB 10.

In another configuration, the first STA 3321 may send indication indicating that the NDL-TBs in the flexible portion 3407 are flexible for selection but the channels are fixed for a selected NDL-TB. In this configuration, as an example, the second STA 3322 may select NDL-TB 10 (or any other NDL-TB) from the available NDL-TBs 10-13, as the NDL-TBs are flexible for selection. Once the second STA 3322 has selected the NDL-TB 10, the second STA 3322 is required to be available on all of the channels 4-8, which are specified in the flexible portion 3407 for the NDL-TB 10. That is, the second STA 3322 determines to be awake on NDL-TB 10 and be available on channels 4-8 in NDL-TB 10.

In certain configurations, the first STA 3321 may also send to the second STA 3322 QoS requirements of the service provided by the first STA 3321. For example, the QoS requirements may specify the minimum amount of time and inter-block time requirements for receiving the data of the service. Further, the NDL setup attribute 3422 may further include a QoS field 3442. The first STA 3321 may include information indicating the QoS requirements in the QoS field 3442 of the scheduling frame 3410, which is then transmitted to the second STA 3322.

Accordingly, upon receiving the QoS information, the second STA 3322 may select the channel/time blocks 3408 from the flexible portion 3407 that can satisfy the QoS requirements. For example, the second STA 3322 may select a collection of channel/time blocks 3408 at different times that collectively meets the minimum amount of time requirement and each two NDL-TBs of which are separated by a time period that meets the inter-block requirement.

Further, the second STA 3322 may send to the first STA 3321 information indicating the selected channel/time blocks 3408 in a frame. For example, the second STA 3322 may similarly use a scheduling frame 3410. More particularly, the scheduling frame 3410 may include an NDL setup attribute 3422 that carries a bitmap 3434 that indicates the selected channel/time blocks 3408.

As described supra, the first STA 3321 and the second STA 3322 may determine an NDL schedule of the first NDL 3332 that are acceptable by both. Accordingly, the first STA 3321 and the second STA 3322 may be available to communicate data with each other on the channels and in the NDL-TBs specified in the accepted NDL schedule.

Figure 35A:
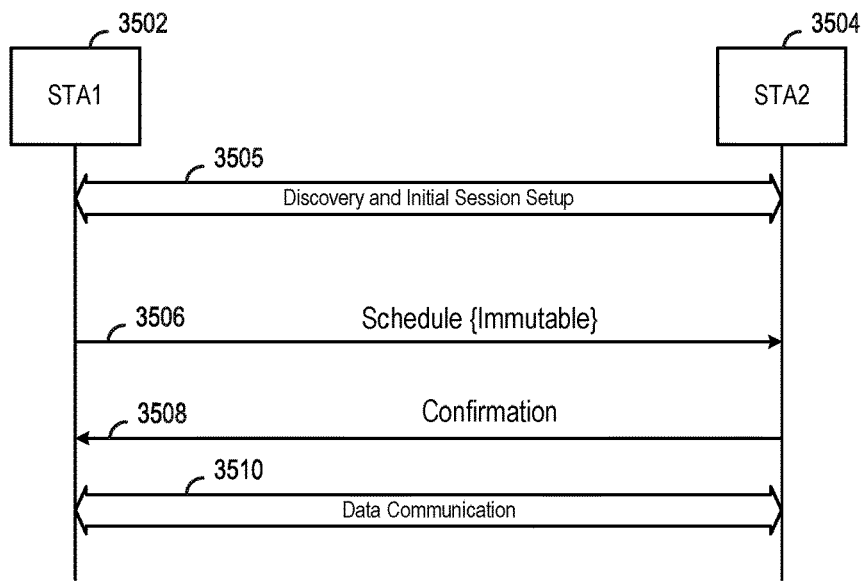
FIG. 35A is a call flow diagram illustrating a first exemplary scheduling procedure on an NDL.

FIG. 35A is a call flow diagram 3500 illustrating a first exemplary scheduling procedure on an NDL. Referring to FIG. 35A, a first STA 3502 and a second STA 3504 may be in a NAN (or another wireless network). In an aspect, the second STA 3504 may be publishing a service and the first STA 3502 may want to subscribe to the service (e.g., a video streaming service). In other words, the first STA 3502 may be a publisher and the second STA 3504 may be a subscriber. As an example, within the discovery window 202 and the fixed interval 204 shown in FIG. 2, the first STA 3502 and the second STA 3504, at operation 3505, may discover each other through a discovery procedure and complete the initial session setup of an NDL between the first STA 3502 and the second STA 3504.

At operation 3506, the first STA 3502 determines an immutable NDL schedule. The NDL schedule may specify the available channel/time blocks 3408 in some or all of the NDL-TBs between the discovery window 202 and fixed interval 204 and the discovery window 218 and the fixed interval 220 shown in FIG. 2. The immutable NDL schedule may be similar to the immutable portion 3405 shown in FIG. 34. Accordingly, the first STA 3502 sends information indicating the determined immutable NDL schedule to the second STA 3504. Particularly, the first STA 3502 may transmit a scheduling frame 3410 that carries the information. At operation 3508, the second STA 3504 determines that the immutable NDL schedule is acceptable. Accordingly, the second STA 3504 transmits a confirmation of the acceptance of the immutable NDL schedule to the first STA 3502. The confirmation may be in carried in a frame. In this example, the operations 3505-3508 may be performed in the discovery window 202 and fixed interval 204. Subsequently, at operation 3510, the first STA 3502 and the second STA 3504 may communicate data at the channel/time blocks 3408 in accordance with the immutable NDL schedule. For example, the immutable NDL schedule may include the first NDL-TB 206 and the second NDL-TB 212.

Figure 35B:
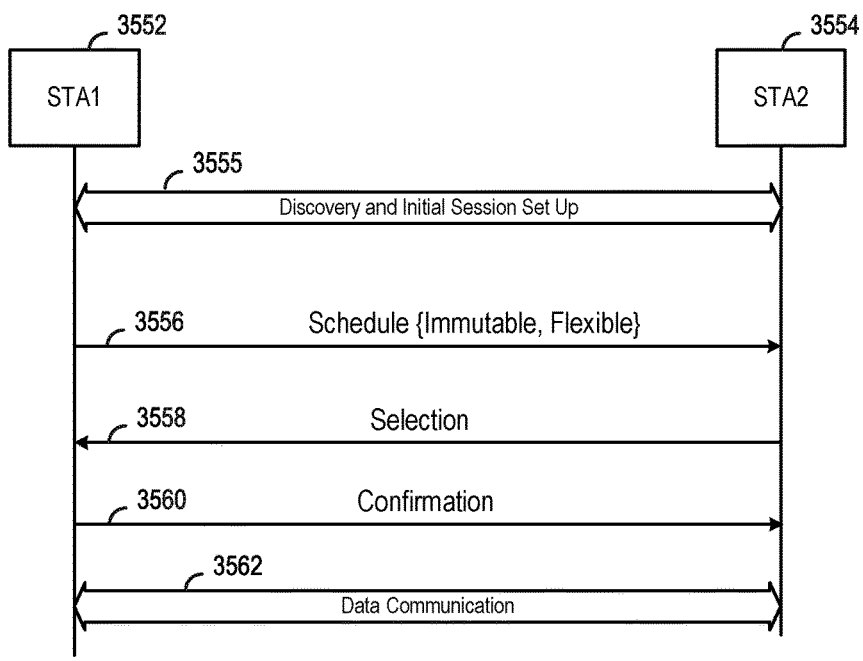
FIG. 35B is a call flow diagram illustrating a second exemplary scheduling procedure on an NDL.

FIG. 35B is a call flow diagram 3550 illustrating a second exemplary scheduling procedure on an NDL. Referring to FIG. 35B, a first STA 3552 and a second STA 3554 may be in a NAN (or another wireless network). In an aspect, the second STA 3554 may be publishing a service and the first STA 3552 may want to subscribe to the service (e.g., a video streaming service). In other words, the first STA 3552 may be a publisher and the second STA 3554 may be a subscriber. As an example, within the discovery window 202 and fixed interval 204 shown in FIG. 2, the first STA 3552 and the second STA 3554, at operation 3555, may discover each other through a discovery procedure and complete the initial session setup of an NDL between the first STA 3552 and the second STA 3554. At operation 3556, the first STA 3552 determines an NDL schedule that includes an immutable portion 3405 and a flexible portion 3407 as shown in FIG. 34. The NDL schedule does not include a semi-immutable portion 3406. The NDL schedule may specify the available channel/time blocks 3408 in some or all of the NDL-TBs between the discovery window 202 and fixed interval 204 and the discovery window 218 and the fixed interval 220. Accordingly, the first STA 3552 sends information indicating the determined NDL schedule to the second STA 3554. Particularly, the first STA 3552 may transmit a scheduling frame 3410 that carries the information.

At operation 3558, the second STA 3554 determines that the immutable portion 3405 of the NDL schedule is acceptable. Further, the second STA 3554 may select a collection of channel/time blocks 3408 from the flexible portion 3407. The selected collection of the channel/time blocks 3408 is a subset of the channel/time blocks 3408 available in the flexible portion 3407. Accordingly, the second STA 3554 transmits to the first STA 3552 information indicating the acceptance of the immutable portion 3405 and the selected collection of channel/time blocks 3408 from the flexible portion 3407. The information may be carried in a frame (e.g., the scheduling frame 3410). At operation 3560, the first STA 3552 receives, from the second STA 3554, the information indicating the acceptance of the immutable portion 3405 and the selected collection of channel/time blocks 3408. The first STA 3552 further may determine that the selected collection of channel/time blocks 3408 is acceptable. Accordingly, the first STA 3552 may send a confirmation to the second STA 3554. The confirmation indicates to the second STA 3554 that the selected collection of channel/time blocks 3408 is accepted by the first STA 3552. In this example, the operations 3555-3560 may be performed in the discovery window 202 and fixed interval 204. Subsequently, at operation 3562, the first STA 3552 and the second STA 3554 may communicate data at the channel/time blocks 3408 in accordance with the mutually accepted NDL schedule. For example, the immutable NDL schedule may include the first NDL-TB 206 and the second NDL-TB 212.

The NDL setup attribute 3422 of a scheduling frame 3410 for setting up an NDL schedule of an NDL (e.g., the first NDL 3332) may indicate one or more of: signaling for scheduling NDL-TBs on the NDL, duration of the NDL, and QoS requirements of the NDL. More specifically, the signaling for scheduling NDL-TBs may include signaling for one or more of: a base schedule, a group schedule, flexible time blocks, and use of paging in an NDL-TB. The QoS requirements may indicate latency requirements and/or data rate requirements for the STA receiving the scheduling frame 3410 (e.g., the second STA 3322, the subscriber). The NDL setup attribute 3422 may be required to be compact to avoid excess air time spent for setup.

The NDL setup attribute 3422 may need to indicate time lines that are longer than 512 TUs, e.g., up to 8192 TUs. In one technique, a bitmap may be used to indicate an NDL schedule on one or more channels of the NDL. The bitmap may indicate a parameter n, which is used by a recipient of the scheduling frame 3410 (e.g., the second STA 3322) to calculate $2^n$, which represents the number of discovery intervals (e.g., the communication interval 200 shown in FIG. 2) over which the bitmap spans. As an example, the parameter n may be 0, 1, 2, 3, or 4. Further, the bitmap may indicate the duration of an NDL-TB in number of groups of TUs. A group of TUs may include a predetermined number of TUs. As an example, the predetermined number of TUs may be 16 TUs. In addition, the bitmap may indicate the start of the bitmap in units of octets. Further, the preceding zeros and/or the trailing zeros from each bitmap may be removed.

Alternatively, the NDL setup attribute 3422 may indicate the NDL schedule for the NDL by periodic indications, instead of bitmaps. The periodic indications may indicate presence or absence. When the periodic indications are configured to indicate presence, the periodic indications indicate the awake NDL-TBs (e.g., the first NDL-TB 206 and the second NDL-TB 212 shown in FIG. 2). When the periodic indications are configured to indicate absence, the periodic indications indicate the sleep time periods (e.g., the time period between the first NDL-TB 206 and the second NDL-TB 212).

The periodic indications for a channel may indicate the starting offset from the previous DW (e.g., the NDL offset shown in FIG. 2) in number of groups of a predetermined number of TUs (e.g., one group may contain 16 TUs). Further, the periodic indications may indicate periodicity of the NDL schedule. For example, the periodicity may be the duration from the beginning of one awake NDL-TB (or one sleep time period) to the beginning of the next awake NDL-TB (or the next sleep time period). The duration of the periodicity may be indicated in number of TUs. Further, the periodic indications may indicate the duration of the awake NDL-TB (for presence periodic indications) or the sleep time period (for absence periodic indications) in number of TUs.

Further, the NDL schedule for each NDL may include the base NDL schedule. The base NDL schedule may be periodic and may be indicated using the periodic indications.

Further, the flexible portion (e.g., the flexible portion 3407 illustrated in FIG. 34) of the NDL schedule on each channel of the NDL may be indicated by a bitmap or periodic indications as described supra. When using periodic indications, a combination of absence and presence periodic indications may be used together to optimize frame size.

Figure 36:
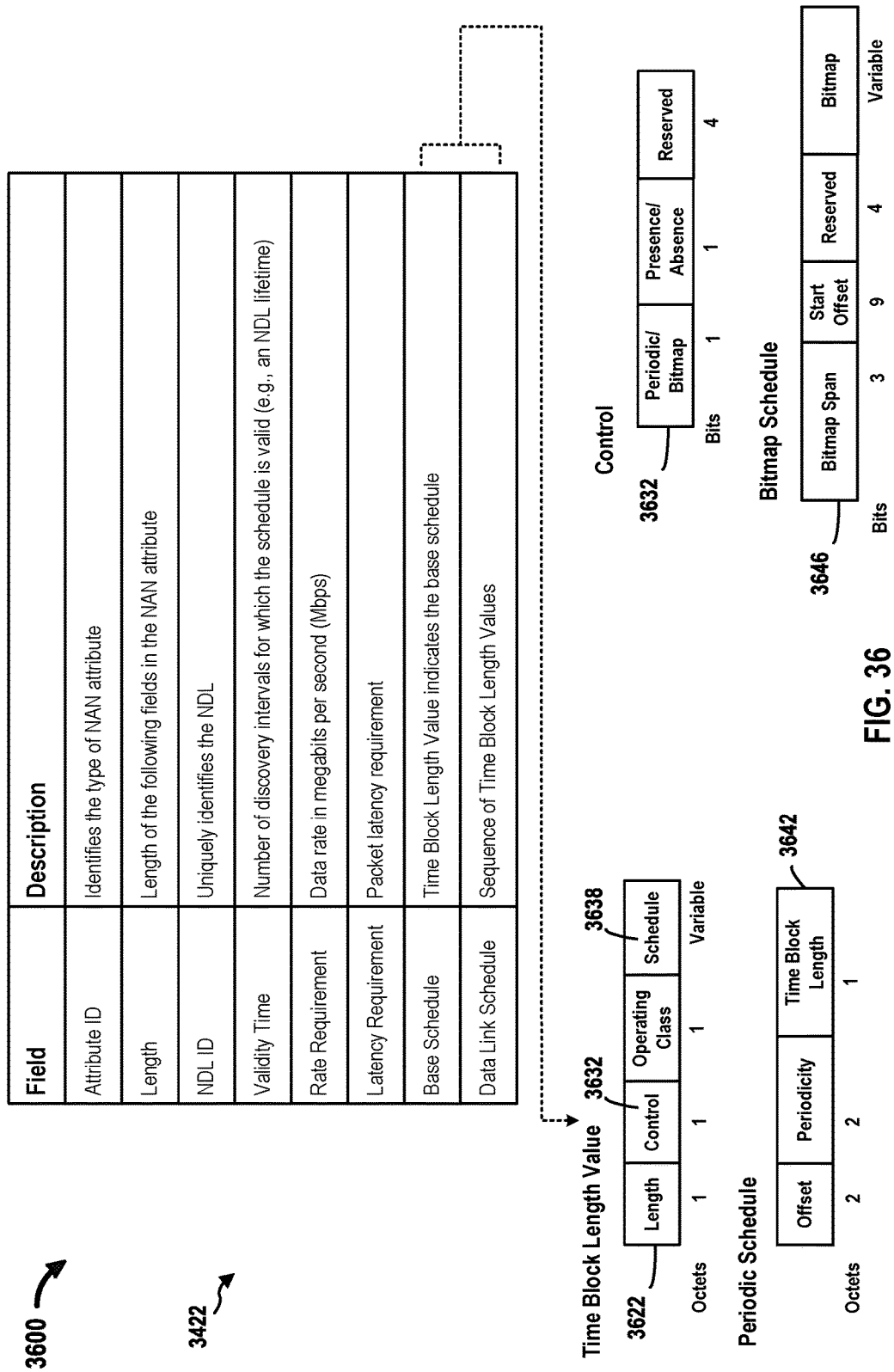
FIG. 36 is a diagram illustrating fields of an NDL setup attribute.

FIG. 36 is a diagram 3600 illustrating fields of the NDL setup attribute 3422. The NDL setup attribute 3422 may include one or more the fields. The NDL setup attribute 3422 may include an attribute ID field, whose value is used to identify the type of NAN attribute (e.g., the NDL setup attribute 3422). The attribute ID field may include 1 octet. As an example, the value of the attribute ID field may be 0x0C. The NDL setup attribute 3422 may include a length field, whose value indicates the length of the fields following the length field in the NDL setup attribute 3422. The length field may include 2 octets. The value of the length field may be a variable. The NDL setup attribute 3422 may include an NDL ID field, whose value uniquely identifies the NDL associated with the NDL setup attribute 3422. The NDL ID field may include 6 octets. The value of the NDL ID field may be a variable. The NDL setup attribute 3422 may include a validity time field, whose value indicates number of discovery intervals for which the NDL setup attribute 3422 is valid. The validity time field may include 1 octet. The value of the validity time field may be a variable. The NDL setup attribute 3422 may include a rate requirement field, whose value indicates the required data rate in Mbps. The rate requirement field may include 1 octet. The value of the rate requirement field may be a variable. The NDL setup attribute 3422 may include a latency requirement field, whose value indicates packet latency requirement. The latency requirement field may include 1 octet. The value of the latency requirement field may be a variable. The NDL setup attribute 3422 may include a base schedule field, which may include a time-block-length-value subfield 3622 that indicates a base NDL schedule. The base schedule field may include a variable number of octets. The value of the base schedule field may be a variable. The NDL setup attribute 3422 may include a data link schedule field, which may include one or more time-block-length-value subfields 3622 that indicate an NDL schedule (e.g., the NDL schedule for the time/channel resource grid 3404). The data link schedule field may include a variable number of octets. The value of the base schedule field may be a variable.

The time-block-length-value subfield 3622 may include a length section, whose value indicates the length of the time-block-length-value subfield 3622. The length section may include 1 octet. The value of the length section may be a variable. The time-block-length-value subfield 3622 may include a control section 3632, whose value indicates whether the time-block-length-value subfield 3622 use a bitmap, presence periodic indications, or absence periodic indications. The control section 3632 may include 1 octet. The value of the control section 3632 may be a variable. The time-block-length-value subfield 3622 may include an operating class section, whose value identifies the channel to which the NDL schedule carried in the time-block-length-value subfield 3622 is to be applied. The operating class section may include 1 octet. The value of the operating class section may be a variable. The time-block-length-value subfield 3622 may include a schedule section 3638, whose value represents the NDL schedule (e.g., the NDL schedule for the time/channel resource grid 3404). The schedule section 3638 may include a variable number of octets. The value of the schedule section 3638 may be a variable.

The control section 3632 may include a periodic/bitmap subsection, whose value indicates whether the schedule section 3638 carries a bitmap or periodic indications representing an NDL schedule. The periodic/bitmap subsection may include 1 bit. The control section 3632 may include a presence/absence subsection, whose value indicates whether the periodic indications, when used, is indicating presence or absence. The presence/absence subsection may include 1 bit. The control section 3632 may include a reserved subsection, whose value indicates whether the periodic indications, when used, is indicating presence or absence. The reserved subsection may include 4 bits.

The schedule section 3638 may carry a periodic schedule 3642, which includes the periodic indications. The periodic schedule 3642 may include an offset subsection, which may include 2 octets and indicates the starting offset as described supra. The periodic schedule 3642 may include a periodicity subsection, which may include 2 octets and indicates the periodicity of the NDL schedule as described supra. The periodic schedule 3642 may include a time block length subsection, which may include 1 octet and indicates the duration of the awake NDL-TB or the sleep time period as described supra.

The schedule section 3638 may carry a bitmap schedule 3646, which includes a bitmap representing an NDL schedule. The bitmap schedule 3646 may include a bitmap span subsection, which may include 3 bits and indicates the number of discovery intervals over which the bitmap spans as described supra. The bitmap schedule 3646 may include a start offset subsection, which may include 2 bits and indicates the start of the bitmap as described supra. The bitmap schedule 3646 may include a reserved subsection, which may include 4 bits. The bitmap schedule 3646 may include a bitmap subsection, which may include a variable number of bits and carries a bitmap representing an NDL schedule as described supra.

Figure 37:
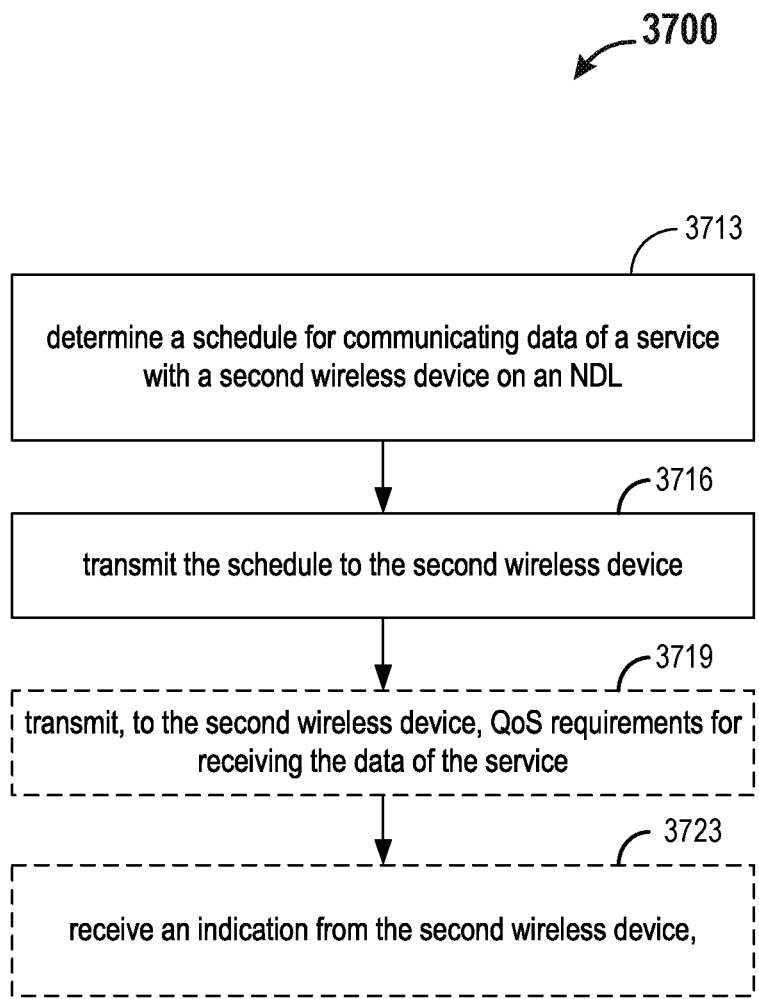
FIG. 37 is a flow chart of a method (process) for scheduling on an NDL.

FIG. 37 is a flow chart 3700 of a method (process) for scheduling on an NDL. The method may be performed by a first wireless device (e.g., first STA 3321, the second STA 3322, . . . , the $N^{th}$ STA 3379, the wireless device 3800/3902).

At operation 3713, the first wireless device determines a schedule for communicating data of a service with a second wireless device on an NDL. The schedule specifies at least one time block in which the first wireless device and the second wireless device are required to be available. For example, referring to FIG. 35B, the first STA 3552 may determine a schedule for communicating data of a service with the second STA 3554 on an NDL. The schedule may specify at least one time block in which the first STA 3552 and the second STA 3554 are required to available. The first STA 3552 may determine the NDL schedule by determining time blocks during which the first STA 3552 is available. The first STA 3552 may determine the periodicity of the time blocks for which the first STA 3552 is available. Of the determined time blocks for which the first STA 3552 is available, the first STA 3552 may select a subset to designate as immutable; that is, for the subset of time blocks, the first STA 3552 and the second STA 3554 must be available.

At operation 3716, the first wireless device transmits the schedule to the second wireless device. In certain configurations, the schedule further specifies at least one channel to be used by the first wireless device and the second wireless device to communicate the data in the specified at least one time block. In certain configurations, the schedule includes an immutable portion. The first wireless device and the second wireless device are required to be available in the at least one time block specified in the immutable portion. The immutable portion may include a base schedule. In certain configurations, the schedule includes a semi-immutable portion. A subset of the at least one time block specified in the semi-immutable portion is to be selected by the second wireless device in accordance with a predetermined rule. In certain configurations, the schedule includes a flexible portion. One or more time blocks of the at least one time block specified in the flexible portion are to be selected by the second wireless device. For example, referring to FIG. 35B, the first STA 3552 may transmit the NDL schedule to the second STA 3554.

In certain configurations, at operation 3719, the first wireless device transmits, to the second wireless device, QoS requirements for receiving the data of the service. The one or more time blocks are further to be selected by the second wireless device to meet the QoS requirements. In certain configurations, the flexible portion further specifies one or more channels that are to be used by the second wireless device in each of the at least one time block specified in the flexible portion. In certain configurations, the flexible portion requires the second wireless device to use all of the one or more channels specified for a time block of the flexible portion and that is selected by the second wireless device. In certain configurations, the flexible portion allows the second wireless device to select from the one or more channels specified for a time block of the flexible portion and that is selected by the second wireless device. For example, referring to FIG. 35B, the first STA 3552 may transmit to the second STA 3554 QoS requirements for receiving data on the NDL.

In certain configurations, at operation 3723, the first wireless device receives an indication from the second wireless device. The indication indicates whether the immutable portion is accepted by the second wireless device. For example, referring to FIG. 35B, the first STA 3552 may receive an indication from the second STA 3554 of whether the immutable portion of the NDL schedule is accepted by the second STA 3554.

Figure 38:
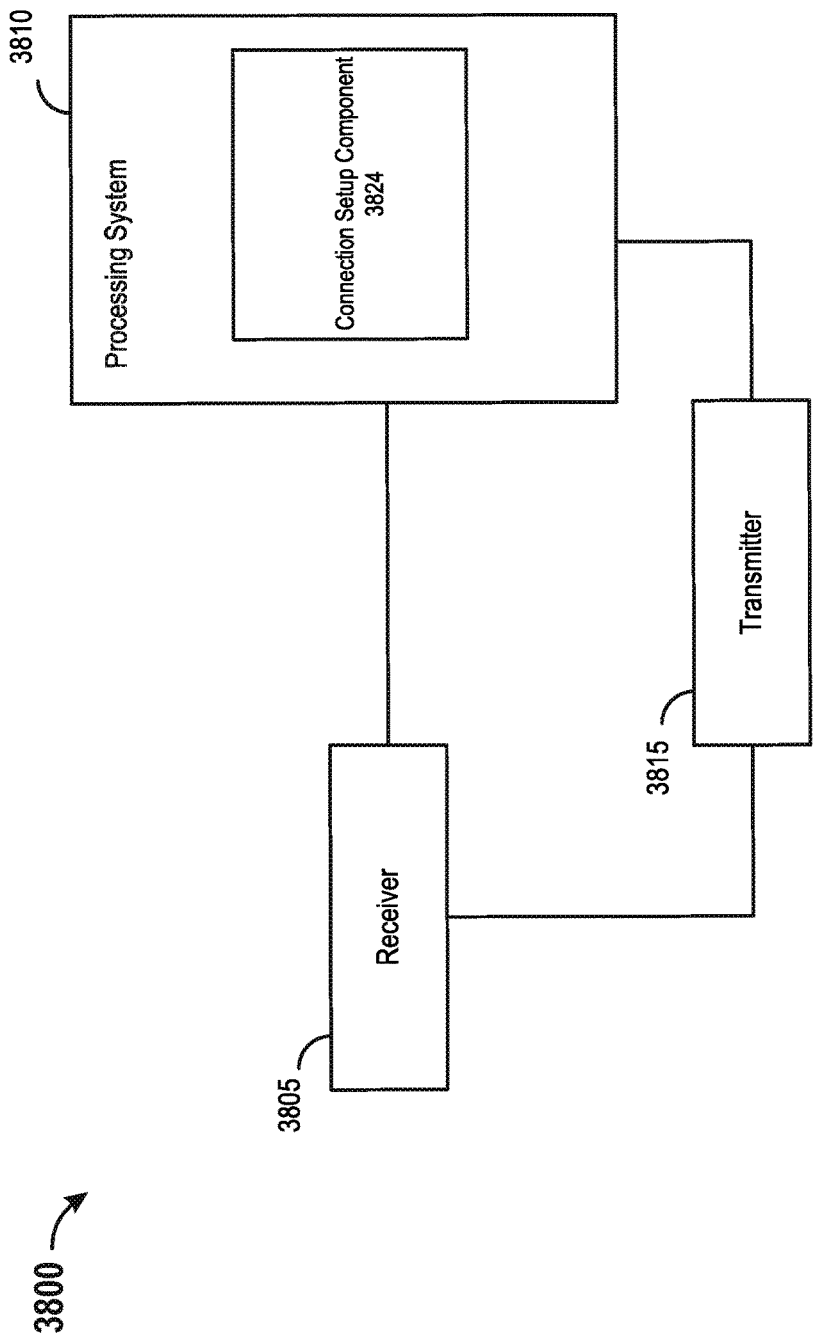
FIG. 38 is a functional block diagram of an example wireless device.

FIG. 38 is a functional block diagram of an example wireless communication device 3800. The wireless communication device 3800 may be one of the first STA 3321, the second STA 3322, . . . , the $N^{th}$ STA 3379. The wireless communication device 3800 may include a receiver 3805, a transmitter 3815, and a processing system 3810. The processing system 3810 may include an NDL scheduling component/circuitry 3824. The NDL scheduling component/circuitry 3824 may be configured to perform the various functions recited herein. In one aspect, the wireless communication device 3800 may be a first wireless device. In certain configurations, the NDL scheduling component/circuitry 3824 may be configured to determine a schedule for communicating data of a service with a second wireless device on an NDL. The schedule specifies at least one time block in which the first wireless device and the second wireless device are required to be available. The NDL scheduling component/circuitry 3824 may be configured to send the schedule to the transmitter 3815. The transmitter 3815 may be configured to transmit the schedule to the second wireless device. In certain configurations, the schedule further specifies at least one channel to be used by the first wireless device and the second wireless device to communicate the data in the specified at least one time block.

In certain configurations, the schedule includes an immutable portion. The first wireless device and the second wireless device are required to be available in the at least one time block specified in the immutable portion. The immutable portion may include a base schedule. In certain configurations, the receiver 3805 may be configured to receive an indication from the second wireless device. The indication indicates whether the immutable portion is accepted by the second wireless device. The receiver 3805 may be configured to send the indication to the NDL scheduling component/circuitry 3824. In certain configurations, the schedule includes a semi-immutable portion. A subset of the at least one time block specified in the semi-immutable portion is to be selected by the second wireless device in accordance with a predetermined rule. In certain configurations, the schedule includes a flexible portion. One or more time blocks of the at least one time block specified in the flexible portion are to be selected by the second wireless device.

In certain configurations, the transmitter 3815 may be configured to transmit, to the second wireless device, QoS requirements for receiving the data of the service. The one or more time blocks are further to be selected by the second wireless device to meet the QoS requirements. In certain configurations, the flexible portion further specifies one or more channels that are to be used by the second wireless device in each of the at least one time block specified in the flexible portion. In certain configurations, the flexible portion requires the second wireless device to use all of the one or more channels specified for a time block of the flexible portion and that is selected by the second wireless device. In certain configurations, the flexible portion allows the second wireless device to select from the one or more channels specified for a time block of the flexible portion and that is selected by the second wireless device.

The apparatus may include additional components that perform each of the blocks of the algorithm in the aforementioned flowchart of FIG. 37. As such, each block in the aforementioned flowcharts of FIG. 37 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 39:
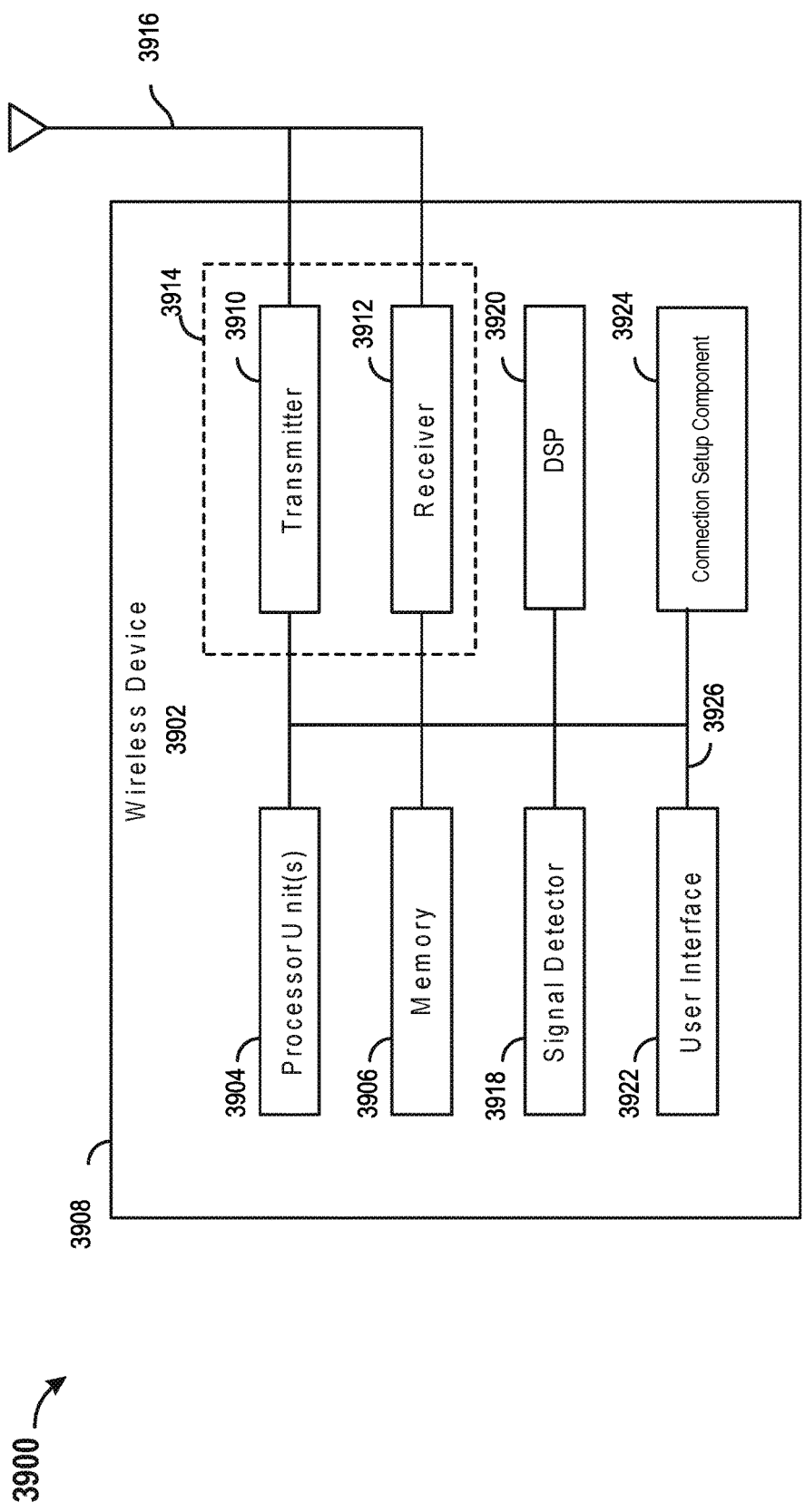
FIG. 39 is a diagram illustrating an example of a hardware implementation of a wireless device.

FIG. 39 is a diagram 3900 illustrating an example of a hardware implementation of a wireless device 3902 that may be employed within the wireless communication system 100 of FIG. 1 or the wireless network of FIG. 32. The wireless device 3902 is an example of a device that may be configured to implement the various methods described herein. For example, the wireless device 3902 may be one of the first STA 3321, the second STA 3322, . . . , the $N^{th}$ STA 3379.

The wireless device 3902 may include a processor 3904, which controls operation of the wireless device 3902. The processor 3904 may also be referred to as a CPU. Memory 3906, which may include both ROM and RAM, may provide instructions and data to the processor 3904. A portion of the memory 3906 may also include NVRAM. The processor 3904 typically performs logical and arithmetic operations based on program instructions stored within the memory 3906. The instructions in the memory 3906 may be executable (by the processor 3904, for example) to implement the methods described herein.

The processor 3904 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 3902 may also include a housing 3908 that may include a transmitter 3910 and/or a receiver 3912 to allow transmission and reception of data between the wireless device 3902 and a remote device. The transmitter 3910 and the receiver 3912 may be combined into a transceiver 3914. An antenna 3916 may be attached to the housing 3908 and electrically coupled to the transceiver 3914. The wireless device 3902 may also include multiple transmitters, multiple receivers, multiple transceivers, and/or multiple antennas.

The wireless device 3902 may also include a signal detector 3918 that may be used to detect and quantify the level of signals received by the transceiver 3914 or the receiver 3912. The signal detector 3918 may detect such signals as total energy, energy per subcarrier per symbol, power spectral density, and other signals. The wireless device 3902 may also include a DSP 3920 for use in processing signals. The DSP 3920 may be configured to generate a packet for transmission. In some aspects, the packet may comprise a PPDU.

The wireless device 3902 may further comprise a user interface 3922 in some aspects. The user interface 3922 may comprise a keypad, a microphone, a speaker, and/or a display. The user interface 3922 may include any element or component that conveys information to a user of the wireless device 3902 and/or receives input from the user.

The wireless device 3902 also includes the NDL scheduling component/circuitry 3824. The processor 3904, the memory 3906, the signal detector 3918, the DSP 3920, the user interface 3922, and the NDL scheduling component/circuitry 3824 may constitute the processing system 3810. The processor 3904, the memory 3906, and the transceiver 3914 may constitute the transmitter 3815 and the receiver 3805. As described supra, the NDL scheduling component/circuitry 3824 may employ, among other components, the processor 3904 and the memory 3906.

The various components of the wireless device 3902 may be coupled together by a bus system 3926. The bus system 3926 may include a data bus, for example, as well as a power bus, a control signal bus, and a status signal bus in addition to the data bus. Components of the wireless device 3902 may be coupled together or accept or provide inputs to each other using some other mechanism.

Although a number of separate components are illustrated in FIG. 39, one or more of the components may be combined or commonly implemented. For example, the processor 3904 may be used to implement not only the functionality described above with respect to the processor 3904, but also to implement the functionality described above with respect to the signal detector 3918, the DSP 3920, the user interface 3922, and/or the NDL scheduling component/circuitry 3824. Further, each of the components illustrated in FIG. 39 may be implemented using a plurality of separate elements.

In one aspect, the wireless device 3800/3902 may be a first wireless device. The wireless device 3800/3902 may include means for performing the operations illustrated in FIG. 37. The aforementioned means may be one or more of the aforementioned components of the wireless device 3800/3902 configured to perform the functions recited by the aforementioned means.

P2P schedule creation may be used to accommodate availability times at either end of the link. In an aspect, P2P schedule creation may be extended to create a multicast schedule (e.g., a one-to-many or many-to-many multicast schedule). In one option, a publishing device (or publisher) may create schedules as in a unicast case to each potential recipient (or subscriber) and repeat frames so that each recipient device has an opportunity to receive the frame based on its own respective availability time. This option, however, places the burden on the publishing device to repeat transmissions for each recipient device when recipient devices do not have overlapping availabilities. In another option, a multicast schedule may be a single immutable schedule, and the publishing device may force all recipient devices to accommodate the schedule or forfeit the service. In one instance, recipient devices offered immutable schedules may not be allowed to modify the schedule, and therefore, when the availability of the recipient devices changes, the recipient devices may have to drop the service. In another instance, recipient devices may request for modification of the schedule (e.g., as discussed in FIG. 12).

Figure 40A:
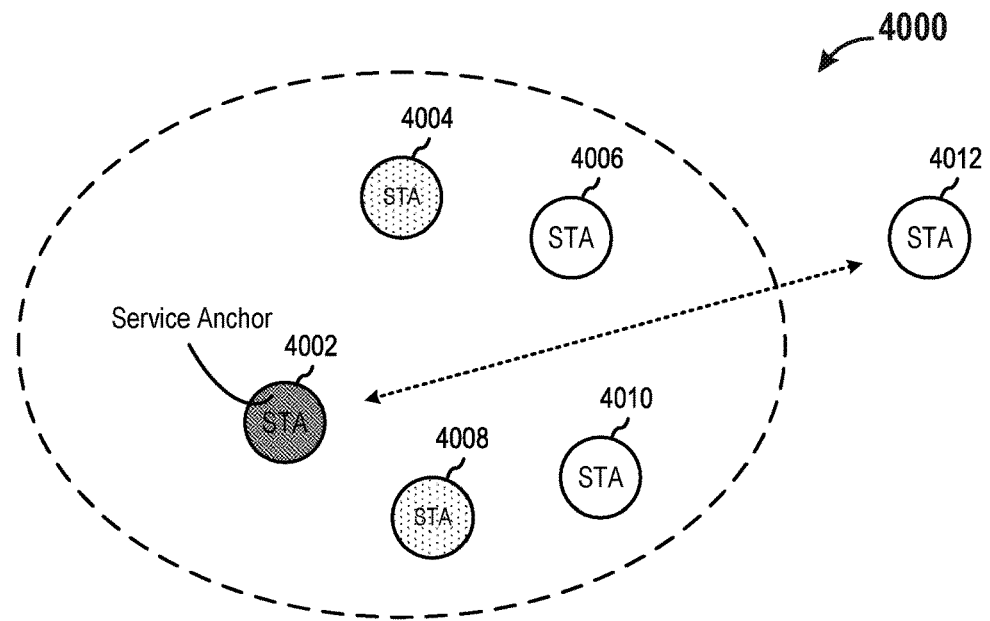
FIGS. 40A and 40B illustrate several options for distributing a multicast schedule.
Figure 40B:
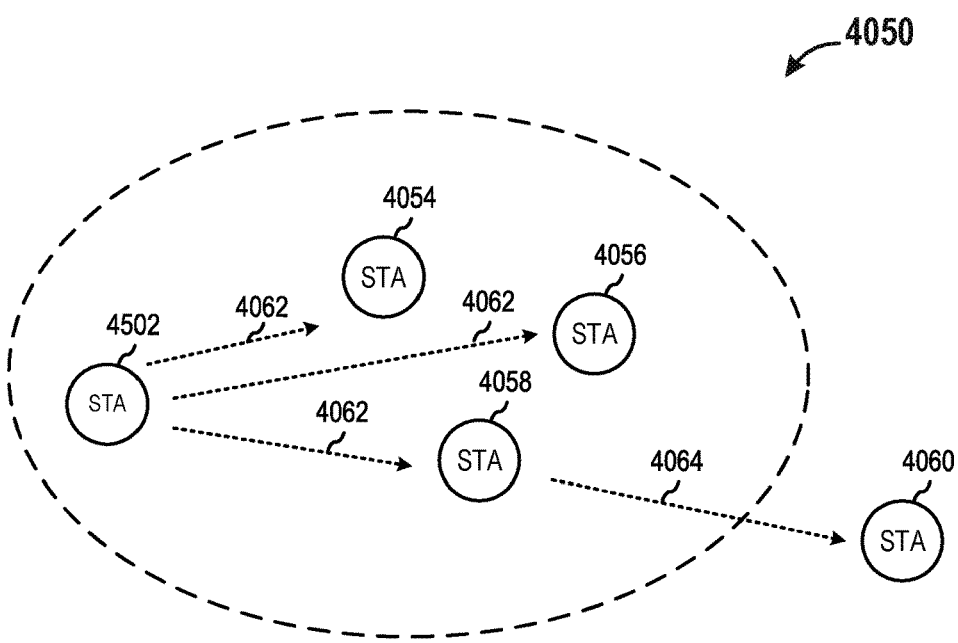

FIGS. 40A-B illustrate several options for distributing a multicast schedule.

FIG. 40A illustrates a first option for distributing a multicast schedule. Referring to FIG. 40A, one or more STAs within a NAN cluster 4000 may be associated with a service within a NAN. The NAN cluster 4000 may include STAs 4002, 4004, 4006, 4008, 4010. In an aspect, all the STAs 4002, 4004, 4006, 4008, 4010 may be participating in the service (e.g., a card game). The STA 4002 may be a service anchor of the service. The service anchor may be responsible for determining, maintaining, and/or communicating an NDL multicast schedule associated with an instance of the service. As such, the life or availability of the service may depend on the presence of the service anchor. If the service anchor is unavailable, then the service may stop. The STA 4002, functioning as the service anchor, may initiate or set up an NDL with a STA 4012 wishing to join the service. In an aspect, the STA 4012 may discover the service based on peer discovery signals received from one or more of the STAs 4002, 4004, 4006, 4008, 4010 that are active (e.g., receiving or transmitting communications associated with the service) with respect to the service. The peer discovery signals from the STAs 4002, 4004, 4006, 4008, 4010 may indicate that the STA 4002 is the service anchor for the service and that NDL set up may be initiated via message exchanges with the STA 4002. For example, the STA 4012 may receive peer discovery signals from the STA 4006, which may indicate that the STA 4002 is the service anchor for the service, and that NDL set up may be initiated with the STA 4002 if the STA 4012 wants to participate in the service. As such, the STA 4012 may transmit a subscription request, for example, to the STA 4002 to initiate the NDL set up. The STA 4002 may respond with an NDL schedule associated with the service to the STA 4012. The NDL schedule may be an immutable schedule (e.g., a schedule that cannot be modified by the recipient of the schedule).

In an aspect, the STA 4002, while acting as the service anchor for the service, need not be a publisher for the service. For example, the STA 4004 and/or the STA 4008 may be the publisher(s) for the service. The STA 4002 may be associated with the NAN cluster 4000 in which the service is offered and may be a NAN anchor master. The NAN anchor master is a device in the NAN cluster with the highest master rank, which represents the willingness of a device to operate as a master of the NAN cluster. The NAN anchor master provides helps provide synchronization to the NAN cluster because the time synchronization function (TSF) of the anchor master is distributed in beacon frames to all devices in a NAN cluster. In another aspect, the STA 4002 may be the service anchor and the only publisher (or one of many publishers) for the service.

In another aspect, a service may have multiple instances. For example, a service may be associated with a type of card game. STAs 4002, 4004, 4006, 4008 may be associated with a first instance of the card game. STAs 4004, 4006, 4008, 4010 may be associated with a second instance of the card game. That is, STAs 4002, 4004, 4006, 4008 may be playing one card game with each other and STAs 4004, 4006, 4008, 4010 may be playing in a different card game of the same type. The STA 4012 may be able to join the first instance of the card game with STAs 4002, 4004, 4006, 4008 and/or the second instance of the card game with STAs 4004, 4006, 4008, 4010 by initiating an NDL set up with the STA 4002. In an aspect, the STA 4002 may be able to differentiate between which of the two instances the STA 4012 is requesting to join based on a service ID and/or a instance ID provided by the STA 4012 and identify the multicast schedule associated with the requested instance.

In another aspect, the STA 4002 may determine the multicast schedule based on a type of service. For example, a service such as a card game that has frequent real-time updates may have more frequent NDL-TBs, whereas a photo sharing service may have fewer NDL-TBs. The STA 4002 may also determine the multicast schedule based on a network load. For example, if the network load is high, the STA 4002 may create multicast schedule with fewer NDL-TBs to reduce network load, but if network load is low, then the STA 4002 may increase throughput by utilizing more NDL-TBs. Further, the STA 4002 may determine the multicast schedule based on a number of instances of the service. A service having more instances may be allocated a multicast schedule with fewer NDL-TBs so that one service does not monopolize the available wireless resources, whereas a service with fewer or no instances may be allocated a multicast schedule with more NDL-TBs.

FIG. 40B illustrates a second option for distributing a multicast schedule. Referring to FIG. 40B, one or more STAs within a NAN cluster 4050 may be associated with a service within a NAN. The NAN cluster 4050 may include STAs 4052, 4054, 4056, 4058. In an aspect, all the STAs 4052, 4054, 4056, 4058 may be participating in the service, such as a card game. Each of the STAs 4052, 4054, 4056, 4058 may be a publisher of the card game service. In an aspect, the STA 4052 may determine the multicast schedule of the service (e.g., because the STA 4052 was the first device to initiate the service). After determining the multicast schedule, the STA 4052 may propagate the schedule to the STAs 4054, 4056, 4058 in a message 4062. The message may indicate that the multicast schedule is to be propagated to other devices requesting to join or subscribe to the service. For example, the STA 4060 may join the NAN cluster 4050 and discover the service based on peer discovery signals received from the STA 4058, for example. As a result, the STA 4060 may want to join the service and initiate NDL set up. Unlike the STA 4012 in FIG. 40A, however, the STA 4060 may initiate NDL set up via any of the STAs 4052, 4054, 4056, 4058. In this example, the STA 4058 may receive the multicast schedule from the STA 4052 (or another STA) and transmit the same multicast schedule in a second message 4064 to the STA 4060. The multicast schedule may be an immutable schedule. In another aspect, the second message 4064 may indicate whether the multicast schedule is associated with a one-to-many service/NDL or a many-to-many service/NDL.

In one configuration, referring to FIGS. 40A-B, a device (e.g., the service anchor in FIG. 40A or the publisher of the service in FIG. 40B), may indicate that multicast traffic is available (e.g., in a paging window). For example, the device may transmit (or broadcast) a message that includes a multicast ID, which may identify a multicast group (e.g., a group of users subscribing to the multicast service). In an aspect, the publisher (or source of the multicast or founder of the NDL) may select the multicast ID to identify the multicast group. The multicast ID may be a 6-octet value (e.g., similar to a MAC address value). As devices interested in the multicast service join the multicast group, the multicast ID may be used to identify traffic for the multicast group. For example, if the device has multicast traffic to announce, the device may indicate the multicast ID in the paging window or in some other traffic announcement period. In one aspect, the device may select from a pool of multicast addresses. For example, the founder of the multicast group (e.g., the publisher) determine a unique multicast ID associated with a multicast service. The founder of the multicast group may have different methods for determining the unique multicast ID. In one aspect, the founder may pick one address from the pool of addresses. In another aspect, the founder may randomly generate the multicast ID. In yet another aspect, the founder may use an algorithm to generate the multicast ID (e.g., a hash of the multicast service name and the MAC address of the founder). In another aspect, the entire multicast ID may be advertised during a discovery window (e.g., NAN discovery window). In another aspect, instead of advertising the entire multicast ID, the pool of addresses may include a set of addresses with a common subset of higher bytes but different lower bytes. In this aspect, the traffic advertisement may only advertise the lower bytes of the multicast address that represents a partial multicast address. When one publisher or service anchor of the multicast service advertises the multicast address in the NAN, another device trying to form a different multicast group may determine that the multicast address is in use and select a different address, thereby avoiding address collision (e.g., two groups using the same multicast address).

Because a NAN may have multiple multicast groups that may share the same schedule, a device may be awake during a time period when its multicast group is scheduled to be awake but there is not traffic associated with the multicast group. Nevertheless, other multicast groups may transmit during the time period. The multicast ID may be used to filter multicast traffic associated with multicast groups to which wireless devices are subscribed and not subscribed. For example, if a wireless device is scheduled to be awake during a time duration, but does not receive traffic announcements that include a multicast ID associated with a multicast service to which the wireless device is subscribed, then the wireless device may enter a sleep mode. The wireless device may ignore multicast IDs that are not of interested to the wireless device and enter a sleep mode when the wireless device only receives multicast IDs associated with multicast services not subscribed to by the wireless device.

In another aspect, instead of transmitting all or a portion of the multicast ID, the pool of available multicast IDs may be associated with bitmap, such that each position in the bitmap corresponds to a single multicast ID. When a position within the bitmap is set to 0, then no traffic will be transmitted for the multicast ID, but if the position is set to 1, then traffic is expected for the multicast ID. The bitmap may be transmitted, for example, during a paging window for traffic announcement.

In another aspect, the multicast group may support the concept of single authentication for group authorization. Once a first device joins a multicast group, the first device may act as an enroller (or authenticator) for a second device, or any number of devices, to join the multicast group. When the second device joins the multicast group, the second device may inherit the multicast schedule from a parent device (e.g., the first device that authenticated the second device to join the multicast group). In an aspect, the second device may join the multicast group by transmitting a multicast request to the first device. Upon receiving the multicast request, the second device may transmit a multicast response indicating whether the request is accepted or rejected. If the request is accepted, the multicast response may also include a multicast schedule (e.g., a multicast attribute). If multicast security is required, the second device may transmit a multicast security confirm message after receiving multicast response. Subsequently, the first device may transmit a security install message. Although this procedure is described with respect to the second device, the first device may perform a similar procedure with respect to the publisher.

Figure 41:
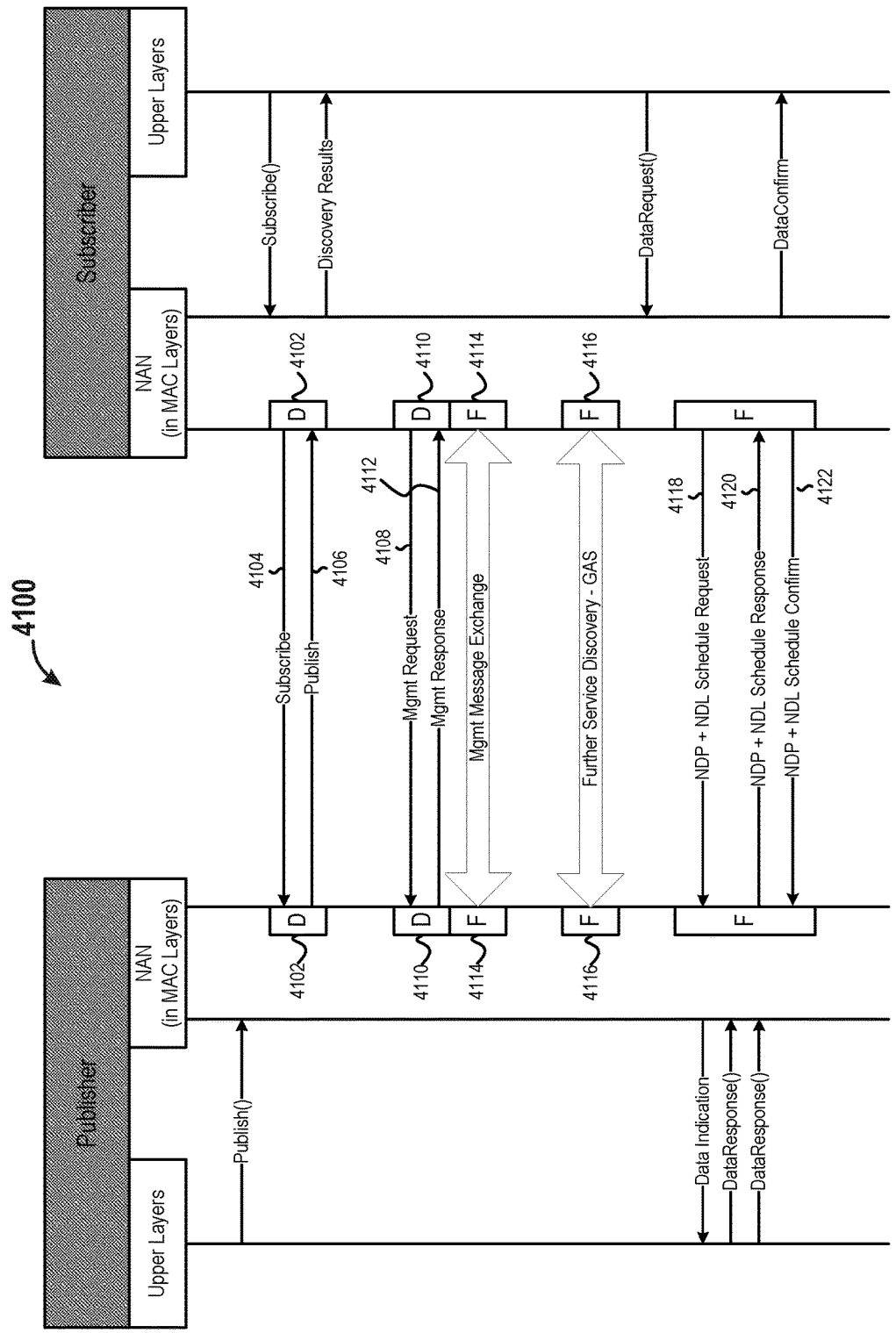
FIG. 41 illustrates a call flow and function call diagram between a publisher and a subscriber.

FIG. 41 illustrates a call flow and function call diagram 4100 between a publisher and a subscriber. Referring to FIG. 41, a publisher may be a wireless device with upper layers (e.g., application and service layers) and MAC layers (e.g., a NAN layer) for data communication. The publisher may have one or more services (e.g., a card game service) available for subscription to one or more subscribers. Similarly, a subscriber may be a wireless device with upper layers (e.g., application and service layers) and MAC layers (e.g., a NAN layer) for data communication. The subscriber may be interested in joining one or more services.

Referring to FIG. 41, the subscriber and the publisher may become aware of the other's presence through peer discovery during a first discovery window 4102, for example. An application on the subscriber may want to determine available services on the publisher. The application may issue a subscribe( ) primitive (e.g., a primitive may be a function call) to a NAN layer, which may be within the MAC layer for NAN communications. In response, the NAN layer in the subscriber may transmit a subscription message 4104 to the publisher.

An application on the publisher may determine, for example, that a card game service is available and may issue a publish( ) primitive. The publish( ) primitive may cause the NAN layer to publish the service. The NAN layer may transmit a publish message 4106 within the first discovery window 4102 indicating that one or more services is available for subscription. In an aspect, the subscription message 4104 may include a request for services available at the publisher, and the publisher may transmit the publish message 4106 in response to receiving the subscription message 4104.

The NAN layer of the subscriber may receive the publish message 4106 from the publisher and transmit the discovery results to the applications in the subscriber. Based on the discovery results, the subscriber may determine one or more services, if any, in which the subscriber is interested. Assuming the subscriber is interested in at least one of the services provided by the publisher, the subscriber may transmit a management request 4108 indicating that the subscriber is interested in at least one of the services offered by the publisher. The management request 4108 may initiate the connection setup for a NDL between the publisher and the subscriber. In an aspect, the management request 4108 may indicate times during which the subscriber is available to negotiate NDL setup or to exchange messages for NDL setup. Upon receiving the management request 4108, the publisher may respond by transmitting a management response 4112. The management response 4112 may indicate times during which the publisher is available to negotiate NDL setup or to exchange messages for NDL setup. In some instances, because discovery windows (e.g., the second discovery window 4110) may not have sufficient duration for the publisher and the subscriber to negotiate times for connection set up, the publisher and the subscriber may utilize a first further availability window 4114 to perform any additional management message exchanges. In an aspect, in case the publisher has additional services to provide, or has additional information about the provided services, the publisher may indicate such services or services related information during the additional management message exchange. In another aspect, the publisher and the subscriber may utilize additional further availability windows (e.g., a second further availability window 4116) for further service discovery.

After determining the services available on the publisher, information related to the services, and/or times for connection setup, the application on the subscriber may determine to request data associated with one or more services available on the publisher. The application may execute a datarequest( ) primitive, which may cause the NAN layer on the subscriber to transmit an NDL schedule request message 4118. The NDL schedule request message 4118 may indicate that the subscriber is requesting an NDL schedule (e.g., a multicast NDL schedule) associated with a service. In an aspect, the NDL schedule request message 4118 may indicate whether the service is a one-to-many or many-to-many service. In another aspect, the NDL schedule request message 4118 may indicate capability information associated with the subscriber. The capability information may include a minimum communication bandwidth of the subscriber, a minimum data rate of the subscriber, wireless standard compatibility information of the subscriber, a minimum number of supported spatial streams of the subscriber, one or more channel capabilities of the subscriber, and/or one or more physical layer capabilities of the subscriber.

Upon receiving the NDL schedule request message 4118, the NAN layer of the publisher may transmit a data indication to one or more applications associated with the corresponding one or more requested services. The data indications may indicate that the subscriber is requesting data associated with the one or more applications. In an aspect, the publisher may determine whether to transmit an NDL schedule to the subscriber based on capability information received from the subscriber. If the publisher determines that the subscriber's capabilities are not compatible with the requested service, then the publisher may refuse to initiate NDL connection setup. By contrast, if the publisher determines that the subscriber's capabilities are compatible, then the publisher may continue connection setup. Based on the received NDL schedule request message 4118, the applications may execute data response( ) primitives. The data response( ) primitives may trigger the NAN layer in the publisher to transmit an NDL schedule response message 4120. The NDL schedule response message 4120 may include a multicast schedule for each of the requested services. In another aspect, the publisher may transmit a different NDL schedule response message for each multicast schedule. The NDL schedule response message 4120 may indicate whether the NDL schedule is associated with a one-to-many service or a many-to-many service. In an aspect, the schedule included in the NDL schedule response message 4120 may be immutable. Upon receiving the schedule in the NDL schedule response message 4120, the NAN layer in the subscriber may transmit a data confirmation signal to the application requesting the service. The NAN layer in the subscriber may also transmit an NDL schedule confirmation message 4122 indicating that the NDL between the publisher and the subscriber is establish based on the multicast schedule transmitted by the publisher.

Figure 42:
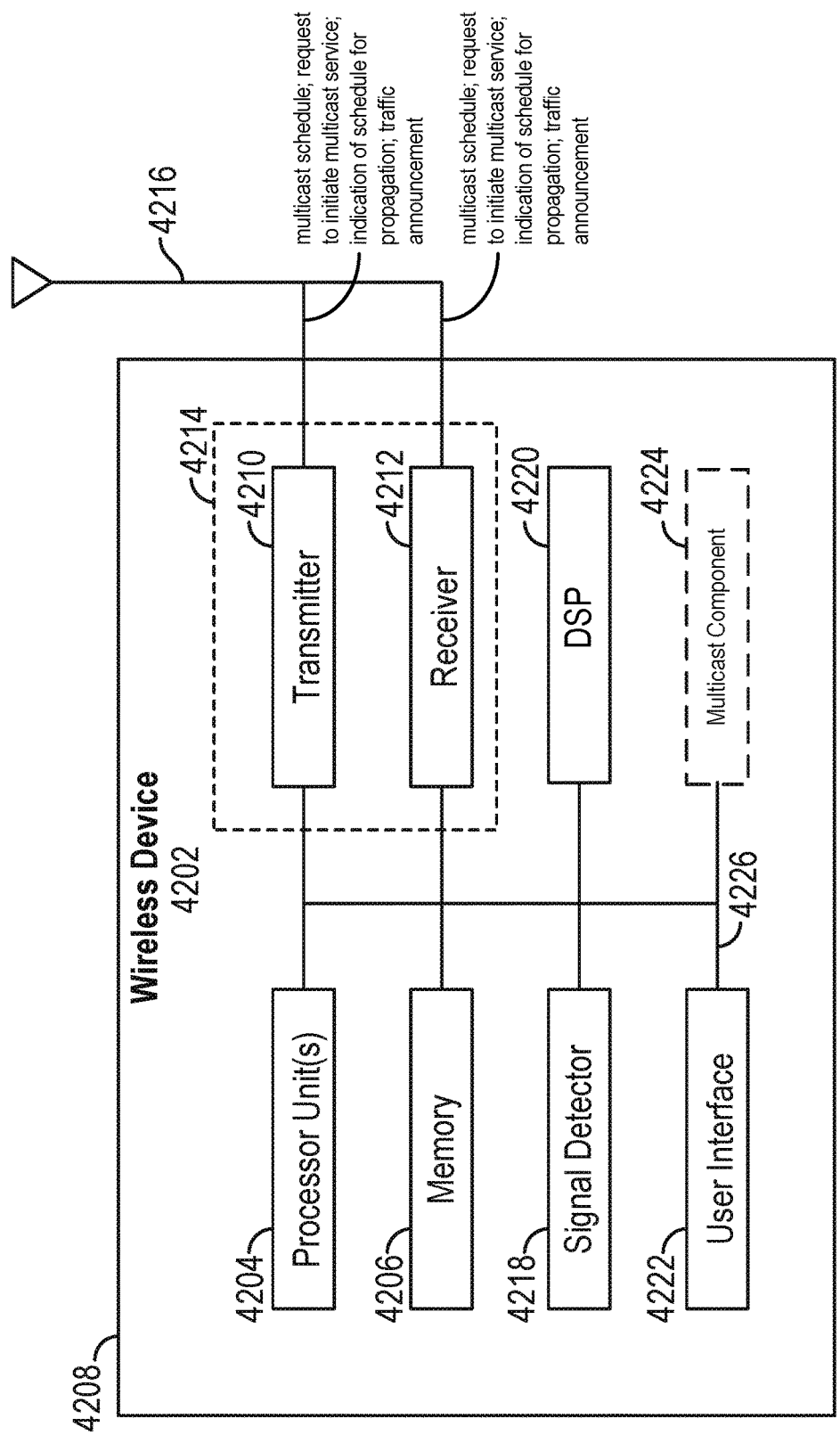
FIG. 42 shows an example functional block diagram of a wireless device that may perform NAN connection setup within the wireless communication system of FIG. 1.

FIG. 42 shows an example functional block diagram of a wireless device 4202 that may perform NAN connection setup within the wireless communication system 100 of FIG. 1. The wireless device 4202 is an example of a device that may be configured to implement the various methods described herein. For example, the wireless device 4202 may comprise one of the STAs 4002, 4052.

The wireless device 4202 may include a processor 4204, which controls operation of the wireless device 4202. The processor 4204 may also be referred to as a CPU. Memory 4206, which may include both ROM and RAM, may provide instructions and data to the processor 4204. A portion of the memory 4206 may also include NVRAM. The processor 4204 typically performs logical and arithmetic operations based on program instructions stored within the memory 4206. The instructions in the memory 4206 may be executable (by the processor 4204, for example) to implement the methods described herein.

The processor 4204 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 4202 may also include a housing 4208, and the wireless device 4202 may include a transmitter 4210 and/or a receiver 4212 to allow transmission and reception of data between the wireless device 4202 and a remote device. The transmitter 4210 and the receiver 4212 may be combined into a transceiver 4214. An antenna 4216 may be attached to the housing 4208 and electrically coupled to the transceiver 4214. The wireless device 4202 may also include multiple transmitters, multiple receivers, multiple transceivers, and/or multiple antennas.

The wireless device 4202 may also include a signal detector 4218 that may be used to detect and quantify the level of signals received by the transceiver 4214 or the receiver 4212. The signal detector 4218 may detect such signals as total energy, energy per subcarrier per symbol, power spectral density, and other signals. The wireless device 4202 may also include a DSP 4220 for use in processing signals. The DSP 4220 may be configured to generate a packet for transmission. In some aspects, the packet may comprise a PPDU.

The wireless device 4202 may further comprise a user interface 4222 in some aspects. The user interface 4222 may comprise a keypad, a microphone, a speaker, and/or a display. The user interface 4222 may include any element or component that conveys information to a user of the wireless device 4202 and/or receives input from the user.

When the wireless device 4202 is implemented as a STA (e.g., the STA 114, the STA 4002, the STA 4058, the STA 4012, or the STA 4060), the wireless device 4202 may also comprise a multicast component 4224.

In one embodiment, the multicast component 4224 may be configured to determine a multicast schedule for communicating data associated with a service over an NDL and to transmit the multicast schedule to at least one other wireless device. In one aspect, the wireless device 4202 may be a service anchor for the service, and the service anchor may be a sole entity responsible for communicating the multicast schedule associated with the service. In another aspect, the wireless device 4202 may not publish the service. In another aspect, the multicast component 4224 may be configured to receive a request from the at least one other wireless device to initiate the NDL for the service, and the multicast schedule may be an immutable schedule. In another aspect, the service may remain available for subscription by another wireless device based on an availability of the multicast component 4224 to communicate the multicast schedule. In another configuration, the multicast component 4224 may be configured to transmit a message indicating that the multicast schedule is for propagation to other wireless devices requesting subscription to the service. In another aspect, the multicast schedule may be associated with an instance of the service, and the multicast schedule may be different from a set of multicast schedules associated with different instances of the service. In another configuration, the multicast component 4224 may be configured to receive a message that indicates the multicast schedule, and the multicast schedule may be determined based on the received message. In another aspect, the message may indicate that the multicast schedule is for propagation to other wireless devices requesting subscription to the service. In another configuration, the multicast component 4224 may be configured to determine whether the service is a one-to-many or many-to-many service during service initialization. In an aspect, the multicast schedule may be associated with a service identifier and a service instance identifier related to the service. In another configuration, the multicast component 4224 may be configured to indicate from an application or a service layer whether the service is a one-to-many or a many-to-many service during service initialization through a data link initialization primitive In another configuration, the multicast component 4224 may be configured to transmit a traffic announcement that includes a multicast identifier associated with the service, and the traffic announcement may indicate that data will be transmitted for the service.

In another configuration, the multicast component 4224 may be configured to transmit a message to a second wireless device to request a multicast schedule for communicating data associated with a service over an NDL. The multicast component 4224 may be configured to receive a second message from the second wireless device based on the transmitted message. The second message may include the multicast schedule for communicating data associated with the service over the NDL. In an aspect, the multicast schedule may be inherited from a service provider of the service. In another aspect, the wireless device 4202 may be allowed to authenticate a third wireless device to join the NDL after successfully authenticating with the second wireless device to join the NDL. In one configuration, the multicast component 4224 may be configured to receive a CGK after being authenticated by the second wireless device. The CGK may enable single authentication group authorization for encrypting and decrypting group-addressed traffic associated with the NDL. In another aspect, the multicast schedule may be an immutable schedule. In another aspect, the second message may indicate that the multicast schedule is for propagation to other wireless devices requesting subscription to the service. In another aspect, the second wireless device may be a service anchor for the service, and the second wireless device may be a sole entity responsible for communicating the multicast schedule associated with the service. In another configuration, the multicast component 4224 may be configured to determine whether the service is a one-to-many or many-to-many service during service initialization. In another configuration, the multicast component 4224 may be configured to indicate from an application or a service layer whether the service is a one-to-many or a many-to-many service during service initialization through a data link initialization primitive. In another configuration, the multicast component 4224 may be configured to receive a traffic announcement that includes a multicast identifier associated with a multicast service. The traffic announcement may indicate that data will be transmitted for the multicast service. In another configuration, the multicast component 4224 may be configured to determine whether to enter a sleep mode based on the received traffic announcement.

The various components of the wireless device 4202 may be coupled together by a bus system 4226. The bus system 4226 may include a data bus, for example, as well as a power bus, a control signal bus, and a status signal bus in addition to the data bus. Components of the wireless device 4202 may be coupled together or accept or provide inputs to each other using some other mechanism.

Although a number of separate components are illustrated in FIG. 42, one or more of the components may be combined or commonly implemented. For example, the processor 4204 may be used to implement not only the functionality described above with respect to the processor 4204, but also to implement the functionality described above with respect to the signal detector 4218, the DSP 4220, the user interface 4222, and/or the multicast component 4224. Further, each of the components illustrated in FIG. 42 may be implemented using a plurality of separate elements.

Figure 43:
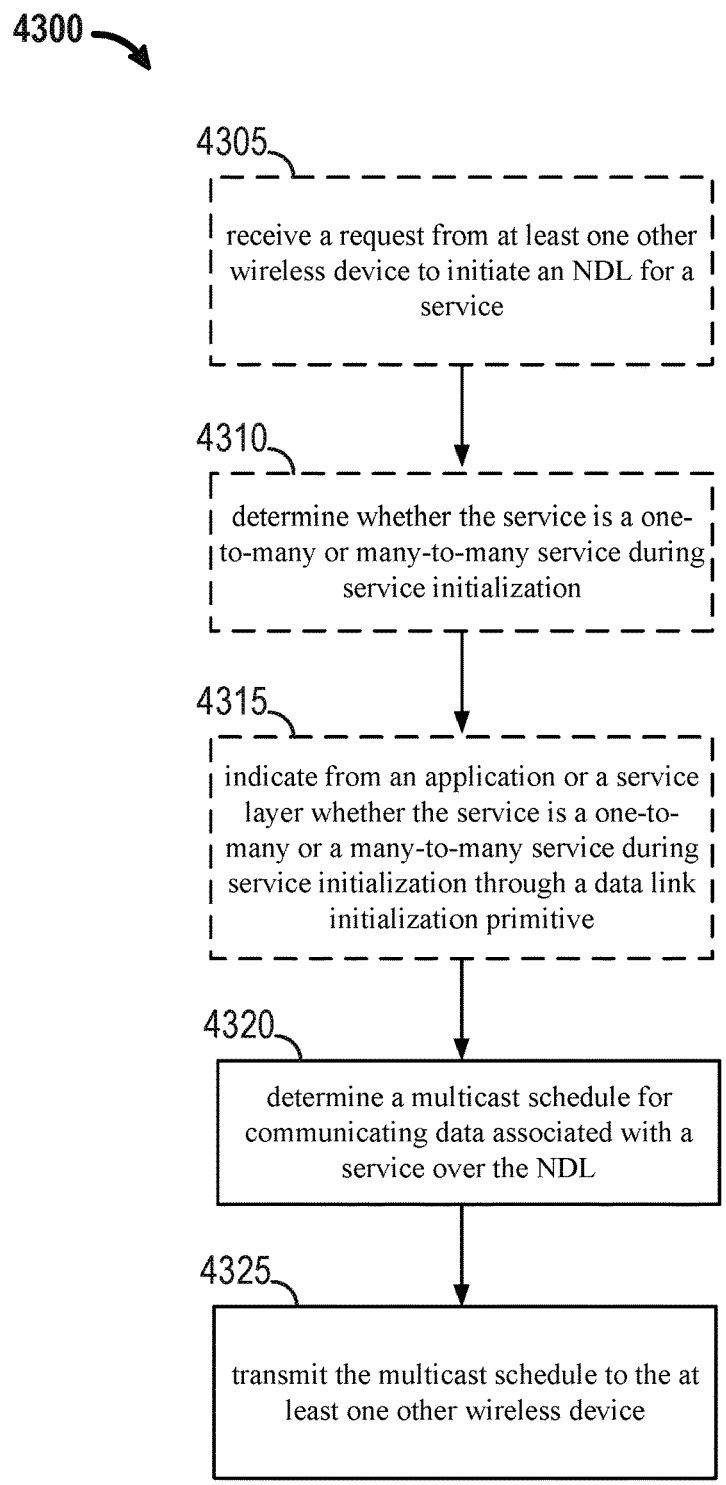
FIG. 43 is a flowchart of an exemplary method of distributing a multicast schedule via a service anchor.

FIG. 43 is a flowchart of an exemplary method 4300 of distributing a multicast schedule via a service anchor. The method 4300 may be performed using an apparatus (e.g., the STA 114, the STA 4002, or the wireless device 4202, for example). Although the method 4300 is described below with respect to the elements of wireless device 4202 of FIG. 42, other components may be used to implement one or more of the steps described herein.

At block 4305, an apparatus may receive a request from at least one other wireless device to initiate or join an NDL for a service. In an aspect, the apparatus is a service anchor for the service, and the service anchor may be the sole entity responsible for communicating the multicast schedule associated with the service. As the service anchor, the apparatus may or may not publish the service. The service may remain available for subscription by another wireless device based on an availability of the apparatus to communicate the multicast schedule. For example, referring to FIG. 40A, the apparatus may correspond to the STA 4002. The STA 4002 may be the service anchor for a card game service. The STA 4002 may receive a request from STA 4012 to initiate/join an NDL for the card game service. In this example, the STA 4002 may publish the card game service. STAs 4004, 4006, 4008, 4010 may participate in the same instance of the card game service and publish the service. As such, the NDL may be many-to-many multicast schedule that includes the STAs 4002, 4004, 4006, 4008, 4010.

At block 4310, the apparatus may determine whether the service is a one-to-many or many-to-many service during service initialization. For example, referring to FIG. 40A, the STA 4002 may determine whether the card game service requested is a one-to-many or many-to-many service during service initialization. The STA 4002 may determine whether the stored information indicates whether the service is one-to-many or many-to-many service. In an aspect, if the STA 4002 is not also a publisher of the service, the STA 4002 may receive discovery messages from publishers of the service (e.g., STAs 4004, 4008, or other STAs) that indicate whether the service is one-to-many or many-to-many. In this example, the card game service may be a many-to-many service.

At block 4315, the apparatus may indicate from an application or a service layer whether the service is a one-to-many or a many-to-many service during service initialization through a data link initialization primitive. For example, referring to FIG. 40A and FIG. 41, the STA 4002 may be a publisher of the service. The card game application or a service layer on the STA 4002 may indicate to the NAN layer on the STA 4002 that the card game service is a many-to-many service during service initialization with the subscriber (e.g., the STA 4012) by executing the dataresponse( ) data link initialization primitive.

At block 4320, the apparatus may determine a multicast schedule for communicating data associated with the service over the NDL associated with the service. For example, referring to FIG. 40A, the STA 4002 may determine the multicast schedule for communicating data associated with the card game service over the NDL among the STAs 4002, 4004, 4006, 4008, 4010 and the STA 4012. In another example, if the STA 4002 is a service anchor but is not a publisher of the service, then the NDL may be between the STA 4012 and the STAs 4004, 4006, 4008, 4010. The STA 4002 may determine if the NDL schedule for an instance of the service has already been created. An existing NDL schedule may be associated with a service ID (e.g., a hash of a service name) and an instance ID. The STA 4002 may determine if an NDL schedule exists for a particular service ID and/or instance ID. In an aspect, the service ID and instance ID may be included in the request from the STA 4012. If there is no existing NDL schedule, the STA 4002 may generate a new NDL schedule based on the type of service. For a card game service that may require frequent updates, the NDL schedule may have more frequent NDL- TBs. The STA 4002 may associate the new NDL schedule with a service ID and instance ID.

At block 4325, the apparatus may transmit the multicast schedule to the at least one other wireless device. For example, referring to FIG. 40A, the STA 4002 may transmit the NDL schedule to the STA 4012.

Figure 44:
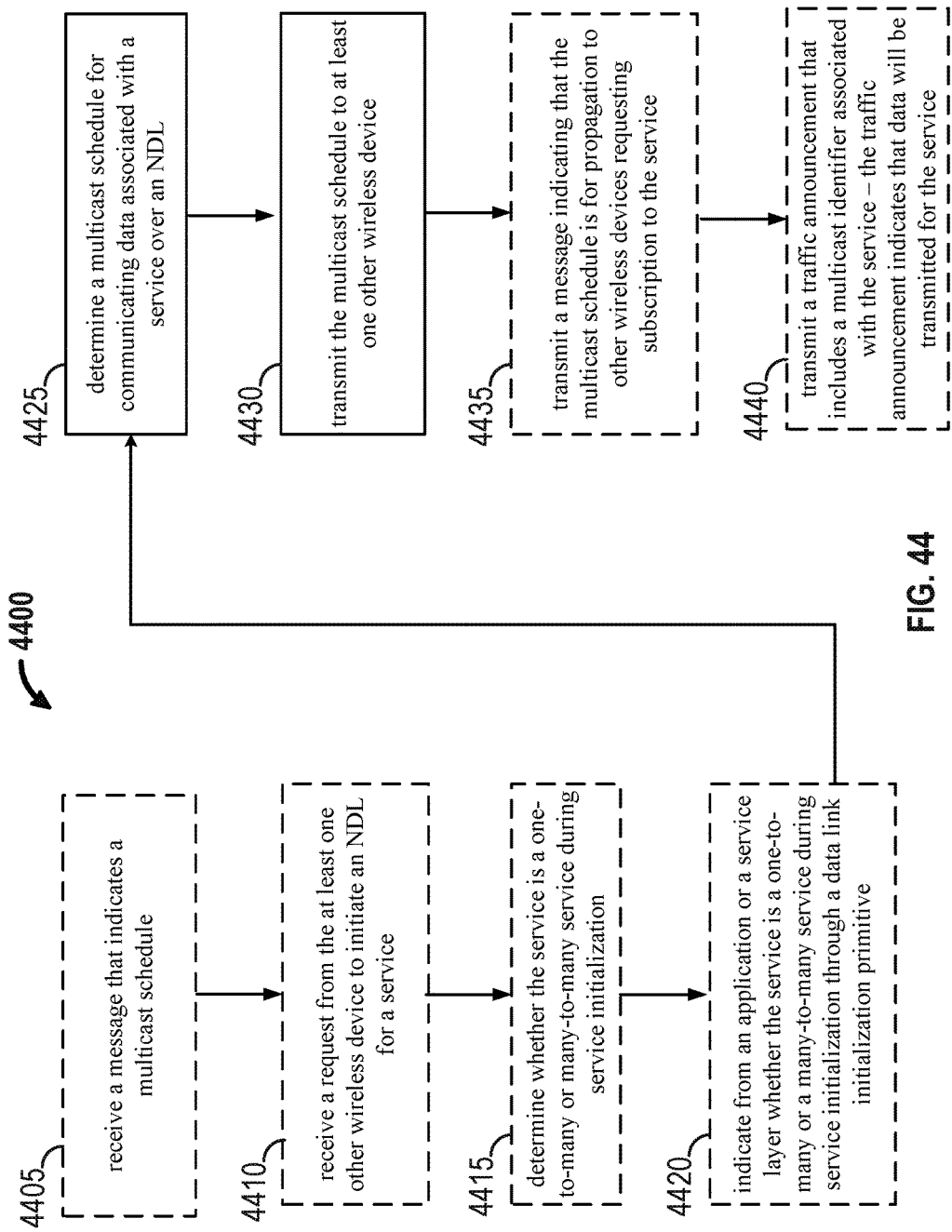
FIG. 44 is a flowchart of an exemplary method of distributing a multicast schedule via an active member of a service.

FIG. 44 is a flowchart of an exemplary method 4400 of distributing a multicast schedule via an active member of a service. The method 4400 may be performed using an apparatus (e.g., the STA 114, the STAs 4052, 4058 or the wireless device 4202, for example). Although the method 4400 is described below with respect to the elements of wireless device 4202 of FIG. 42, other components may be used to implement one or more of the steps described herein.

At block 4405, an apparatus may receive a message that indicates a multicast schedule. For example, referring to FIG. 40B, the apparatus may correspond to the STA 4058. The STA 4058 may receive the message 4062 that indicates a multicast schedule associated with an instance of a card game service. The message 4062 may indicate that the multicast schedule is for propagation to other wireless devices (e.g., the STA 4060) requesting subscription to the instance of the card game service.

At block 4410, an apparatus may receive a request from the at least one other wireless device to initiate or join the NDL for the service. For example, referring to FIG. 40B, the STA 4058 may receive a request from the STA 4060 to initiate or to join an NDL for an instance of the card game service.

At block 4415, the apparatus may determine whether the service is a one-to-many or many-to-many service during service initialization. For example, referring to FIG. 40B, the STA 4058 may determine whether the card game service requested is a one-to-many or many-to-many service during service initialization. The STA 4058 may determine whether the stored information indicates whether the service is one-to-many or many-to-many service. In this example, the card game service may be a many-to-many service.

At block 4420, the apparatus may indicate from an application or a service layer whether the service is a one-to-many or a many-to-many service during service initialization through a data link initialization primitive. For example, referring to FIG. 40B and FIG. 41, the card game application or a service layer on the STA 4058 may indicate to the NAN layer on the STA 4058 that the card game service is a many-to-many service during service initialization with the subscriber (e.g., the STA 4060) by executing the dataresponse( ) data link initialization primitive.

At block 4425, the apparatus may determine a multicast schedule for communicating data associated with the service over the NDL associated with the service. For example, referring to FIG. 40B, the STA 4058 may determine the multicast schedule for communicating data associated with the card game service over the NDL among the STAs 4052, 4054, 4056, 4058 and the STA 4060. The STA 4058 may determine if the NDL schedule for an instance of the service has already been created. An existing NDL schedule may be associated with a service ID (e.g., a hash of a service name) and an instance ID. The STA 4058 may determine if an NDL schedule exists for a particular service ID and/or instance ID. In an aspect, the service ID and instance ID may be included in the request from the STA 4060. If there is no existing NDL schedule, the STA 4058 may generate a new NDL schedule based on the type of service. For a card game service that may require frequent updates, the NDL schedule may have more frequent NDL-TBs. The STA 4058 may associate the new NDL schedule with a service ID and instance ID.

At 4435, the apparatus may transmit a message indicating that the multicast schedule is for propagation to other wireless devices requesting subscription to the service. For example, referring to FIG. 40B, the STA 4058 may transmit the second message 4064 to the STA 4060 indicating that the multicast schedule is for propagation to other wireless devices requesting subscription to the service. As such, if another wireless device initiates connection setup with the STA 4060 for the same instance of the card game service, then the STA 4060 may provide the same multicast schedule.

At 4440, the apparatus may transmit a traffic announcement that includes a multicast identifier associated with the service. The traffic announcement may indicate that data will be transmitted for the service. For example, referring to FIG. 40B, the STA 4058 may transmit a traffic announcement that includes a multicast identifier associated with the card game service. In another example, the STA 4052 may transmit the traffic announcement.

Figure 45:
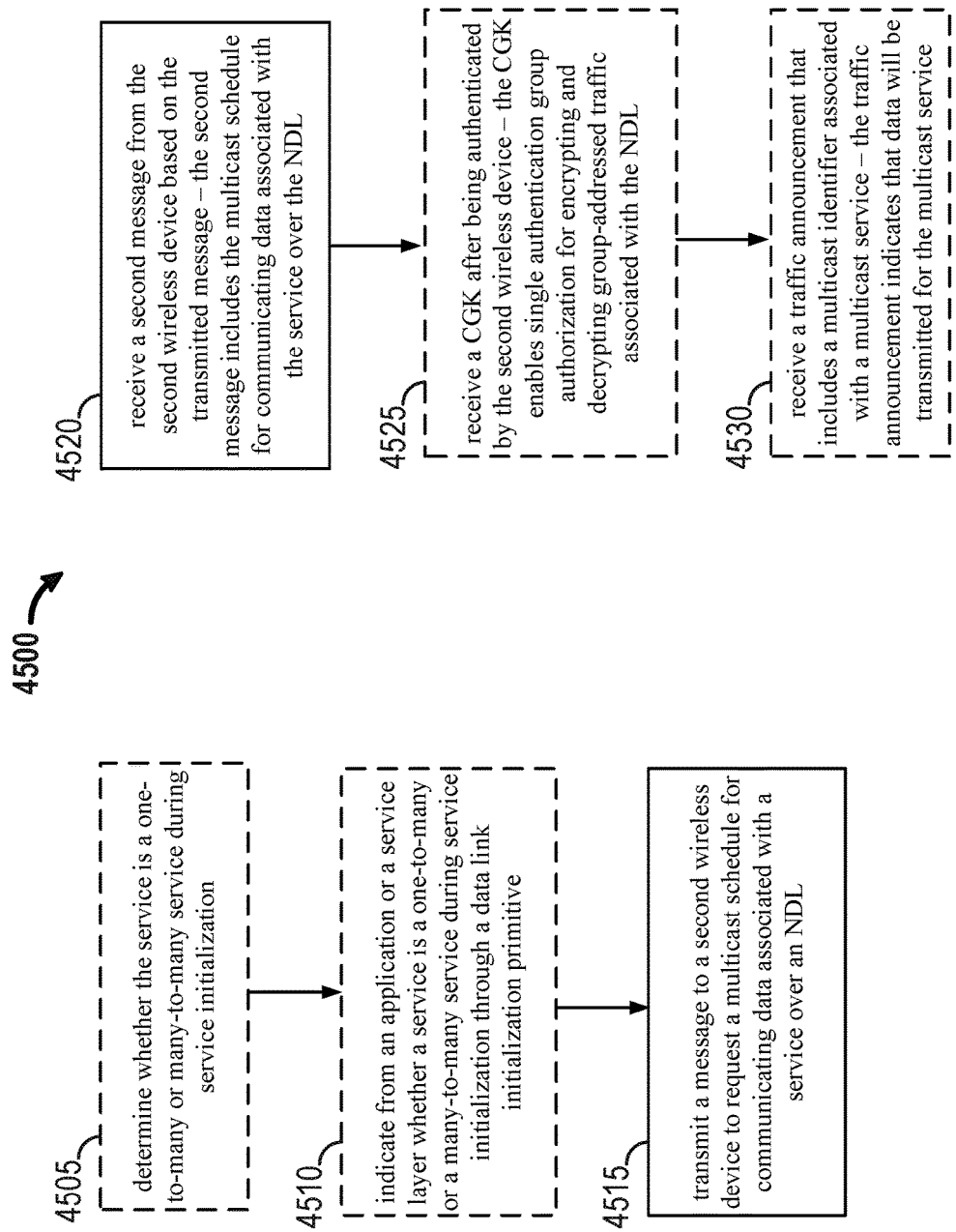
FIG. 45 is a flowchart of an exemplary method of receiving a multicast schedule via an active member of a service.

FIG. 45 is a flowchart of an exemplary method 4500 of receiving a multicast schedule via an active member of a service. The method 4500 may be performed using an apparatus (e.g., the STA 114, the STA 4012, the STA 4060, or the wireless device 4202, for example). Although the method 4500 is described below with respect to the elements of wireless device 4202 of FIG. 42, other components may be used to implement one or more of the steps described herein.

At block 4505, an apparatus may determine whether the service is a one-to-many or many-to-many service during service initialization. For example, referring to FIG. 40A, the STA 4012 may receive information regarding the service during one or more discovery windows. The information may indicate whether the service is a one-to-many or many-to-many service. In another aspect, the information may indicate a service ID and an instance ID associate with the service. Based on the service ID and/or the instance ID, the STA 4012 may be able to determine whether the service is a one-to-many or many-to-many service. In another example, the STA 4060 may make similar determinations.

At block 4510, the apparatus may indicate from an application or a service layer whether a service is a one-to-many or a many-to-many service during service initialization through a data link initialization primitive. For example, referring to FIG. 40A and FIG. 41, the STA 4012 may be a subscriber of the service. The card game application or a service layer on the STA 4012 may indicate to the NAN layer on the STA 4012 that the card game service is a many-to-many service during service initialization with the publisher (e.g., the STA 4002) by executing the datarequest( ) data link initialization primitive.

At block 4515, the apparatus may transmit a message to a second wireless device to request a multicast schedule for communicating data associated with a service over an NDL. For example, referring to FIG. 40A, the STA 4012 may transmit the message to the STA 4002 to request a multicast schedule for communicating data associated with a service over the NDL. In another example, referring to FIG. 40B, the STA 4060 may transmit the message to the STA 4058 to request the multicast schedule for communicating data associated with a service over the NDL.

At block 4520, the apparatus may receive a second message from the second wireless device based on the transmitted message. The second message may include the multicast schedule for communicating data associated with the service over the NDL. For example, referring to FIG. 40A, the STA 4012 may receive the multicast schedule in a message from the STA 4002. In another example, referring to FIG. 40B, the STA 4060 may receive the multicast schedule in a message from the STA 4058.

At block 4525, the apparatus may receive a CGK after being authenticated by the second wireless device. The CGK may enable single authentication group authorization for encrypting and decrypting group-addressed traffic associated with the NDL. For example, referring to FIG. 40A, the STA 4012 may receive a CGK from the STA 4002 after being authenticated by the STA 4002.

At block 4530, the apparatus may receive a traffic announcement that includes a multicast identifier associated with a multicast service. The traffic announcement may indicate\ that data will be transmitted for the multicast service. For example, referring to FIG. 40A, the STA 4012 may receive a traffic announcement that includes a multicast identifier associated with the multicast service provided by the STA 4002.

Figure 46:
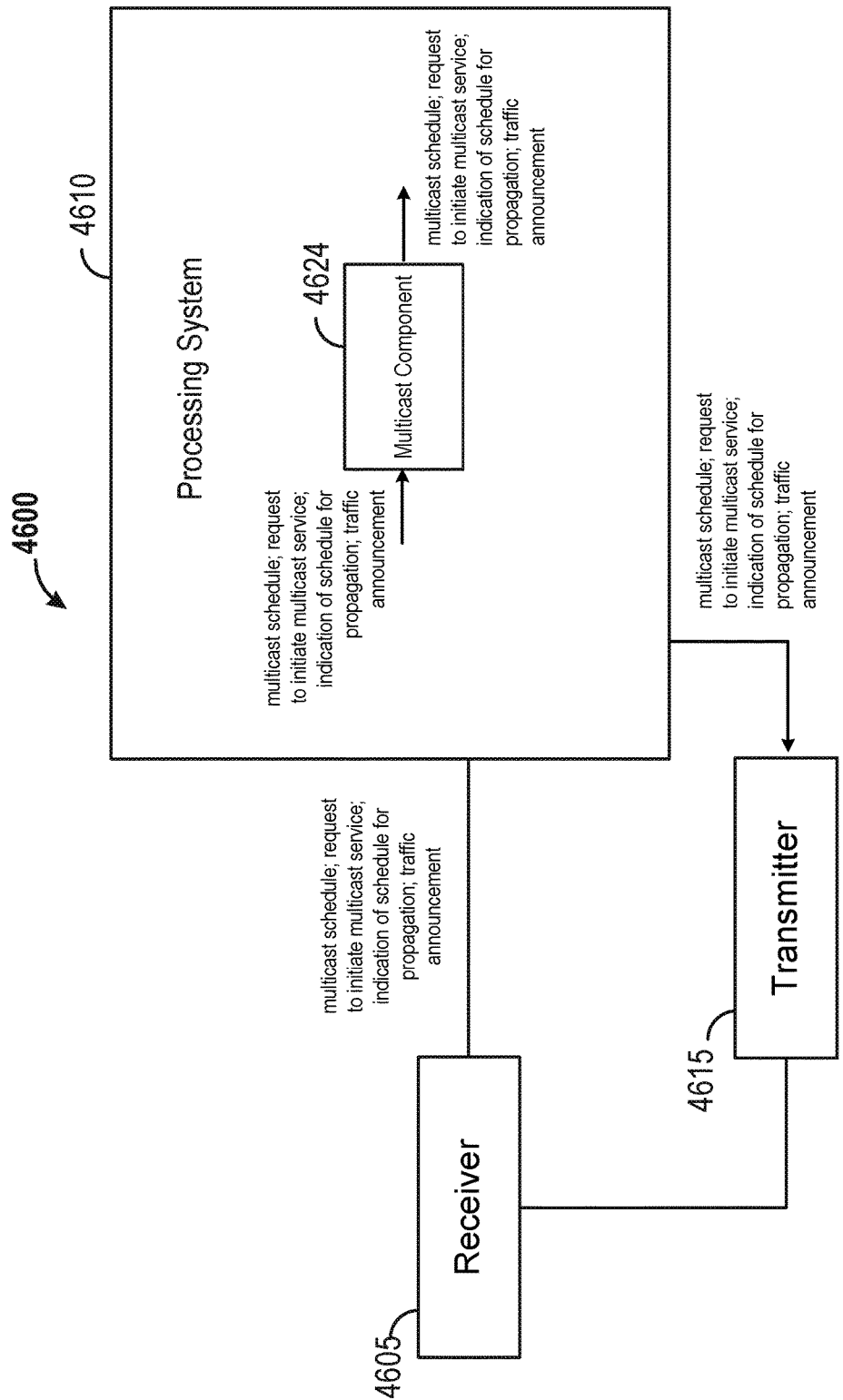
FIG. 46 is a functional block diagram of an example wireless communication device that performs connection setup.

FIG. 46 is a functional block diagram of an example wireless communication device 4600 that performs connection setup. The wireless communication device 4600 may include a receiver 4605, a processing system 4610, and a transmitter 4615. The processing system 4610 may include a multicast component 4624.

In one embodiment, the multicast component 4624 and/or the processing system 4610 may be configured to determine a multicast schedule for communicating data associated with a service over an NDL. The multicast component 4624, the processing system 4610, and/or the transmitter 4615 may be configured to transmit the multicast schedule to at least one other wireless device. In one aspect, the wireless communication device 4600 may be a service anchor for the service, and the service anchor may be a sole entity responsible for communicating the multicast schedule associated with the service. In another aspect, the wireless communication device 4600 may not publish the service. In another aspect, the multicast component 4624, the processing system 4610, and/or the receiver 4605 may be configured to receive a request from the at least one other wireless device to initiate the NDL for the service, and the multicast schedule may be an immutable schedule. In another aspect, the service may remain available for subscription by another wireless device based on an availability of the wireless communication device 4600 to communicate the multicast schedule. In another configuration, the multicast component 4624, the processing system 4610, and/or the transmitter 4615 may be configured to transmit a message indicating that the multicast schedule is for propagation to other wireless devices requesting subscription to the service. In another aspect, the multicast schedule may be associated with an instance of the service, and the multicast schedule may be different from a set of multicast schedules associated with different instances of the service. In another configuration, the multicast component 4624, the processing system 4610, and/or the receiver 4605 may be configured to receive a message that indicates the multicast schedule, and the multicast schedule may be determined based on the received message. In another aspect, the message may indicate that the multicast schedule is for propagation to other wireless devices requesting subscription to the service. In another configuration, the multicast component 4624 and/or the processing system 4610 may be configured to determine whether the service is a one-to-many or many-to-many service during service initialization. In an aspect, the multicast schedule may be associated with a service identifier and a service instance identifier related to the service. In another configuration, the multicast component 4624 and/or the processing system 4610 may be configured to indicate from an application or a service layer whether the service is a one-to-many or a many-to-many service during service initialization through a data link initialization primitive. In another configuration, the multicast component 4624, the processing system 4610, and/or the transmitter 4615 may be configured to transmit a traffic announcement that includes a multicast identifier associated with the service, and the traffic announcement may indicate that data will be transmitted for the service.

In another embodiment, the multicast component 4624, the processing system 4610, and/or the transmitter 4615 may be configured to transmit a message to a second wireless device to request a multicast schedule for communicating data associated with a service over an NDL. The multicast component 4624, the processing system 4610, and/or the receiver 4605 may be configured to receive a second message from the second wireless device based on the transmitted message. The second message may include the multicast schedule for communicating data associated with the service over the NDL. In an aspect, the multicast schedule may be inherited from a service provider of the service. In another aspect, the wireless communication device 4600 may be allowed to authenticate a third wireless device to join the NDL after successfully authenticating with the second wireless device to join the NDL. In one configuration, the multicast component 4624, the processing system 4610, and/or the receiver 4605 may be configured to receive a CGK after being authenticated by the second wireless device. The CGK may enable single authentication group authorization for encrypting and decrypting group-addressed traffic associated with the NDL. In another aspect, the multicast schedule may be an immutable schedule. In another aspect, the second message may indicate that the multicast schedule is for propagation to other wireless devices requesting subscription to the service. In another aspect, the second wireless device may be a service anchor for the service, and the second wireless device may be a sole entity responsible for communicating the multicast schedule associated with the service. In another configuration, the multicast component 4624 and/or the processing system 4610 may be configured to determine whether the service is a one-to-many or many-to-many service during service initialization. In another configuration, the multicast component 4624 and/or the processing system 4610 may be configured to indicate from an application or a service layer whether the service is a one-to-many or a many-to-many service during service initialization through a data link initialization primitive. In another configuration, the multicast component 4624, the processing system 4610, and/or the receiver 4605 may be configured to receive a traffic announcement that includes a multicast identifier associated with a multicast service. The traffic announcement may indicate that data will be transmitted for the multicast service. In another configuration, the multicast component 4624 and/or the processing system 4610 may be configured to determine whether to enter a sleep mode based on the received traffic announcement.

The transmitter 4615, the processing system 4610, and/or the multicast component 4624 may be configured to perform one or more functions discussed above with respect to blocks 4305, 4310, 4315, 4320, and 4325 of FIG. 43, to blocks 4405, 4410, 4415, 4420, 4425, 4430, 4435, and 4440 of FIG. 44, and to blocks 4505, 4510, 4515, 4520, 4525, and 4530 of FIG. 45. The receiver 4605 may correspond to the receiver 4212. The processing system 4610 may correspond to the processor 4204. The transmitter 4615 may correspond to the transmitter 4210. The multicast component 4624 may correspond to the multicast component 126, and/or the multicast component 4224.

In one embodiment, the wireless communication device 4600 may include means for determining a multicast schedule for communicating data associated with a service over an NDL and means for transmitting the multicast schedule to at least one other wireless device. In one aspect, the wireless communication device 4600 may be a service anchor for the service, and the service anchor may be a sole entity responsible for communicating the multicast schedule associated with the service. In another aspect, the wireless communication device 4600 may not publish the service. In another aspect, the wireless communication device 4600 may include means for receiving a request from the at least one other wireless device to initiate the NDL for the service, and the multicast schedule may be an immutable schedule. In another aspect, the service may remain available for subscription by another wireless device based on an availability of the wireless communication device 4600 to communicate the multicast schedule. In another configuration, the wireless communication device 4600 may include means for transmitting a message indicating that the multicast schedule is for propagation to other wireless devices requesting subscription to the service. In another aspect, the multicast schedule may be associated with an instance of the service, and the multicast schedule may be different from a set of multicast schedules associated with different instances of the service. In another configuration, the wireless communication device 4600 may include means for receiving a message that indicates the multicast schedule, and the multicast schedule may be determined based on the received message. In another aspect, the message may indicate that the multicast schedule is for propagation to other wireless devices requesting subscription to the service. In another configuration, the wireless communication device 4600 may include means for determining whether the service is a one-to-many or many-to-many service during service initialization. In an aspect, the multicast schedule may be associated with a service identifier and a service instance identifier related to the service. In another configuration, the wireless communication device 4600 may include means for indicating from an application or a service layer whether the service is a one-to-many or a many-to-many service during service initialization through a data link initialization primitive In another configuration, the wireless communication device 4600 may include means for transmitting a traffic announcement that includes a multicast identifier associated with the service, and the traffic announcement may indicate that data will be transmitted for the service.

For example, means for determining a multicast schedule may include the multicast component 4624 and/or the processing system 4610. Means for transmitting the multicast schedule may include the multicast component 4624, the processing system 4610, and/or the transmitter 4615. Means for receiving a request may include the multicast component 4624, the processing system 4610, and/or the receiver 4605. Means for transmitting a message may include the multicast component 4624, the processing system 4610, and/or the transmitter 4615. Means for receiving a message may include the multicast component 4624, the processing system 4610, and/or the receiver 4605. Means for determining whether the service is a one-to-many or many-to-many may include multicast component 4624 and/or the processing system 4610. Means for indicating may include the multicast component 4624 and/or the processing system 4610. Means for transmitting a traffic announcement may include the multicast component 4624, the processing system 4610, and/or the transmitter 3615.

In another embodiment, the wireless communication device 4600 may include means for transmitting a message to a second wireless device to request a multicast schedule for communicating data associated with a service over an NDL. The wireless communication device 4600 may include means for receiving a second message from the second wireless device based on the transmitted message. The second message may include the multicast schedule for communicating data associated with the service over the NDL. In an aspect, the multicast schedule may be inherited from a service provider of the service. In another aspect, the wireless communication device 4600 may be allowed to authenticate a third wireless device to join the NDL after successfully authenticating with the second wireless device to join the NDL. In another configuration, the wireless communication device 4600 may include means for receiving a CGK after being authenticated by the second wireless device. The CGK may enable single authentication group authorization for encrypting and decrypting group-addressed traffic associated with the NDL. In another aspect, the multicast schedule may be an immutable schedule. In another aspect, the second message may indicate that the multicast schedule is for propagation to other wireless devices requesting subscription to the service. In another aspect, the second wireless device may be a service anchor for the service, and the second wireless device may be a sole entity responsible for communicating the multicast schedule associated with the service. In another configuration, the wireless communication device 4600 may include means for determining whether the service is a one-to-many or many-to-many service during service initialization. In another configuration, the wireless communication device 4600 may include means for indicating from an application or a service layer whether the service is a one-to-many or a many-to-many service during service initialization through a data link initialization primitive. In another configuration, the wireless communication device 4600 may include means for receiving a traffic announcement that includes a multicast identifier associated with a multicast service. The traffic announcement may indicate that data will be transmitted for the multicast service. In another configuration, the wireless communication device 4600 may include means for determining whether to enter a sleep mode based on the received traffic announcement.

For example, means for transmitting may include the transmitter 4615, the processing system 4610, and/or the multicast component 4624. Means for receiving may include the receiver 4605, the processing system 4610, and/or the multicast component 4624. Means for receiving a common group key may include the receiver 4605, the processing system 4610, and/or the multicast component 4624. Means for determining may include the processing system 4610 and/or the multicast component 4624. Means for indicating may include the processing system 4610 and/or the multicast component 4624. Means for receiving a traffic announcement may include the multicast component 4624, the processing system 4610, and/or the receiver 4605. Means for determining whether to enter a sleep mode may include the multicast component 4624, the processing system 4610, and/or the receiver 4605.

As part of the NDP (or NDL) setup, a publisher device and a subscriber device may engage in a 4-way handshake to establish a secure connection using robust security network association (RSNA).

Figure 47:
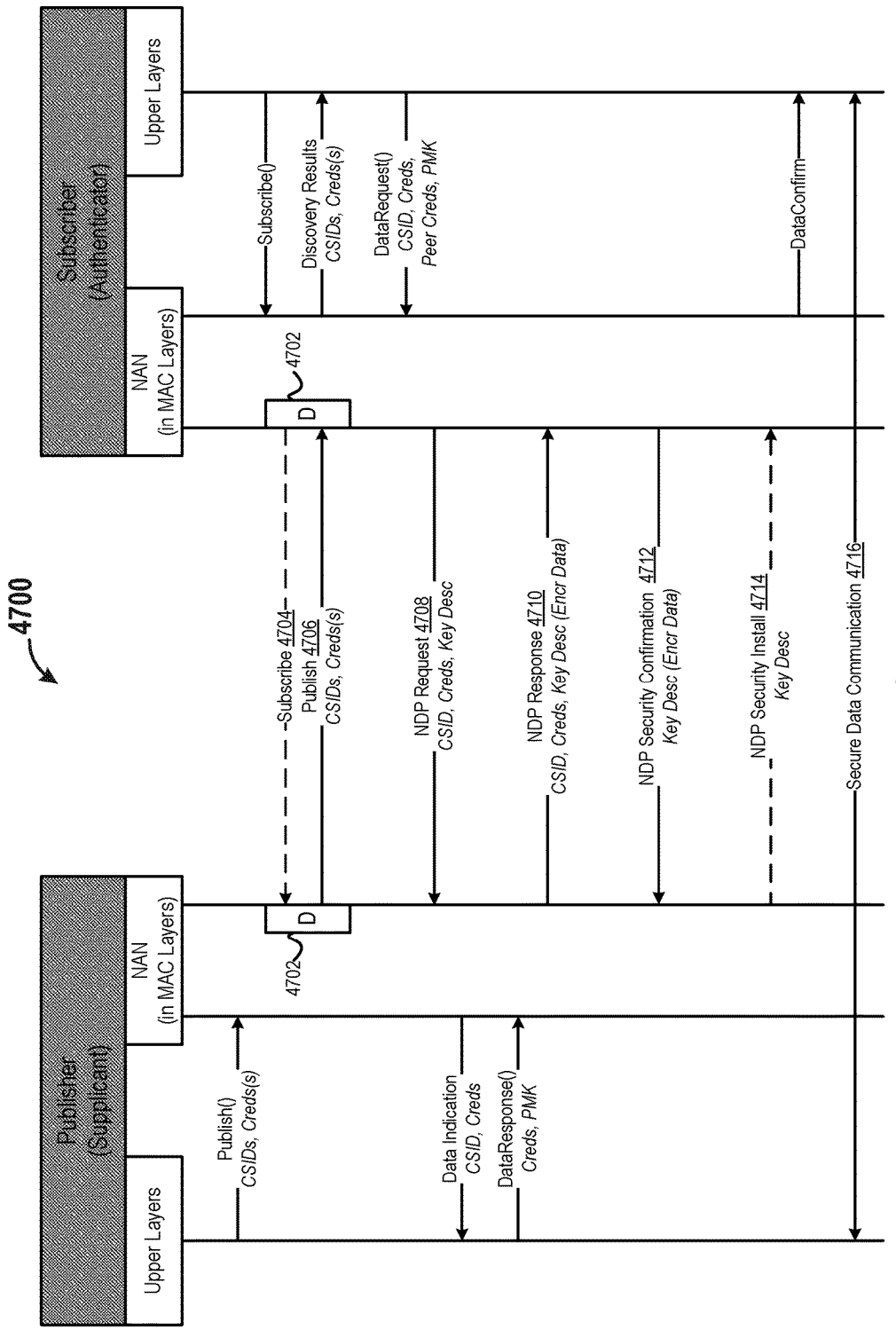
FIG. 47 illustrates a method of establishing a secure connection using RSNA.

FIG. 47 illustrates a method 4700 of establishing a secure connection using RSNA. In one aspect, the initiator of the 4-way handshake may assume the RSNA authenticator role and the responder may assume the RSNA supplicant role according to the IEEE 802.11 convention. During NDP setup, because the subscriber typically initiates a connection, the subscriber would be first to send a NDP request in the NDP 4-way handshake. As a result, the subscriber is designated as the authenticator while the publisher becomes the supplicant.

Referring to FIG. 47, a publisher may have one or more NAN services available for subscription by a subscriber. In one aspect, an application on the subscriber may intend to subscribe to a NAN service. The application may issue a subscribe( ) primitive to a NAN layer, which may be within the MAC layer for NAN communications. In response, the NAN layer in the subscriber may transmit a subscription message 4704 during a first discovery window 4702. The subscription message 4704 may indicate a request for one or more services.

An application on the publisher may determine, for example, that a service (e.g., a gaming service) is available and may issue publish( ) primitive. The publish( ) primitive may cause the NAN layer to publish the service. In one aspect, the publisher may transmit the publish message 4706 during the first discovery window 4702 in response to receiving the subscription message 4704. In another aspect, the publisher may transmit the publish message 4706 during the first discovery window 4702 without receiving the subscription message 4704. The publish message 4706 may indicate that one or more services is available for subscription on the publisher.

The NAN layer of the subscriber may receive the publish message 4706 from the publisher and transmit the discovery results to the applications in the subscriber. Based on the discovery results, the subscriber may determine one or more services, if any, in which the subscriber is interested. Assuming the subscriber is interested in at least one of the services provided by the publisher, the subscriber and the publisher may perform a 4-way handshake security negotiation.

The application on the subscriber may execute a datarequest( ) primitive, which may cause the NAN layer on the subscriber to transmit an NDP request 4708. Upon receiving the NDP request 4708, the NAN layer on the publisher may transmit a data indication to one or more applications associated with the corresponding one or more requested services. The data indication may indicate that the subscriber is requesting data associated with the one or more applications. Based on the data indication, the one or more applications on the publisher may execute a data response primitive, which may cause the NAN layer of the publisher to transmit an NDP response 4710. Upon receiving the NDP response 4710, the subscriber may transmit an NDP security confirmation 4712. Subsequently, the publisher may transmit an NDP security install message 4714 based on the received NDP security confirmation 4712. Upon receiving the NDP security install message 4714, the NAN layer of the subscriber may transmit a data confirmation message to one or more application layers indicating that the 4-way handshake is complete. The publisher and the subscriber may then have secure data communication 4716.

Referring to FIG. 47, the publisher is the entity providing a service, but the subscriber is the entity assuming the authenticator role. Ideally, the device providing the service should be the authenticator (e.g., a device authenticating new devices who want to join the NDP for the service). One solution to the problem is to have the subscriber indicate in the NDP request 4708 that the publisher is to be the authenticator in the security negotiation and the subscriber is the supplicant. For example, the subscriber may include an initiation message or field in the NDP request 4708 that indicates the publisher is to be the authenticator in the security negotiation. In this solution, the NDP request 4708 may include the initiation message. In response, to receiving the NDP request 4708, which may include a nonce from the subscribed used to derive a pairwise transient key, the publisher may transmit the NDP response 4710. In an aspect, the NDP response 4710 may include a common group key (CGK). In this aspect, the NDP security installation message 4714 may be included in the NDP response 4710. Upon receiving the NDP response 4710, the subscriber may transmit a first NDP security confirmation message (e.g., the NDP security confirmation 4712) to the publisher. The publisher may then transmit a second NDP security confirmation message to the subscriber (not pictured). In an aspect, instead of transmitting the CGK in the NDP response 4710, the CGK may be transmitted by the publisher to the subscriber in the second NDP security confirmation message. In this aspect, the second NDP security confirmation message would include the NDP security install message 4714. In another aspect, if the CGK is transmitted in the NDP response 4710, then the second NDP security confirmation message from the publisher may be omitted from the protocol. In sum, the CGK may be transmitted either in the NDP response 4710 or in the second NDP security confirmation message.

Other solutions are also possible. As further discussed below, the 4-way handshake configuration in FIG. 47 may be modified such that the publisher may act as the authenticator while the subscriber may act as the supplicant. In this configuration, the subscriber may trigger the 4-way handshake with an INIT (or initiation) message to the publisher as shown in FIG. 48.

Figure 48:
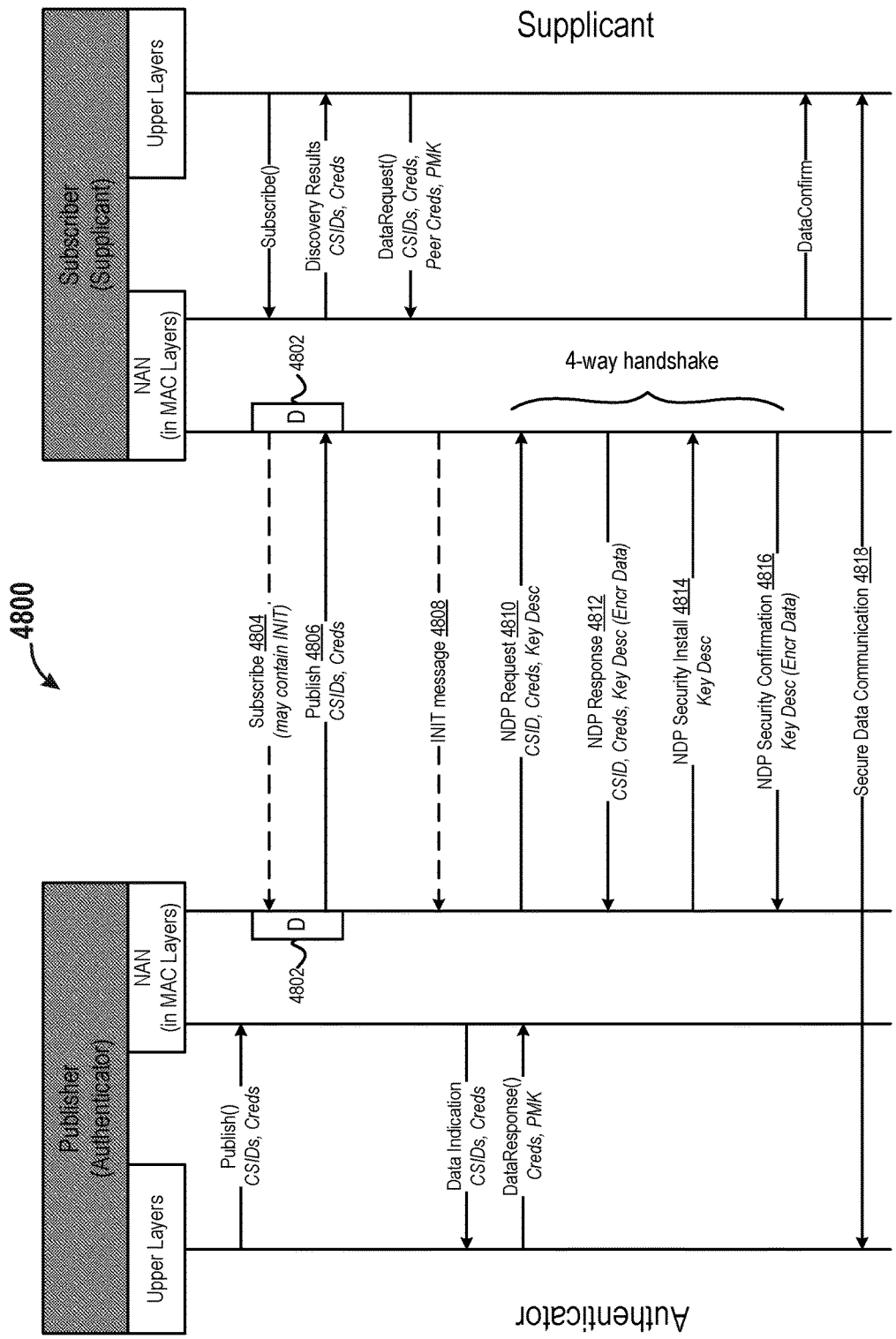
FIG. 48 illustrates a method of establishing a secure connection using RSNA in which a publisher acts as an authenticator.

FIG. 48 illustrates a method 4800 of establishing a secure connection using RSNA in which a publisher acts as an authenticator. Referring to FIG. 48, a publisher may have one or more NAN services available for subscription by a subscriber. In one aspect, an application on the subscriber may intend to subscribe to a NAN service. The application may issue a subscribe( ) primitive to a NAN layer, which may be within the MAC layer for NAN communications. In response, the NAN layer in the subscriber may transmit a subscription message 4804 during a first discovery window 4802. The subscription message 4804 may indicate a request for one or more services.

An application on the publisher may determine, for example, that a service (e.g., a gaming service) is available and may issue publish( ) primitive. The publish( ) primitive may cause the NAN layer to publish the service. The publish( ) primitive may also indicate to the NAN layer one or more cipher suites and credentials. A cipher suite is a bundle of algorithms (e.g., cryptographic algorithms such as encryption, integrity protection, hash and key-wrap algorithms) and parameters that are supported by the publisher and may define a profile for security related processing. The cipher suite may provide a means for protocols to support cryptographic agility and version changes in security processing. A cipher suite identifier (CSID) may identify a cipher suite. A CSID may be an octet string that represents a specific cipher suite. The CSID octet string may be 1 to 32 octets in length. Single octet CSID values may be defined and registered to ensure uniqueness for well-known suites of algorithms. Longer CSID values may be allowed to support the creation of unique values using hashes. As such, the CSIDs may indicate types of cryptography algorithms that a device supports. Credentials may be public information presented along with cipher suites to assist in authenticating a party in security negotiations. Examples of credentials include a pairwise master key identifier (PMKID), a public key, a certificate, etc. The credentials may indicate a type of authentication method (e.g., shared key vs. public key) that a device supports.

In one aspect, the publisher may transmit a publish message 4806, which may include CSIDs and/or credentials, during the first discovery window 4802 in response to receiving the subscription message 4804. In another aspect, the publisher may transmit the publish message 4806 during the first discovery window 4802 without receiving the subscription message 4804. The publish message 4806 may indicate that one or more services is available for subscription on the publisher. The publish message 4806 may also advertise supported cipher suites and available credentials for the publisher. Upon receiving the publish message 4806, the NAN layer of the subscriber may transmit discovery results to one or more applications on the subscriber. The discovery results may include the CSIDs and the credentials included in the publish message 4806. The subscriber may select a suitable cipher suite and credentials for conduction NDP negotiation and for establishing a secure data communication 4818.

In one configuration, if the subscriber transmits the subscription message 4804 during the first discovery window 4802, the subscribe message may include an INIT message that requests the publisher to transmit an NDP request 4810. In another configuration, if the subscriber does not transmit the subscription message 4804 or the subscription message 4804 does not include the INIT message, the subscriber may transmit an INIT message 4808 separate from the subscription message 4804 such as during a further service discovery period. In this configuration, an application on the subscriber may execute a datarequest( ) primitive, which may indicate the CSIDs, credentials, peer credentials, and/or pairwise master keys (PMKs) associated with the subscriber to the NAN layer. The INIT message 4808 may include all or part of the CSIDs, credentials, peer credentials, and/or PMKIDs.

Upon receiving the INIT message, either within the subscription message 4804 or as a separate message, the NAN layer of the publisher may transmit a data indication to one or more applications on the publisher. The data indication may include CSIDs and/or credentials supported by the subscriber. In response, one or more applications on the publisher may execute a dataresponse( ) primitive. The dataresponse( ) primitive may include, for example, credentials and a PMK associated with the publisher. The NAN layer may receive the credentials and the PMK and initiate the 4-way handshake.

Assuming both the publisher and the station have PMK or public keys associated with the service, the publisher may initiate the 4-way handshake by transmitting the NDP request 4810. The NDP request may include a CSID, credentials, and a key descriptor. The key descriptor may include values and parameters (e.g., a nonce) for generating a pairwise transient key (PTK), which may be used for unicast communication between two peer devices, and for proving that the publisher and the subscriber each have obtained/derived/generated the same PTK based on the same PMK or public keys exchanged. The PTK may be a NAN unicast security key. A NAN security group may include two or more devices that share a common security policy and compatible security credentials or keying material for one or more services such that any member may send encrypted unicast frames to any other member of the group. Further, once the publisher has authenticated the subscriber, the publisher may also transmit a common group key (CGK) to the subscriber with an encrypted unicast message (e.g., in an NDP security installation message). The CGK may be a separate key used for group communication between members of the NDL. The CGK may be used by all devices associated with the same NAN service or the same instance of the same NAN service.

Upon receiving the NDP request 4810, the subscriber may generate the PTK based on the PMK, the nonce in the NDP request 4810 associated with the publisher, a nonce associated with the subscriber, an identifier associated with the publisher (e.g., a MAC address), and an identifier associated with the subscriber (e.g., a MAC address). When a public key is used as a credential, the subscriber may generate the PTK based on the public key received from the publisher and its own public key. The subscriber may transmit an NDP response 4812 to the publisher. The NDP response 4812 may include a CSID, credential, and a key descriptor with encrypted data (e.g., encrypted based on the PTK). Upon receiving the NDP response 4812, the publisher may generate the PTK based on the PMK, the nonce in the NDP response 4812 associated with the subscriber, the nonce associated with the publisher, an identifier associated with the publisher, and an identifier associated with the subscriber. When a public key is used as a credential, the publisher may generate the PTK based on the public key received from the subscriber and its own public key. After generating the PTK, the publisher may decrypt the encrypted data transmitted in the NDP response 4812. If the decrypted data matches the unencrypted data transmitted by the publisher in the NDP request 4810, then the publisher may confirm that the subscriber has the PMK. The publisher may transmit an NDP security install message 4814 to the subscriber. The NDP security install message 4814 may include a key descriptor, and the NDP security install message 4814 may indicate that the subscriber is authenticated by the publisher. The NDP security install message 4814 may include a group key, which may be used to decode messages from the publisher that may be broadcast or multicast to all subscribers associated with the publisher. The security install message 4814 may indicate that the publisher has derived the same PTK as the subscriber. In an aspect, the NDP security install message 4814 may be transmitted by the publisher in a first NDP security confirmation message (not pictured). Upon receiving the NDP security install message 4814, the subscriber may transmit an NDP security confirmation 4816 indicating that the subscriber is ready for secure data communication 4818 over the NDP. The NDP security confirmation 4816 may be referred to as a second NDP security confirmation message. The NDP security confirmation 4816 may confirm that the subscriber has derived the same PTK as the publisher. The NAN layer on the subscriber may also transmit a data confirmation message to one or more applications on the subscriber indicating that the secure NDP is set up.

Although the above examples provide several scenarios in which the INIT message 4808 may be transmitted, other scenarios are also possible. In one aspect, the INIT message may be included as a field in an attribute (e.g., an NDL attribute) or as part of a new security attribute or a new information element. In another aspect, the INIT message may be a separate message carried in an extensible authentication protocol (EAP) over local area network (LAN) (EAPoL) key frame. In yet another aspect, the INIT message may be a field or an information element in an IEEE 802.1 management frame.

Figure 49:
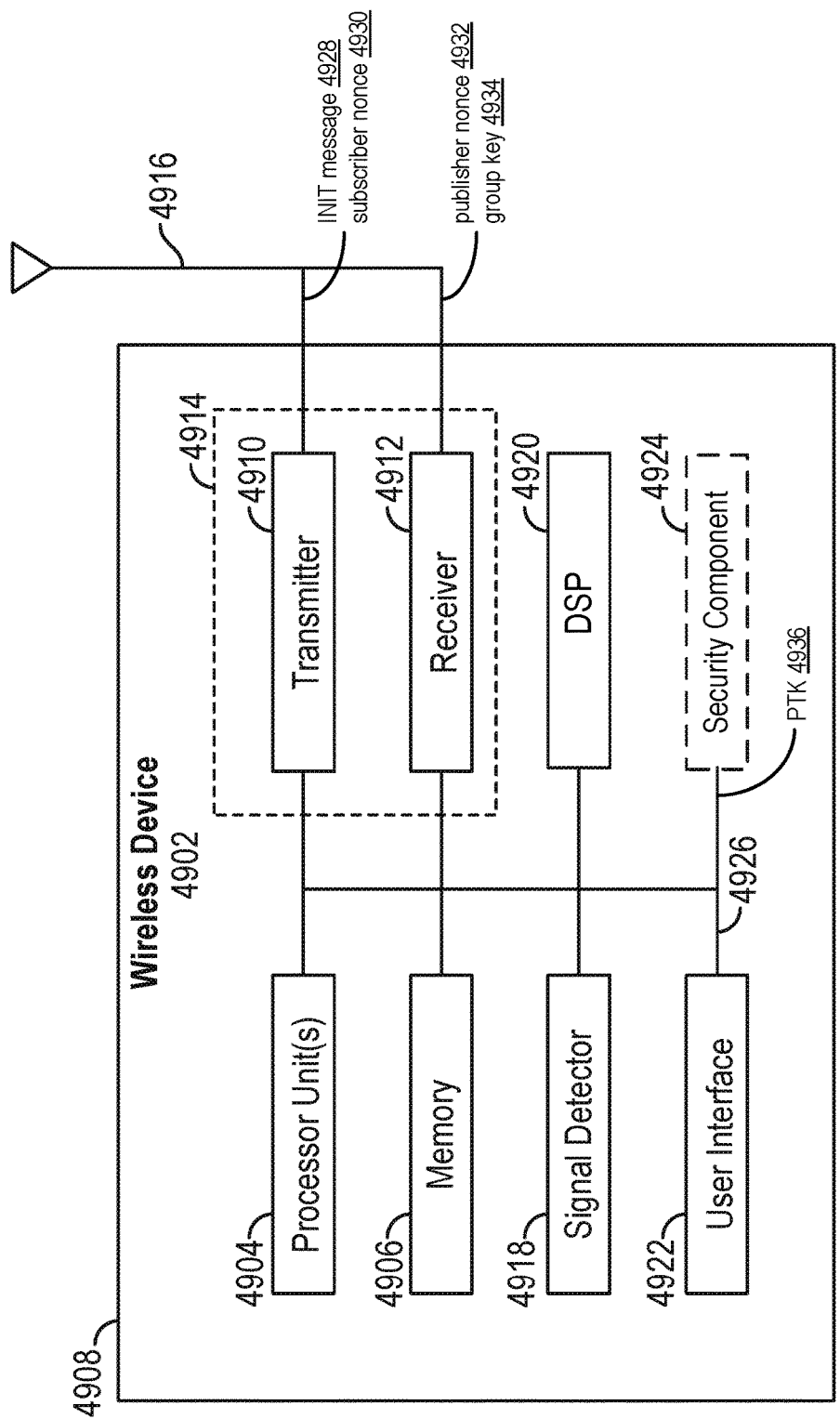
FIG. 49 shows an example functional block diagram of a wireless device 4902 that may perform security negotiations for an NDP within the wireless communication system of FIG. 1.

FIG. 49 shows an example functional block diagram of a wireless device 4902 that may perform security negotiations for an NDP within the wireless communication system 100 of FIG. 1. The wireless device 4902 is an example of a device that may be configured to implement the various methods described herein. For example, the wireless device 4902 may comprise the publisher or the subscriber in FIGS. 47 and 48.

The wireless device 4902 may include a processor 4904, which controls operation of the wireless device 4902. The processor 4904 may also be referred to as a CPU. Memory 4906, which may include both ROM and RAM, may provide instructions and data to the processor 4904. A portion of the memory 4906 may also include NVRAM. The processor 4904 typically performs logical and arithmetic operations based on program instructions stored within the memory 4906. The instructions in the memory 4906 may be executable (by the processor 4904, for example) to implement the methods described herein.

The processor 4904 may comprise or be a component of a processing system implemented with one or more processors. The one or more processors may be implemented with any combination of general-purpose microprocessors, microcontrollers, DSPs, FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 4902 may also include a housing 4908, and the wireless device 4902 may include a transmitter 4910 and/or a receiver 4912 to allow transmission and reception of data between the wireless device 4902 and a remote device. The transmitter 4910 and the receiver 4912 may be combined into a transceiver 4914. An antenna 4916 may be attached to the housing 4908 and electrically coupled to the transceiver 4914. The wireless device 4902 may also include multiple transmitters, multiple receivers, multiple transceivers, and/or multiple antennas.

The wireless device 4902 may also include a signal detector 4918 that may be used to detect and quantify the level of signals received by the transceiver 4914 or the receiver 4912. The signal detector 4918 may detect such signals as total energy, energy per subcarrier per symbol, power spectral density, and other signals. The wireless device 4902 may also include a DSP 4920 for use in processing signals. The DSP 4920 may be configured to generate a packet for transmission. In some aspects, the packet may comprise a PPDU.

The wireless device 4902 may further comprise a user interface 4922 in some aspects. The user interface 4922 may comprise a keypad, a microphone, a speaker, and/or a display. The user interface 4922 may include any element or component that conveys information to a user of the wireless device 4902 and/or receives input from the user.

When the wireless device 4902 is implemented as a STA (e.g., the STA 114), the wireless device 4902 may also comprise a security component 4924.

In one configuration, when the wireless device 4902 is functioning as a subscribing device, the security component 4924 may be configured to determine to initiate a security negotiation with a publishing device to establish a secure NDP in which the publishing device is an authenticator in the security negotiation and the wireless device 4902 is a supplicant. The security component 4924 may be configured to transmit an initiation message (e.g., an INIT message 4928) to the publishing device, which is providing a NAN service, to initiate the security negotiation for establishing the secure NDP. In another configuration, the security component 4924 may be configured to transmit a subscription message to the publishing device, and the subscription message may indicate one or more NAN services requested by the wireless device 4902. In this configuration, the security component 4924 may be configured to receive a publication message from the publication device, and the publication message may indicate at least one NAN service available from the publishing device. In an aspect, the initiation message may be transmitted in the subscription message during a discovery window or the initiation message may be transmitted during an NDP schedule negotiation. In another aspect, the initiation message may be a field, an information element, a message carried in an extensible authentication protocol (EAP) over local area network (LAN) (EAPoL) key frame, or a field or information element carried in an IEEE 802.11 management frame. In another configuration, the security component 4924 may be configured to receive an NDP request message from the publishing device based on the transmitted initiation message (e.g., the NDP request message may include a publisher nonce 4932), to transmit an NDP response message based on the received NDP request message (e.g., the NDP response message may include a subscriber nonce 4930), to receive an NDP security installation message in response to the transmitted NDP response message (e.g., the NDP security installation message may include a group key 4934), and to transmit a NDP security confirmation message based on the received NDP security installation message. In this configuration, the security component 4924 may be configured to generate a PTK 4936 based on the subscriber nonce 4930 and the publisher nonce 4932. In another configuration, the security component 4924 may be configured to transmit an NDP request message to the publishing device, in which the initiation message may be included within the NDP request message, and the initiation message may indicate that the publishing device will be the authenticator in the security negotiation. In this configuration, the security component 4924 may be configured to receive an NDP response message based on the transmitted NDP request message, to transmit an NDP security installation message in response to the received NDP response message, and to receive a NDP security confirmation message based on the transmitted NDP security installation message.

In another configuration, when the wireless device 4902 is functioning as the publishing device, the security component 4924 may be configured to receive an initiation message from a subscribing device, that is requesting a NAN service, to initiate a security negotiation associated with an NDP and to determine based on the received initiation message that the wireless device 4902 is an authenticator and the subscribing device is a supplicant in the security negotiation. In another configuration, the security component 4924 may be configured to transmit an NDP request message to the subscribing device based on the received initiation message. In another configuration, the security component 4924 may be configured to receive a subscription message from the subscribing device, and the subscription message may indicate one or more NAN services requested by the subscribing device. In this configuration, the initiation message may be received in the subscription message. Also in this configuration, the security component 4924 may be configured to transmit a publication message to the subscribing device, and the publication message may indicate at least one NAN service available from the wireless device 4902. In another configuration, the security component 4924 may be configured to receive an NDP request message from the subscribing device, and the initiation message may be included within the NDP request message.

The various components of the wireless device 4902 may be coupled together by a bus system 4926. The bus system 4926 may include a data bus, for example, as well as a power bus, a control signal bus, and a status signal bus in addition to the data bus. Components of the wireless device 4902 may be coupled together or accept or provide inputs to each other using some other mechanism.

Although a number of separate components are illustrated in FIG. 49, one or more of the components may be combined or commonly implemented. For example, the processor 4904 may be used to implement not only the functionality described above with respect to the processor 4904, but also to implement the functionality described above with respect to the signal detector 4918, the DSP 4920, the user interface 4922, and/or the security component 4924. Further, each of the components illustrated in FIG. 49 may be implemented using a plurality of separate elements.

Figure 50:
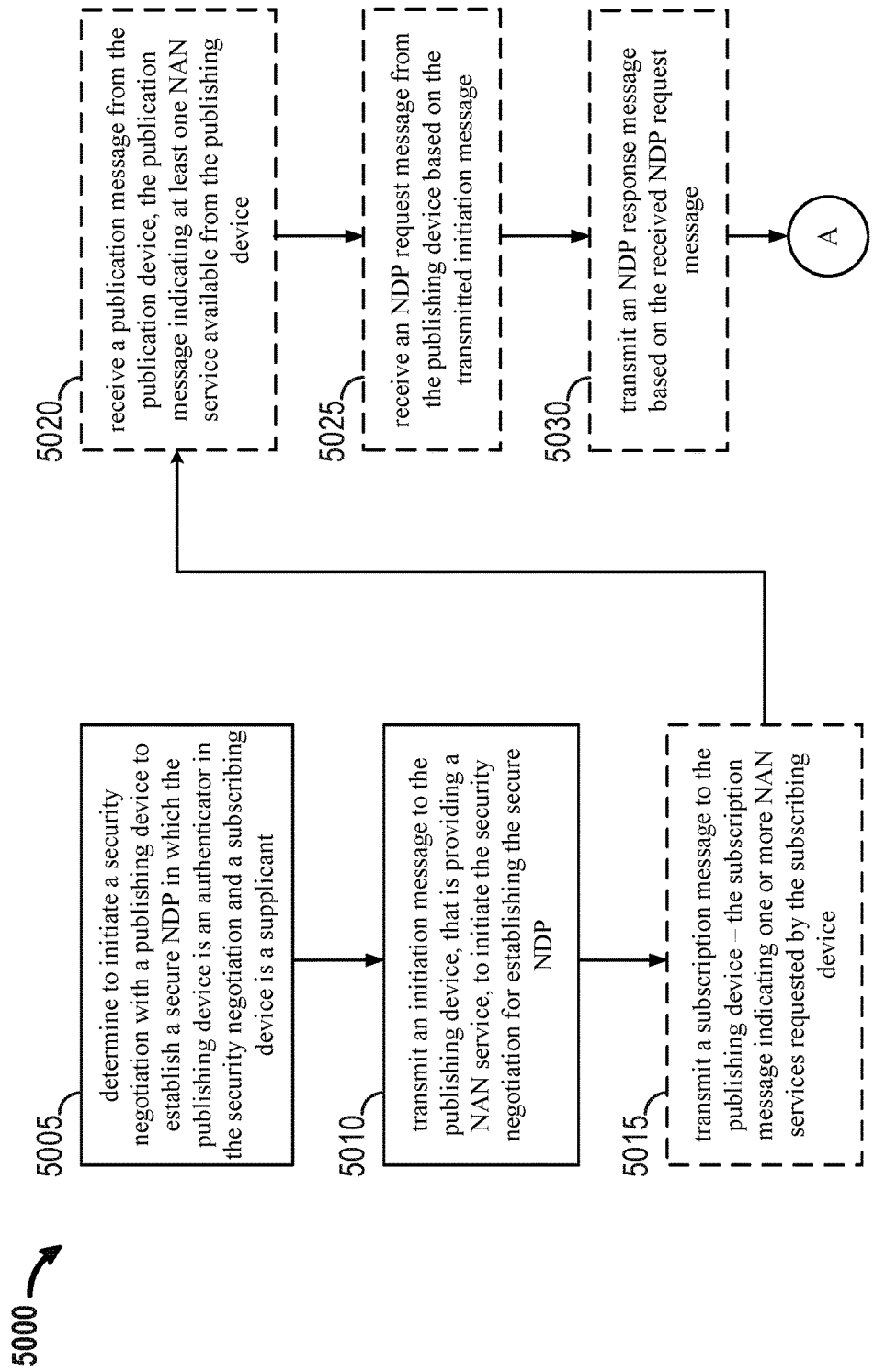
FIGS. 50-51 are flowcharts of exemplary methods of requesting a publisher to initiate a security negotiation for a secure NDP.
Figure 51:
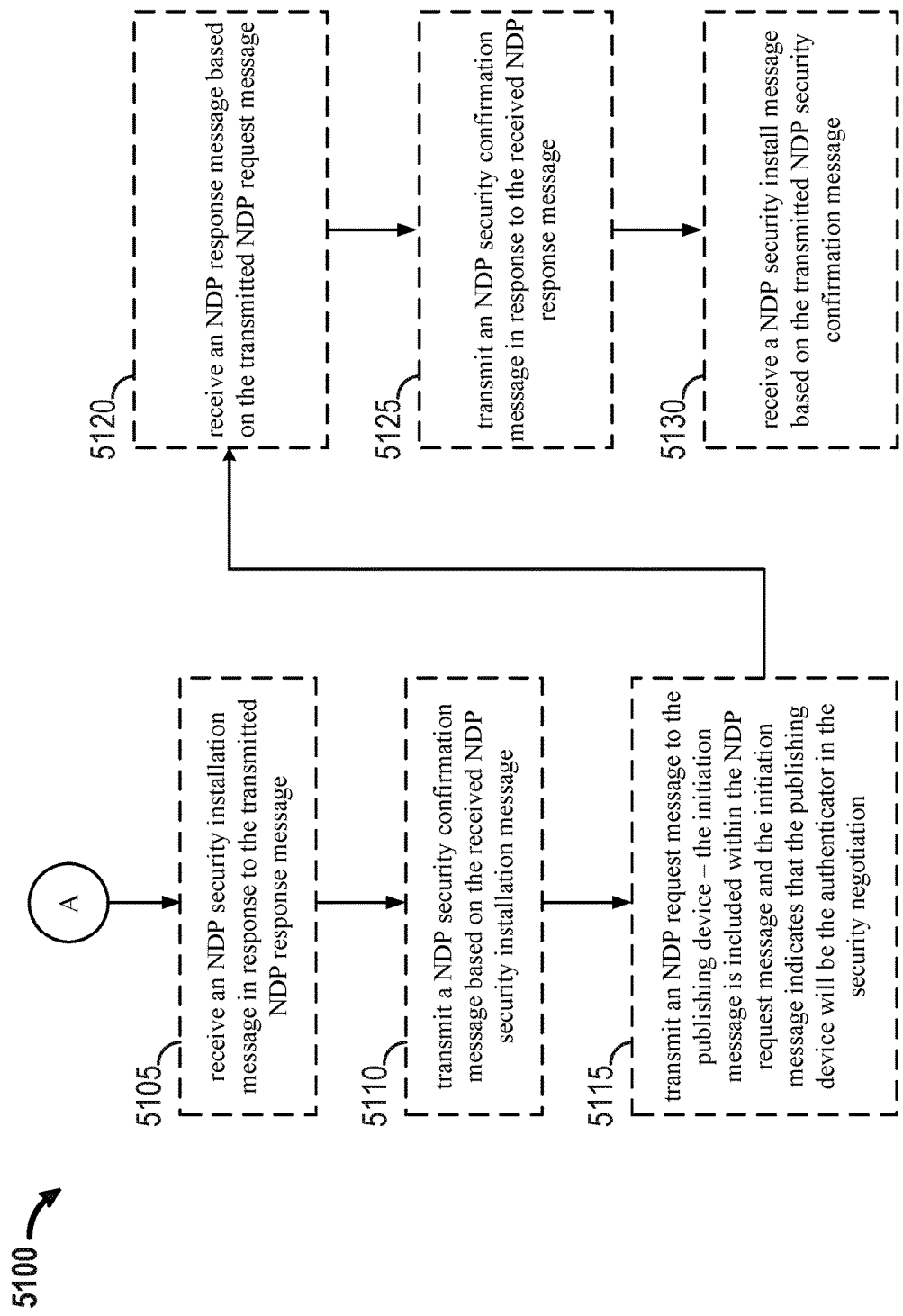

FIGS. 50-51 are flowcharts of exemplary methods 5000, 5100 of requesting a publisher to initiate a security negotiation for a secure NDP. The methods 5000, 5100 may be performed using an apparatus (e.g., the STA 114 or the wireless device 4902, for example). Although the methods 5000, 5100 are described below with respect to the elements of wireless device 4902 of FIG. 49, other components may be used to implement one or more of the steps described herein.

At block 5005, an apparatus may determine to initiate a security negotiation with a publishing device to establish a secure NDP in which the publishing device is an authenticator in the security negotiation and a subscribing device is a supplicant. For example, referring to FIG. 38, the apparatus may correspond to the subscriber. The subscriber may determine to initiate a security negotiation with the publisher to establish a secure NDP (e.g., the secure data communication 4818) in which the publisher is an authenticator in the security negotiation and the subscriber is the supplicant. In one configuration, the subscriber may determine to initiate the security negotiation by executing a subscribe( ) primitive and by causing the NAN layer of the subscriber to transmit an INIT message in the subscription message 4804 to request for one or more NAN services. In another configuration, the subscriber may determine to initiate the security negotiation after receiving the publish message 4806 indicating that one or more NAN services is available. In this configuration, the NAN layer of the subscriber may transmit discovery results to the application layer, and the application layer may execute a datarequest( ) primitive to cause the NAN layer to transmit the INIT message 4808 (e.g., as a standalone message or as part of the NDP scheduling or security negotiation procedure).

At block 5010, the apparatus may transmit an initiation message to the publishing device, which is providing a NAN service, to initiate the security negotiation for establishing the secure NDP. For example, referring to FIG. 48, the subscriber may transmit the INIT message 4808 to the publisher that is providing the NAN service, to initiate the security negotiation for establishing the secure NDP.

At block 5015, the apparatus may transmit a subscription message to the publishing device. The subscription message may indicate one or more NAN services requested by the subscribing device. For example, referring to FIG. 48, the subscriber may transmit the subscription message 4804 to the publisher. The subscription message 4804 may indicate one or more NAN services requested by the subscriber. In this example, the subscription message 4804 may include the INIT message that requests the publisher to transmit the NDP request 4810.

At block 5020, the apparatus may receive a publication message from the publication device, and the publication message may indicate at least one NAN service available from the publishing device. For example, referring to FIG. 48, the subscriber may receive the publish message 4806 from the publisher, and the publish message 4806 may indicate at least one NAN service available from the publisher. The publish message 4806 may further include CSIDs and credentials to be used for security negotiations between the publisher and the subscriber.

At block 5025, the apparatus may receive an NDP request message from the publishing device based on the transmitted initiation message. For example, the subscriber may receive the NDP request 4810 from the publisher based on the transmitted initiation message. In one aspect, the transmitted initiation message may be in the subscription message 4804. In another aspect, the transmitted initiation message may be a separate message, such as the INIT message 4808. The NDP request 4810 may include CSIDs identifying available cipher suites at the publisher. The NDP request 4810 may include credentials and a key descriptor, which may include a nonce from the publisher for generating the PTK from the PMK.

At block 5030, the apparatus may transmit an NDP response message based on the received NDP request message. For example, referring to FIG. 48, the subscriber may generate a PTK based on the PMK, a nonce associated with the publisher, a nonce associated with the subscriber, the identifier associated with the publisher, and the identifier associated with the subscriber. After generating the PTK, the subscriber may transmit the NDP response 4812 based on the received NDP request 4810. The NDP response 4812 may include CSIDs selected by the subscriber along with associated credentials. The NDP response 4812 may include a key descriptor, which may include the nonce associated with the subscriber and data encrypted based on the PTK.

Continuing to FIG. 51, at block 5105, the apparatus may receive an NDP security installation message in response to the transmitted NDP response message. For example, the subscriber may receive the NDP security install message 4814 in response to transmitting the NDP response 4812. The NDP security install message 4814 may include a key descriptor, and the key descriptor may include a confirmation that the subscriber has the PMK and/or that the subscriber is authenticated by the publisher.

At block 5110, the apparatus may transmit a NDP security confirmation message based on the received NDP security installation message. For example, referring to FIG. 48, the subscriber may transmit the NDP security confirmation 4816 based on the received NDP security install message 4814.

The NDP security confirmation 4816 may indicate that the subscriber is ready for secure data communication 4818 over the NDP.

In another configuration, at block 5115, the apparatus may transmit an NDP request message to the publishing device. The initiation message may be included within the NDP request message, and the initiation message may indicate that the publishing device will be the authenticator in the security negotiation. For example, referring to FIG. 47, the apparatus may be the subscriber. The subscriber may transmit the NDP request 4708 to the publisher. The NDP request 4708 may include an INIT field that indicates that the publisher is to be the authenticator in the security negotiation. The contents of the NDP request 4708 may be similar to the contents of the NDP request 4810 in FIG. 48.

In this configuration, at block 5120, the apparatus may receive an NDP response message based on the transmitted NDP request message. For example, referring to FIG. 47, the subscriber may receive the NDP response 4710 based on the transmitted NDP request 4708. The NDP response 4710 may include similar content as the NDP response 4812 in FIG. 48. At block 5125, the apparatus may transmit an NDP security confirmation message in response to the received NDP response message. For example, referring to FIG. 47, the subscriber transmit the NDP security confirmation 4712. The NDP security confirmation 4712 may include similar content as the NDP security confirmation 4816. At block 5130, the apparatus may receive an NDP security install message based on the transmitted NDP security confirmation message. For example, referring to FIG. 47, the subscriber may receive the NDP security install message 4714 based on the transmitted NDP security confirmation 4712. The NDP security install message 4714 may include similar content as the NDP security install message 4814.

Figure 52:
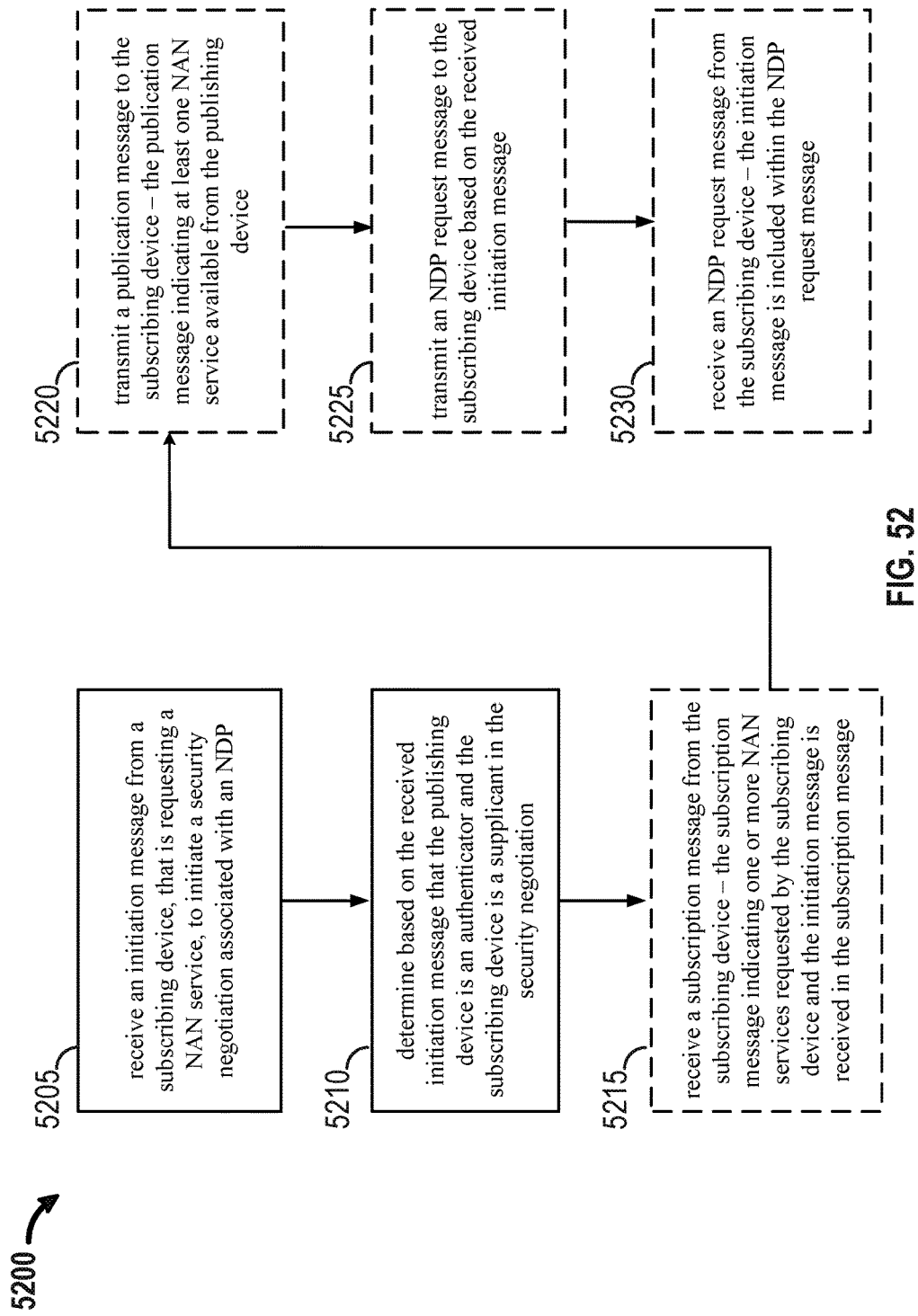
FIG. 52 is a flowchart of an exemplary method of initiating a security negotiation for a secure NDP at a publisher.

FIG. 52 is a flowchart of an exemplary method 5200 of initiating a security negotiation for a secure NDP at a publisher. The method 5200 may be performed using an apparatus (e.g., the STA 114 or the wireless device 4902, for example). Although the method 5200 is described below with respect to the elements of wireless device 4902 of FIG. 49, other components may be used to implement one or more of the steps described herein.

At block 5205, an apparatus may receive an initiation message from a subscribing device, which is requesting a NAN service, to initiate a security negotiation associated with an NDP. For example, referring to FIG. 48, the apparatus may correspond to the publisher. The publisher may receive an INIT message from the subscriber, which is requesting the NAN service, to initiate the 4-way handshake associated with the NDP. The INIT message may indicate that the publisher is the authenticator in the 4-way handshake.

At block 5210, the apparatus may determine based on the received initiation message that the publishing device is an authenticator and the subscribing device is a supplicant in the security negotiation. For example, referring to FIG. 48, the publisher may determine based on the received INIT message that the publisher is the authenticator and the subscriber is the supplicant in the 4-way handshake. For example, the INIT message may include a bit value. When the bit value is set to 0, then the publisher is the supplicant, and when the bit value is set to 1 then the publisher is the authenticator. The publisher may determine whether the bit value is set to 0 or 1 and determine whether the publisher is the authenticator or the supplicant based on the bit value.

In one configuration, at block 5215, the apparatus may receive a subscription message from the subscribing device. The subscription message may indicate one or more NAN services requested by the subscribing device, and the initiation message may be received in the subscription message. For example, referring to FIG. 48, the publisher may receive the subscription message 4804 from the subscriber. The subscription message 4804 may indicate one or more NAN services requested by the subscriber, and the INIT message may be included in the subscription message 4804. In this configuration, at block 5220, the apparatus may transmit a publication message to the subscribing device. The publication message may indicate at least one NAN service available from the publishing device. For example, referring to FIG. 48, the publisher may transmit the publish message 4806 to the subscriber. The publish message 4806 may indicate at least one NAN service available from the publisher. The publish message 4806 may further indicate supported cipher suites and available credentials for the publisher.

In another configuration, the subscriber may transmit the initiation message as a separate message. In this configuration, at block 5225, the apparatus may transmit an NDP request message to the subscribing device based on the received initiation message. For example, referring to FIG. 48, the subscriber may transmit the INIT message 4808 as a separate message. The publisher may then transmit the NDP request 4810 to the subscriber based on the received INIT message 4808. The NDP request 4810 may include CSIDs, credentials, and a key descriptor associated with the publisher.

In another configuration, at block 5230, the apparatus may receive an NDP request message from the subscribing device. The initiation message may be included within the NDP request message. For example, referring to FIG. 47, the publisher may receive the NDP request 4708 from the subscriber, and the INIT message may be included within the NDP request 4708.

Figure 53:
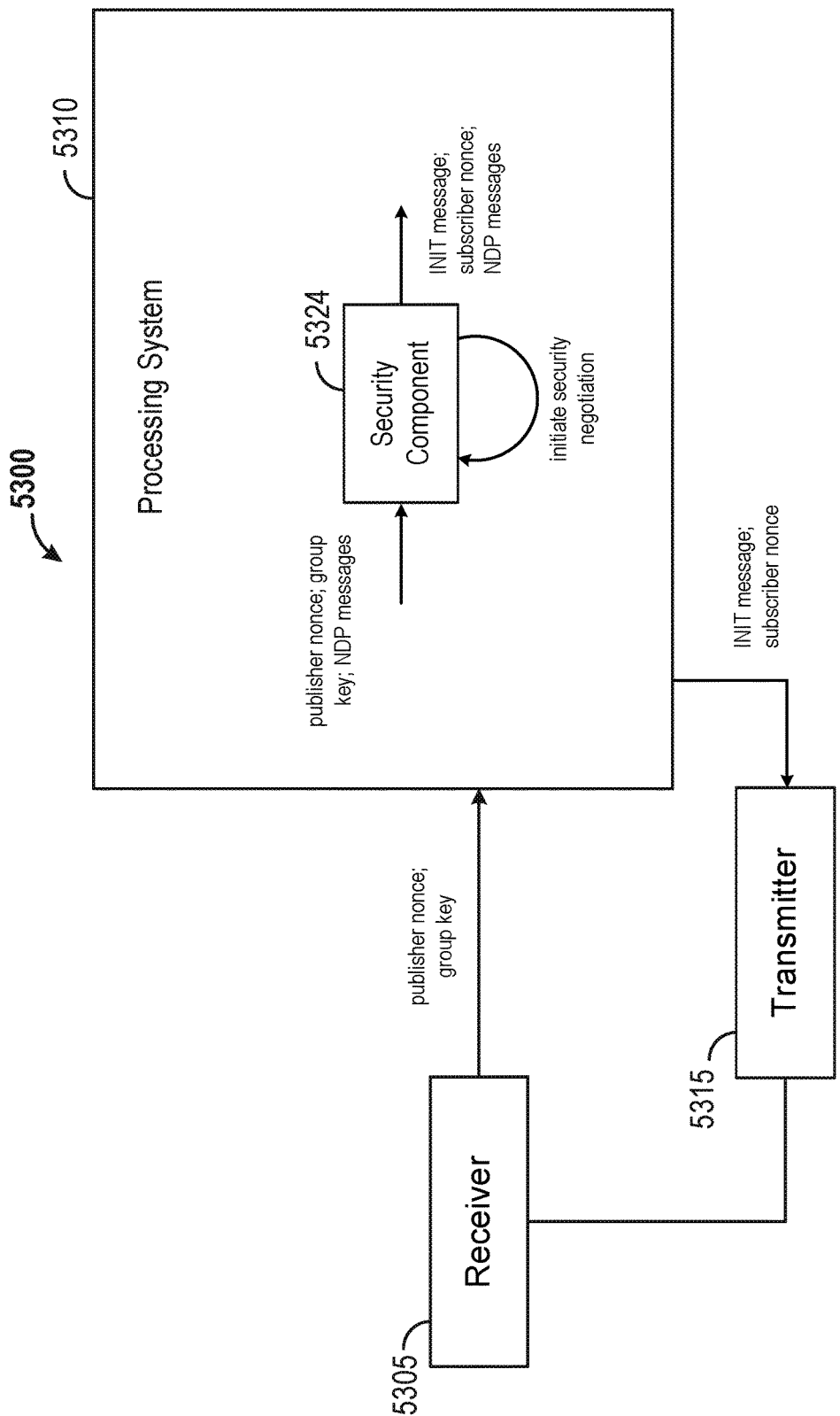
FIG. 53 is a functional block diagram of an example wireless communication device that performs security negotiations.

FIG. 53 is a functional block diagram of an example wireless communication device 5300 that performs security negotiations. The wireless communication device 5300 may include a receiver 5305, a processing system 5310, and a transmitter 5315. The processing system 5310 may include a security component 5324.

In one configuration, the wireless communication device 5300 may be a subscribing device. In this configuration, the processing system 5310, and/or the security component 5324 may be configured to determine to initiate a security negotiation with a publishing device to establish a secure NDP in which the publishing device is an authenticator in the security negotiation and the subscribing device is a supplicant. The processing system 5310, the security component 5324, and/or the transmitter 5315 may be configured to transmit an initiation message to the publishing device, which is providing a NAN service, to initiate the security negotiation for establishing the secure NDP. The initiation message may indicate that the publishing device will be the authenticator in the security negotiation. In another configuration, the processing system 5310, the security component 5324, and/or the transmitter 5315 may be configured to transmit a subscription message to the publishing device, and the subscription message may indicate one or more NAN services requested by the subscribing device. In this configuration, the processing system 5310, the security component 5324, and/or the receiver 5305 may be configured to receive a publication message from the publication device, and the publication message may indicate at least one NAN service available from the publishing device. In an aspect, the initiation message may be transmitted in the subscription message during a discovery window or the initiation message may be transmitted during an NDP schedule negotiation. In another aspect, the initiation message may be a field, an information element, a message carried in an EAPoL key frame, or a field or information element carried in an IEEE 802.11 management frame. In another configuration, the processing system 5310, the security component 5324, and/or the receiver 5305 may be configured to receive an NDP request message from the publishing device based on the transmitted initiation message. In this configuration, the processing system 5310, the security component 5324, and/or the transmitter 5315 may be configured to transmit an NDP response message based on the received NDP request message. In this configuration, the processing system 5310, the security component 5324, and/or the receiver 5305 may be configured to receive an NDP security installation message in response to the transmitted NDP response message. In this configuration, the processing system 5310, the security component 5324, and/or the transmitter 5315 may be configured to transmit a NDP security confirmation message based on the received NDP security installation message. In another configuration, the processing system 5310, the security component 5324, and/or the transmitter 5315 may be configured to transmit an NDP request message to the publishing device, and the initiation message may be included within the NDP request message. In this configuration, the processing system 5310, the security component 5324, and/or the receiver 5305 may be configured to receive an NDP response message based on the transmitted NDP request message. In this configuration, the processing system 5310, the security component 5324, and/or the transmitter 5315 may be configured to transmit an NDP security confirmation message in response to the received NDP response message. In this configuration, the processing system 5310, the security component 5324, and/or the receiver 5305 may be configured to receive a NDP security installation message based on the transmitted NDP security confirmation message.

In another configuration, the wireless communication device 5300 may be a publishing device. In another configuration, the processing system 5310, the security component 5324, and/or the receiver 5305 may be configured to receive an initiation message from a subscribing device, which is requesting a NAN service, to initiate a security negotiation associated with an NDP. The initiation message may indicate that the publishing device is an authenticator in the security negotiation. In this configuration, the processing system 5310 and/or the security component 5324 may be configured to determine based on the received initiation message that the publishing device is the authenticator and the subscribing device is a supplicant in the security negotiation. In another configuration, the processing system 5310, the security component 5324, and/or the transmitter 5315 may be configured to transmit an NDP request message to the subscribing device based on the received initiation message. In another configuration, the processing system 5310, the security component 5324, and/or the receiver 5305 may be configured to receive a subscription message from the subscribing device. The subscription message may indicate one or more NAN services requested by the subscribing device, and the initiation message may be received in the subscription message. In this configuration, the processing system 5310, the security component 5324, and/or the transmitter 5315 may be configured to transmit a publication message to the subscribing device, and the publication message may indicate at least one NAN service available from the publishing device. In another configuration, the processing system 5310, the security component 5324, and/or the receiver 5305 may be configured to receive an NDP request message from the subscribing device, and the initiation message may be included within the NDP request message.

In one configuration, the transmitter 5315, the processing system 5310, and/or the security component 5324 may be configured to perform one or more functions discussed above with respect to blocks 5005, 5010, 5015, 5020, 5025, 5030 of FIG. 50, to blocks 5105, 5110, 5115, 5120, 5125, and 5130 of FIG. 51, and to blocks 5205, 5210, 5215, 5220, 5225, and 5230 of FIG. 52. The receiver 5305 may correspond to the receiver 2812. The processing system 5310 may correspond to the processor 4904. The transmitter 5315 may correspond to the transmitter 4910. The security component 5324 may correspond to the security component 4924 and/or the security component 128.

In one configuration, the wireless communication device 5300 may be a subscribing device. In this configuration, the wireless communication device 5300 may include means for determining to initiate a security negotiation with a publishing device to establish a secure NDP in which the publishing device is an authenticator in the security negotiation and the subscribing device is a supplicant. The wireless communication device 5300 may include means for transmitting an initiation message to the publishing device, which is providing a NAN service, to initiate the security negotiation for establishing the secure NDP. The initiation message may indicate that the publishing device will be the authenticator in the security negotiation. In another configuration, the wireless communication device 5300 may include means for transmitting a subscription message to the publishing device, and the subscription message may indicate one or more NAN services requested by the subscribing device. In this configuration, the wireless communication device 5300 may include means for receiving a publication message from the publication device, and the publication message may indicate at least one NAN service available from the publishing device. In an aspect, the initiation message may be transmitted in the subscription message during a discovery window or the initiation message is transmitted during an NDP schedule negotiation. In another aspect, the initiation message may be a field, an information element, a message carried in an EAPoL key frame, or a field or information element carried in an IEEE 802.11 management frame. In another configuration, the wireless communication device 5300 may include means for receiving an NDP request message from the publishing device based on the transmitted initiation message, means for transmitting an NDP response message based on the received NDP request message, means for receiving an NDP security installation message in response to the transmitted NDP response message, and means for transmitting a NDP security confirmation message based on the received NDP security installation message. In another configuration, the wireless communication device 5300 may include means for transmitting an NDP request message to the publishing device, in which the initiation message is included within the NDP request message, means for receiving an NDP response message based on the transmitted NDP request message, means for transmitting an NDP security confirmation message in response to the received NDP response message, and means for receiving a NDP security installation message based on the transmitted NDP security confirmation message.

For example, means for determining may include the processing system 5310 and/or the security component 5324. Means for transmitting may include the processing system 5310, the security component 5324, and/or the transmitter 5315. Means for receiving may include the processing system 5310, the security component 5324, and/or the receiver 5305.

In another configuration, the wireless communication device 5300 may be a publishing device. In this configuration, the wireless communication device 5300 may include means for receiving an initiation message from a subscribing device, which is requesting a NAN service, to initiate a security negotiation associated with an NDP. The initiation message may indicate that the publishing device is an authenticator in the security negotiation. In this configuration, the wireless communication device may include means for determining based on the received initiation message that the publishing device is the authenticator and the subscribing device is a supplicant in the security negotiation. In another configuration, the wireless communication device may include means for transmitting an NDP request message to the subscribing device based on the received initiation message. In another configuration, the wireless communication device may include means for receiving a subscription message from the subscribing device. The subscription message may indicate one or more NAN services requested by the subscribing device, and the initiation message may be received in the subscription message. IN this configuration, the wireless communication device may include means for transmitting a publication message to the subscribing device, and the publication message may indicate at least one NAN service available from the publishing device. In another configuration, the wireless communication device may include means for receiving an NDP request message from the subscribing device, and the initiation message may be included within the NDP request message.

For example, means for receiving may include the processing system 5310, the security component 5324, and/or the receiver 5305. Means for determining may include the processing system 5310 and/or the security component 5324. Means for receiving may include the processing system 5310, the security component 5324, and/or the transmitter 5315.

In an aspect, the NDL and NDP principles described herein may also be applicable to other peer-to-peer communication protocols.

The various operations of methods described above may be performed by any suitable means capable of performing the operations, such as various hardware and/or software component(s), circuits, and/or component(s). Generally, any operations illustrated in the Figures may be performed by corresponding functional means capable of performing the operations.

The various illustrative logical blocks, components and circuits described in connection with the present disclosure may be implemented or performed with a general purpose processor, a DS), an ASIC, a FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a first wireless device, comprising:
    determining a multicast schedule for communicating data associated with a service over a neighbor awareness networking (NAN) data link (NDL); and
    transmitting, to at least one other wireless device, the multicast schedule and information indicative that the multicast schedule is for propagation to other wireless devices requesting subscription to the service.

2. The method of claim 1, wherein the first wireless device is a service anchor for the service, and wherein the service anchor is a sole entity responsible for communicating the multicast schedule associated with the service.

3. The method of claim 2, wherein the first wireless device does not publish the service.

4. The method of claim 1, further comprising receiving a request from the at least one other wireless device to initiate the NDL for the service, wherein the multicast schedule is an immutable schedule.

5. The method of claim 1, wherein the service remains available for subscription by another wireless device based on an availability of the first wireless device to communicate the multicast schedule.

6. The method of claim 1, further comprising transmitting the information indicative that the multicast schedule is for propagation to other wireless devices requesting subscription to the service in a message.

7. The method of claim 6, wherein the multicast schedule is associated with an instance of the service, and the multicast schedule is different from a set of multicast schedules associated with different instances of the service.

8. The method of claim 1, further comprising receiving a message that indicates the multicast schedule, wherein the multicast schedule is determined based on the received message.

9. The method of claim 8, wherein the message includes the information indicative that the multicast schedule is for propagation to other wireless devices requesting subscription to the service.

10. The method of claim 1, further comprising determining whether the service is a one-to-many or many-to-many service during service initialization.

11. The method of claim 1, wherein the multicast schedule is associated with a service identifier and a service instance identifier related to the service.

12. The method of claim 1, further comprising indicating from an application or a service layer whether the service is a one-to-many or a many-to-many service during service initialization through a data link initialization primitive.

13. The method of claim 1, further comprising transmitting a traffic announcement that includes a multicast identifier associated with the service, wherein the traffic announcement indicates that data will be transmitted for the service.

14. A method of wireless communication by a first wireless device, comprising:
    transmitting a first message to a second wireless device to request a multicast schedule for communicating data associated with a service over a neighbor awareness networking (NAN) data link (NDL); and
    receiving a second message from the second wireless device based on the transmitted message, wherein the second message includes the multicast schedule for communicating data associated with the service over the NDL and information indicative that the multicast schedule is for propagation to other wireless devices requesting subscription to the service.

15. The method of claim 14, wherein the multicast schedule is inherited from a service provider of the service.

16. The method of claim 14, wherein the first wireless device is allowed to authenticate a third wireless device to join the NDL after successfully authenticating with the second wireless device to join the NDL.

17. The method of claim 14, further comprising receiving a common group key (CGK) after being authenticated by the second wireless device, wherein the CGK enables single authentication group authorization for encrypting and decrypting group-addressed traffic associated with the NDL.

18. The method of claim 14, wherein the multicast schedule is an immutable schedule.

19. The method of claim 14, wherein the second wireless device is a service anchor for the service, and the second wireless device is a sole entity responsible for communicating the multicast schedule associated with the service.

20. The method of claim 14, further comprising determining whether the service is a one-to-many or many-to-many service during service initialization.

21. The method of claim 14, further comprising indicating from an application or a service layer whether the service is a one-to-many or a many-to-many service during service initialization through a data link initialization primitive.

22. The method of claim 14, further comprising receiving a traffic announcement that includes a multicast identifier associated with a multicast service, wherein the traffic announcement indicates that data will be transmitted for the multicast service.

23. The method of claim 22, further comprising determining whether to enter a sleep mode based on the received traffic announcement.

24. An apparatus for wireless communication, comprising:
    means for determining a multicast schedule for communicating data associated with a service over a neighbor awareness networking (NAN) data link (NDL); and
    means for transmitting, to at least one other wireless device, the multicast schedule and information indicative that the multicast schedule is for propagation to other wireless devices requesting subscription to the service.

25. The apparatus of claim 24, wherein the apparatus is a service anchor for the service, and wherein the service anchor is a sole entity responsible for communicating the multicast schedule associated with the service.

26. The apparatus of claim 25, wherein the apparatus does not publish the service.

27. The apparatus of claim 24, further comprising means for receiving a request from the at least one other wireless device to initiate the NDL for the service, wherein the multicast schedule is an immutable schedule.

28. The apparatus of claim 24, wherein the service remains available for subscription by another wireless device based on an availability of the apparatus to communicate the multicast schedule.

29. The apparatus of claim 24, wherein the means for transmitting the information indicative that the multicast schedule is for propagation to other wireless devices requesting subscription to the service is configured to transmit the information indicative that the multicast schedule is for propagation to other wireless devices requesting subscription to the service in a message.

30. The apparatus of claim 29, wherein the multicast schedule is associated with an instance of the service, and the multicast schedule is different from a set of multicast schedules associated with different instances of the service.

31. The apparatus of claim 24, further comprising means for receiving a message that indicates the multicast schedule, wherein the multicast schedule is determined based on the received message.

32. The apparatus of claim 31, wherein the message includes the information indicative that the multicast schedule is for propagation to other wireless devices requesting subscription to the service.

33. The apparatus of claim 24, further comprising means for determining whether the service is a one-to-many or many-to-many service during service initialization.

34. The apparatus of claim 24, wherein the multicast schedule is associated with a service identifier and a service instance identifier related to the service.

35. The apparatus of claim 24, further comprising means for indicating from an application or a service layer whether the service is a one-to-many or a many-to-many service during service initialization through a data link initialization primitive.

36. The apparatus of claim 24, further comprising means for transmitting a traffic announcement that includes a multicast identifier associated with the service, wherein the traffic announcement indicates that data will be transmitted for the service.

37. An apparatus for wireless communication, comprising:
    means for transmitting a first message to a first wireless device to request a multicast schedule for communicating data associated with a service over a neighbor awareness networking (NAN) data link (NDL); and
    means for receiving a second message from the first wireless device based on the transmitted message, wherein the second message includes the multicast schedule for communicating data associated with the service over the NDL and information indicative that the multicast schedule is for propagation to other wireless devices requesting subscription to the service.

38. The apparatus of claim 37, wherein the multicast schedule is inherited from a service provider of the service.

39. The apparatus of claim 37, wherein the apparatus is allowed to authenticate a third wireless device to join the NDL after successfully authenticating with the first wireless device to join the NDL.

40. The apparatus of claim 37, further comprising means for receiving a common group key (CGK) after being authenticated by the first wireless device, wherein the CGK enables single authentication group authorization for encrypting and decrypting group-addressed traffic associated with the NDL.

41. The apparatus of claim 37, wherein the multicast schedule is an immutable schedule.

42. The apparatus of claim 37, wherein the first wireless device is a service anchor for the service, and the first wireless device is a sole entity responsible for communicating the multicast schedule associated with the service.

43. The apparatus of claim 37, further comprising means for determining whether the service is a one-to-many or many-to-many service during service initialization.

44. The apparatus of claim 37, further comprising means for indicating from an application or a service layer whether the service is a one-to-many or a many-to-many service during service initialization through a data link initialization primitive.

45. The apparatus of claim 37, further comprising means for receiving a traffic announcement that includes a multicast identifier associated with a multicast service, wherein the traffic announcement indicates that data will be transmitted for the multicast service.

46. The apparatus of claim 45, further comprising means for determining whether to enter a sleep mode based on the received traffic announcement.

47. An apparatus for wireless communication, comprising:
    a memory; and
    at least one processor coupled to the memory, wherein the at least one processor is configured to:
        determine a multicast schedule for communicating data associated with a service over a neighbor awareness networking (NAN) data link (NDL); and
        transmit, to at least one other wireless device, the multicast schedule and information indicative that the multicast schedule is for propagation to other wireless devices requesting subscription to the service.

48. The apparatus of claim 47, wherein the apparatus is a service anchor for the service, and wherein the service anchor is a sole entity responsible for communicating the multicast schedule associated with the service.

49. The apparatus of claim 48, wherein the apparatus does not publish the service.

50. The apparatus of claim 47, wherein the at least one processor is further configured to receive a request from the at least one other wireless device to initiate the NDL for the service, wherein the multicast schedule is an immutable schedule.

51. The apparatus of claim 47, wherein the service remains available for subscription by another wireless device based on an availability of the apparatus to communicate the multicast schedule.

52. The apparatus of claim 47, wherein to transmit the information indicative that the multicast schedule is for propagation to other wireless devices requesting subscription to the service, the at least one processor is configured to transmit the information indicative that the multicast schedule is for propagation to other wireless devices requesting subscription to the service in a message.

53. The apparatus of claim 52, wherein the multicast schedule is associated with an instance of the service, and the multicast schedule is different from a set of multicast schedules associated with different instances of the service.

54. The apparatus of claim 47, wherein the at least one processor is further configured to receive a message that indicates the multicast schedule, wherein the multicast schedule is determined based on the received message.

55. The apparatus of claim 54, wherein the message includes the information indicative that the multicast schedule is for propagation to other wireless devices requesting subscription to the service.

56. The apparatus of claim 47, wherein the at least one processor is further configured to determine whether the service is a one-to-many or many-to-many service during service initialization.

57. The apparatus of claim 47, wherein the multicast schedule is associated with a service identifier and a service instance identifier related to the service.

58. The apparatus of claim 47, wherein the at least one processor is further configured to indicate from an application or a service layer whether the service is a one-to-many or a many-to-many service during service initialization through a data link initialization primitive.

59. The apparatus of claim 47, wherein the at least one processor is further configured to transmit a traffic announcement that includes a multicast identifier associated with the service, wherein the traffic announcement indicates that data will be transmitted for the service.

60. An apparatus for wireless communication, comprising:
a memory; and
at least one processor coupled to the memory, wherein the at least one processor is configured to:
transmit a first message to a first wireless device to request a multicast schedule for communicating data associated with a service over a neighbor awareness networking (NAN) data link (NDL); and
receive a second message from the first wireless device based on the transmitted message, wherein the second message includes the multicast schedule for communicating data associated with the service over the NDL and information indicative that the multicast schedule is for propagation to other wireless devices requesting subscription to the service.

61. The apparatus of claim 60, wherein the multicast schedule is inherited from a service provider of the service.

62. The apparatus of claim 60, wherein the apparatus is allowed to authenticate a third wireless device to join the NDL after successfully authenticating with the first wireless device to join the NDL.

63. The apparatus of claim 60, wherein the at least one processor is further configured to receive a common group key (CGK) after being authenticated by the first wireless device, wherein the CGK enables single authentication group authorization for encrypting and decrypting group-addressed traffic associated with the NDL.

64. The apparatus of claim 60, wherein the multicast schedule is an immutable schedule.

65. The apparatus of claim 60, wherein the first wireless device is a service anchor for the service, and the first wireless device is a sole entity responsible for communicating the multicast schedule associated with the service.

66. The apparatus of claim 60, wherein the at least one processor is further configured to determine whether the service is a one-to-many or many-to-many service during service initialization.

67. The apparatus of claim 60, wherein the at least one processor is further configured to indicate from an application or a service layer whether the service is a one-to-many or a many-to-many service during service initialization through a data link initialization primitive.

68. The apparatus of claim 60, wherein the at least one processor is further configured to receive a traffic announcement that includes a multicast identifier associated with a multicast service, wherein the traffic announcement indicates that data will be transmitted for the multicast service.

69. The apparatus of claim 68, wherein the at least one processor is further configured to determine whether to enter a sleep mode based on the received traffic announcement.

70. A non-transitory computer-readable medium having code stored thereon that, when executed, causes a first wireless device to:
determine a multicast schedule for communicating data associated with a service over a neighbor awareness networking (NAN) data link (NDL); and
transmit, to at least one other wireless device, the multicast schedule and information indicative that the multicast schedule is for propagation to other wireless devices requesting subscription to the service.

71. A non-transitory computer-readable medium having code stored thereon that, when executed, causes a first wireless device to:
transmit a message to a second wireless device to request a multicast schedule for communicating data associated with a service over a neighbor awareness networking (NAN) data link (NDL); and
receive a second message from the second wireless device based on the transmitted message, wherein the second message includes the multicast schedule for communicating data associated with the service over the NDL.

72. A method of wireless communication by a first wireless device, comprising:
transmitting a first message to a second wireless device to request a multicast schedule for communicating data associated with a service over a neighbor awareness networking (NAN) data link (NDL);
receiving a second message from the second wireless device based on the transmitted message, wherein the second message includes the multicast schedule for communicating data associated with the service over the NDL; and
receiving a common group key (CGK) after being authenticated by the second wireless device, wherein the CGK enables single authentication group authorization for encrypting and decrypting group-addressed traffic associated with the NDL.

73. An apparatus for wireless communication, comprising:
means for transmitting a first message to a first wireless device to request a multicast schedule for communicating data associated with a service over a neighbor awareness networking (NAN) data link (NDL);
means for receiving a second message from the first wireless device based on the transmitted message, wherein the second message includes the multicast schedule for communicating data associated with the service over the NDL; and
means for receiving a common group key (CGK) after being authenticated by the first wireless device, wherein the CGK enables single authentication group authorization for encrypting and decrypting group-addressed traffic associated with the NDL.

74. An apparatus for wireless communication, comprising:
- a memory; and
- at least one processor coupled to the memory, wherein the at least one processor is configured to:
  - transmit a first message to a first wireless device to request a multicast schedule for communicating data associated with a service over a neighbor awareness networking (NAN) data link (NDL);
  - receive a second message from the first wireless device based on the transmitted message, wherein the second message includes the multicast schedule for communicating data associated with the service over the NDL; and
  - receive a common group key (CGK) after being authenticated by the first wireless device, wherein the CGK enables single authentication group authorization for encrypting and decrypting group-addressed traffic associated with the NDL.

* * * * *